(12) United States Patent
Anderson et al.

(10) Patent No.: US 8,606,946 B2
(45) Date of Patent: Dec. 10, 2013

(54) METHOD, SYSTEM AND COMPUTER PROGRAM FOR DRIVING A DATA SIGNAL IN DATA INTERFACE COMMUNICATION DATA LINK

(75) Inventors: Jon James Anderson, Boulder, CO (US); Brian Steele, Lafayette, CO (US); George Alan Wiley, San Diego, CA (US); Shashank Shekhar, Erie, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1606 days.

(21) Appl. No.: 10/987,123

(22) Filed: Nov. 12, 2004

(65) Prior Publication Data

US 2005/0135390 A1  Jun. 23, 2005

Related U.S. Application Data

(60) Provisional application No. 60/519,833, filed on Nov. 12, 2003.

(51) Int. Cl.
*G06F 13/00* (2006.01)

(52) U.S. Cl.
USPC ........................................................ 709/230

(58) Field of Classification Search
USPC ........................................................ 709/230
See application file for complete search history.

(56) References Cited

U.S. PATENT DOCUMENTS

| | | |
|---|---|---|
| 3,594,304 A | 7/1971 | Seitzer |
| 4,042,783 A | 8/1977 | Gindi |
| 4,363,123 A | 12/1982 | Grover |
| 4,393,444 A | 7/1983 | Weinberg |
| 4,491,943 A | 1/1985 | Iga et al. |
| 4,660,096 A | 4/1987 | Arlan et al. |
| 4,764,805 A | 8/1988 | Rabbani et al. |
| 4,769,761 A | 9/1988 | Downes et al. |
| 4,812,296 A | 3/1989 | Schmelz et al. |

(Continued)

FOREIGN PATENT DOCUMENTS

| CN | 88101302 A | 10/1988 |
|---|---|---|
| CN | 1234709 A | 11/1999 |

(Continued)

OTHER PUBLICATIONS

Plug and Display Standard, Video Electronics Standards Association (VESA) San Jose, CA (Jun. 11, 1997).

(Continued)

*Primary Examiner* — Robert B Harrell
(74) *Attorney, Agent, or Firm* — Nicholas J. Pauley; Peter Michael Kamarchik; Joseph Agusta

(57) ABSTRACT

A data Interface for transferring digital data between a host and a client over a communication path using packet structures linked together to form a communication protocol for communicating a pre-selected set of digital control and presentation data. The signal protocol is used by link controllers configured to generate, transmit, and receive packets forming the communications protocol, and to form digital data into one or more types of data packets, with at least one residing in the host device and being coupled to the client through the communications path. The data interface includes a system, method and computer program for driving a data signal to a logic one state for a first predetermined range of strobe signals and then driving the data signal to a logic zero state for a second predetermined range of strobe cycles for starting up a digital data interface communication data link from hibernation.

16 Claims, 71 Drawing Sheets

(56) References Cited

U.S. PATENT DOCUMENTS

| | | |
|---|---|---|
| 4,821,296 A | 4/1989 | Cordell |
| 5,079,693 A | 1/1992 | Miller |
| 5,111,455 A | 5/1992 | Negus |
| 5,131,012 A | 7/1992 | Dravida |
| 5,138,616 A | 8/1992 | Wagner, Jr. et al. |
| 5,155,590 A | 10/1992 | Beyers et al. |
| 5,167,035 A | 11/1992 | Mann et al. |
| 5,224,213 A | 6/1993 | Dieffenderfer et al. |
| 5,227,783 A | 7/1993 | Shaw et al. |
| 5,231,636 A | 7/1993 | Rasmussen |
| 5,331,642 A | 7/1994 | Valley et al. |
| 5,345,542 A | 9/1994 | Wye |
| 5,359,595 A | 10/1994 | Weddle et al. |
| 5,377,188 A | 12/1994 | Seki |
| 5,396,636 A | 3/1995 | Gallagher et al. |
| 5,418,452 A | 5/1995 | Pyle |
| 5,418,952 A | 5/1995 | Morley et al. |
| 5,420,858 A | 5/1995 | Marshall et al. |
| 5,422,894 A | 6/1995 | Abe et al. |
| 5,430,486 A | 7/1995 | Fraser et al. |
| 5,477,534 A | 12/1995 | Kusano |
| 5,483,185 A | 1/1996 | Scriber et al. |
| 5,490,247 A | 2/1996 | Tung et al. |
| 5,502,499 A | 3/1996 | Birch et al. |
| 5,510,832 A | 4/1996 | Garcia |
| 5,513,185 A | 4/1996 | Schmidt |
| 5,519,830 A | 5/1996 | Opoczynski |
| 5,521,907 A | 5/1996 | Ennis, Jr. et al. |
| 5,524,007 A | 6/1996 | White et al. |
| 5,530,704 A | 6/1996 | Gibbons et al. |
| 5,535,336 A | 7/1996 | Smith et al. |
| 5,543,939 A | 8/1996 | Harvey et al. |
| 5,546,121 A | 8/1996 | Gotanda et al. |
| 5,550,489 A | 8/1996 | Raab |
| 5,559,459 A | 9/1996 | Back et al. |
| 5,559,952 A | 9/1996 | Fujimoto |
| 5,560,022 A | 9/1996 | Dunstan et al. |
| 5,565,957 A | 10/1996 | Goto |
| 5,575,951 A | 11/1996 | Anderson |
| 5,604,450 A | 2/1997 | Borkar et al. |
| 5,619,650 A | 4/1997 | Bach et al. |
| 5,621,664 A | 4/1997 | Phaal |
| 5,646,947 A | 7/1997 | Cooper et al. |
| 5,664,948 A | 9/1997 | Dimitriadis et al. |
| 5,680,404 A | 10/1997 | Gray |
| 5,726,990 A | 3/1998 | Shimada et al. |
| 5,732,352 A | 3/1998 | Gutowski et al. |
| 5,733,131 A | 3/1998 | Park |
| 5,734,118 A | 3/1998 | Ashour et al. |
| 5,751,445 A | 5/1998 | Masunaga |
| 5,751,951 A | 5/1998 | Osborne et al. |
| 5,777,999 A | 7/1998 | Hiraki et al. |
| 5,790,551 A | 8/1998 | Chan |
| 5,798,720 A | 8/1998 | Yano |
| 5,802,351 A | 9/1998 | Frampton |
| 5,815,507 A | 9/1998 | Vinggaard et al. |
| 5,816,921 A | 10/1998 | Hosokawa |
| 5,818,255 A | 10/1998 | New et al. |
| 5,822,603 A | 10/1998 | Hansen et al. |
| 5,844,918 A | 12/1998 | Kato |
| 5,847,752 A | 12/1998 | Sebestyen |
| 5,862,160 A | 1/1999 | Irvin et al. |
| 5,864,546 A | 1/1999 | Campanella |
| 5,867,501 A | 2/1999 | Horst et al. |
| 5,867,510 A | 2/1999 | Steele |
| 5,881,262 A | 3/1999 | Abramson et al. |
| 5,903,281 A | 5/1999 | Chen et al. |
| 5,935,256 A | 8/1999 | Lesmeister |
| 5,953,378 A | 9/1999 | Hotani et al. |
| 5,958,006 A | 9/1999 | Eggleston et al. |
| 5,963,557 A | 10/1999 | Eng |
| 5,963,564 A | 10/1999 | Petersen et al. |
| 5,963,979 A | 10/1999 | Inoue |
| 5,969,750 A | 10/1999 | Hsieh et al. |
| 5,982,362 A | 11/1999 | Crater et al. |
| 5,983,261 A | 11/1999 | Riddle |
| 5,990,852 A | 11/1999 | Szamrej |
| 5,990,902 A | 11/1999 | Park |
| 5,995,512 A | 11/1999 | Pogue, Jr. |
| 6,002,709 A | 12/1999 | Hendrickson |
| 6,014,705 A | 1/2000 | Koenck et al. |
| 6,047,380 A | 4/2000 | Nolan et al. |
| 6,049,837 A | 4/2000 | Youngman |
| 6,055,247 A | 4/2000 | Kubota et al. |
| 6,064,649 A | 5/2000 | Johnston |
| 6,078,361 A | 6/2000 | Reddy |
| 6,081,513 A | 6/2000 | Roy |
| 6,091,709 A | 7/2000 | Harrison et al. |
| 6,092,231 A | 7/2000 | Sze |
| 6,097,401 A | 8/2000 | Owen et al. |
| 6,101,601 A | 8/2000 | Matthews et al. |
| 6,117,681 A | 9/2000 | Salmons et al. |
| 6,118,791 A | 9/2000 | Fichou et al. |
| 6,151,067 A | 11/2000 | Suemoto et al. |
| 6,151,320 A | 11/2000 | Shim |
| 6,154,156 A | 11/2000 | Tagato |
| 6,154,466 A | 11/2000 | Iwasaki et al. |
| 6,185,601 B1 | 2/2001 | Wolff |
| 6,192,230 B1 | 2/2001 | Van Bokhorst et al. |
| 6,198,752 B1 | 3/2001 | Lee |
| 6,199,169 B1 | 3/2001 | Voth |
| 6,222,677 B1 | 4/2001 | Budd et al. |
| 6,236,647 B1 | 5/2001 | Amalfitano |
| 6,242,953 B1 | 6/2001 | Thomas |
| 6,243,596 B1 | 6/2001 | Kikinis |
| 6,243,761 B1 | 6/2001 | Mogul et al. |
| 6,246,876 B1 | 6/2001 | Hontzeas |
| 6,252,526 B1 | 6/2001 | Uyehara |
| 6,252,888 B1 | 6/2001 | Fite, Jr. et al. |
| 6,256,509 B1 | 7/2001 | Tanaka et al. |
| 6,288,739 B1 | 9/2001 | Hales et al. |
| 6,297,684 B1 | 10/2001 | Uyehara et al. |
| 6,308,239 B1 | 10/2001 | Osakada et al. |
| 6,335,696 B1 | 1/2002 | Aoyagi et al. |
| 6,359,479 B1 | 3/2002 | Oprescu |
| 6,363,439 B1 | 3/2002 | Battles et al. |
| 6,393,008 B1 | 5/2002 | Cheng et al. |
| 6,397,286 B1 | 5/2002 | Chatenever et al. |
| 6,400,392 B1 | 6/2002 | Yamaguchi et al. |
| 6,400,654 B1 | 6/2002 | Sawamura et al. |
| 6,400,754 B2 | 6/2002 | Fleming et al. |
| 6,421,735 B1 | 7/2002 | Jung et al. |
| 6,429,867 B1 | 8/2002 | Deering |
| 6,430,196 B1 | 8/2002 | Baroudi |
| 6,430,606 B1 | 8/2002 | Haq |
| 6,434,187 B1 | 8/2002 | Beard et al. |
| 6,438,363 B1 | 8/2002 | Feder et al. |
| 6,457,090 B1 | 9/2002 | Young |
| 6,475,245 B2 | 11/2002 | Gersho et al. |
| 6,477,186 B1 | 11/2002 | Nakura et al. |
| 6,480,521 B1 | 11/2002 | Odenwalder et al. |
| 6,483,825 B2 | 11/2002 | Seta |
| 6,487,217 B1 | 11/2002 | Baroudi |
| 6,493,357 B1 | 12/2002 | Fujisaki |
| 6,493,713 B1 | 12/2002 | Kanno |
| 6,493,824 B1 | 12/2002 | Novoa et al. |
| 6,545,979 B1 | 4/2003 | Poulin |
| 6,549,958 B1 | 4/2003 | Kuba |
| 6,574,211 B2 | 6/2003 | Padovani et al. |
| 6,583,809 B1 | 6/2003 | Fujiwara |
| 6,594,304 B2 | 7/2003 | Chan |
| 6,609,167 B1 | 8/2003 | Bastiani et al. |
| 6,611,221 B1 | 8/2003 | Soundarapandian et al. |
| 6,611,503 B1 | 8/2003 | Fitzgerald et al. |
| 6,618,360 B1 | 9/2003 | Scoville et al. |
| 6,621,809 B1 | 9/2003 | Lee et al. |
| 6,621,851 B1 | 9/2003 | Agee et al. |
| 6,636,508 B1 | 10/2003 | Li et al. |
| 6,636,922 B1 | 10/2003 | Bastiani et al. |
| 6,662,322 B1 | 12/2003 | Abdelilah et al. |
| 6,690,201 B1 | 2/2004 | Simkins et al. |
| 6,714,233 B2 | 3/2004 | Chihara et al. |
| 6,715,088 B1 | 3/2004 | Togawa |
| 6,728,263 B2 | 4/2004 | Joy et al. |

(56) References Cited

U.S. PATENT DOCUMENTS

| | | |
|---|---|---|
| 6,738,344 B1 | 5/2004 | Bunton et al. |
| 6,745,364 B2 | 6/2004 | Bhatt et al. |
| 6,754,179 B1 | 6/2004 | Lin |
| 6,760,722 B1 | 7/2004 | Raghunandan |
| 6,760,772 B2 | 7/2004 | Zou et al. |
| 6,760,882 B1 | 7/2004 | Gesbert et al. |
| 6,765,506 B1 | 7/2004 | Lu |
| 6,771,613 B1 | 8/2004 | O'Toole et al. |
| 6,778,493 B1 | 8/2004 | Ishii |
| 6,782,039 B2 | 8/2004 | Alamouti et al. |
| 6,784,941 B1 | 8/2004 | Su et al. |
| 6,791,379 B1 | 9/2004 | Wakayama et al. |
| 6,797,891 B1 | 9/2004 | Blair et al. |
| 6,804,257 B1 | 10/2004 | Benayoun et al. |
| 6,810,084 B1 | 10/2004 | Jun et al. |
| 6,813,638 B1 | 11/2004 | Sevanto et al. |
| 6,816,929 B2 | 11/2004 | Ueda |
| 6,831,685 B1 | 12/2004 | Ueno et al. |
| 6,836,469 B1 | 12/2004 | Wu |
| 6,850,282 B1 | 2/2005 | Makino et al. |
| 6,865,240 B1 | 3/2005 | Kwataka |
| 6,865,609 B1 | 3/2005 | Gubbi et al. |
| 6,865,610 B2 | 3/2005 | Bolosky et al. |
| 6,867,668 B1 | 3/2005 | Dagostino et al. |
| 6,882,361 B1 | 4/2005 | Gaylord |
| 6,886,035 B2 | 4/2005 | Wolff |
| 6,892,071 B2 | 5/2005 | Park |
| 6,894,994 B1 | 5/2005 | Grob et al. |
| 6,895,410 B2 | 5/2005 | Ridge |
| 6,897,891 B2 | 5/2005 | Itsukaichi |
| 6,906,762 B1 | 6/2005 | Witehira |
| 6,927,746 B2 | 8/2005 | Lee et al. |
| 6,947,436 B2 | 9/2005 | Harris et al. |
| 6,950,428 B1 | 9/2005 | Horst et al. |
| 6,956,829 B2 | 10/2005 | Lee |
| 6,973,039 B2 | 12/2005 | Redi et al. |
| 6,973,062 B1 | 12/2005 | Han |
| 6,975,145 B1 | 12/2005 | Vadi et al. |
| 6,990,549 B2 | 1/2006 | Main et al. |
| 6,993,393 B2 | 1/2006 | Von Arx et al. |
| 6,999,432 B2 | 2/2006 | Zhang et al. |
| 7,003,796 B1 | 2/2006 | Humpleman |
| 7,010,607 B1 | 3/2006 | Bunton |
| 7,012,636 B2 | 3/2006 | Hatanaka |
| 7,015,838 B1 | 3/2006 | Groen et al. |
| 7,023,924 B1 | 4/2006 | Keller et al. |
| 7,030,796 B2 | 4/2006 | Shim et al. |
| 7,036,066 B2 | 4/2006 | Weibel et al. |
| 7,042,914 B2 | 5/2006 | Zerbe et al. |
| 7,047,475 B2 | 5/2006 | Sharma et al. |
| 7,051,218 B1 | 5/2006 | Gulick et al. |
| 7,062,264 B2 | 6/2006 | Ko et al. |
| 7,062,579 B2 | 6/2006 | Tateyama et al. |
| 7,068,666 B2 | 6/2006 | Foster et al. |
| 7,095,435 B1 | 8/2006 | Hartman et al. |
| 7,110,420 B2 | 9/2006 | Bashirullah et al. |
| 7,126,945 B2 | 10/2006 | Beach |
| 7,138,989 B2 | 11/2006 | Mendelson et al. |
| 7,143,177 B1 | 11/2006 | Johnson et al. |
| 7,143,207 B2 | 11/2006 | Vogt |
| 7,145,411 B1 | 12/2006 | Blair et al. |
| 7,151,940 B2 | 12/2006 | Diao |
| 7,158,536 B2 | 1/2007 | Ching et al. |
| 7,158,539 B2 | 1/2007 | Zhang et al. |
| 7,161,846 B2 | 1/2007 | Padaparambil |
| 7,165,112 B2 | 1/2007 | Battin et al. |
| 7,178,042 B2 | 2/2007 | Sakagami |
| 7,180,951 B2 | 2/2007 | Chan |
| 7,184,408 B2 | 2/2007 | Denton et al. |
| 7,187,738 B2 | 3/2007 | Naven et al. |
| 7,191,281 B2 | 3/2007 | Bajikar |
| 7,219,294 B2 | 5/2007 | Vogt |
| 7,231,402 B2 | 6/2007 | Dickens |
| 7,251,231 B2 | 7/2007 | Gubbi |
| 7,257,087 B2 | 8/2007 | Grovenburg |
| 7,260,087 B2 | 8/2007 | Bao et al. |
| 7,269,153 B1 | 9/2007 | Schultz et al. |
| 7,274,652 B1 | 9/2007 | Webster et al. |
| 7,278,069 B2 | 10/2007 | Abrosimov et al. |
| 7,284,181 B1 | 10/2007 | Venkatramani |
| 7,301,968 B2 | 11/2007 | Haran et al. |
| 7,310,535 B1 | 12/2007 | MacKenzie et al. |
| 7,315,265 B2 | 1/2008 | Wiley et al. |
| 7,315,520 B2 | 1/2008 | Xue et al. |
| 7,317,754 B1 | 1/2008 | Remy et al. |
| 7,327,735 B2 | 2/2008 | Robotham et al. |
| 7,336,139 B2 | 2/2008 | Blair et al. |
| 7,336,667 B2 | 2/2008 | Allen et al. |
| 7,340,548 B2 | 3/2008 | Love et al. |
| 7,349,973 B2 | 3/2008 | Saito et al. |
| 7,373,155 B2 | 5/2008 | Duan et al. |
| 7,383,350 B1 | 6/2008 | Moore et al. |
| 7,383,399 B2 | 6/2008 | Vogt |
| 7,392,541 B2 | 6/2008 | Largman et al. |
| 7,403,511 B2 | 7/2008 | Liang et al. |
| 7,405,703 B2 | 7/2008 | Qi et al. |
| 7,412,642 B2 | 8/2008 | Cypher |
| 7,430,001 B2 | 9/2008 | Fujii |
| 7,447,953 B2 | 11/2008 | Vogt |
| 7,451,362 B2 | 11/2008 | Chen et al. |
| 7,487,917 B2 | 2/2009 | Kotlarsky et al. |
| 7,508,760 B2 | 3/2009 | Akiyama et al. |
| 7,515,705 B2 | 4/2009 | Segawa et al. |
| 7,526,323 B2 | 4/2009 | Kim et al. |
| 7,536,598 B2 | 5/2009 | Largman et al. |
| 7,543,326 B2 | 6/2009 | Moni |
| 7,557,633 B2 | 7/2009 | Yu |
| 7,574,113 B2 | 8/2009 | Nagahara et al. |
| 7,595,834 B2 | 9/2009 | Kawai et al. |
| 7,595,835 B2 | 9/2009 | Kosaka |
| 7,634,607 B2 | 12/2009 | Honda |
| 7,643,823 B2 | 1/2010 | Shamoon et al. |
| 7,729,720 B2 | 6/2010 | Suh et al. |
| 7,800,600 B2 | 9/2010 | Komatsu et al. |
| 7,813,451 B2 | 10/2010 | Binder et al. |
| 7,831,127 B2 | 11/2010 | Wilkinson |
| 7,835,280 B2 | 11/2010 | Pang et al. |
| 7,844,296 B2 | 11/2010 | Yuki |
| 7,873,343 B2 | 1/2011 | Gollnick et al. |
| 7,876,821 B2 | 1/2011 | Li et al. |
| 7,877,439 B2 | 1/2011 | Gallou et al. |
| 7,912,503 B2 | 3/2011 | Chang et al. |
| 7,945,143 B2 | 5/2011 | Yahata et al. |
| 7,949,777 B2 | 5/2011 | Wallace et al. |
| 8,031,130 B2 | 10/2011 | Tamura |
| 8,077,634 B2 | 12/2011 | Maggenti et al. |
| 8,325,239 B2 | 12/2012 | Kaplan et al. |
| 2001/0005385 A1 | 6/2001 | Ichiguchi et al. |
| 2001/0012293 A1 | 8/2001 | Peterson et al. |
| 2001/0032295 A1 | 10/2001 | Tsai et al. |
| 2001/0047450 A1 | 11/2001 | Gillingham et al. |
| 2001/0047475 A1 | 11/2001 | Terasaki |
| 2001/0053174 A1 | 12/2001 | Fleming et al. |
| 2002/0011998 A1 | 1/2002 | Tamura |
| 2002/0045448 A1 | 4/2002 | Park et al. |
| 2002/0071395 A1 | 6/2002 | Redi et al. |
| 2002/0131379 A1 | 9/2002 | Lee et al. |
| 2002/0140845 A1 | 10/2002 | Yoshida et al. |
| 2002/0146024 A1 | 10/2002 | Harris et al. |
| 2002/0188907 A1 | 12/2002 | Kobayashi |
| 2002/0193133 A1 | 12/2002 | Shibutani |
| 2003/0003943 A1 | 1/2003 | Bajikar |
| 2003/0028647 A1 | 2/2003 | Grosu |
| 2003/0033417 A1 | 2/2003 | Wiley et al. |
| 2003/0034955 A1 | 2/2003 | Gilder et al. |
| 2003/0035049 A1 | 2/2003 | Dickens et al. |
| 2003/0039212 A1 | 2/2003 | Lloyd et al. |
| 2003/0061431 A1 | 3/2003 | Mears et al. |
| 2003/0081557 A1 | 5/2003 | Mettala et al. |
| 2003/0086443 A1 | 5/2003 | Beach |
| 2003/0091056 A1 | 5/2003 | Walker et al. |
| 2003/0093607 A1 | 5/2003 | Main et al. |
| 2003/0125040 A1 | 7/2003 | Walton et al. |
| 2003/0144006 A1 | 7/2003 | Johansson et al. |

(56) References Cited

U.S. PATENT DOCUMENTS

| | | |
|---|---|---|
| 2003/0158979 A1 | 8/2003 | Tateyama et al. |
| 2003/0185220 A1 | 10/2003 | Valenci |
| 2003/0191809 A1 | 10/2003 | Mosley et al. |
| 2003/0193576 A1 | 10/2003 | Fujii |
| 2003/0194018 A1 | 10/2003 | Chang |
| 2003/0235209 A1 | 12/2003 | Garg et al. |
| 2004/0008631 A1 | 1/2004 | Kim |
| 2004/0024920 A1 | 2/2004 | Gulick et al. |
| 2004/0028415 A1 | 2/2004 | Eiselt |
| 2004/0049616 A1 | 3/2004 | Dunstan et al. |
| 2004/0073697 A1 | 4/2004 | Saito et al. |
| 2004/0082383 A1 | 4/2004 | Muncaster et al. |
| 2004/0100966 A1 | 5/2004 | Allen, Jr. et al. |
| 2004/0128563 A1 | 7/2004 | Kaushik et al. |
| 2004/0130466 A1 | 7/2004 | Lu |
| 2004/0140459 A1 | 7/2004 | Haigh et al. |
| 2004/0153952 A1 | 8/2004 | Sharma et al. |
| 2004/0176065 A1 | 9/2004 | Liu |
| 2004/0184450 A1 | 9/2004 | Omran |
| 2004/0199652 A1 | 10/2004 | Zou et al. |
| 2004/0221315 A1 | 11/2004 | Kobayashi |
| 2004/0260823 A1 | 12/2004 | Tiwari et al. |
| 2005/0012905 A1 | 1/2005 | Morinaga |
| 2005/0020279 A1 | 1/2005 | Markhovsky et al. |
| 2005/0021885 A1 | 1/2005 | Anderson et al. |
| 2005/0033586 A1 | 2/2005 | Savell |
| 2005/0055399 A1 | 3/2005 | Savchuk |
| 2005/0088939 A1 | 4/2005 | Hwang et al. |
| 2005/0091593 A1 | 4/2005 | Peltz |
| 2005/0108611 A1 | 5/2005 | Vogt |
| 2005/0117601 A1 | 6/2005 | Anderson et al. |
| 2005/0120079 A1 | 6/2005 | Anderson et al. |
| 2005/0120208 A1 | 6/2005 | Dobson et al. |
| 2005/0125840 A1 | 6/2005 | Anderson et al. |
| 2005/0138260 A1 | 6/2005 | Love |
| 2005/0144225 A1 | 6/2005 | Anderson et al. |
| 2005/0154599 A1 | 7/2005 | Kopra et al. |
| 2005/0163085 A1 | 7/2005 | Cromer et al. |
| 2005/0163116 A1 | 7/2005 | Anderson et al. |
| 2005/0165970 A1 | 7/2005 | Ching et al. |
| 2005/0184993 A1 | 8/2005 | Ludwin et al. |
| 2005/0204057 A1 | 9/2005 | Anderson et al. |
| 2005/0213593 A1 | 9/2005 | Anderson et al. |
| 2005/0216421 A1 | 9/2005 | Barry et al. |
| 2005/0216599 A1 | 9/2005 | Anderson et al. |
| 2005/0216623 A1 | 9/2005 | Dietrich et al. |
| 2005/0248685 A1 | 11/2005 | Seo et al. |
| 2005/0259670 A1 | 11/2005 | Anderson et al. |
| 2005/0265333 A1 | 12/2005 | Coffey et al. |
| 2005/0271072 A1 | 12/2005 | Anderson et al. |
| 2005/0286466 A1 | 12/2005 | Tagg et al. |
| 2006/0004968 A1 | 1/2006 | Vogt |
| 2006/0034301 A1 | 2/2006 | Anderson et al. |
| 2006/0034326 A1 | 2/2006 | Anderson et al. |
| 2006/0120433 A1 | 6/2006 | Baker et al. |
| 2006/0128399 A1 | 6/2006 | Duan et al. |
| 2006/0161691 A1 | 7/2006 | Katibian et al. |
| 2006/0164424 A1 | 7/2006 | Wiley et al. |
| 2006/0168496 A1 | 7/2006 | Steele et al. |
| 2006/0171414 A1 | 8/2006 | Katibian et al. |
| 2006/0179164 A1 | 8/2006 | Katibian et al. |
| 2006/0179384 A1 | 8/2006 | Wiley et al. |
| 2006/0212775 A1 | 9/2006 | Cypher |
| 2006/0274031 A1 | 12/2006 | Yuen et al. |
| 2006/0288133 A1 | 12/2006 | Katibian et al. |
| 2007/0008897 A1 | 1/2007 | Denton et al. |
| 2007/0073949 A1 | 3/2007 | Fredrickson et al. |
| 2007/0274434 A1 | 11/2007 | Arkas et al. |
| 2008/0036631 A1 | 2/2008 | Musfeldt |
| 2008/0088492 A1 | 4/2008 | Wiley et al. |
| 2008/0129749 A1 | 6/2008 | Wiley et al. |
| 2008/0147951 A1 | 6/2008 | Love |
| 2008/0282296 A1 | 11/2008 | Kawai et al. |
| 2009/0055709 A1 | 2/2009 | Anderson et al. |
| 2009/0070479 A1 | 3/2009 | Anderson et al. |
| 2009/0290628 A1 | 11/2009 | Matsumoto |
| 2010/0128626 A1 | 5/2010 | Anderson et al. |
| 2010/0260055 A1 | 10/2010 | Anderson et al. |
| 2011/0013681 A1 | 1/2011 | Zou et al. |
| 2011/0022719 A1 | 1/2011 | Anderson et al. |
| 2011/0199383 A1 | 8/2011 | Anderson et al. |
| 2011/0199931 A1 | 8/2011 | Anderson et al. |
| 2012/0008642 A1 | 1/2012 | Katibian et al. |

FOREIGN PATENT DOCUMENTS

| | | |
|---|---|---|
| CN | 1310400 A | 8/2001 |
| CN | 1377194 A | 10/2002 |
| CN | 1467953 A | 1/2004 |
| CN | 1476268 A | 2/2004 |
| EP | 0594006 | 4/1994 |
| EP | 0872085 | 12/1996 |
| EP | 0850522 A2 | 7/1998 |
| EP | 0896318 | 2/1999 |
| EP | 0969676 | 1/2000 |
| EP | 1217602 A2 | 6/2002 |
| EP | 1309151 | 5/2003 |
| EP | 1423778 A2 | 6/2004 |
| EP | 1478137 A1 | 11/2004 |
| EP | 1544743 A2 | 6/2005 |
| EP | 1580964 A1 | 9/2005 |
| EP | 1630784 | 3/2006 |
| FR | 2729528 A1 | 7/1996 |
| GB | 2250668 A | 6/1992 |
| GB | 2265795 | 10/1993 |
| JP | 53131709 A | 11/1978 |
| JP | 62132433 A | 6/1987 |
| JP | 64008731 U | 1/1989 |
| JP | 1314022 A | 12/1989 |
| JP | 4167715 A | 6/1992 |
| JP | 4241541 | 8/1992 |
| JP | 5199387 A | 8/1993 |
| JP | 5219141 A | 8/1993 |
| JP | 5260115 A | 10/1993 |
| JP | 6037848 A | 2/1994 |
| JP | 06053973 | 2/1994 |
| JP | 06317829 | 11/1994 |
| JP | 7115352 A | 5/1995 |
| JP | 837490 | 2/1996 |
| JP | H0854481 A | 2/1996 |
| JP | 08-274799 | 10/1996 |
| JP | 09-006725 | 1/1997 |
| JP | 09230837 | 9/1997 |
| JP | 09261232 | 10/1997 |
| JP | 09270951 | 10/1997 |
| JP | 9307457 A | 11/1997 |
| JP | 10234038 | 2/1998 |
| JP | 10200941 | 7/1998 |
| JP | 10312370 | 11/1998 |
| JP | 1117710 | 1/1999 |
| JP | 11032041 A | 2/1999 |
| JP | 11122234 A | 4/1999 |
| JP | 11163690 A | 6/1999 |
| JP | 11225182 A | 8/1999 |
| JP | 11225372 A | 8/1999 |
| JP | 11249987 | 9/1999 |
| JP | 11282786 A | 10/1999 |
| JP | 11341363 A | 12/1999 |
| JP | 11355327 A | 12/1999 |
| JP | 2000188626 | 4/2000 |
| JP | 2000216843 A | 8/2000 |
| JP | 2000236260 | 8/2000 |
| JP | 2000278141 A | 10/2000 |
| JP | 2000295667 | 10/2000 |
| JP | 2000324135 A | 11/2000 |
| JP | 2000358033 A | 12/2000 |
| JP | 200144960 | 2/2001 |
| JP | 200194542 | 4/2001 |
| JP | 2001094524 | 4/2001 |
| JP | 2001177746 | 6/2001 |
| JP | 2001222474 A | 8/2001 |
| JP | 2001282714 A | 10/2001 |
| JP | 2001292146 A | 10/2001 |
| JP | 2001306428 | 11/2001 |

(56) References Cited

FOREIGN PATENT DOCUMENTS

| | | |
|---|---|---|
| JP | 2001319745 A | 11/2001 |
| JP | 2001320280 | 11/2001 |
| JP | 2001333130 A | 11/2001 |
| JP | 2002500855 A | 1/2002 |
| JP | 2002503065 T | 1/2002 |
| JP | 2002062990 A | 2/2002 |
| JP | 2002208844 A | 7/2002 |
| JP | 2002281007 A | 9/2002 |
| JP | 2002300229 A | 10/2002 |
| JP | 2002300299 A | 10/2002 |
| JP | 2003006143 A | 1/2003 |
| JP | 2003009035 | 1/2003 |
| JP | 2003044184 A | 2/2003 |
| JP | 2003046595 | 2/2003 |
| JP | 2003046596 A | 2/2003 |
| JP | 2003058271 A | 2/2003 |
| JP | 2003069544 A | 3/2003 |
| JP | 2003076654 A | 3/2003 |
| JP | 2003098583 A | 4/2003 |
| JP | 2003111135 | 4/2003 |
| JP | 2003167680 | 6/2003 |
| JP | 2003198550 | 7/2003 |
| JP | 2004005683 A | 1/2004 |
| JP | 2004007356 | 1/2004 |
| JP | 2004021613 | 1/2004 |
| JP | 2004046324 | 2/2004 |
| JP | 2004153620 | 5/2004 |
| JP | 2004246023 A | 9/2004 |
| JP | 2004297660 A | 10/2004 |
| JP | 2004531916 T | 10/2004 |
| JP | 2004309623 A | 11/2004 |
| JP | 2004363687 A | 12/2004 |
| JP | 2005107683 A | 4/2005 |
| JP | 2005536167 A | 11/2005 |
| JP | 2005539464 A | 12/2005 |
| KR | 199961245 | 7/1999 |
| KR | 0222225 | 10/1999 |
| KR | 1019990082741 | 11/1999 |
| KR | 200039224 | 7/2000 |
| KR | 1999-0058829 | 1/2001 |
| KR | 20010019734 | 3/2001 |
| KR | 20020071226 | 9/2002 |
| KR | 2003-0061001 | 7/2003 |
| KR | 2004-0014406 | 2/2004 |
| KR | 1020047003852 | 5/2004 |
| KR | 2004-69360 | 8/2004 |
| KR | 1020060053050 | 5/2006 |
| KR | 1020060056989 | 5/2006 |
| RU | 2111619 | 5/1998 |
| RU | 2150791 | 6/2000 |
| RU | 2337497 | 10/2008 |
| TW | 459184 B | 10/2001 |
| TW | 466410 | 12/2001 |
| TW | 488133 B | 5/2002 |
| TW | 507195 | 10/2002 |
| TW | 513636 | 12/2002 |
| TW | 515154 | 12/2002 |
| TW | 529253 | 4/2003 |
| TW | 535372 | 6/2003 |
| TW | 540238 B | 7/2003 |
| TW | 542979 B | 7/2003 |
| TW | 200302008 | 7/2003 |
| TW | 546958 | 8/2003 |
| TW | 552792 B | 9/2003 |
| TW | 200304313 | 9/2003 |
| TW | 563305 B | 11/2003 |
| TW | 569547 B | 1/2004 |
| TW | 595116 B | 6/2004 |
| WO | 9210890 | 6/1992 |
| WO | 9410779 | 5/1994 |
| WO | 9619053 | 6/1996 |
| WO | 96/42158 A1 | 12/1996 |
| WO | 9642158 | 12/1996 |
| WO | 98/02988 A2 | 1/1998 |
| WO | WO9915979 | 4/1999 |
| WO | 9923783 A2 | 5/1999 |
| WO | 0130038 | 4/2001 |
| WO | 0138970 | 5/2001 |
| WO | WO0137484 A2 | 5/2001 |
| WO | WO0138982 A1 | 5/2001 |
| WO | WO0158162 | 8/2001 |
| WO | 0249314 A1 | 6/2002 |
| WO | WO02098112 | 12/2002 |
| WO | 03/023587 | 3/2003 |
| WO | 03023587 A2 | 3/2003 |
| WO | 03039081 | 5/2003 |
| WO | 03040893 | 5/2003 |
| WO | 03061240 | 7/2003 |
| WO | WO2004015680 | 2/2004 |
| WO | 2004110021 | 12/2004 |
| WO | 2005018191 | 2/2005 |
| WO | 2005073955 A1 | 8/2005 |
| WO | 2005088939 | 9/2005 |
| WO | 2005091593 | 9/2005 |
| WO | WO2005091593 | 9/2005 |
| WO | 2005096594 | 10/2005 |
| WO | 2005122509 | 12/2005 |
| WO | WO2006008067 | 1/2006 |
| WO | 2006058045 | 6/2006 |
| WO | 2006058050 | 6/2006 |
| WO | 2006058051 | 6/2006 |
| WO | 2006058052 | 6/2006 |
| WO | 2006058053 | 6/2006 |
| WO | 2006058067 | 6/2006 |
| WO | 2006058173 | 6/2006 |
| WO | WO2006058045 A2 | 6/2006 |
| WO | WO2006058051 | 6/2006 |
| WO | WO2007051186 | 5/2007 |

OTHER PUBLICATIONS

J. Sevanto, "Multimedia messaging service for GPRS and UMTS", IEEE on WCNC, Sep. 1999, pp. 1422-1426, vol. 3.

"V4400," Product Brochure, May 31, 2004.

Plug and Display Standard Video Electronics Standards Association—VESA, Ver. 1, Jun. 11, 1997.

International Search Report—PCT/US04/038002, International Search Authority—European Patent Office—Feb. 3, 2005.

"Transmission and Multiplexing; High Bit Rate Digital Subscriber Line (HDSL) Transmission System on Metallic Local Lines; HDSL Core Specification and Applications for 2 048 Kbit/S Based Access Digital Sections; ETR 152" European Telecommunications Standard, 3rd Ed., Dec. 1996 RTR/TM-06002.

IEEE STD 1394B;IEEE Standard for High Performance Serial Bus—Amendment 2(Dec. 2002).

Video Electronics Standards Association (VESA) "Mobile Display Digital Interface Standard (MDDI)," Jul. 2004.

VESA Mobile Display Digital Interface, Proposed Standard: Version 1P, Draft 10, Aug. 13, 2003, pp. 1-75.

VESA Mobile Display Digital Interface, Proposed Standard, Version 1 p. Draft 1 0, Aug. 13, 2003, pp. 76-151.

VESA Mobile Display Digital Interface, Proposed Standard: Version 1 p. Draft 11. Sep. 10, 2003, pp. 1-75.

VESA Mobile Display Digital Interface, Proposed Standard, Version 1 P, Draft 11, Sep. 10, 2003, pp. 76-150

VESA Mobile Display Digital Interface, Proposed Standard, Version 1P, Draft 13, Oct. 15, 2003, pp. 1-75.

VESA Mobile Display Digital Interface, Proposed Standard: Version 1P, Draft 13, Oct. 15, 2003, pp. 76-154.

VESA Mobile Display Digital Interface, Proposed Standard: Version1P, Draft 14"Oct. 29, 2003"pp. 1-75.

VESA Mobile Display Digital Interface, Proposed Standard, Version 1P, Draft 14, Oct. 29, 2003, pp. 76-158.

VESA Mobile Display Digital Interface, Proposed Standard: Version 1P, Draft 15, Nov. 12, 2003, pp. 1-75.

VESA Mobile Display Digital Interface, Proposed Standard: Version 1P, Draft 15, Nov. 12, 2003, pp. 76-160.

Liptak, "Instrument Engineer's Handbook, Third Edition, vol. Three: Process Software and Digital Networks, Section 4.17, Proprietary Networks, pp. 627-637, Boca Raton" CRC Press, Jun. 26, 2002.

(56) References Cited

OTHER PUBLICATIONS

VESA Mobile Display Digital Interface. Proposed Standard, 'Version 1P, Draft 11. Sep. 10, 2003, pp. 76-150.
European Search Report—EP05852048, Search Authority—The Hague Patent Office, Nov. 18, 2010.
European Search Report—EP10172872, Search Authority—Munich Patent Office, Dec. 17, 2010.
European Search Report—EP10172878, Search Authority—Munich Patent Office, Dec. 17, 2010.
European Search Report—EP10172882, Search Authority—Munich Patent Office, Dec. 29, 2010.
European Search Report—EP10172885, Search Authority—Munich Patent Office, Dec. 23, 2010.
Hopkins, K. et al.: "Display Power Management," IP.com Journal; IP.com Inc., West Henrietta, NY (Mar. 1, 1995), XP013103130, ISSN: 1533-0001, vol. 38, No. 3 pp. 425-427.
"Universal Serial Bus Specification—Revision 2.0: Chapter 9—USB Device Framework," Universal Serial Bus Specification, Apr. 27, 2000, pp. 239-274, XP002474828.
VESA: VESA Mobile Display Digital Interface Standard: Version 1. Milpitas, CA (Jul. 23, 2004). pp. 87-171.
European Search Report—EP10161998, Search Authority—Munich Patent Office, Sep. 10, 2010.
European Search Report—EP10162001, Search Authority—Munich Patent Office, Sep. 10, 2010.
Masnick, et al., "On Linear Unequal Error Protection Codes" IEEE Transactions on Information Theory, vol., IT-3, No. 4, Oct. 1967, pp. 600-607.
STMicroelectronics: "STV0974 Mobile Imaging DSP Rev.3", Datasheet internet, (Nov. 30, 2004), XP002619368. Retrieved from the Internet: URL: http://pdf1.alldatasheet.com/datasheet-pdf/view/112376/STMICROELECTRONICS/STV0974.html [retrieved on Jan. 27, 2011], pp. 1-69.
Taiwan Search Report—TW093127510—TIPO—Apr. 1, 2011.
Translation of Office Action in Chinese application 201010183254.3 corresponding to U.S. Appl. No. 11/008,024, citing CN1467953 dated Apr. 21, 2011.
3GPP2 C.S0047-0. "Link-Layer Assisted Service Options for Voice-over-IP: Header Remover (SO60) and Robust Header Compression (SO61)," Version 1.0, Apr. 14, 2003, pp. 1-36.
"Nokia 6255", Retrieved from the Internet: URL:http://nokiamuseum.com/view.php"model=6255 [retrieved on Feb. 4, 2012], 2 pgs.
Taiwan Search Report—TW093134825—TIPO—Jan. 28, 2012.
Taiwan Search Report—TW094141287—TIPO—May 5, 2012.

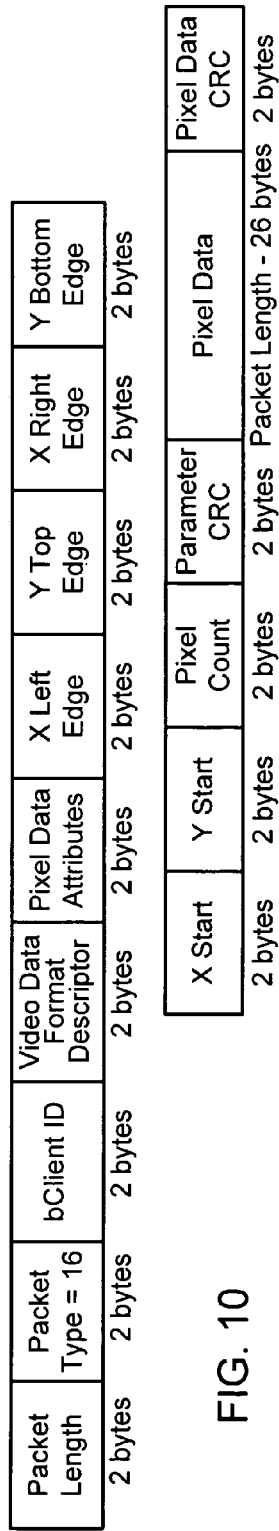

FIG. 18

Client Capability Packet

| Packet Length | Packet Type = 66 | cClient ID | Protocol Version | Min Protocol Version | Data Rate Capability | Interface Type Capability |
|---|---|---|---|---|---|---|
| 2 bytes | 2 bytes | 2 bytes | 2 bytes | 2 bytes | 2 bytes | 1 byte |

| Number of Alt Displays | Reserved 1 | Bitmap Width | Bitmap Height | Display Window Width | Display Window Height | Color Map Size |
|---|---|---|---|---|---|---|
| 1 byte | 2 bytes | 2 bytes | 2 bytes | 2 bytes | 2 bytes | 4 bytes |

| Color Map RGB Width | RGB Capability | Monochrome Capability | Reserved 2 | Y Cb Cr Capability | Bayer Capability | Alpha-Cursor Image Planes |
|---|---|---|---|---|---|---|
| 2 bytes | 2 bytes | 1 byte | 1 byte | 2 bytes | 2 bytes | 2 bytes |

| Client Feature Capability | Max Video Frame Rate | Min Video Frame Rate | Min Sub-Frame rate | Audio Buffer Depth | Audio Channel Capability | Audio Sample Rate Capability |
|---|---|---|---|---|---|---|
| 4 bytes | 1 byte | 1 byte | 2 bytes | 2 bytes | 2 bytes | 2 bytes |

| Audio Sample Resolution | Mic Sample Resolution | Mic Sample Rate Capability | Keyboard Data Format | Poinring Device Data Format | Content Protection Type | Mfr Name |
|---|---|---|---|---|---|---|
| 1 byte | 1 byte | 2 bytes | 1 byte | 1 byte | 2 bytes | 2 bytes |

| Product Code | Reserved 3 | Serial Number | Week of Mfr | Year of Mfr | CRC |
|---|---|---|---|---|---|
| 2 bytes | 2 bytes | 4 bytes | 1 byte | 1 byte | 2 bytes |

| Packet Length | Packet Type = 67 | bClient ID | Keyboard Data Format | Keyboard Data | CRC |
|---|---|---|---|---|---|
| 2 bytes | 2 bytes | 2 bytes | 2 bytes | (Packet_Length - 8) bytes | 2 bytes |

FIG. 19

| Packet Length | Packet Type = 68 | bClient ID | Pointing Device Format | Pointing Device Data | CRC |
|---|---|---|---|---|---|
| 2 bytes | 2 bytes | 2 bytes | 2 bytes | (Packet_Length - 8) bytes | 2 bytes |

FIG. 20

| Packet Length | Packet Type = 69 | CRC | All Zeros |
|---|---|---|---|
| 2 bytes | 2 byte | 2 bytes | 16 bytes |

FIG. 21

| Packet Length | Packet Type = 70 | cClient ID | Reverse Link Request | CRC Error Count | Capability Change | Graphics Busy flags | CRC |
|---|---|---|---|---|---|---|---|
| 2 bytes | 2 bytes | 2 bytes | 2 bytes | 1 byte | 1 byte | 2 bytes | 2 bytes |

FIG. 22

| Packet Length | Packet Type = 71 | hClient ID | Upper Left X Value | Upper Left Y Value | Window Width | Window Height | Window X Movement | Window Y Movement | CRC |
|---|---|---|---|---|---|---|---|---|---|
| 2 bytes | 2 bytes | 2 bytes | 2 bytes | 2 bytes | 2 bytes | 2 bytes | 2 bytes | 2 bytes | 2 bytes |

FIG. 23

| Packet Length | Packet Type = 74 | hClient ID | X Left Edge | Y Top Edge | X Right Edge | Y Bottom Edge | CRC |
|---|---|---|---|---|---|---|---|
| 2 bytes | 2 bytes | 2 bytes | 2 bytes | 2 bytes | 2 bytes | 2 bytes | 2 bytes |

FIG. 26

| Packet Length | Packet Type = 75 | Interface Type | Reserved 1 | CRC |
|---|---|---|---|---|
| 2 bytes | 2 bytes | 1 byte | 1 byte | 2 bytes |

FIG. 27

| Packet Length | Packet Type = 76 | cClient ID | Interface Type | Reserved 1 | CRC |
|---|---|---|---|---|---|
| 2 bytes | 2 bytes | 2 bytes | 1 byte | 1 byte | 2 bytes |

FIG. 28

| Packet Length | Packet Type = 77 | Interface Type | Reserved 1 | CRC |
|---|---|---|---|---|
| 2 bytes | 2 bytes | 1 byte | 1 byte | 2 bytes |

FIG. 29

| Packet Length | Packet Type = 78 | hClient ID | Audio Channel Enable Mask | CRC |
|---|---|---|---|---|
| 2 bytes | 2 bytes | 2 bytes | 2 bytes | 2 bytes |

FIG. 30

| Packet Length | Packet Type = 79 | hClient ID | Audio Sample Rate | Reserved 1 | CRC |
|---|---|---|---|---|---|
| 2 bytes | 2 bytes | 2 bytes | 1 byte | 1 byte | 2 bytes |

| Packet Length | Packet Type = 80 | bClient ID | Content Protection Type | Content Protection Overhead Messages | CRC |
|---|---|---|---|---|---|
| 2 bytes | 2 bytes | 2 bytes | 2 bytes | Packet Length - 8 bytes | 2 bytes |

FIG. 33

| Packet Length | Packet Type = 81 | hClient ID | Transparent Color Enable | Reserved 1 | Alpha-Cursor Identifier | Data Format Descriptor | Transparent Pixel Value | CRC |
|---|---|---|---|---|---|---|---|---|
| 2 bytes | 2 bytes | 2 bytes | 1 byte | 1 byte | 2 bytes | 2 bytes | 4 bytes | 2 bytes |

FIG. 34

| Packet Length | Packet Type = 82 | hClient ID | Parameter CRC | Guard Time 1 | Measurement Period | All Zero | Guard Time 2 |
|---|---|---|---|---|---|---|---|
| 2 bytes | 2 bytes | 2 byte | 2 bytes | 64 bytes | 64 bytes | 2 bytes | 64 bytes |

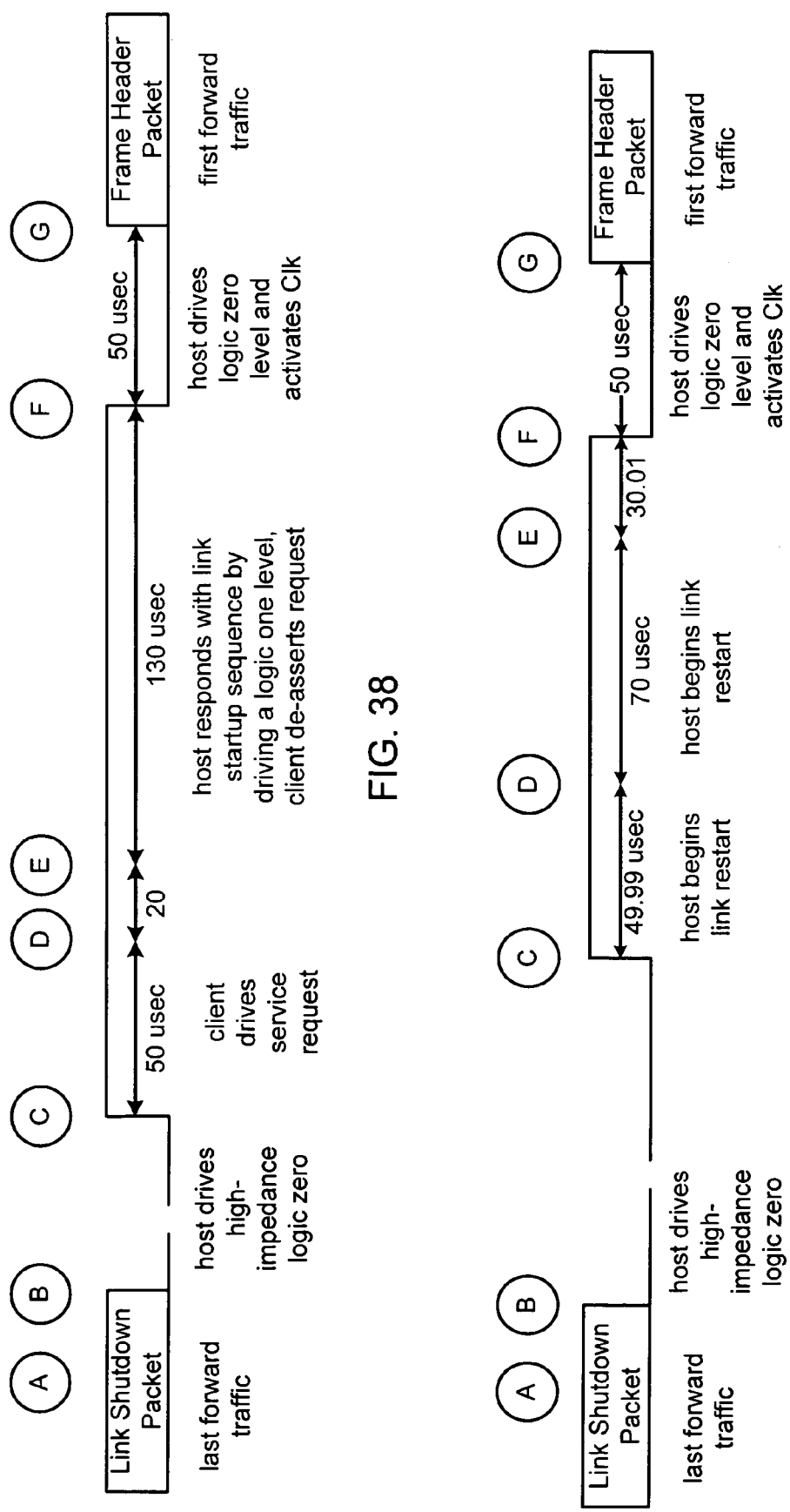

Forward Link Skew Calibration Packet

| Packet Length | Packet Type = 83 | hClient ID | Parameter CRC | All Zero 1 | Calibration Data Sequence | All Zero 2 |
|---|---|---|---|---|---|---|
| 2 bytes | 2 bytes | 2 bytes | 2 bytes | 8 bytes | Packet Length – 22 bytes | 8 bytes |

FIG. 56

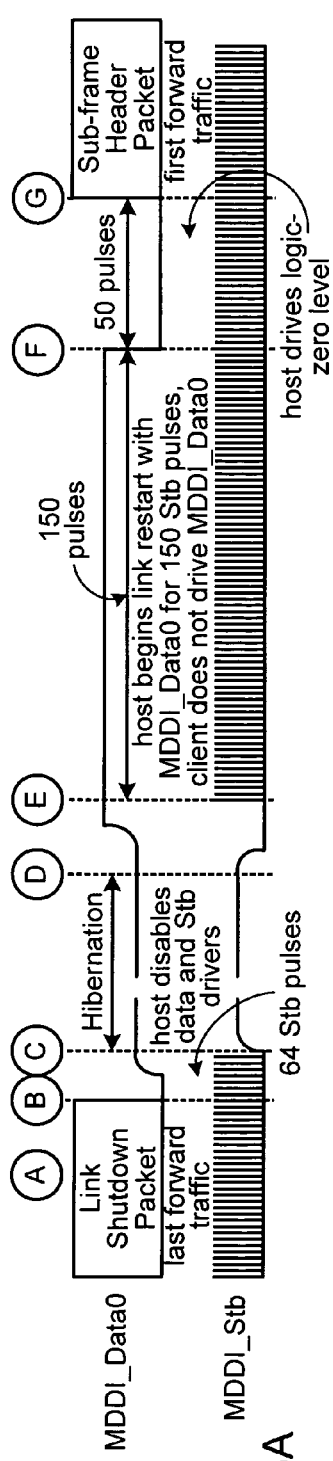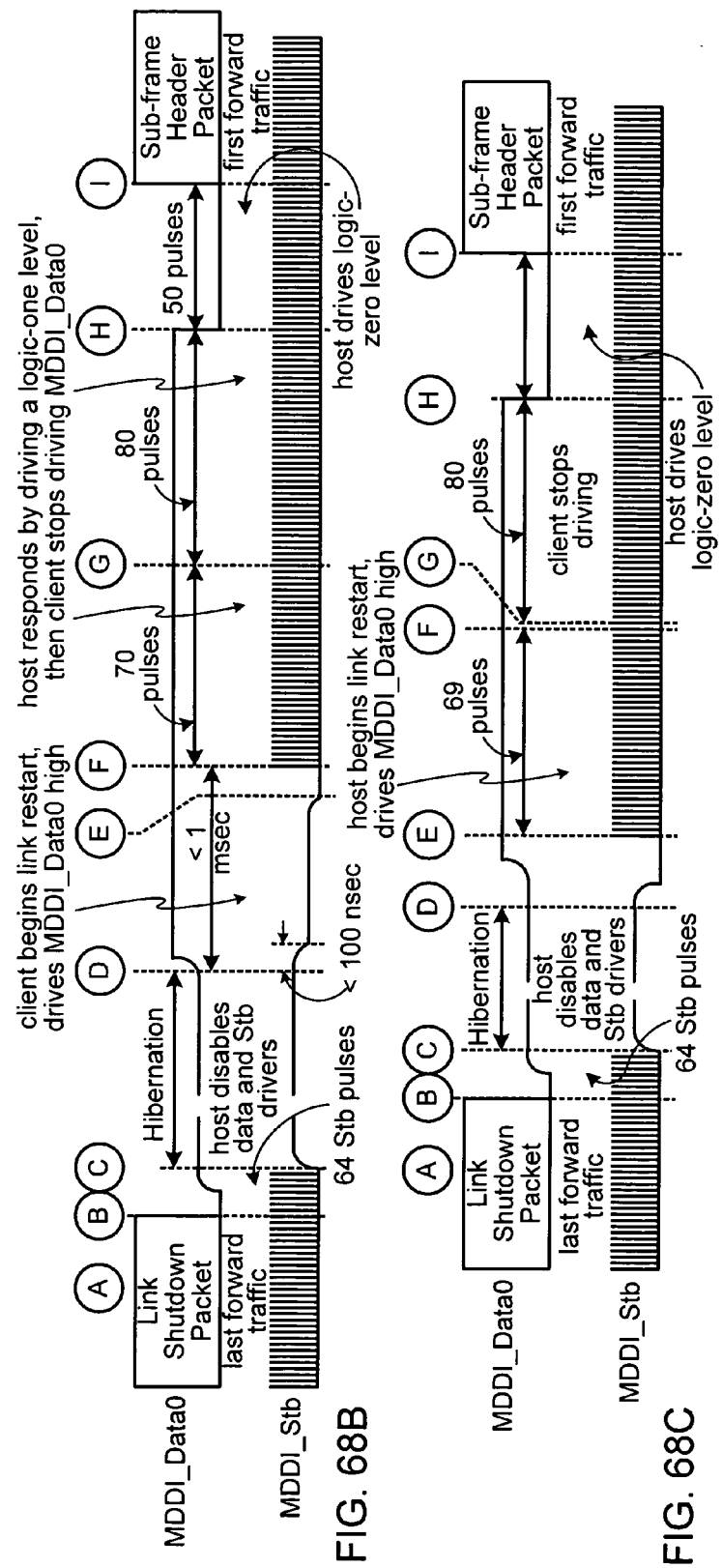
FIG. 68A
FIG. 68B
FIG. 68C

Request VCP Feature Packet

| Packet Length | Packet Type = 128 | hClient ID | MCCS VCP Code | CRC |
|---|---|---|---|---|
| 2 bytes | 2 bytes | 2 bytes | 2 bytes | 2 bytes |

FIG. 69

VCP Feature Reply Packet

| Packet Length | Packet Type = 129 | cClient ID | MCCS Version | Reply Sequence Number | Number of Features in List | VCP Feature Reply List | CRC |
|---|---|---|---|---|---|---|---|
| 2 bytes | 2 bytes | 2 bytes | 2 bytes | 2 bytes | 2 bytes | (Packet_Length - 12 bytes) | 2 bytes |

FIG. 70

VCP Feature Reply List Item

| MCCS VCP code | Result Code | Maximum Value | Present Value |
|---|---|---|---|
| 2 bytes | 2 bytes | 4 bytes | 4 bytes |

FIG. 71

Set VCP Feature Packet

| Packet Length | Packet Type = 130 | hClient ID | MCCS VCP Code | Number of Values in List | Control Value List | CRC |
|---|---|---|---|---|---|---|
| 2 bytes | 2 bytes | 2 bytes | 2 bytes | 2 bytes | (Packet_Length - 10 bytes) | 2 bytes |

FIG. 72

Request Valid Parameter Packet

| Packet Length | Packet Type = 131 | hClient ID | MCCS VCP Code | CRC |
|---|---|---|---|---|
| 2 bytes | 2 bytes | 2 bytes | 2 bytes | 2 bytes |

FIG. 73

Valid Parameter Reply Packet

| Packet Length | Packet Type = 132 | cClient ID | MCCS VCP Code | Response Code | Reply Sequence Number | Number of Values in List | VCP Parameter Reply List | CRC |
|---|---|---|---|---|---|---|---|---|
| 2 bytes | 2 bytes | 2 bytes | 2 bytes | 2 bytes | 2 bytes | 2 bytes | (Packet_Length - 14 bytes) | 2 bytes |

FIG. 74

Alpha-Cursor Image Capability Packet

| Packet Length | Packet Type = 133 | cClient ID | Alpha-Cursor Identifier | Alpha-Cursor Bitmap Width | Alpha-Cursor Bitmap Height |
|---|---|---|---|---|---|
| 2 bytes | 2 bytes | 2 bytes | 2 bytes | 2 bytes | 2 bytes |

| RGP Capability | Monochrome Capability | Reserved 1 | Y Cr CB Capability | Transparency Map Res. | Capability Bits | CRC |
|---|---|---|---|---|---|---|
| 2 bytes | 1 byte | 1 byte | 2 bytes | 1 byte | 1 byte | 2 bytes |

FIG. 75

Alpha-Cursor Transparency Map Packet

| Packet Length | Packet Type = 134 | hClient ID | Alpha-Cursor Identifier | Transparency Map X Start | Transparency Map Y Start |
|---|---|---|---|---|---|
| 2 bytes | 2 bytes | 2 bytes | 2 bytes | 2 bytes | 2 bytes |

| Transparency Map Resolution | Reserved 1 | Parameter CRC | Transparency Map Data | Transparency Map Data CRC |
|---|---|---|---|---|
| 1 byte | 1 byte | 2 bytes | Packet Length - 16 bytes | 2 bytes |

FIG. 76

Alpha-Cursor Image Offset Packet

| Packet Length | Packet Type = 135 | hClient ID | Alpha-Cursor X Offset | Alpha-Cursor Y Offset | CRC |
|---|---|---|---|---|---|
| 2 bytes | 2 bytes | 2 bytes | 2 bytes | 2 bytes | 2 bytes |

FIG. 77

Alpha-Cursor Video Stream Packet

| Packet Length | Packet Type = 17 | bClient ID | Video Data Format Descriptor | Pixel Data Attributes | X Left Edge | Y Top Edge | X Right Edge | Y Bottom Edge |
|---|---|---|---|---|---|---|---|---|
| 2 bytes | 2 bytes | 2 bytes | 2 bytes | 2 bytes | 2 bytes | 2 bytes | 2 bytes | 2 bytes |

| X Start | Y Start | Pixel Count | Pixel Data | Pixel Data CRC |
|---|---|---|---|---|
| 2 bytes | 2 bytes | 2 bytes | Packet Length - 26 bytes | 2 bytes |

| | | Parameter CRC |
|---|---|---|
| | | 2 bytes |

FIG. 78

Scaled Video Stream Capability Packet

| Packet Length | Packet Type = 143 | cClient ID | Max Number of Streams | Source Max X Size | Source Max Y Size |
|---|---|---|---|---|---|
| 2 bytes | 2 bytes | 2 bytes | 2 bytes | 2 bytes | 2 bytes |

| RGB Capability | Monochrome Capability | Y Cr Cb Capability | Reserved 1 | Capability Bits | Reserved 2 | CRC |
|---|---|---|---|---|---|---|
| 1 byte | 1 byte | 2 bytes | 1 byte | 1 byte | 1 byte | 2 bytes |

FIG. 79

Scaled Video Stream Setup Packet

| Packet Length | Packet Type = 136 | hClient ID | Stream ID | Video Data Format Descriptor | Pixel Data Attributes |
|---|---|---|---|---|---|
| 2 bytes | 2 bytes | 2 bytes | 2 bytes | 2 bytes | 2 bytes |

| X Left Edge | Y Top Edge | X Right Edge | Y Bottom Edge | X Image Size | Y Image Size | CRC |
|---|---|---|---|---|---|---|
| 2 bytes | 2 bytes | 2 bytes | 2 bytes | 2 bytes | 2 bytes | 2 bytes |

FIG. 80

Scaled Video Stream Acknowledgement Packet

| Packet Length | Packet Type = 137 | cClient ID | Stream ID | Ack Code | CRC |
|---|---|---|---|---|---|
| 2 bytes | 2 bytes | 2 bytes | 2 bytes | 2 bytes | 2 bytes |

FIG. 81

Scaled Video Stream Packet

| Packet Length | Packet Type = 18 | hClient ID | Stream ID | Parameter CRC | Pixel Count | Pixel Data | Pixel Data CRC |
|---|---|---|---|---|---|---|---|
| 2 bytes | 2 bytes | 2 bytes | 2 bytes | 2 bytes | 2 bytes | Packet Length - 12 bytes | 2 bytes |

FIG. 82

Request Specific Status Packet

| Packet Length | Packet Type = 138 | hClient ID | Status Packet ID | CRC |
|---|---|---|---|---|
| 2 bytes | 2 bytes | 2 bytes | 2 bytes | 2 bytes |

FIG. 83

Valid Status Reply List Packet

| Packet Length | Packet Type = 139 | cClient ID | Number of Values in List | Valid Parameter Reply List | CRC |
|---|---|---|---|---|---|
| 2 bytes | 2 bytes | 2 bytes | 2 bytes | Packet Length - 8 bytes | 2 bytes |

FIG. 84

Packet Processing Delay Parameters Packet

| Packet Length | Packet Type = 140 | cClient ID | Number of List Items | Delay Parameters List | CRC |
|---|---|---|---|---|---|
| 2 bytes | 2 bytes | 2 bytes | 2 bytes | Packet Length - 8 bytes | 2 bytes |

FIG. 85A

Delay Parameters List Item

| Packet Type for Delay | Pixel Delay | Horizontal Pixel Delay | Vertical Pixel Delay | Fixed Delay |
|---|---|---|---|---|
| 2 bytes | 1 byte | 1 byte | 1 byte | 1 byte |

FIG. 85B

Personal Display Capability Packet

| Packet Length | Packet Type = 141 | cClient ID | Sub-Pixel Layout | Pixel Shape | Horizontal Field of View | Vertical Field of View | Visual Axis Crossing |
|---|---|---|---|---|---|---|---|
| 2 bytes | 2 bytes | 2 bytes | 1 byte | 1 byte | 1 byte | 1 byte | 1 byte |

| Lft./Rt. Image Overlap | See Through | Maximum Brightness | Optical Capability | Minimum IPD | Maximum IPD | Points of Field Curvature list (25 2-Byte Values) | CRC |
|---|---|---|---|---|---|---|---|
| 1 byte | 1 byte | 1 byte | 2 bytes | 1 byte | 1 byte | 50 bytes | 2 bytes |

FIG. 86

Client Error Report Packet

| Packet Length | Packet Type = 142 | cClient ID | Number of List Items | Error Code List | CRC |
|---|---|---|---|---|---|
| 2 bytes | 2 bytes | 2 bytes | 2 bytes | Packet Length - 8 bytes | 2 bytes |

FIG. 87A

Error Report List Item

| Display Error Code | Error Sub-Code |
|---|---|
| 2 bytes | 2 bytes |

FIG. 87B

Client Identification Packet

| Packet Length | Packet Type = 144 | cClient ID | Week of Mfr | Year of Mfr | Length of Mfr Name | Length of Product Name | Length of Serial Number |
|---|---|---|---|---|---|---|---|
| 2 bytes | 2 bytes | 2 bytes | 1 byte | 1 byte | 2 bytes | 2 bytes | 2 bytes |

| Manufacturer Name String | Product Name String | Serial Number String | CRC |
|---|---|---|---|
| Length of Mfr Name bytes | Length of Mfr Name bytes | Length of Mfr Name bytes | 2 bytes |

FIG. 88

Alternate Display Capability Packet

| Packet Length | Packet Type = 145 | cClient ID | Alt Display Number | Reserved 1 | Bitmap Width | Bitmap Height | Display Window Width | Display Window Height |
|---|---|---|---|---|---|---|---|---|
| 2 bytes | 2 bytes | 2 bytes | 1 byte | 1 byte | 2 bytes | 2 bytes | 2 bytes | 2 bytes |

| Color Map RGB Width | RGB Capability | Monochrome Capability | Reserved 2 | Y Cb Cr Capability | Display Feature Capability | Reserved 3 | CRC |
|---|---|---|---|---|---|---|---|
| 2 bytes | 2 bytes | 1 byte | 1 byte | 2 bytes | 1 byte | 1 byte | 2 bytes |

FIG. 89

Register Access Packet

| Packet Length | Packet Type = 146 | bClient ID | Read/Write Flags | Register Address | Parameter CRC | Register Data List | CRC |
|---|---|---|---|---|---|---|---|
| 2 bytes | 2 bytes | 2 bytes | 2 bytes | 4 bytes | 2 bytes | Packet Length - 14 bytes | 2 bytes |

FIG. 90

Two Buffers, display refresh faster than image transfer

Image Transfer

| frame 1, buffer A 20% 40% 60% 80% | frame 2, buffer B 20% 40% 60% 80% | frame 3, buffer A 20% 40% 60% 80% | frame 4, buffer B 20% 40% 60% 80% | frame 5, buffer A 20% 40% 60% 80% | frame 6, buffer B 20% 40% 60% 80% |

Display Refresh

| frame 0, buf B 20% 40% 60% 80% | frame 0, buf B 20% 40% 60% 80% | frame 1, buf A 20% 40% 60% 80% | frame 2, buf B 20% 40% 60% 80% | frame 3, buf A 20% 40% 60% 80% | frame 4, buf B 20% 40% 60% 80% | frame 5, buf A 20% 40% 60% 80% |

Two Buffers, display refresh much faster than image transfer

Image Transfer

| frame 1, buffer A 20% 40% 60% 80% | frame 2, buffer B 20% 40% 60% 80% | frame 3, buffer A 20% 40% 60% 80% | frame 4, buffer B 20% 40% 60% 80% | frame 5, buffer A 20% 40% 60% 80% | frame 6, buffer B 20% 40% 60% 80% |

Display Refresh

| fm 0, b=B | fm 0, b=B | fm 1, b=A | fm 2, b=B | fm 2, b=B | fm 3, b=A | fm 4, b=B | fm 4, b=B | fm 5, b=A |
|---|---|---|---|---|---|---|---|---|
| 20 40 60 80 % % % % | 20 40 60 80 % % % % | 20 40 60 80 % % % % | 20 40 60 80 % % % % | 20 40 60 80 % % % % | 20 40 60 80 % % % % | 20 40 60 80 % % % % | 20 40 60 80 % % % % | 20 40 60 80 % % % % |

FIG. 92

Two Buffers, display refresh slower than Image transfer

Image Transfer

| frame 1, buffer A<br>20% 40% 60% 80% | frame 2, buffer B<br>20% 40% 60% 80% | frame 3, buffer A<br>20% 40% 60% 80% | frame 4, buffer B<br>20% 40% 60% 80% | frame 5, buffer A<br>20% 40% 60% 80% | frame 6, buffer B<br>20% 40% 60% 80% |

Display Refresh

| frame 0, buffer B<br>20% 40% 60% | frame 2, buffer B<br>80% | frame 1 & 3, buffer A<br>20% 40% 60% | frame 3, buffer A<br>80% | frame 4, buffer B<br>20% 40% 60% | frame 4 & 6, buffer B<br>80% |

FIG. 93

Two Buffers, display refresh much faster than Image transfer, small video window

Image Transfer

| frame 1, buffer A<br>20% 40% 60% 80% | frame 2, buffer B<br>20% 40% 60% 80% | frame 3, buffer A<br>20% 40% 60% 80% | frame 4, buffer B<br>20% 40% 60% 80% | frame 5, buffer A<br>20% 40% 60% 80% | frame 6, buffer B<br>20% 40% 60% 80% |

Display Refresh

| fm0, b=B<br>20% 40% 60% 80% | fm0, b=B<br>20% 40% 60% 80% | fm1, b=A<br>20% 40% 60% 80% | fm2, b=B<br>20% 40% 60% 80% | fm2, b=B<br>20% 40% 60% 80% | fm3, b=A<br>20% 40% 60% 80% | fm4, b=B<br>20% 40% 60% 80% | fm4, b=B<br>20% 40% 60% 80% | fm5, b=A<br>20% 40% 60% 80% |

Three Buffers, display refresh much faster than Image transfer, any-size video window Image Transfer

| frame 1, buffer A<br>20% 40% 60% 80% | frame 2, buffer B<br>20% 40% 60% 80% | frame 3, buffer C<br>20% 40% 60% 80% | frame 4, buffer A<br>20% 40% 60% 80% | frame 5, buffer B<br>20% 40% 60% 80% | frame 6, buffer C<br>20% 40% 60% 80% |

Display Refresh

| fm0, b=C | fm0, b=C | fm1, b=A | fm1, b=A | fm2, b=B | fm2, b=B | fm3, b=C | fm3, b=C | fm4, b=A | fm4, b=A | fm5, b=B | fm5, b=B |
|---|---|---|---|---|---|---|---|---|---|---|---|
| 20% 40% 60% 80% | 20% 40% 60% 80% | 20% 40% 60% 80% | 20% 40% 60% 80% | 20% 40% 60% 80% | 20% 40% 60% 80% | 20% 40% 60% 80% | 20% 40% 60% 80% | 20% 40% 60% 80% | 20% 40% 60% 80% | 20% 40% 60% 80% | 20% 40% 60% 80% |

FIG. 96

Three Buffers, display refresh slower than Image transfer

Image Transfer

| frame 1, buffer A<br>20% 40% 60% 80% | frame 2, buffer B<br>20% 40% 60% 80% | frame 3, buffer C<br>20% 40% 60% 80% | frame 4, buffer A<br>20% 40% 60% 80% | frame 5, buffer B<br>20% 40% 60% 80% | frame 6, buffer C<br>20% 40% 60% 80% | frame 7<br>20% |

Display Refresh

| 20% | frame 0, buffer C<br>40% 60% | 80% | frame 1 & 4, buffer A<br>40% 60% | 20% | frame 3, buffer A<br>40% 60% | 80% | frame 4 & 7, buffer A<br>40% 60% | 80% |

FIG. 97

METHOD, SYSTEM AND COMPUTER PROGRAM FOR DRIVING A DATA SIGNAL IN DATA INTERFACE COMMUNICATION DATA LINK

CLAIM OF PRIORITY UNDER 35 U.S.C. §119

The present Application for Patent claims priority to Provisional Application No. 60/519,833 entitled "Switchable Threshold Differential Interface" filed Nov. 12, 2003, and assigned to the assignee hereof and hereby expressly incorporated by reference herein.

BACKGROUND

1. Field

Embodiments of the invention in this disclosure relate to a digital signal protocol and process for communicating or transferring signals between a host device and a client device at high data rates. More specifically, the disclosure relates to a technique for transferring multimedia and other types of digital signals from a host or controller device to a client device for presentation or display to an end user using a low power high data rate transfer mechanism having internal and external device applications.

2. Background

Computers, electronic game related products, and various video technologies (for example DVD's and High Definition VCRs) have advanced significantly over the last few years to provide for presentation of increasingly higher resolution still, video, video-on-demand, and graphics images, even when including some types of text, to end users of such equipment. These advances in turn mandated the use of higher resolution electronic viewing devices such as high definition video monitors, HDTV monitors, or specialized image projection elements. Combining such visual images with high-definition or -quality audio data, such as when using CD type sound reproduction, DVDs, surround-sound, and other devices also having associated audio signal outputs, is used to create a more realistic, content rich, or true multimedia experience for an end user. In addition, highly mobile, high quality sound systems and music transport mechanisms, such as MP3 players, have been developed for audio only presentations to end users. This has resulted in increased expectations for typical users of commercial electronics devices, from computers to televisions and even telephones, now being accustomed to and expecting high or premium quality output.

In a typical video presentation scenario, involving an electronics product, video data is typically transferred using current techniques at a rate that could be best termed as slow or medium, being on the order of one to tens of kilobits per second. This data is then either buffered or stored in transient or longer-term memory devices, for delayed (later) play out on a desired viewing device. For example, images may be transferred "across" or using the Internet using a program resident on a computer having a modem or other type of Internet connection device, to receive or transmit data useful in digitally representing an image. A similar transfer can take place using wireless devices such as portable computers equipped with wireless modems, or wireless Personal Data Assistants (PDAs), or wireless telephones.

Once received, the data is stored locally in memory elements, circuits, or devices, such as RAM or flash memory, including internal or external storage devices such as small size hard drives, for playback. Depending on the amount of data and the image resolution, the playback might begin relatively quickly, or be presented with longer-term delay. That is, in some instances, image presentation allows for a certain degree of real time playback for very small or low resolution images not requiring much data, or using some type of buffering, so that after a small delay, some material is presented while more material is being transferred. Provided there are no interruptions in the transfer link, or interference from other systems or users relative to the transfer channel being used, once the presentation begins the transfer is reasonably transparent to the end user of the viewing device. Naturally, where multiple users share a single communication path, such as a wired Internet connection, transfers can be interrupted or slower than desired.

The data used to create either still images or motion video are often compressed using one of several well known techniques such as those specified by the Joint Photographic Experts Group (JPEG), the Motion Picture Experts Group (MPEG), and other well known standards organizations or companies in the media, computer, and communications industries to speed the transfer of data over a communication link. This allows transferring images or data faster by using a smaller number of bits to transfer a given amount of information.

Once the data is transferred to a "local" device such as a computer having a storage mechanism such as memory, or magnetic or optical storage elements, or to other recipient devices, the resulting information is un-compressed (or played using special decoding players), and decoded if needed, and prepared for appropriate presentation based on the corresponding available presentation resolution and control elements. For example, a typical computer video resolution in terms of a screen resolution of X by Y pixels typically ranges from as low as 480×640 pixels, through 600×800 to 1024×1024, although a variety of other resolutions are generally possible, either as desired or needed.

Image presentation is also affected by the image content and the ability of given video controllers to manipulate the image in terms of certain predefined color levels or color depth (bits per pixel used to generate colors) and intensities, and any additional overhead bits being employed. For example, a typical computer presentation would anticipate anywhere from around 8 to 32, or more, bits per pixel to represent various colors (shades and hues), although other values are encountered.

From the above values, one can see that a given screen image is going to require the transfer of anywhere from 2.45 Megabits (Mb) to around 33.55 Mb of data over the range from the lowest to highest typical resolutions and depth, respectively. When viewing video or motion type images at a rate of 30 frames per second, the amount of data required is around 73.7 to 1,006 Megabits of data per second (Mbps), or around 9.21 to 125.75 Megabytes per second (MBps). In addition, one may desire to present audio data in conjunction with images, such as for a multimedia presentation, or as a separate high resolution audio presentation, such as CD quality music. Additional signals dealing with interactive commands, controls, or signals may also be employed. Each of these options adding even more data to be transferred. Furthermore, newer transmission techniques involving High Definition (HD) television and movie recordings may add even more data and control information. In any case, when one desires to transfer high quality or high resolution image data and high quality audio information or data signals to an end user to create a content rich experience, a high data transfer rate link is required between presentation elements and the source or host device that is configured to provide such types of data.

Data rates of around 115 Kilobytes (KBps) or 920 Kilobits per second (Kbps) can be routinely handled by some modern serial interfaces. Other interfaces such as USB serial interfaces, can accommodate data transfers at rates as high as 12 MBps, and specialized high speed transfers such as those configured using the Institute of Electrical and Electronics Engineers (IEEE) 1394 standard, can occur at rates on the order of 100 to 400 MBps. Unfortunately, these rates fall short of the desired high data rates discussed above which are contemplated for use with future wireless data devices and other services for providing high resolution, content rich, output signals for driving portable video displays or audio devices. This includes computers for business and other presentations, gaming devices, and so forth. In addition, these interfaces require the use of a significant amount of host or system and client software to operate. Their software protocol stacks also create an undesirably large amount of overhead, especially where mobile wireless devices or telephone applications are contemplated. Such devices have severe memory and power consumption limitations, as well as already taxed computational capacity. Furthermore, some of these interfaces utilize bulky cables which are too heavy and unsatisfactory for highly aesthetic oriented mobile applications, complex connectors which add cost, or simply consume too much power.

There are other known interfaces such as the Analog Video Graphics Adapter (VGA), Digital Video Interactive (DVI) or Gigabit Video Interface (GVIF) interfaces. The first two of these are parallel type interfaces which process data at higher transfer rates, but also employ heavy cables and consume large amounts of power, on the order of several watts. Neither of these characteristics are amenable to use with portable consumer electronic devices. Even the third interface consumes too much power and uses expensive or bulky connectors.

For some of the above interfaces, and other very high rate data systems/protocols or transfer mechanisms associated with data transfers for fixed installation computer equipment, there is another major drawback. To accommodate the desired data transfer rates also requires substantial amounts of power and/or operation at high current levels. This greatly reduces the usefulness of such techniques for highly mobile consumer oriented products.

Generally, to accommodate such data transfer rates using alternatives such as say optical fiber type connections and transfer elements, also requires a number of additional converters and elements that introduce much more complexity and cost, than desired for a truly commercial consumer oriented product. Aside from the generally expensive nature of optical systems as yet, their power requirements and complexity prevents general use for lightweight, low power, portable applications.

What has been lacking in the industry for portable, wireless, or mobile applications, is a technique to provide a high quality presentation experience, whether it be audio, video, or multimedia based, for highly mobile end users. That is, when using portable computers, wireless phones, PDAs, or other highly mobile communication devices or equipment, the current video and audio presentation systems or devices being used simply cannot deliver output at the desired high quality level. Often, the perceived quality that is lacking is the result of unobtainable high data rates needed to transfer the high quality presentation data. This can include both transfer to more efficient, advanced or feature laden external devices for presentation to an end user, or transfer between hosts and clients internal to portable devices such as computers, gaming machines, and wireless devices such as mobile telephones.

In this latter case, there have been great strides made in adding higher and higher resolution internal video screens, and other specialty input and/or output devices and connections to wireless devices like so called third generation telephones, and to so called laptop computers. However, internal data busses and connections which may include bridging across rotating or sliding hinge or hinge-like structures which mount or connect video screens or other elements to the main housing where the host and/or various other control elements and output components reside. It is very difficult to construct high throughput data transfers interfaces using prior techniques which can require up to 90 conductors, or more, to achieve the desired throughput, on say a wireless telephone, as one example. This presents many manufacturing, cost prohibitive, and reliability challenging issues to overcome.

Such issues and requirements are also being seen on fixed location installations where communication or computing type devices, as one example, are added to appliances and other consumer devices to provide advanced data capabilities, Internet and data transfer connections, or built in entertainment. Another example would be airplanes and busses where individual video and audio presentation screen are mounted in seat-backs. However, in these situations it is often more convenient, efficient, and easily serviceable to have the main storage, processing, or communication control elements located a distance from visible screens or audio outputs with an interconnecting link or channel for the presentation of information. This link will need to handle a significant amount of data to achieve the desired throughput, as discussed above.

Therefore, a new transfer mechanism is needed to increase data throughput between host devices providing the data and client display devices or elements presenting an output to end users.

Applicants have proposed such new transfer mechanisms in U.S. patent application Ser. No. 10/020,520, now U.S. Pat. No. 6,760,772 and Ser. No. 10/236,657, now allowed, both entitled "Generating And Implementing A Communication Protocol And Interface For High Data Rate Signal Transfer," which are assigned to the assignee of the present invention and incorporated herein by reference. Also, application Ser. No. 10/860,116 entitled "Generating and Implementing a Signal Protocol and Interface for Higher Data Rates." The techniques discussed in those applications can greatly improve the transfer rate for large quantities of data in high speed data signals. However, the demands for ever increasing data rates, especially as related to video presentations, continue to grow. Even with other ongoing developments in data signal technology, there is still a need to strive for even faster transfer rates, improved communication link efficiencies, and more powerful communication links. Therefore, there is a continuing need to develop a new or improved transfer mechanism which is needed to increase data throughput between host and client devices.

SUMMARY

The above drawback, and others, existent in the art are addressed by embodiments of the invention in which a new protocol and data transfer means, method and mechanism have been developed for transferring data between a host device and a recipient client device at high data rates.

Embodiments for the invention are directed to a Mobile Data Digital Interface (MDDI) for transferring digital data at a high rate between a host device and a client device over a communication path which employs a plurality or series of packet structures to form a communication protocol for communicating a pre-selected set of digital control and presentation data between the host and client devices. The signal communications protocol or link layer is used by a physical layer of host or client link controllers. At least one link controller residing in the host device is coupled to the client device through the communications path or link, and is configured to generate, transmit, and receive packets forming the communications protocol, and to form digital presentation data into one or more types of data packets. The interface provides for bi-directional transfer of information between the host and client, which can reside within a common overall housing or support structure.

The implementation is generally all digital in nature with the exception of differential drivers and receivers which can be easily implemented on a digital CMOS chip, requires a few as 6 signals, and operates at almost any data rate that is convenient for the system designer. The simple physical and link layer protocol makes it easy to integrate, and this simplicity plus a hibernation state enables the portable system to have very low system power consumption.

To aid in use and acceptance, the interface will add very little to the cost of a device, will allow for consumption of very little power while able to power displays through the interface using standard battery voltages, and can accommodate devices having a pocket-able form-factor. The interface is scalable to support resolutions beyond HDTV, supports simultaneous stereo video and 7.1 audio to a display device, performs conditional updates to any screen region, and supports multiple data types in both directions.

In further aspects of embodiments of the invention, at least one client link controller, or client receiver, is disposed in the client device and is coupled to the host device through the communications path or link. The client link controller is also configured to generate, transmit, and receive packets forming the communications protocol, and to form digital presentation data into one or more types of data packets. Generally, the host or link controller employs a state machine for processing data packets used in commands or certain types of signal preparation and inquiry processing, but can use a slower general purpose processor to manipulate data and some of the less complex packets used in the communication protocol. The host controller comprises one or more differential line drivers; while the client receiver comprises one or more differential line receivers coupled to the communication path.

The packets are grouped together within media frames that are communicated between the host and client devices having a pre-defined fixed length with a pre-determined number of packets having different variable lengths. The packets each comprise a packet length field, one or more packet data fields, and a cyclic redundancy check field. A Sub-frame Header Packet is transferred or positioned at the beginning of transfers of other packets from the host link controller. One or more Video Stream type packets and Audio Stream type packets are used by the communications protocol to transfer video type data and audio type data, respectively, from the host to the client over a forward link for presentation to a client device user. One or more Reverse Link Encapsulation type packets are used by the communications protocol to transfer data from the client device to the host link controller. These transfer in some embodiments include the transfer of data from internal controllers having at least one MDDI device to internal video screens. Other embodiments include transfer to internal sound systems, and transfers from various input devices including joysticks and complex keyboards to internal host devices.

Filler type packets are generated by the host link controller to occupy periods of forward link transmission that do not have data. A plurality of other packets are used by the communications protocol to transfer video information. Such packets include Color Map, Bit Block Transfer, Bitmap Area Fill, Bitmap Pattern Fill, and Transparent Color Enable type packets. User-Defined Stream type packets are used by the communications protocol to transfer interface-user defined data. Keyboard Data and Pointing Device Data type packets are used by the communications protocol to transfer data to or from user input devices associated with said client device. A Link Shutdown type packet is used by the communications protocol to terminate the transfer of data in either direction over said communication path.

The communication path generally comprises or employs a cable having a series of four or more conductors and a shield. In addition, printed wires or conductors can be used, as desired, with some residing on flexible substrates.

The host link controller requests display capabilities information from the client device in order to determine what type of data and data rates said client is capable of accommodating through said interface. The client link controller communicates display or presentation capabilities to the host link controller using at least one Client Capability type packet. Multiple transfer modes are used by the communications protocol with each allowing the transfer of different maximum numbers of bits of data in parallel over a given time period, with each mode selectable by negotiation between the host and client link controllers. These transfer modes are dynamically adjustable during transfer of data, and the same mode need not be used on the reverse link as is used on the forward link.

In other aspects of some embodiments of the invention, the host device comprises a wireless communications device, such as a wireless telephone, a wireless PDA, or a portable computer having a wireless modem disposed therein. A typical client device comprises a portable video display such as a micro-display device, and/or a portable audio presentation system. Furthermore, the host may use storage means or elements to store presentation or multimedia data to be transferred to be presented to a client device user.

In still other aspects of some embodiments, the host device comprises a controller or communication link control device with drivers as described below residing within a portable electronic device such as a wireless communications device, such as a wireless telephone, a wireless PDA, or a portable computer. A typical client device in this configuration comprises a client circuit or integrated circuit or module coupled to the host and residing within the same device, and to an internal video display such as a high resolution screen for a mobile phone, and/or a portable audio presentation system, or in the alternative some type of input system or device.

The presently claimed invention is directed to a method, system and computer program product for starting up a digital data interface communication data link by driving a data signal to a logic one state for a first predetermined range of strobe signals and then driving the data signal to a logic zero state for a second predetermined range of strobe cycles.

BRIEF DESCRIPTION OF THE DRAWINGS

Further features and advantages of the invention, as well as the structure and operation of various embodiments of the invention, are described in detail below with reference to the accompanying drawings. In the drawings, like reference numbers generally indicate identical, functionally similar, and/or structurally similar elements or processing steps, and the drawing in which an element first appears is indicated by the leftmost digit(s) in the reference number.

FIG. 10 illustrates the format of a Video Stream Packet.

FIGS. 11A-11E illustrate the format and contents for the Video Data Format Descriptor used in FIG. 10.

FIG. 18 illustrates the format of a Client Capability Packet.

FIG. 19 illustrates the format of a Keyboard Data Packet.

FIG. 20 illustrates the format of a Pointing Device Data Packet.

FIG. 21 illustrates the format of a Link Shutdown Packet.

FIG. 22 illustrates the format of a Client Request and Status Packet.

FIG. 23 illustrates the format of a Bit Block Transfer Packet.

FIG. 26 illustrates the format of a Communication Link Data Channel Packet.

FIG. 27 illustrates the format of a Interface Type Handoff Request Packet.

FIG. 28 illustrates the format of an Interface Type Acknowledge Packet.

FIG. 29 illustrates the format of a Perform Type Handoff Packet.

FIG. 30 illustrates the format of a Forward Audio Channel Enable Packet.

FIG. 31 illustrates the format of a Reverse Audio Sample Rate Packet.

FIG. 32 illustrates the format of a Digital Content Protection Overhead Packet.

FIG. 33 illustrates the format of a Transparent Color Enable Packet.

FIG. 34 illustrates the format of a Round Trip Delay Measurement Packet.

FIG. 38 illustrates processing steps for a typical service request with no contention.

FIG. 39 illustrates processing steps for a typical service request asserted after the link restart sequence has begun, contending with link start.

FIG. 56 illustrates the format of a Forward Link Packet

FIG. 68A illustrates processing steps for a host initiated wake-up.

FIG. 68B illustrates processing steps for a client initiated wake-up.

FIG. 68C illustrates processing steps for host and client initiated wake-up with contention.

FIG. 69 illustrates the format of a Request VCP Feature Packet.

FIG. 70 illustrates the format of a VCP Feature Reply Packet.

FIG. 71 illustrates the format of a VCP Feature Reply List.

FIG. 72 illustrates the format of a Set VCP Feature Packet.

FIG. 73 illustrates the format of a Request Valid Parameter Packet.

FIG. 74 illustrates the format of a Valid Parameter Reply Packet.

FIG. 75 illustrates the format of a Alpha-Cursor Image Capability Packet.

FIG. 76 illustrates the format of a Alpha-Cursor Transparency Map Packet.

FIG. 77 illustrates the format of a Alpha-Cursor Image Offset Packet.

FIG. 78 illustrates the format of a Alpha-Cursor Video Stream Packet.

FIG. 79 illustrates the format of a Scaled Video Stream Capability Packet.

FIG. 80 illustrates the format of a Scaled Video Stream Setup Packet.

FIG. 81 illustrates the format of a Scaled Video Stream Acknowledgement Packet.

FIG. 82 illustrates the format of a Scaled Video Stream Packet.

FIG. 83 illustrates the format of a Request Specific Status Packet.

FIG. 84 illustrates the format of a Valid Status Reply List Packet.

FIG. 85A illustrates the format of a Packet Processing Delay Parameters Packet.

FIG. 85B illustrates the format of a Delay Parameters List item

FIG. 86 illustrates the format of a Personal Display Capability Packet.

FIG. 87A illustrates the format of a Client Error Report Packet.

FIG. 87B illustrates the format of an Error Report List item

FIG. 88 illustrates the format of a Client Identification Packet.

FIG. 89 illustrates the format of an Alternate Display Capability Packet.

FIG. 90 illustrates the format of a Register Access Packet

FIG. 92 illustrates two buffers with display refresh faster than image transfer.

FIG. 93 illustrates two buffers with display refresh slower than image transfer.

FIG. 94 illustrates two buffers with display refresh much faster than image transfer.

FIG. 95 illustrates three buffers with display refresh faster than image transfer.

FIG. 96 illustrates three buffers with display refresh slower than image transfer.

FIG. 97 illustrates one buffer with display refresh faster than image transfer.

DETAILED DESCRIPTION

I. Overview

Figure 1A:
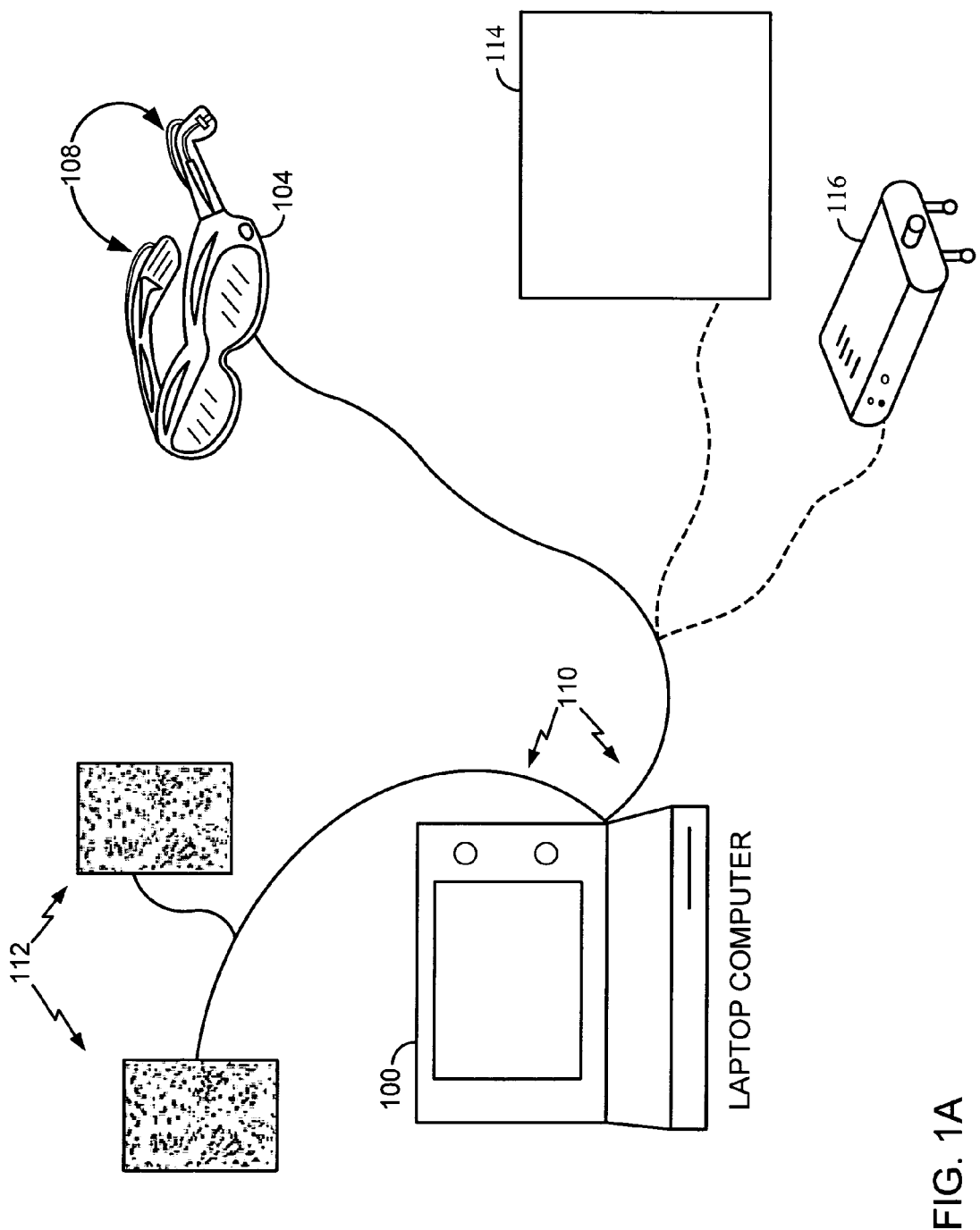
FIG. 1A illustrates a basic environment in which embodiments of the invention might operate including the use of a micro-display device, or a projector, in conjunction with a portable computer or other data processing device.

A general intent of the invention is to provide a Mobile Display Digital Interface (MDDI), as discussed below, which results in or provides a cost-effective, low power consumption, transfer mechanism that enables high- or very-high-speed data transfer over a short-range communication link between a host device and a client device, such as a display element, using a "serial" type of data link or channel. This mechanism lends itself to implementation with miniature connectors and thin flexible cables which are especially useful in connecting internal (to a housing or support frame) display elements or input devices to a central controller, or external display elements or devices such as wearable micro-displays (goggles or projectors) to portable computers, wireless communication devices, or entertainment devices.

Although the terms Mobile and Display are associated with the naming of the protocol, it is to be understood that this is for convenience only in terms of having a standard name easily understood by those skilled in the art working with the interface and protocol. However, it will be readily understood after a review of the embodiments presented below that many non-mobile and non-display related applications will benefit from application of this protocol and resulting interface structure, and the MDDI label is not intended to imply any limitations to the nature or usefulness of the invention or its various embodiments.

An advantage of embodiments of the invention is that a technique is provided for data transfer that is low in complexity, low cost, has high reliability, fits well within the environment of use, and is very robust, while remaining very flexible.

Embodiments of the invention can be used in a variety of situations to communicate or transfer large quantities of data, generally for audio, video, or multimedia applications from a host or source device where such data is generated or stored, to a client display or presentation device at a high rate. A typical application, which is discussed below, is the transfer of data from either a portable computer or a wireless telephone or modem to a visual display device such as a small video screen or a wearable micro-display appliance, such as in the form of goggles or helmets containing small projection lenses and screens, or from a host to client device within such components. That is, from a processor to an internal screen or other presentation element, as well as from various internal, or external input devices employing a client to an internally located (collocated within same device housing or support structure) host.

The characteristics or attributes of the MDDI are such that they are independent of specific display or presentation technology. This is a highly flexible mechanism for transferring data at a high rate without regards to the internal structure of that data, nor the functional aspects of the data or commands it implements. This allows the timing of data packets being transferred to be adjusted to adapt to the idiosyncrasies of particular client devices, such as for unique display desires for certain devices, or to meet the requirements of combined audio and video for some A-V systems, or for certain input devices such as joysticks, touch pads, and so forth. The interface is very display element or client device agnostic, as long as the selected protocol is followed. In addition, the aggregate serial link data, or data rate, can vary over several orders of magnitude which allows a communication system or host device designer to optimize the cost, power requirements, client device complexity, and client device update rates.

The data interface is presented primarily for use in transferring large amounts of high rate data over a "wired" signal link or small cable. However, some applications may take advantage of a wireless link as well, including optical based links, provided it is configured to use the same packet and data structures developed for the interface protocol, and can sustain the desired level of transfer at low enough power consumption or complexity to remain practical.

II. Environment

Figure 1B:
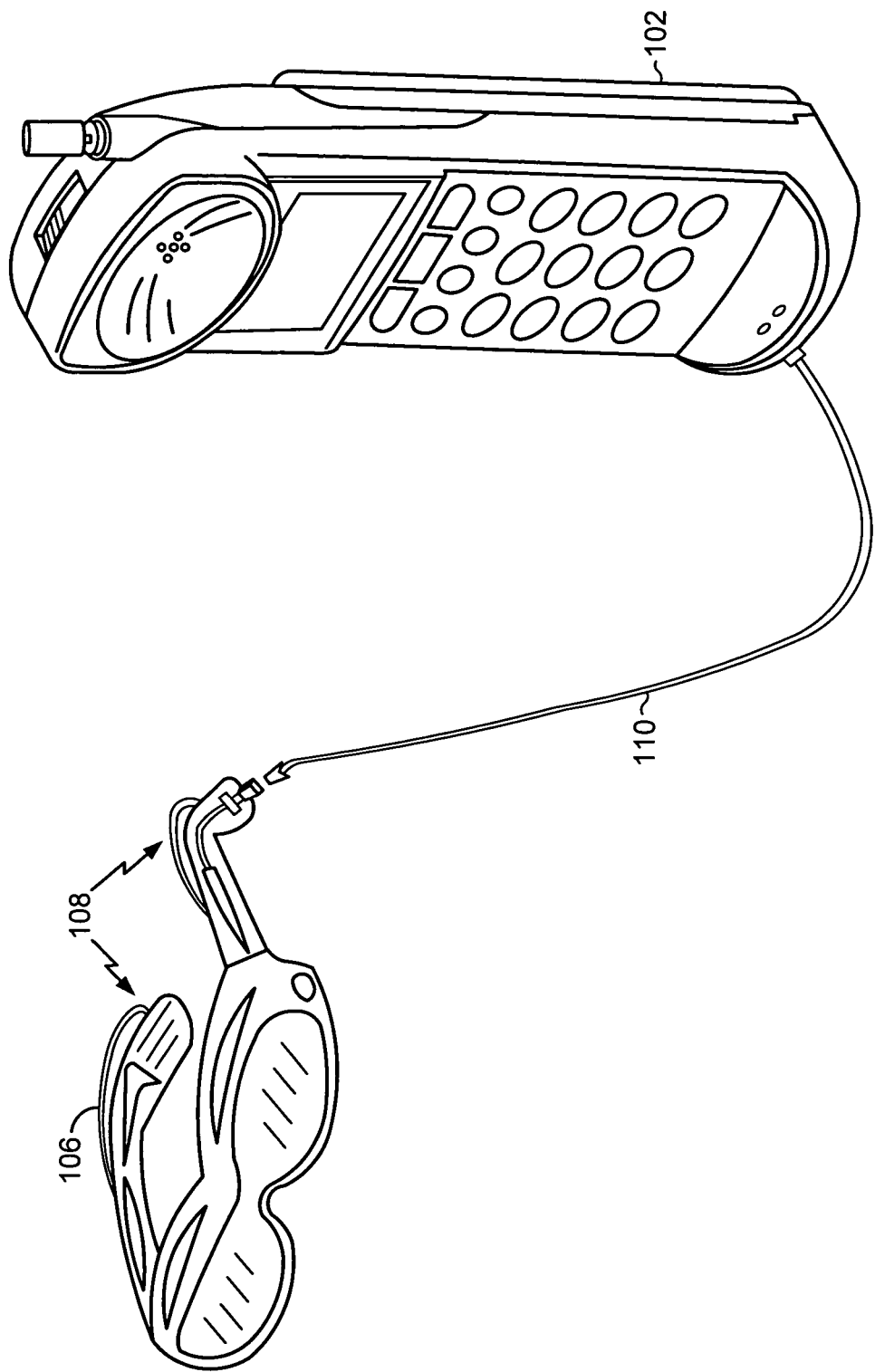
FIG. 1B illustrates a basic environment in which embodiments of the invention might operate including the use of a micro-display device or a projector, and audio presentation elements used in conjunction with a wireless transceiver.

A typical application can be seen in FIGS. 1A and 1B where a portable or laptop computer 100 and wireless telephone or PDA device 102 are shown communicating data with display devices 104 and 106, respectively, along with audio reproduction systems 108 and 112. In addition, FIG. 1A shows potential connections to a larger display or screen 114 or an image projector 116, which are only shown in one figure for clarity, but are connectable to wireless device 102 as well. The wireless device can be currently receiving data or have previously stored a certain amount of multimedia type data in a memory element or device for later presentation for viewing and/or hearing by an end user of the wireless device. Since a typical wireless device is used for voice and simple text communications most of the time, it has a rather small display screen and simple audio system (speakers) for communicating information to the device 102 user.

Computer 100 has a much larger screen, but still inadequate external sound system, and still falls short of other multimedia presentation devices such as a high definition television, or movie screens. Computer 100 is used for purposes of illustration and other types of processors, interactive video games, or consumer electronics devices can also be used with the invention. Computer 100 can employ, but is not limited to or by, a wireless modem or other built in device for wireless communications, or be connected to such devices using a cable or wireless link, as desired.

This makes presentation of more complex or "rich" data a less than a useful or enjoyable experience. Therefore, the industry is developing other mechanisms and devices to present the information to end users and provide a minimum level of desired enjoyment or positive experience.

As previously discussed above, several types of display devices have or are currently being developed for presenting information to end users of device 100. For example, one or more companies have developed sets of wearable goggles that project an image in front of the eyes of a device user to present a visual display. When correctly positioned such devices effectively "project" a virtual image, as perceived by a user's eyes, that is much larger than the element providing the visual output. That is, a very small projection element allows the eye(s) of the user to "see" images on a much larger scale than possible with typical LCD screens and the like. The use of larger virtual screen images also allows the use of much higher resolution images than possible with more limited LCD screen displays. Other display devices could include, but are not limited to, small LCD screens or various flat panel display elements, projection lenses and display drivers for projecting images on a surface, and so forth.

There may also be additional elements connected to or associated with the use of wireless device 102 or computer 100 for presenting an output to another user, or to another device which in turn transfers the signals elsewhere or stores them. For example, data may be stored in flash memory, in optical form, for example using a writeable CD media or on magnetic media such as in a magnetic tape recorder and similar devices, for later use.

In addition, many wireless devices and computers now have built-in MP3 music decoding capabilities, as well as other advanced sound decoders and systems. Portable computers utilize CD and DVD playback capabilities as a general rule, and some have small dedicated flash memory readers for receiving pre-recorded audio files. The issue with having such capabilities is that digital music files promise a highly increased feature rich experience, but only if the decoding and playback process can keep pace. The same holds true for the digital video files.

To assist with sound reproduction, external speakers 114 are shown in FIG. 1A, which could also be accompanied by addition elements such as sub-woofers, or "surround-sound" speakers for front and rear sound projection. At the same time, speakers or earphones 108 are indicated as built-in to the support frame or mechanism of micro-display device 106 of FIG. 1B. As would be known, other audio or sound reproduction elements can be used including power amplification or sound shaping devices.

In any case, as discussed above, when one desires to transfer high quality or high resolution image data and high quality audio information or data signals from a data source to an end user over one or more communication links 110, a high data rate is required. That is, transfer link 110 is clearly a potential bottleneck in the communication of data as discussed earlier, and is limiting system performance, since current transfer mechanisms do not achieve the high data rates typically desired. As discussed above for example, for higher image resolutions such as 1024 by 1024 pixels, with color depths of 24-32 bits per pixel and at data rates of 30 fps, the data rates can approach rates in excess of 755 Mbps or more. In addition, such images may be presented as part of a multimedia presentation which includes audio data and potentially additional signals dealing with interactive gaming or communications, or various commands, controls, or signals, further increasing the quantity or data and the data rate.

It is also clear that fewer cables or interconnections required for establishing a data link, means that mobile devices associated with a display are easier to use, and more likely to be adopted by a larger user base. This is especially true where multiple devices are commonly used to establish a full audio-visual experience, and more especially as the quality level of the displays and audio output devices increases.

Figure 1D:
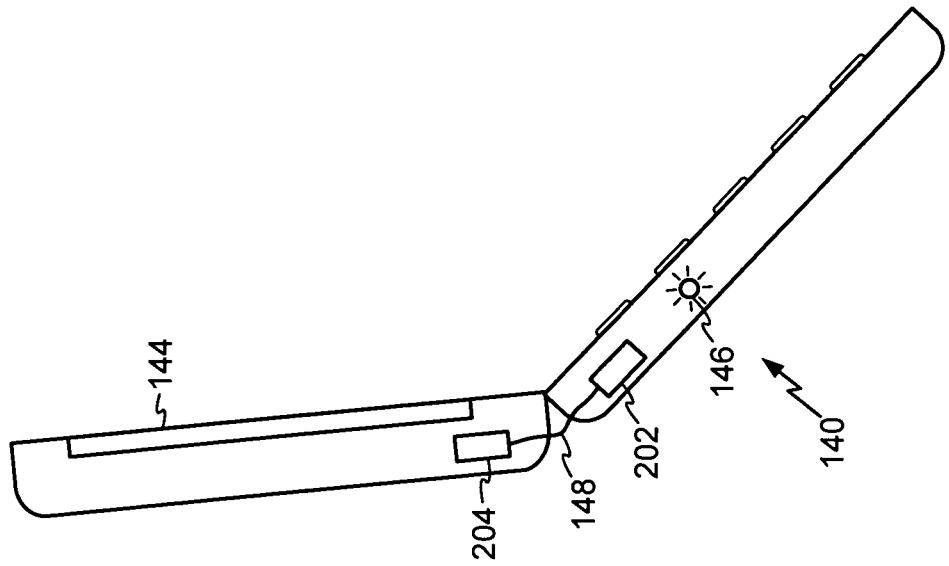
FIG. 1D illustrates a basic environment in which embodiments of the invention might operate including the use of internal display or audio presentation elements used in a wireless transceiver.
Figure 1C:
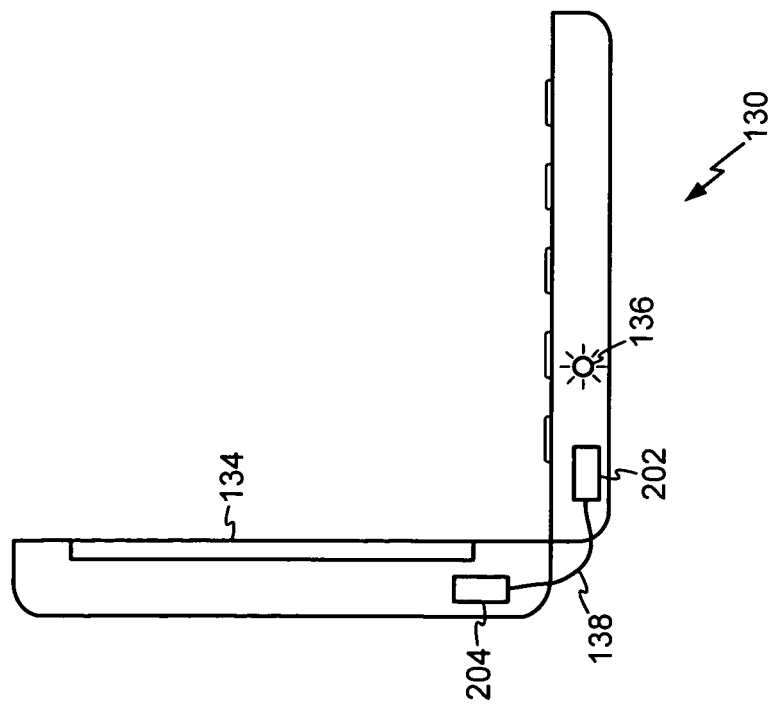
FIG. 1C illustrates a basic environment in which embodiments of the invention might operate including the use of internal display or audio presentation devices used in a portable computer.

Another typical application related to many of the above and other improvements in video screens and other output or input devices can be seen in FIGS. 1C and 1D where a portable or laptop computer 130 and wireless telephone or PDA device 140 are shown communicating data with "internal" display devices 134 and 144, respectively, along with audio reproduction systems 136 and 146.

In FIGS. 1C and 1D, small cut-away sections of the overall electronic devices or products are used to show the location of one or more internal hosts and controllers in one portion of the device with a generalized communication link, here 138 and 148, respectively, connecting them to the video display elements or screens having the corresponding clients, across a rotating joint of some known type used throughout the electronics industry today. One can see that the amount of data involved in these transfers requires a large number of conductors to comprise links 138 and 148. It is estimated that such communication links are approaching 90 or more conductors in order to satisfy today's growing needs for utilizing advanced color and graphical interfaces, display elements, on such devices because of the types of parallel or other known interface techniques available for transferring such data.

Unfortunately, the higher data rates exceed current technology available for transferring data. Both in terms of the raw amount of data needing to be transferred per unit time, and in terms of manufacturing reliable cost effective physical transfer mechanisms.

What is needed is a technique, a structure, means or method, for transferring data at higher rates for the data transfer link or communication path between presentation elements and the data source, which allows for consistently low(er) power, light weight, and as simple and economical a cabling structure as possible. Applicants have developed a new technique, or method and apparatus, to achieve these and other goals to allow an array of mobile, portable, or even fixed location devices to transfer data to desired displays, micro-displays, or audio transfer elements, at very high data rates, while maintaining a desired low power consumption, and complexity.

III. High Rate Digital Data Interface System Architecture

In order to create and efficiently utilize a new device interface, a signal protocol and system architecture has been formulated that provides a very high data transfer rate using low power signals. The protocol is based on a packet and common frame structure, or structures linked together to form a protocol for communicating a pre-selected set of data or data types along with a command or operational structure imposed on the interface.

A. Overview

Figure 2:
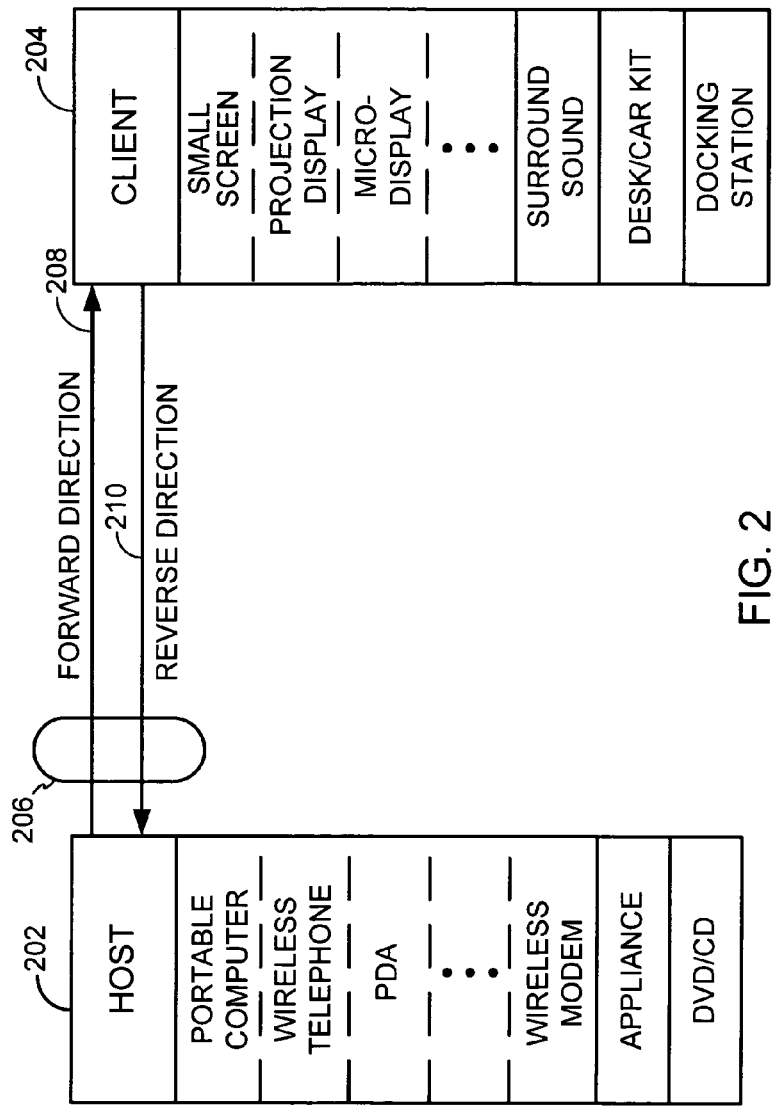
FIG. 2 illustrates the overall concept of a Mobile Digital Data Interface with a host and client interconnection.

The devices connected by or communicating over the MDDI link are called the host and client, with the client typically being a display device of some type, although other output and input devices are contemplated. Data from the host to the display travels in the forward direction (referred to as forward traffic or link), and data from the client to the host travels in the reverse direction (reverse traffic or link), as enabled by the host. This is illustrated in the basic configuration shown in FIG. 2. In FIG. 2, a host 202 is connected to a client 204 using a bi-directional communication channel 206 which is illustrated as comprising a forward link 208 and a reverse link 210. However, these channels are formed by a common set of conductors whose data transfer is effectively switched between the forward or reverse link operations. This allows for greatly reduced numbers of conductors, immediately addressing one of the many problems faced with current approaches to high speed data transfer in low power environments such as for mobile electronic devices.

As discussed elsewhere, the host comprises one of several types of devices that can benefit from using the present invention. For example, host 202 could be a portable computer in the form of a handheld, laptop, or similar mobile computing device. It could also be a Personal Data Assistant (PDA), a paging device, or one of many wireless telephones or modems. Alternatively, host 202 could be a portable entertainment or presentation device such as a portable DVD or CD player, or a game playing device.

Furthermore, the host can reside as a host device or control element in a variety of other widely used or planned commercial products for which a high speed communication link is desired with a client. For example, a host could be used to transfer data at high rates from a video recording device to a storage based client for improved response, or to a high resolution larger screen for presentations. An appliance such as a refrigerator that incorporates an onboard inventory or computing system and/or Bluetooth connections to other household devices, can have improved display capabilities when operating in an internet or Bluetooth connected mode, or have reduced wiring needs for in-the-door displays (a client) and keypads or scanners (client) while the electronic computer or control systems (host) reside elsewhere in the cabinet. In general, those skilled in the art will appreciate the wide variety of modern electronic devices and appliances that may benefit from the use of this interface, as well as the ability to retrofit older devices with higher data rate transport of information utilizing limited numbers of conductors available in either newly added or existing connectors or cables.

At the same time, client 204 could comprise a variety of devices useful for presenting information to an end user, or presenting information from a user to the host. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. Other presentation devices include projectors or projection devices used to present information for meetings, or for movies and television images. Another example would be the use of touch pads or sensitive devices, voice recognition input devices, security scanners, and so forth that may be called upon to transfer a significant amount of information from a device or system user with little actual "input" other than touch or sound from the user. In addition, docking stations for computers and car kits or desk-top kits and holders for wireless telephones may act as interface devices to end users or to other devices and equipment, and employ either clients (output or input devices such as mice) or hosts to assist in the transfer of data, especially where high speed networks are involved.

However, those skilled in the art will readily recognize that the present invention is not limited to these devices, there being many other devices on the market, and proposed for use, that are intended to provide end users with high quality images and sound, either in terms of storage and transport or in terms of presentation at playback. The present invention is useful in increasing the data throughput between various elements or devices to accommodate the high data rates needed for realizing the desired user experience.

The inventive MDD Interface and communication signal protocol may be used to simplify the interconnect between a host processor, controller, or circuit component (for example), and a display within a device or device housing or structure (referred to as an internal mode) in order to reduce the cost or complexity and associated power and control requirements or constraints of these connections, and to improve reliability, not just for connection to or for external elements, devices, or equipment (referred to as an external mode).

The aggregate serial link data rate on each signal pair used by this interface structure can vary over many orders of magnitude, which allows a system or device designer to easily optimize cost, power, implementation complexity, and the display update rate for a given application or purpose. The attributes of MDDI are independent of display or other presentation device (target client) technology. The timing of data packets transferred through the interface can be easily adjusted to adapt to idiosyncrasies of particular clients such as display devices, sound systems, memory and control elements, or combined timing requirements of audio-video systems. While this makes it possible to have a system with a very small power consumption, it is not a requirement of the various clients to have frame buffers in order to make use of the MDDI protocol at least at some level.

B. Interface Types

The MDD Interface is contemplated as addressing at least fours, and potentially more, somewhat distinct physical types of interfaces found in the communications and computer industries. These are labeled simply as Type 1, Type 2, Type 3, and Type 4, although other labels or designations may be applied by those skilled in the art depending upon the specific applications they are used for or industry they are associated with. For example, simple audio systems use fewer connections than more complex multimedia systems, and may reference features such as "channels" differently, and so forth.

The Type 1 interface is configured as a 6-wire, or other type of conductor or conductive element, interface which makes it suitable for mobile or wireless telephones, PDAs, electronic games, and portable media players, such as CD players, or MP3 players, and similar devices or devices used on similar types of electronic consumer technology. In one embodiment, a an interface can be configured as an 8-wire (conductor) interface which is more suitable for laptop, notebook, or desktop personal computers and similar devices or applications, not requiring rapid data updates and which do not have a built-in MDDI link controller. This interface type is also distinguishable by the use of an additional two-wire Universal Serial Bus (USB) interface, which is extremely useful in accommodating existing operating systems or software support found on most personal computers.

Type 2, Type 3, and Type 4 interfaces are suitable for high performance clients or devices and use larger more complex cabling with additional twisted-pair type conductors to provide the appropriate shielding and low loss transfers for data signals.

The Type 1 interface passes signals which can comprise display, audio, control, and limited signaling information, and is typically used for mobile clients or client devices that do not require high-resolution full-rate video data. A Type 1 interface can easily support SVGA resolution at 30 fps plus 5.1 channel audio, and in a minimum configuration might use only three wire pairs total, two pairs for data transmission and one pair for power transfer. This type of interface is primarily intended for devices, such as mobile wireless devices, where a USB host is typically not available within the such device for connection and transfer of signals. In this configuration, the mobile wireless device is a MDDI host device, and acts as the "master" that controls the communication link from the host, which generally sends data to the client (forward traffic or link) for presentation, display or playback.

Figure 3:
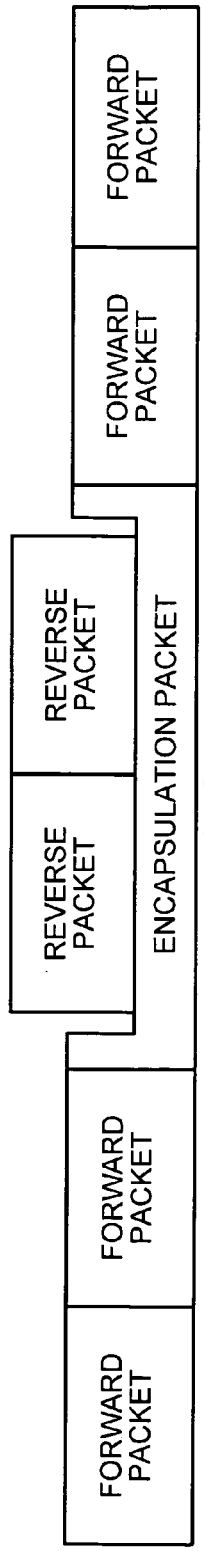
FIG. 3 illustrates the structure of a packet useful for realizing data transfers from a client device to a host device.

In this interface, a host enables receipt of communication data at the host from the client (reverse traffic or link) by sending a special command or packet type to the client that allows it to take over the bus (link) for a specified duration and send data to the host as reverse packets. This is illustrated in FIG. 3, where a type of packet referred to as an encapsulation packet (discussed below) is used to accommodate the transfer of reverse packets over the transfer link, creating the reverse link. The time interval allocated for the host to poll the client for data is pre-determined by the host, and is based on the requirements of each specified application. This type of half-duplex bi-directional data transfer is especially advantageous where a USB port is not available for transfer of information or data from the client.

High-performance displays capable of HDTV type or similar high resolutions require around 1.5 Gbps rate data streams in order to support full-motion video. The Type 2 interface supports high data rates by transmitting 2 bits in parallel, the Type 3 by transmitting 4 bits in parallel, and the Type 4 interface transfers 8 bits in parallel. Type 2 and Type 3 interfaces use the same cable and connector as Type 1 but can operate at twice and four times the data rate to support higher-performance video applications on portable devices. A Type 4 interface is suited for very high performance clients or displays and requires a slightly larger cable that contains additional twisted-pair data signals.

The protocol used by the MDDI allows each Type 1, 2, 3, or 4 host to generally communicate with any Type 1, 2, 3, or 4 client by negotiating what is the highest data rate possible that can be used. The capabilities or available features of what can be referred to as the least capable device is used to set the performance of the link. As a rule, even for systems where the host and client are both capable using Type 2, Type 3, or Type 4 interfaces, both begin operation as a Type 1 interface. The host then determines the capability of the target client, and negotiates a hand-off or reconfiguration operation to either Type 2, Type 3, or Type 4 mode, as appropriate for the particular application.

It is generally possible for the host to use the proper link-layer protocol (discussed further below) and step down or again reconfigure operation at generally any time to a slower mode to save power or to step up to a faster mode to support higher speed transfers, such as for higher resolution display content. For example, a host may change interface types when the system switches from a power source such as a battery to AC power, or when the source of the display media switches to a lower or higher resolution format, or a combination of these or other conditions or events may be considered as a basis for changing an interface type, or transfer mode.

It is also possible for a system to communicate data using one mode in one direction and another mode in another direction. For example, a Type 4 interface mode could be used to transfer data to a display at a high rate, while a Type 1 mode is used when transferring data to a host device from peripheral devices such as a keyboard or a pointing device. It will be appreciated by one skilled in the art that hosts and clients may communicate outgoing data at different rates.

Often, users of the MDDI protocol may distinguish between an "external" mode and an "internal" mode. An external mode describes the use of the protocol and interface to connect a host in one device to a client outside of that device that is up to about 2 meters or so from the host. In this situation, the host may also send power to the external client so that both devices can easily operate in a mobile environment. An internal mode describes when the host is connected to a client contained inside the same device, such as within a common housing or support frame or structure of some kind. An example would be applications within a wireless phone or other wireless device, or a portable computer or gaming device where the client is a display or display driver, or an input device such as a keypad or touch-pad, or a sound system, and the host is a central controller, graphics engine, or CPU element. Since a client is located much closer to the host in internal mode applications as opposed to external mode applications, there are generally no requirements discussed for the power connection to the client in such configurations.

C. Physical Interface Structure

Figure 4:
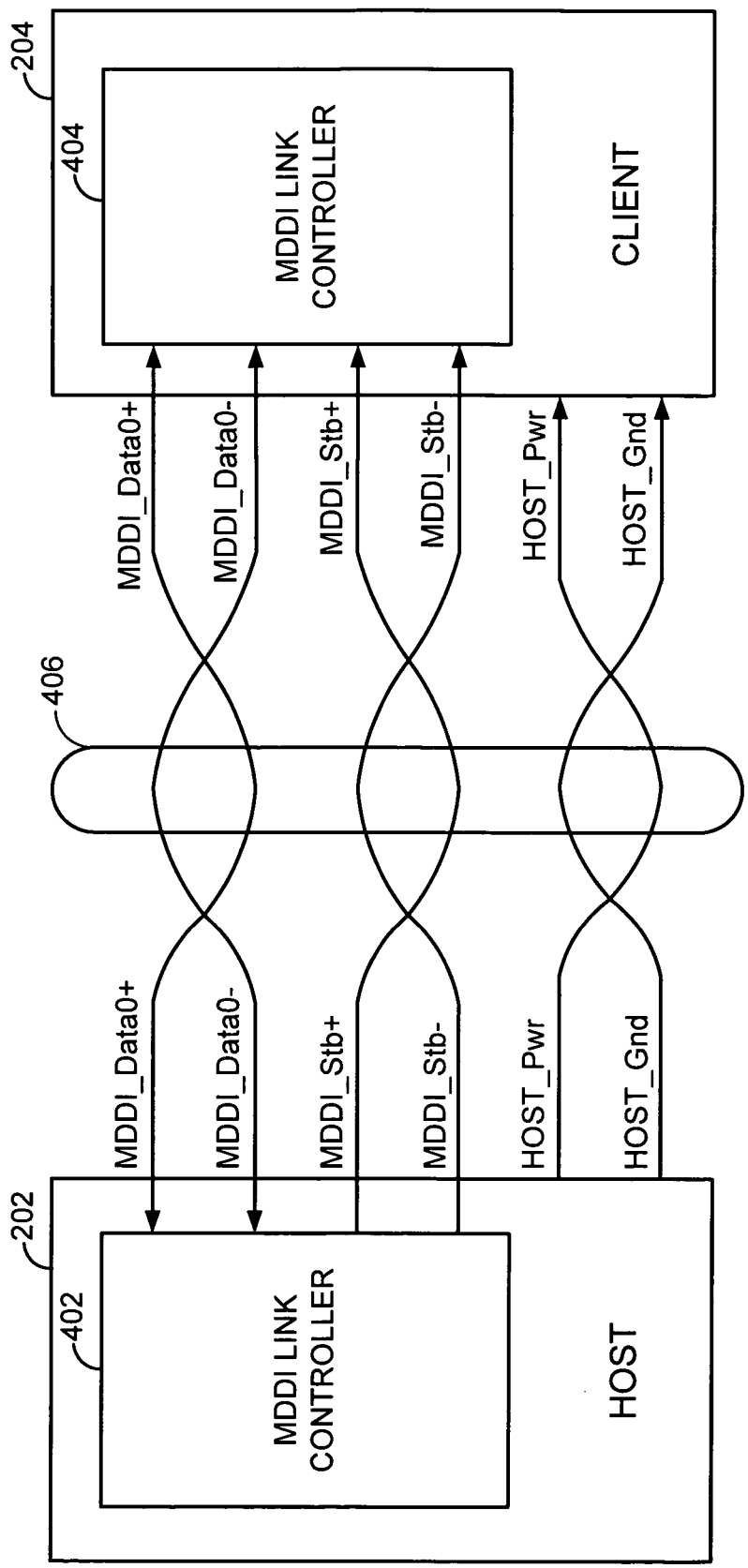
FIG. 4 illustrates the use of an MDDI link controller and the types of signals passed between a host and a client over the physical data link conductors for a Type 1 interface.
Figure 5:
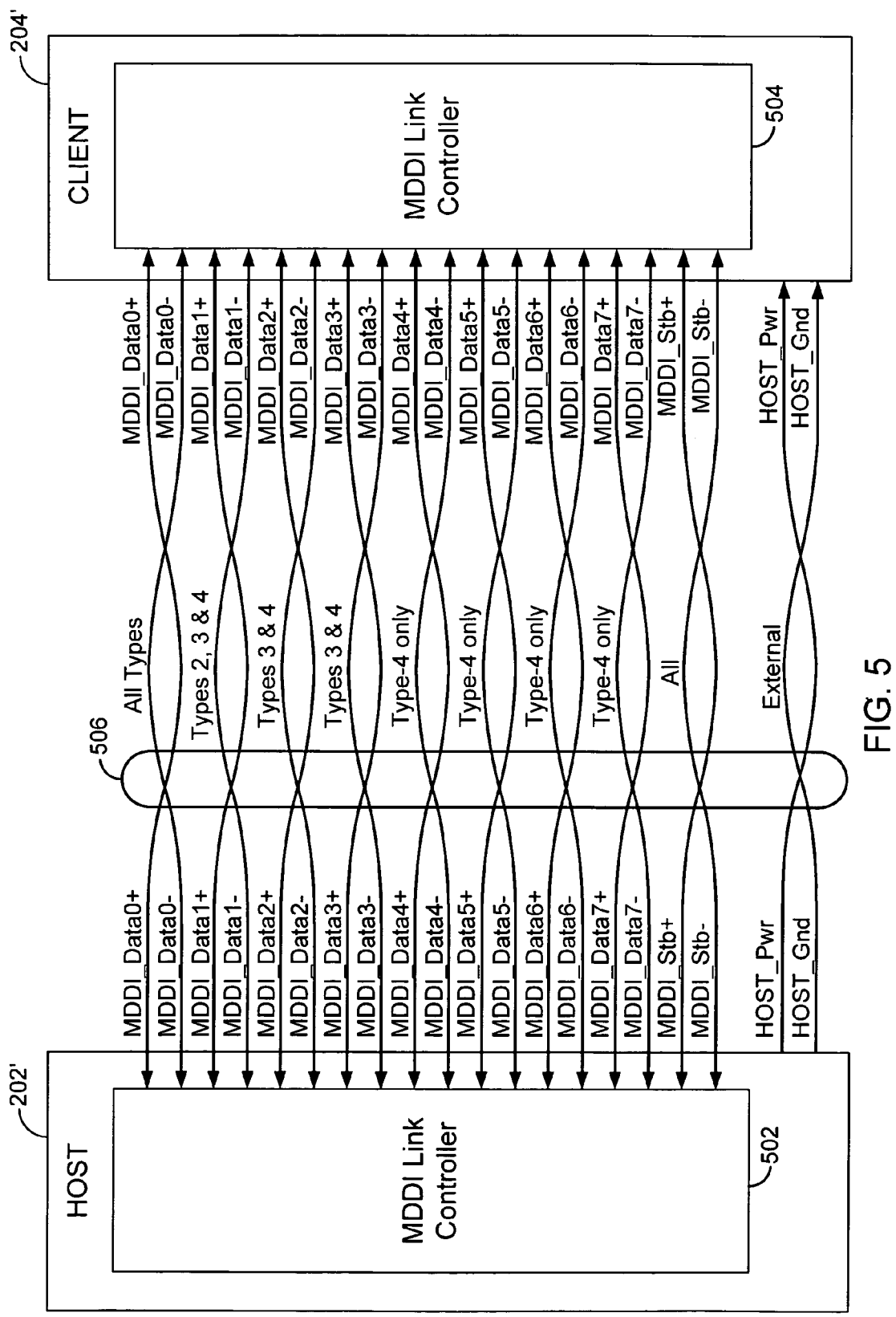
FIG. 5 illustrates the use of an MDDI link controller and the types of signals passed between a host and a client over the physical data link conductors for Types 2, 3, and 4 interfaces.

The general disposition of a device or link controller for establishing communications between host and client devices is shown in FIGS. 4 and 5. In FIGS. 4 and 5, a MDDI link controller 402 and 502 is shown installed in a host device 202 and a MDDI link controller 404 and 504 is shown installed in a client device 204. As before, host 202 is connected to a client 204 using a bi-directional communication channel 406 comprising a series of conductors. As discussed below, both the host and client link controllers can be manufactured as an integrated circuit using a single circuit design that can be set, adjusted, or programmed to respond as either a host controller (driver) or a client controller (receiver). This provides for lower costs due to larger scale manufacturing of a single circuit device.

MDDI_Data11+/−. The Type 3 interface contains two additional data pairs or signal paths beyond that of the Type 2 interface referred to as MDDI_Data2+/−, and MDDI_Data3+/−. The Type 4 interface contains four more data pairs or signal paths beyond that of the Type 3 interface referred to as: MDDI_data4+/−, MDDI_Data5+/−, MDDI_Data6+/−, and MDDI_Data7+/−, respectively. In each of the above interface configurations, a host can send power to the client or display using the wire-pair or signals designated as HOST_Pwr and HOST_Gnd. As discussed further below, power transfer can also be accommodated, if desired, in some configurations on the MDDI_data4+/−, MDDI_Data5+/−, MDDI_Data6+/−, or MDDI_Data7+/− conductors when an interface "Type" is being used that employs fewer conductors than are available or present for the other modes. This Power transfer is generally employed for external modes, there generally being no need for internal modes, although some applications may differ.

A summary of the signals passed between the host and client (display) over the MDDI link for various modes are illustrated in Table I, below, in accordance with the interface type.

TABLE I

| Type 1 | Type 2 | Type 3 | Type 4 |
|---|---|---|---|
| HOST_Pwr/Gnd | HOST_Pwr/Gnd | HOST_Pwr/Gnd | HOST_Pwr/Gnd |
| MDDI_Stb+/− | MDDI_Stb+/− | MDDI_Stb+/− | MDDI_Stb+/− |
| MDDI_Data0+/− | MDDI_Data0+/− | MDDI_Data0+/− | MDDI_Data0+/− |
|  | MDDI_Data1+/− | MDDI_Data1+/− | MDDI_Data1+/− |
|  |  | MDDI_Data2+/− | MDDI_Data2+/− |
|  |  | MDDI_Data3+/− | MDDI_Data3+/− |
| Optional Pwr | Optional Pwr | Optional Pwr | MDDI_Data4+/− |
| Optional Pwr | Optional Pwr | Optional Pwr | MDDI_Data5+/− |
| Optional Pwr | Optional Pwr | Optional Pwr | MDDI_Data6+/− |
| Optional Pwr | Optional Pwr | Optional Pwr | MDDI_Data7+/− |

In FIG. 5, a MDDI link controller 502 is shown installed in a host device 202' and a MDDI link controller 504 is shown installed in a client device 204'. As before, host 202' is connected to a client 204' using a bi-directional communication channel 506 comprising a series of conductors. As discussed before, both the host and client link controllers can be manufactured using a single circuit design.

Signals passed between a host and a client, such as a display device, over the MDDI link, or the physical conductors used, are also illustrated in FIGS. 4 and 5. As seen in FIGS. 4 and 5, the primary path or mechanism for transferring data through the MDDI uses data signals labeled as MDDI_Data0+/− and MDDI_Stb+/−. Each of these are low voltage data signals that are transferred over a differential pair of wires in a cable. There is only one transition on either the MDDI_Data0 pair or the MDDI_Stb pair for each bit sent over the interface. This is a voltage based transfer mechanism not current based, so static current consumption is nearly zero. The host drives the MDDI_Stb signals to the client display.

While data can flow in both the forward and reverse directions over the MDDI_Data pairs, that is, it is a bi-directional transfer path, the host is the master or controller of the data link. The MDDI_Data0 and MDDI-Stb signal paths are operated in a differential mode to maximize noise immunity. The data rate for signals on these lines is determined by the rate of the clock sent by the host, and is variable over a range of about 1 kbps up to 400 Mbps or more.

The Type 2 interface contains one additional data pair or conductors or paths beyond that of the Type 1, referred to as Also note that the HOST_Pwr/Gnd connections for transfer from the host are provided generally for external modes. Internal applications or modes of operation generally have clients that draw power directly from other internal resources, and do not use MDDI to control power distribution, as would be apparent to one skilled in the art, so such distribution is not discussed in further detail here. However, it is certainly possible to allow power to be distributed through the MDDI interface to allow for certain kinds of power control, synchronization, or interconnection convenience, for example, as would be understood by one skilled in the art.

Cabling generally used to implement the above structure and operation is nominally on the order of 1.5 meters in length, generally 2 meters or less, and contains three twisted pairs of conductors, each in turn being multi-strand 30 AWG wire. A foil shield covering is wrapped or otherwise formed above the three twisted pairs, as an additional drain wire. The twisted pairs and shield drain conductor terminate in the client connector with the shield connected to the shield for the client, and there is an insulating layer, covering the entire cable, as would be well known in the art. The wires are paired as: HOST_Gnd with HOST_Pwr; MDDI_Stb+ with MDDI_Stb−; MDDI_Data0+ with MDDI_Data0−; MDDI_Data1+ with MDDI_Data1−; and so forth. However, a variety of conductors and cabling can be used, as would be understood in the art, to implement the embodiments of the invention, depending upon specific applications. For example, heavier outside coatings or even metallic layers may be used to protect the cable in some applications, while thinner, flatter conductive ribbon type structures may be well suited to other applications.

D. Data Types and Rates

To achieve a useful interface for a full range of user experiences and applications, the Mobile Digital Data Interface (MDDI) provides support for a variety of clients and display information, audio transducers, keyboards, pointing devices, and many other input or output devices that might be integrated into or working in concert with a mobile display device, along with control information, and combinations thereof. The MDD interface is designed to be able to accommodate a variety of potential types of streams of data traversing between the host and client in either the forward or reverse link directions using a minimum number of cables or conductors. Both isochronous streams and asynchronous stream (updates) are supported. Many combinations of data types are possible as long as the aggregate data rate is less than or equal to the maximum desired MDDI link rate, which is limited by the maximum serial rate and number of data airs employed. These could include, but are not limited to, those items listed in Tables II and III below.

TABLE II

Transferring from Host to Client

| | | |
|---|---|---|
| isochronous video data | 720 × 480, 12 bit, 30 f/s | ~124.5 Mbps |
| isochronous stereo audio data | 44.1 kHz, 16 bit, stereo | ~1.4 Mbps |
| asynchronous graphics data | 800 × 600, 12 bit, 10 f/s, stereo | ~115.2 Mbps |
| asynchronous control | Minimum | <<1.0 Mbps |

TABLE III

Transferring from Client to Host

| | | |
|---|---|---|
| isochronous voice data | 8 kHz, 8 bit | <<1.0 Mbps |
| isochronous video data | 640 × 480, 12 bit, 24 f/s | ~88.5 Mbps |
| asynchronous status, user input, etc. | minimum | <<1.0 Mbps |

The interface is not fixed but extensible so that it can support the transfer of a variety of information "types" which includes user-defined data, for future system flexibility. Specific examples of data to be accommodated are: full-motion video, either in the form of full or partial screen bitmap fields or compressed video; static bitmaps at low rates to conserve power and reduce implementation costs; PCM or compressed audio data at a variety of resolutions or rates; pointing device position and selection, and user-definable data for capabilities yet to be defined. Such data may also be transferred along with control or status information to detect device capability or set operating parameters.

Embodiments of the invention advance the art for use in data transfers that include, but are not limited to: watching a movie (video display and audio); using a personal computer with limited personal viewing (graphics display, sometimes combined with video and audio); playing a video game on a PC, console, or personal device (motion graphics display, or synthetic video and audio); "surfing" the Internet, using devices in the form of a video phone (bi-directional low-rate video and audio), a camera for still digital pictures, or a camcorder for capturing digital video images; using a phone, computer, or PDA docked with a projector to give a presentation or docked with a desktop docking station connected to a video monitor, keyboard, and mouse; and for productivity enhancement or entertainment use with cell phones, smart phones, or PDAs, including wireless pointing devices and keyboard data.

The high speed data interface as discussed below is presented in terms of providing large amounts of A-V type data over a communication or transfer link which is generally configured as a wire-line or cable type link. However, it will be readily apparent that the signal structure, protocols, timing, or transfer mechanism could be adjusted to provide a link in the form of an optical or wireless media, if it can sustain the desired level of data transfer.

The MDD interface signals use a concept known as the Common Frame Rate (CFR) for the basic signal protocol or structure. The idea behind using of a Common Frame Rate is to provide a synchronization pulse for simultaneous isochronous data streams. A client device can use this common frame rate as a time reference. A low CF rate increases channel efficiency by decreasing overhead to transmit the sub-frame header. On the other hand, a high CF rate decreases the latency, and allows a smaller elastic data buffer for audio samples. The CF rate of the present inventive interface is dynamically programmable and may be set at one of many values that are appropriate for the isochronous streams used in a particular application. That is, the CF value is selected to best suit the given client and host configuration, as desired.

The number of bytes generally required per sub-frame, which is adjustable or programmable, for isochronous data steams that are most likely to be used with an application, such as for a video or micro-display are shown in Table IV.

TABLE IV

| Common Frame Rate (CFR) = 300 Hz | | | | | | |
|---|---|---|---|---|---|---|
| | X | Y | Bit | Frame Rate | Channel | Rate (Mbps) | Bytes/ Sub-frame |
| Computer Game | 720 | 480 | 24 | 30 | 1 | 248.832 | 103680 |
| Computer Graphics | 800 | 600 | 24 | 10 | 1 | 115.200 | 48000 |
| Video | 640 | 480 | 12 | 29.97 or 30 | 1 | 221.184 | 92160 |
| CD Audio | 1 | 1 | 16 | 44100 | 2 | 1.4112 | 588 |
| Voice | 1 | 1 | 8 | 8000 | 1 | 0.064 | 26-2/3 |

Fractional counts of bytes per sub-frame are easily obtained using a simple programmable M/N counter structure. For example, a count of 26⅔ bytes per CF is implemented by transferring 2 frames of 27 bytes each followed by one sub-frame of 26 bytes. A smaller CF rate may be selected to produce an integer number of bytes per sub-frame. However, generally speaking, to implement a simple M/N counter in hardware should require less area within an integrated circuit chip or electronic module used to implement part or all of embodiments of the invention than the area needed for a larger audio sample FIFO buffer.

An exemplary application that illustrates the impact of different data transfer rates and data types is a Karaoke system. For Karaoke, a system where an end user, or users, sings along with a music video program. Lyrics of the song are displayed somewhere on, typically at the bottom of, a screen so the user knows the words to be sung, and roughly the timing of the song. This application requires a video display with infrequent graphics updates, and mixing of the user's voice, or voices, with a stereo audio stream.

If one assumes a common frame rate of 300 Hz, then each sub-frame will consist of: 92,160 bytes of video content and 588 bytes of audio content (based on 147 16-bit samples, in stereo) over the forward link to the client display device, and an average of 26.67 (26⅔) bytes of voice are sent back from a microphone to the mobile Karaoke machine. Asynchronous packets are sent between the host and the display, possibly head mounted. This includes at most 768 bytes of graphics data (quarter-screen height), and less than about 200 bytes (several) bytes for miscellaneous control and status commands.

Table V, shows how data is allocated within a sub-frame for the Karaoke example. The total rate being used is selected to be about 279 Mbps. A slightly higher rate of 280 Mbps allows about another 400 bytes of data per sub-frame to be transferred which allows the use of occasional control and status messages.

TABLE V

| Element Rate | Overhead Bytes per sub-frame | Media Bytes per sub-frame |
|---|---|---|
| Music Video at 640 × 480 pixels and 30 fps | 2 * 28 = 56 | 92160 |
| Lyric Text at 640 × 120 pixels and 1 fps Updated in 10 sub-frames, 1/30 sec. | 28 | 768 |
| CD Audio at 44,100 sps, stereo, 16-bit | 2 * 16 = 32 | 588 |
| Voice at 8,000 sps, mono, 8-bit | 28 + 8 + 8 + (4*16) + (3*27) = 125 | 26.67 |
| Sub-frame Header | 22 | |
| Total Bytes/CF | 263 | 115815 |
| Total Rate (Mbps) | (263 + 115815)*8*300 = 278.5872 | |

III.(Continued) High Rate Digital Data Interface System Architecture

E. Link Layer

Data transferred using the MDD interface high-speed serial data signals consists of a stream of time-multiplexed packets that are linked one after the other. Even when a transmitting device has no data to send, a MDDI link controller generally automatically sends filler packets, thus, maintaining a stream of packets. The use of a simple packet structure ensures reliable isochronous timing for video and audio signals or data streams.

Groups of packets are contained within signal elements or structures referred to as sub-frames, and groups of sub-frames are contained within signal elements or structures referred to as a media-frame. A sub-frame contains one or more packets, depending on their respective size and data transfer uses, and a media-frame contains one more sub-frames. The largest sub-frame provided by the protocol employed by the embodiments presented here is on the order of $2^{32}-1$ or 4,294,967,295 bytes, and the largest media-frame size then becomes on the order of $2^{16}-1$ or 65,535 sub-frames.

A special sub-frame header packet contains a unique identifier that appears at the beginning of each sub-frame, as is discussed below. That identifier is also used for acquiring the frame timing at the client device when communication between the host and client is initiated. Link timing acquisition is discussed in more detail below.

Typically, a display screen is updated once per media-frame when full-motion video is being displayed. The display frame rate is the same as the media-frame rate. The link protocol supports full-motion video over an entire display, or just a small region of full-motion video content surrounded by a static image, depending on the desired application. In some low-power mobile applications, such as viewing web pages or email, the display screen may only need to be updated occasionally. In those situations, it is advantageous to transmit a single sub-frame and then shut down or inactivate the link to minimize power consumption. The interface also supports effects such as stereo vision, and handles graphics primitives.

Sub-frames allow a system to enable the transmission of high-priority packets on a periodic basis. This allows simultaneous isochronous streams to co-exist with a minimal amount of data buffering. This is one advantage embodiments provide to the display process, allowing multiple data streams (high speed communication of video, voice, control, status, pointing device data, etc.) to essentially share a common channel. It transfers information using relatively few signals. It also enables display-technology-specific actions to exist, such as horizontal sync pulses and blanking intervals for a CRT monitor, or for other client-technology-specific actions.

F. Link Controller

The MDDI link controller shown in FIGS. 4 and 5 is manufactured or assembled to be a completely digital implementation with the exception of the differential line receivers which are used to receive MDDI data and strobe signals. However, even the differential line drivers and receivers can be implemented in the same digital integrated circuits with the link controller, such as when making a CMOS type IC. No analog functions or phase lock loops (PLLs) are required for bit recovery or to implement the hardware for the link controller. The host and client link controllers contain very similar functions, with the exception of the client interface which contains a state machine for link synchronization. Therefore, the embodiments of the invention allow the practical advantage of being able to create a single controller design or circuit that can be configured as either a host or client, which can reduce manufacturing costs for the link controllers, as a whole.

IV. Interface Link Protocol

A. Frame Structure

Figure 6:
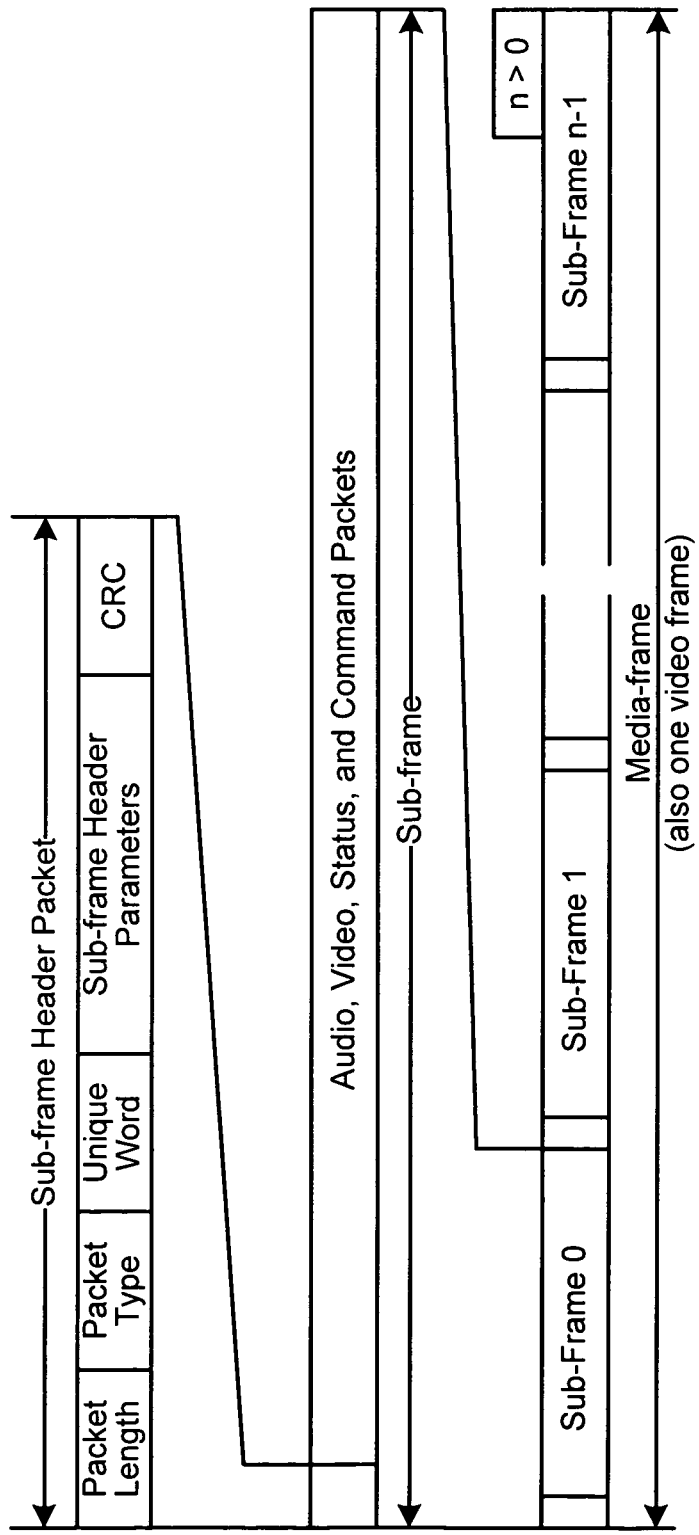
FIG. 6 illustrates the structure of frames and sub-frames used to implement the interface protocol.

The signal protocol or frame structure used to implement the forward link communication for packet transfer is illustrated in FIG. 6. As shown in FIG. 6, information or digital data is grouped into elements known as packets. Multiple packets are in turn grouped together to form what are referred to as a "sub-frame," and multiple sub-frames are in turn grouped together to form a "media" frame. To control the formation of frames and transfer of sub-frames, each sub-frame begins with a specially predefined packet referred to as a Sub-frame Header Packet (SHP).

The host device selects the data rate to be used for a given transfer. This rate can be changed dynamically by the host device based on both the maximum transfer capability of the host, or the data being retrieved from a source by the host, and the maximum capability of the client, or other device the data is being transferred to.

A recipient client device designed for, or capable of, working with the MDDI or inventive signal protocol is able to be queried by the host to determine the maximum, or current maximum, data transfer rate it can use, or a default slower minimum rate may be used, as well as useable data types and features supported. This information could be transferred using a Client Capability Packet (DCP), as discussed further below. The client display device is capable of transferring data or communicating with other devices using the interface at a pre-selected minimum data rate or within a minimum data rate range, and the host will perform a query using a data rate within this range to determine the full capabilities of the client devices.

Other status information defining the nature of the bitmap and video frame-rate capabilities of the client can be transferred in a status packet to the host so that the host can configure the interface to be as efficient or optimal as practical, or desired within any system constraints.

The host sends filler packets when there are no (more) data packets to be transferred in the present sub-frame, or when the host cannot transfer at a rate sufficient to keep pace with the data transmission rate chosen for the forward link. Since each sub-frame begins with a sub-frame header packet, the end of the previous sub-frame contains a packet (most likely a filler packet) the exactly fills the previous sub-frame. In the case of a lack of room for data bearing packets per se, a filler packet will most likely be the last packet in a sub-frame, or at the end of a next previous sub-frame and before a sub-frame header packet. It is the task of the control operations in a host device to ensure that there is sufficient space remaining in a sub-frame for each packet to be transmitted within that sub-frame. At the same time, once a host device initiates the sending of a data packet, the host must be able to successfully complete a packet of that size within a frame without incurring a data under-run condition.

In one aspect of embodiments, sub-frame transmission has two modes. One mode is a periodic sub-frame mode, or periodic timing epochs, used to transmit live video and audio streams. In this mode, the Sub-frame length is defined as being non-zero. The second mode is an asynchronous or non-periodic mode in which frames are used to provide bitmap data to a client when new information is available. This mode is defined by setting the sub-frame length to zero in the Sub-frame Header Packet. When using the periodic mode, sub-frame packet reception may commence when the client has synchronized to the forward link frame structure. This corresponds to the "in sync" states defined according to the state diagram discussed below with respect to FIG. 49 or FIG. 63. In the asynchronous non-periodic sub-frame mode, reception commences after the first Sub-frame Header packet is received.

B. Overall Packet Structure

The format or structure of packets used to formulate the communication or signal protocol, or method or means for transferring data, implemented by the embodiments are presented below, keeping in mind that the interface is extensible and additional packet structures can be added as desired. The packets are labeled as, or divided into, different "packet types" in terms of their function in the interface, that is, commands, information, value, or data they transfer or are associated with. Therefore, each packet type denotes a predefined packet structure for a given packet which is used in manipulating the packets and data being transferred. As will be readily apparent, the packets may have pre-selected lengths or have variable or dynamically changeable lengths depending on their respective functions. The packets could also bear differing names, although the same function is still realized, as can occur when protocols are changed during acceptance into a standard. The bytes or byte values used in the various packets are configured as multi-bit (8- or 16-bit) unsigned integers. A summary of the packets being employed along with their "type" designations, listed in type order, is shown in Tables VI-1 through VI-4.

Each table represents a general "type" of packet within the overall packet structure for ease in illustration and understanding. There is no limitation or other impact implied or being expressed for the invention by these groupings, and the packets can be organized in many other fashions as desired. The direction in which transfer of a packet is considered valid is also noted.

TABLE VI-1

Link Control Packets

| Packet Name | Packet Type | Valid in Forward | Valid in Reverse |
|---|---|---|---|
| Sub-frame Header Packet | 15359 | x | |
| Filler Packet | 0 | x | x |
| Reverse Link Encapsulation Packet | 65 | x | |
| Link Shutdown Packet | 69 | x | |
| Interface Type Handoff Request Packet | 75 | x | |
| Interface Type Acknowledge Packet | 76 | | x |
| Perform Type Handoff Packet | 77 | x | |
| Forward Audio Channel Enable Packet | 78 | x | |
| Round Trip Delay Measurement Packet | 82 | x | |
| Forward Link Skew Calibration Packet | 83 | x | |

TABLE VI-2

Basic Media Stream Packets

| Packet Name | Packet Type | Valid in Forward | Valid in Reverse |
|---|---|---|---|
| Video Stream Packet | 16 | x | x |
| Audio Stream Packet | 32 | x | x |
| Reserved Stream Packets | 1-15, 18-31, 33-55 | x | x |
| User-Defined Stream Packets | 56-63 | x | x |
| Color Map Packet | 64 | x | x |
| Reverse Audio Sample Rate Packet | 79 | x | |
| Transparent Color Enable Packet | 81 | x | |

TABLE VI-3

Client Status and Control Packets

| Packet Name | Packet Type | Valid in Forward | Valid in Reverse |
|---|---|---|---|
| Client Capability Packet | 66 | | x |
| Keyboard Data Packet | 67 | x | x |
| Pointing Device Data Packet | 68 | x | x |
| Client Request and Status Packet | 70 | | x |
| Digital Content Protection Overhead Packet | 80 | x | x |
| Request VCP Feature Packet | 128 | x | |
| VCP Feature Reply Packet | 129 | | x |
| Set VCP Feature Packet | 130 | x | |
| Request Valid Parameter Packet | 131 | x | |
| Valid Parameter Reply Packet | 132 | | x |
| Request Specific Status Packet | 138 | x | |
| Valid Status Reply List Packet | 139 | | x |
| Packet Processing Delay Parameters Packet | 140 | | x |
| Personal Display Capability Packet | 141 | | x |
| Client Error Report Packet | 142 | | x |
| Scaled Video Stream Capability Packet | 143 | | x |

TABLE VI-3-continued

Client Status and Control Packets

| Packet Name | Packet Type | Valid in Forward | Valid in Reverse |
|---|---|---|---|
| Client Identification Packet | 144 | | x |
| Alternate Display Capability Packet | 145 | | x |
| Register Access Packet | 146 | x | x |

TABLE VI-4

Advanced Graphic and Display Packets

| Packet Name | Packet Type | Valid in Forward | Valid in Reverse |
|---|---|---|---|
| Bit Block Transfer Packet | 71 | x | |
| Bitmap Area Fill Packet | 72 | x | |
| Bitmap Pattern Fill Packet | 73 | x | |
| Read Frame Buffer Packet | 74 | x | |
| Alpha-Cursor Image Capability Packet | 133 | | x |
| Alpha-Cursor Transparency Map Packet | 134 | x | |
| Alpha-Cursor Image Offset Packet | 135 | x | |
| Alpha-Cursor Video Stream Packet | 17 | x | |
| Scaled Video Stream Capability Packet | 143 | | x |
| Scaled Video Stream Setup Packet | 136 | x | |
| Scaled Video Stream Acknowledgement Packet | 137 | | x |
| Scaled Video Stream Packet | 18 | x | |

Something that is clear from other discussions within this text is that while the Reverse Encapsulation Packet, Client Capability Packet, and Client Request and Status Packet are each considered very important to, or even required in many embodiments of communication interfaces, for External Mode operation, while they can be or are more likely to be considered optional for Internal Mode operation. This creates yet another type of MDD Interface protocol which allows communication of data at very high speeds with a reduced set of communications packets, and corresponding simplification of control and timing.

Figure 7:
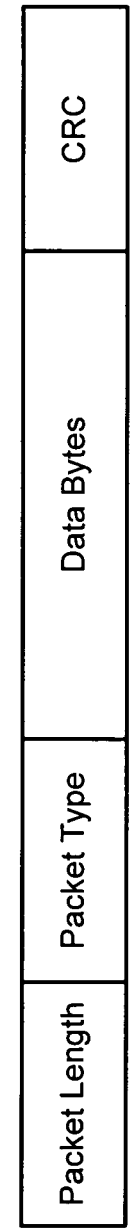
FIG. 7 illustrates the general structure of packets used to implement the interface protocol.

Packets have a common basic structure or overall set of minimum fields comprising a Packet Length field, a Packet Type field, Data Bytes field(s), and a CRC field, which is illustrated in FIG. 7. As shown in FIG. 7, the Packet Length field contains information, in the form of a multi-bit or -byte value, that specifies the total number of bits in the packet, or its length between the packet length field and the CRC field. In one embodiment, the packet length field contains a 16-bit or 2-byte wide, unsigned integer, that specifies the packet length. The Packet Type field is another multi-bit field which designates the type of information that is contained within the packet. In an exemplary embodiment, this is an 16-bit or 2-byte wide value, in the form of an 16-bit unsigned integer, and specifies such data types as display capabilities, handoff, video or audio streams, status, and so forth.

A third field is the Data Bytes field, which contains the bits or data being transferred or sent between the host and client devices as part of that packet. The format of the data is defined specifically for each packet type according to the specific type of data being transferred, and may be separated into a series of additional fields, each with its own format requirements. That is, each packet type will have a defined format for this portion or field. The last field is the CRC field which contains the results of a 16-bit cyclic redundancy check calculated over the Data Bytes, Packet Type, and Packet Length fields, which is used to confirm the integrity of the information in the packet. In other words, calculated over the entire packet except for the CRC field itself. The client generally keeps a total count of the CRC errors detected, and reports this count back to the host in the Client Request and Status Packet (see further below).

Generally, these field widths and organization are designed to keep 2-byte fields aligned on an even byte boundary, and 4-byte fields aligned on 4-byte boundaries. This allows packet structures to be easily built in a main memory space of, or associated with, a host and a client without violating the data-type alignment rules encountered for most or typically used processors or control circuits.

During transfer of the packets, fields are transmitted starting with the Least Significant Bit (LSB) first and ending with the Most Significant Bit (MSB) transmitted last. Parameters that are more than one byte in length are transmitted using the least significant byte first, which results in the same bit transmission pattern being used for a parameter greater than 8 bits in length, as is used for a shorter parameter where the LSB is transmitted first. The data fields of each packet are generally transmitted in the order that they are defined in the subsequent sections below, with the first field listed being transmitted first, and the last field described being transmitted last. The data on the MDDI_Data0 signal path is aligned with bit '0' of bytes transmitted on the interface in any of the modes, Type 1, Type 2, Type 3, or Type-4.

When manipulating data for displays, the data for arrays of pixels are transmitted by rows first, then columns, as is traditionally done in the electronics arts. In other words, all pixels that appear in the same row in a bit map are transmitted in order with the left-most pixel transmitted first and the right-most pixel transmitted last. After the right-most pixel of a row is transmitted then the next pixel in the sequence is the left-most pixel of the following row. Rows of pixels are generally transmitted in order from top to bottom for most displays, although other configurations can be accommodated as needed. Furthermore, in handling bitmaps, the conventional approach, which is followed here, is to define a reference point by labeling the upper-left corner of a bitmap as location or offset "0,0." The X and Y coordinates used to define or determine a position in the bitmap increase in value as one approaches the right and bottom of the bitmap, respectively. The first row and first column (upper left corner of an image) start with an index value of zero. The magnitude of the X coordinate increases toward the right side of the image, and the magnitude of the Y coordinate increases toward the bottom of the image as viewed by the user of the display.

A display window is the visible portion of a bitmap, the portion of the pixels in the bitmap that can be seen by the user on the physical display medium. It is often the case that the display window and the bitmap are the same size. The upper-left corner of a display window always displays bitmap pixel location '0,0'. The width of the display window corresponds to the X axis of the bitmap, and the display window width for this embodiment is less than or equal to the width of the corresponding bitmap. The height of the window corresponds to the Y axis of the bitmap, and the display window height for this embodiment is less than or equal to the height of the corresponding bitmap. The display window itself is not addressable in the protocol because it is only defined as the visible portion of a bitmap.

The relationship between a bitmaps and display windows is well known in the computer, electronic art, Internet communication, and other electronics related arts. Therefore, no further discussion or illustration of these principles is provided here.

C. Packet Definitions

1. Sub-Frame Header Packet

Figure 8:
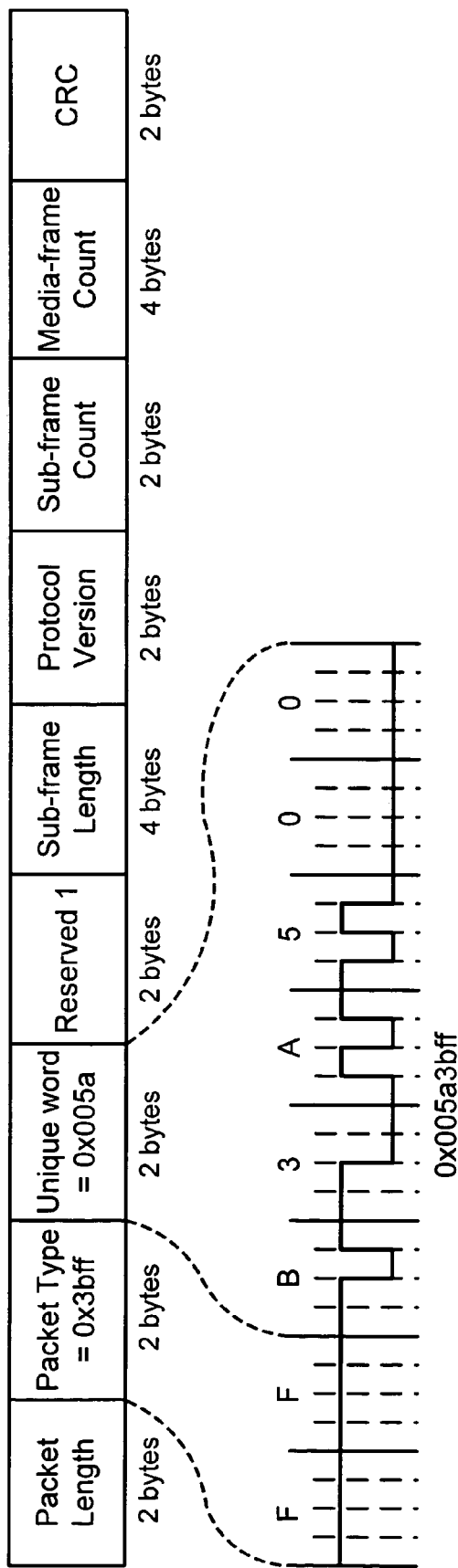
FIG. 8 illustrates the format of a Sub-frame Header Packet.

The Sub-Frame Header packet is the first packet of every sub-frame, and has a basic structure as illustrated in FIG. 8. The Sub-Frame Header Packet is used for host-client synchronization, every host should be able to generate this packet, while every client should be able to receive and interpret this packet. As can be seen in one embodiment in FIG. 8, this type of packet is structured to have Packet Length, Packet Type, Unique Word, Reserved 1, Sub-Frame Length, Protocol Version, Sub-Frame Count, and Media-frame Count fields, generally in that order. In one embodiment, this type of packet is generally identified as a Type 15359 (0x3bff hexadecimal) packet and uses a pre-selected fixed length of 20 bytes, not including the packet length field.

The Packet Type field and the Unique Word field each use a 2 byte value (16-bit unsigned integer). The 4-byte combination of these two fields together forms a 32-bit unique word with good autocorrelation. In one embodiment, the actual unique word is 0x005a3bff, where the lower 16 bits are transmitted first as the Packet Type, and the most significant 16 bits are transmitted afterward.

The Reserved 1 field contains 2 bytes that are reserved space for future use, and is generally configured at this point with all bits set to zero. One purpose of this field is to cause subsequent 2-byte fields to align to a 16-bit word address and cause 4-byte fields to align to a 32-bit word address. The least significant byte is reserved to indicate whether or not a host is capable of addressing multiple client devices. A value of zero for this byte is reserved to indicate that the host is capable of operating only with a single client device.

The Sub-frame Length field contains 4 bytes of information, or values, that specifies the number of bytes per sub-frame. In one embodiment, the length of this field may be set equal to zero to indicate that only one sub-frame will be transmitted by the host before the link is shut down into an idle state. The value in this field can be dynamically changed "on-the-fly" when transitioning from one sub-frame to the next. This capability is useful in order to make minor timing adjustments in the sync pulses for accommodating isochronous data streams. If the CRC of the Sub-frame Header packet is not valid then the link controller should use the Sub-frame Length of the previous known-good Sub-frame Header packet to estimate the length of the current sub-frame.

The Protocol Version field contains 2 bytes that specify the protocol version used by the host. The Protocol Version field may be set to '0' to specify the first or current version of the protocol as being used. This value will change over time as new versions are created, and is already being upgraded to a value of '1' for some version fields. Version values will probably or generally follow a current version number for an approved standards document which covers interfaces such as MDDI, as would be known.

The Sub-frame Count field contains 2 bytes that specify a sequence number that indicates the number of sub-frames that have been transmitted since the beginning of the media-frame. The first sub-frame of the media-frame has a Sub-frame Count of zero. The last sub-frame of the media-frame has a value of n−1, where n is the number of sub-frames per media-frame. The value of the Sub-frame Count field is equal to the Sub-frame Count sent in the previous Sub-Frame packet plus 1, except for a first sub-frame of a media-frame which will have a count of zero. Note that if the Sub-frame Length is set equal to zero (indicating a non-periodic sub-frame) then the Sub-frame count is also set equal to zero.

The Media-frame Count field contains 4 bytes (32-bit unsigned integer) that specify a sequence number that indicates the number of media-frames that have been transmitted since the beginning of the present media item or data being transferred. The first media-frame of a media item has a Media-frame Count of zero. The Media-frame Count increments just prior to the first sub-frame of each media-frame and wraps back to zero after the maximum Media-frame Count (for example, media-frame number $2^{3}-1=4,294,967,295$) is used. The Media-frame Count value may be reset generally at any time by the Host to suit the needs of an end application.

2. Filler Packet

A filler packet is a packet that is transferred to, or from, a client device when no other information is available to be sent on either the forward or reverse link. It is recommended that filler packets have a minimum length in order to allow maximum flexibility in sending other packets when required. At the very end of a sub-frame or a reverse link encapsulation packet (see below), a link controller sets the size of the filler packet to fill the remaining space to maintain packet integrity. The Filler Packet is useful to maintain timing on the link when the host or client have no information to send or exchange. Every host and client needs to be able to send and receive this packet to make effective use of the interface.

Figure 9:
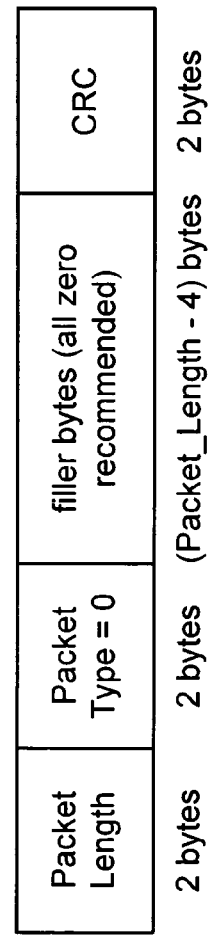
FIG. 9 illustrates the format and contents of a Filler Packet.

An exemplary embodiment of the format and contents of a Filler Packet are shown in FIG. 9. As shown in FIG. 9, this type of packet is structured to have Packet Length, Packet Type, Filler Bytes, and CRC fields. In one embodiment, this type of packet is generally identified as a Type 0, which is indicated in the 2-byte Type field. The bits or bytes in the Filler Bytes field comprise a variable number of all zero bit values to allow the filler packet to be the desired length. The smallest filler packet contains no bytes in this field. That is, the packet consists of only the packet length, packet type, and CRC, and in one embodiment uses a pre-selected fixed length of 6 bytes or a Packet Length value of 4. The CRC value is determined for all bytes in the packet including the Packet Length, which may be excluded in some other packet types.

3. Video Stream Packet

Video Stream Packets carry video data to update typically rectangular regions of a display device. The size of this region may be as small as a single pixel or as large as the entire display. There may be an almost unlimited number of streams displayed simultaneously, limited by system resources, because all context required to display a stream is contained within the Video Stream Packet. The format of one embodiment of a Video Stream Packet (Video Data Format Descriptor) is shown in FIG. 10. As seen in FIG. 10, in one embodiment, this type of packet is structured to have Packet Length (2 bytes), Packet Type, bClient ID, Video Data Descriptor, Pixel Display Attributes, X Left Edge, Y Top Edge, X Right Edge, Y Bottom Edge, X and Y Start, Pixel Count, Parameter CRC, Pixel Data, and Pixel Data CRC fields. This type of packet is generally identified as a Type 16, which is indicated in the 2-byte Type field. In one embodiment, a client indicates an ability to receive a Video Stream Packet using RGB, Monochrome, and Y Cr Cb Capability fields of the Client Capability Packet.

In one embodiment, the bClient ID field contains 2 bytes of information that are reserved for a Client ID. Since this is a newly developed communications protocol actual client IDs are not yet known or sufficiently communicable. Therefore, the bits in this field are generally set equal to zero until such ID values are known, at which time the ID values can be inserted or used, as would be apparent to those skilled in the art. The same process will generally be true for the client ID fields discussed below.

Figure 12:
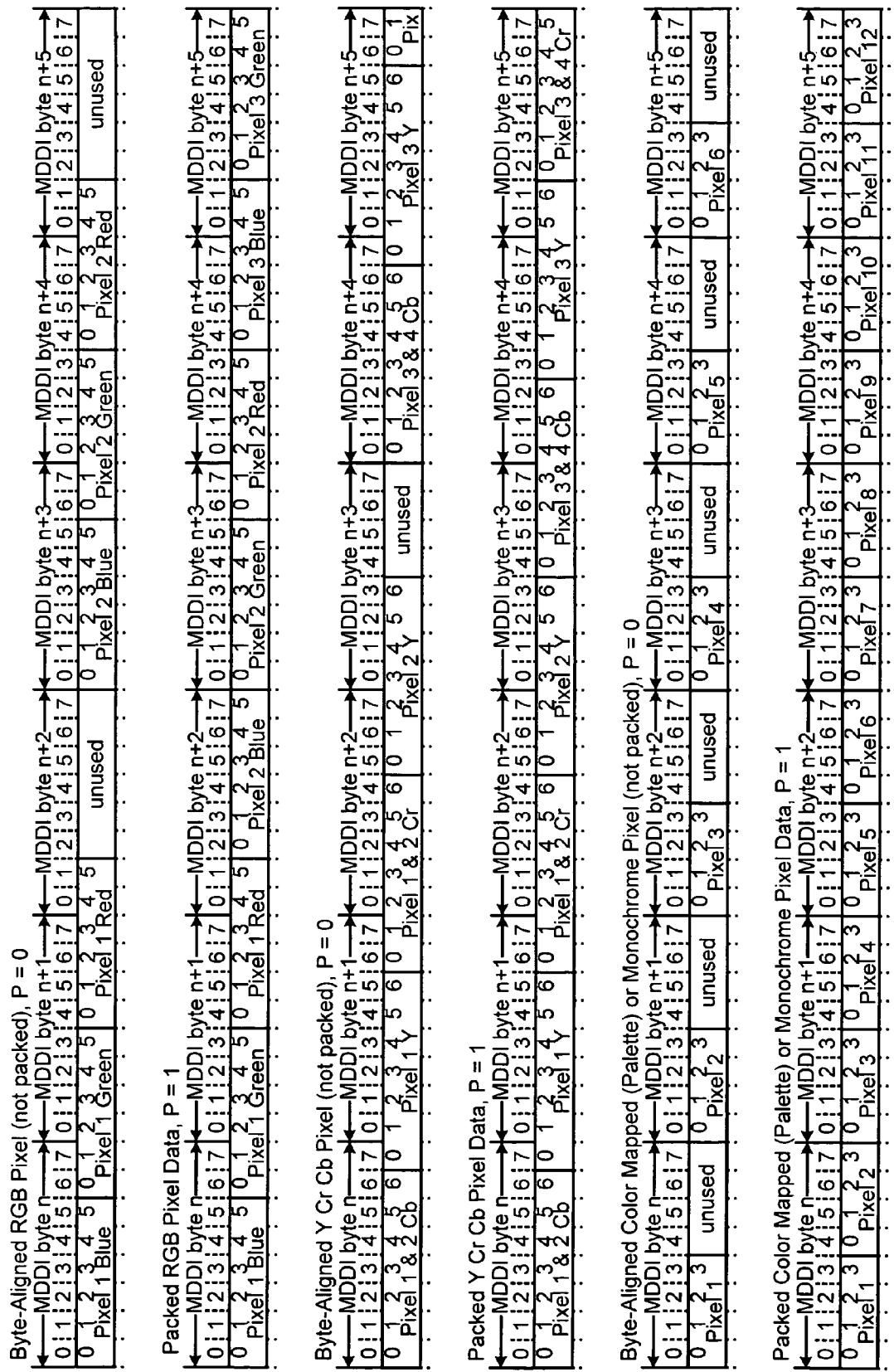
FIG. 12 illustrates the use of packed and unpacked formats for data.

The common frame concept discussed above is an effective way to minimize the audio buffer size and decrease latency. However, for video data it may be necessary to spread the pixels of one video frame across multiple Video Stream Packets within a media-frame. It is also very likely that the pixels in a single Video Stream Packet will not exactly correspond to a perfect rectangular window on the display. For the exemplary video frame rate of 30 frames per second, there are 300 sub-frames per second, which results in 10 sub-frames per media-frame. If there are 480 rows of pixels in each frame, each Video Stream Packet in each sub-frame will contain 48 rows of pixels. In other situations, the Video Stream Packet might not contain an integer number of rows of pixels. This is true for other video frame sizes where the number of sub-frames per media-frame does not divide evenly into the number of rows (also known as video lines) per video frame. For efficient operation, each Video Stream Packet generally must contain an integer number of pixels, even though it might not contain an integer number of rows of pixels. This is important if pixels are more than one byte each, or if they are in a packed format as shown in FIG. 12.

The format and contents employed for realizing the operation of an exemplary Video Data Descriptor field, as mentioned above, are shown in FIGS. 11A-11E. In FIGS. 11A-11E, the Video Data Format Descriptor field contains 2 bytes in the form of a 16-bit unsigned integer that specifies the format of each pixel in the Pixel Data in the present stream in the present packet. It is possible that different Video Stream packets may use different pixel data formats, that is, use a different value in the Video Data Format Descriptor, and similarly, a stream (region of the display) may change its data format on-the-fly. The pixel data format should comply with at least one of the valid formats for the client as defined in the Client Capability Packet. The Video Data Format Descriptor defines the pixel format for the present packet only which does not imply that a constant format will continue to be used for the lifetime of a particular video stream.

FIGS. 11A through 11D illustrate how the Video Data Format Descriptor is coded. As used in these figures, and in this embodiment, when bits [15:13] are equal to '000', as shown in FIG. 11A, then the video data consists of an array of monochrome pixels where the number of bits per pixel is defined by bits 3 through 0 of the Video Data Format Descriptor word. Bits 11 through 4 are generally reserved for future use or applications and are set to zero in this situation. When bits [15:13] are instead equal to the values '001', as shown in FIG. 11B, then the video data consists of an array of color pixels that each specify a color through a color map (palette). In this situation, bits 5 through 0 of the Video Data Format Descriptor word define the number of bits per pixel, and bits 11 through 6 are generally reserved for future use or applications and set equal to zero. When bits [15:13] are instead equal to the values '010', as shown in FIG. 11C, then the video data consists of an array of color pixels where the number of bits per pixel of red is defined by bits 11 through 8, the number of bits per pixel of green is defined by bits 7 through 4, and the number of bits per pixel of blue is defined by bits 3 through 0. In this situation, the total number of bits in each pixel is the sum of the number of bits used for red, green, and blue.

However, when bits [15:13] are instead equal to the values or string '011', as shown in FIG. 11D, then the video data consists of an array of video data in 4:2:2 YCbCr format with luminance and chrominance information, where the number of bits per pixel of luminance (Y) is defined by bits 11 through 8, the number of bits of the Cb component is defined by bits 7 through 4, and the number of bits of the Cr component is defined by bits 3 through 0. The total number of bits in each pixel is the sum of the number of bits used for red, green, and blue. The Cb and Cr components are sent at half the rate as Y. In addition, the video samples in the Pixel Data portion of this packet are organized as follows: Cbn, Yn, Crn, Yn+1, Cbn+2, Yn+2, Crn+2, Yn+3, . . . where Cbn and Cm are associated with Yn and Yn+1, and Cbn+2 and Crn+2 are associated with Yn+2 and Yn+3, and so on.

Yn, Yn+1, Yn+2 and Yn+3 are luminance values of four consecutive pixels in a single row from left to right. If there are an odd number of pixels in a row (X Right Edge–X Left Edge+1) in the window referenced by the Video Stream Packet then the Y value corresponding to the last pixel in each row will be followed by the Cb value of the first pixel of the next row, and a Cr value is not sent for the last pixel in the row. It is recommended that windows using Y Cb Cr format have a width that is an even number of pixels. The Pixel Data in a packet should contain an even number of pixels. It may contain an odd or even number of pixels in the case where the last pixel of the Pixel Data corresponds to the last pixel of a row in the window specified in the Video Stream Packet header, i.e. when the X location of the last pixel in the Pixel Data is equal to X Right Edge.

When bits [15:13] are instead equal to the values '100' then the video data consists of an array of Bayer pixels where the number of bits per pixel is defined by bits 3 through 0 of the Video Data Format Descriptor word. The Pixel Group Pattern is defined by bits 5 and 4 as shown in FIG. 1E. The order of pixel data may be horizontal or vertical, and the pixels in rows or columns may be sent in forward or backward order and is defined by bits 8 through 6. Bits 11 through 9 should be set to zero. The group of four pixels in the pixel group in the Bayer format resembles what is often referred to as a single pixel in some display technologies. However, one pixel in the Bayer format is only one of the four colored pixels of the pixel group mosaic pattern.

For all five formats shown in the figures, Bit 12, which is designated as "P," specifies whether or not the Pixel Data samples are packed, or byte-aligned pixel data. A value of '0' in this field indicates that each pixel in the Pixel Data field is byte-aligned with an MDD interface byte boundary. A value of '1' indicates that each pixel and each color within each pixel in the Pixel Data is packed up against the previous pixel or color within a pixel leaving no unused bits. The difference between Byte-Aligned and Packed Pixel data format is shown in more detail in FIG. 12, where one can clearly see that byte-aligned data may leave unused portions of the data sub-frame, as opposed to packed pixel format which does not.

The first pixel in the first video stream packet of a media frame for a particular display window will go into the upper left corner of the stream window defined by an X Left Edge and a Y Top Edge, and the next pixel received is placed in the next pixel location in the same row, and so on. In this first packet of a media frame, the X start value will usually be equal to X Left Edge, and Y start value will usually be equal to Y Top Edge. In subsequent packets corresponding to the same screen window, the X and Y start values will usually be set to the pixel location in the screen window that would normally follow after the last pixel sent in the Video Stream Packet that was transmitted in the previous sub-frame.

4. Audio Stream Packet

The audio stream packets carry audio data to be played through the audio system of the client, or for a stand alone audio presentation device. Different audio data streams may be allocated for separate audio channels in a sound system, for example: left-front, right-front, center, left-rear, and right-rear, depending on the type of audio system being used. A full complement of audio channels is provided for headsets that contain enhanced spatial-acoustic signal processing. A client indicates an ability to receive an Audio Stream Packet using the Audio Channel Capability and Audio Sample Rate fields of the Client Capability Packet. The format of Audio Stream Packets is illustrated in FIG. 13.

Figure 13:
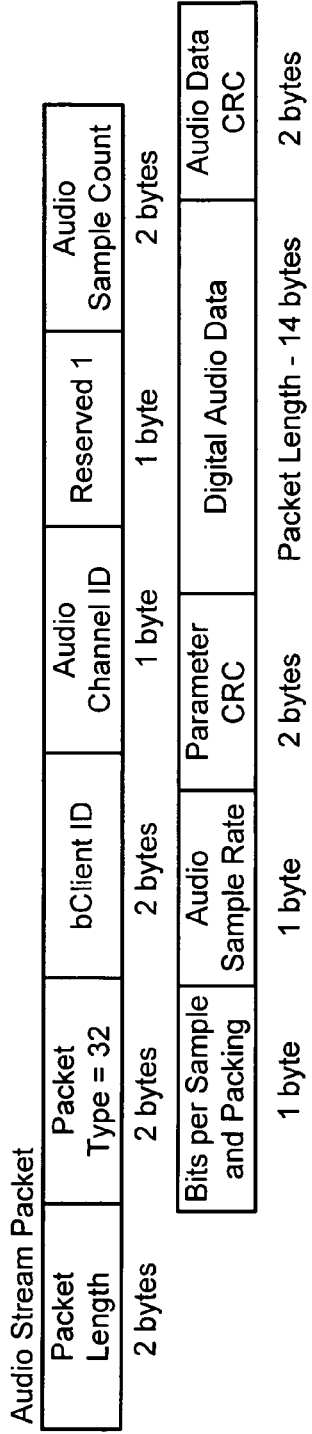
FIG. 13 illustrates the format of an Audio Stream Packet.

As shown in FIG. 13, this type of packet is structured in one embodiment to have Packet Length, Packet Type, bClient ID, Audio Channel ID, Reserved 1, Audio Sample Count, Bits Per Sample and Packing, Audio Sample Rate, Parameter CRC, Digital Audio Data, and Audio Data CRC fields. In one embodiment, this type of packet is generally identified as a Type 32 packet.

The bClient ID field contains 2 bytes of information that are reserved for a Client ID, as used previously. The Reserved 1 field contains 2 bytes that is reserved for future use, and is generally configured at this point with all bits set to zero.

Figure 14:
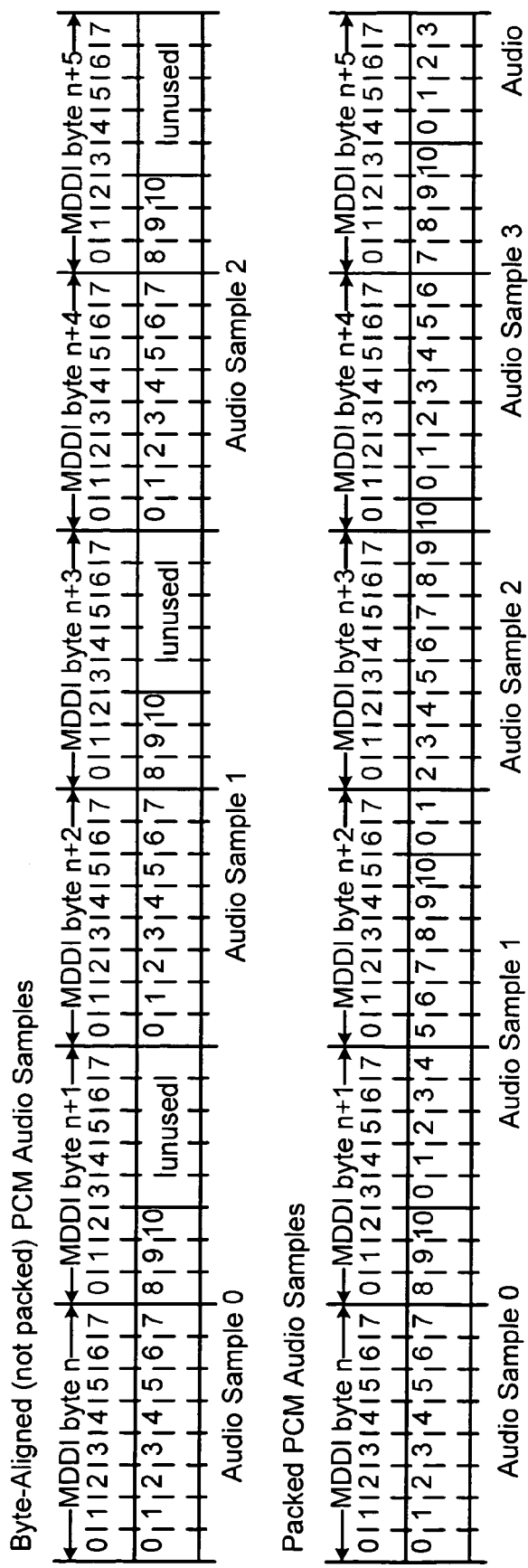
FIG. 14 illustrates the use of byte-aligned and packed PCM formats for data

The Bits Per Sample and Packing field contains 1 byte in the form of an 8-bit unsigned integer that specifies the packing format of audio data. The format generally employed is for Bits 4 through 0 to define the number of bits per PCM audio sample. Bit 5 then specifies whether or not the Digital Audio Data samples are packed. The difference between packed and byte-aligned audio samples, here using 10-bit samples, is illustrated in FIG. 14. A value of '0' indicates that each PCM audio sample in the Digital Audio Data field is byte-aligned with an MDDI interface byte boundary, and a value of '1' indicates that each successive PCM audio sample is packed up against the previous audio sample. This bit is generally effective only when the value defined in bits 4 through 0 (the number of bits per PCM audio sample) is not a multiple of eight. Bits 7 through 6 are reserved for future use and are generally set at a value of zero.

5. Reserved Stream Packets

In one embodiment, packet types 1 to 15, 18 to 31, and 33 through 55 are reserved for stream packets to be defined for use in future versions or variations of the packet protocols, as desired for various applications encountered. Again, this is part of making the MDD interface more flexible and useful in the face of ever changing technology and system designs as compared to other techniques.

6. User-Defined Stream Packets

Figure 15:
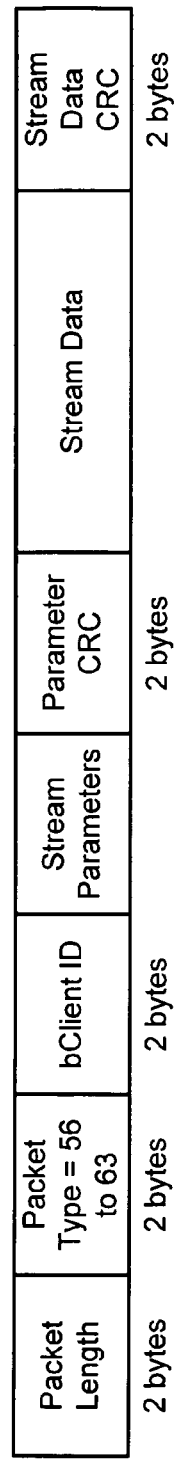
FIG. 15 illustrates the format of a User-Defined Stream Packet.

Eight data stream types, known as Types 56 through 63, are reserved for use in proprietary applications that may be defined by equipment manufacturers for use with a MDDI link. These are known as User-defined Stream Packets. Such packets may be used for any purpose, but the host and client should only employ such packets in situations where the result of such use is very well understood or known. The specific definition of the stream parameters and data for these packet types is left to the specific equipment manufacturers or interface designers implementing such packet types or seeking their use. Some exemplary uses of the User-defined Stream Packets are to convey test parameters and test results, factory calibration data, and proprietary special use data. The format of the user-defined stream packets as used in one embodiment is illustrated in FIG. 15. As shown in FIG. 15, this type of packet is structured to have Packet Length (2 bytes), Packet Type, bClient ID number, Stream Parameters, Parameter CRC, Stream Data, and Stream Data CRC fields.

7. Color Map Packets

Figure 16:
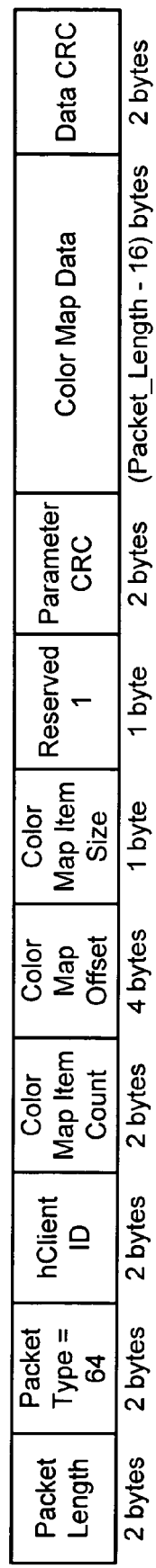
FIG. 16 illustrates the format of a Color Map Packet.

The color map packets specify the contents of a color map look-up table used to present colors for a client. Some applications may require a color map that is larger than the amount of data that can be transmitted in a single packet. In these cases, multiple Color Map packets may be transferred, each with a different subset of the color map by using the offset and length fields described below. The format of the Color Map Packet in one embodiment is illustrated in FIG. 16. As shown in FIG. 16, this type of packet is structured to have Packet Length, Packet Type, hClient ID, Color Map Item Count, Color Map Offset, Parameter CRC, Color Map Data, and Data CRC fields. In one embodiment, this type of packet is generally identified as a Type 64 packet (Video Data Format and Color Map Packet) as specified in the Packet Type Field (2 bytes). A client indicates an ability to receive Color Map Packets using the Color Map Size and Color Map Width fields of the Client Capability Packet.

8. Reverse Link Encapsulation Packets

Figure 17:
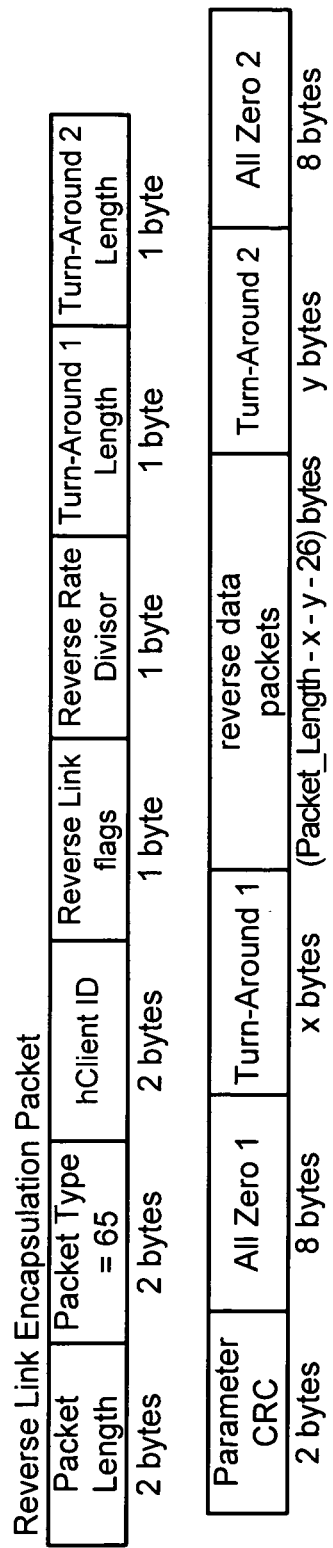
FIG. 17 illustrates the format of a Reverse Link Encapsulation Packet.

In an exemplary embodiment, data is transferred in the reverse direction using a Reverse Link Encapsulation Packet. A forward link packet is sent and the MDDI link operation (transfer direction) is changed or turned around in the middle of this packet so that packets can be sent in the reverse direction. The format of the Reverse Link Encapsulation packet in one embodiment is illustrated in FIG. 17. As shown in FIG. 17, this type of packet is structured to have Packet Length, Packet Type, hCLient ID, Reverse Link Flags, Reverse Rate Divisor, Turn-Around 1 Length, Turn-Around 2 Length, Parameter CRC, All Zero 1, Turn-Around 1, Reverse Data Packets, Turn-Around 2, and All Zero 2 fields. In one embodiment, this type of packet is generally identified as a Type 65 packet. For External Mode every host must be able to generate this packet and receive data, and every client must be able to receive and send data to the host in order to efficiently make use of the desired protocol and resulting speed. Implementation of this packet is optional for Internal Mode, but the Reverse Link Encapsulation Packet is used for the host to receive data from the client.

The MDDI link controller behaves in a special manner while sending a Reverse Link Encapsulation Packet. The MDD interface has a strobe signal that is generally always driven by the host as controller of the link. The host behaves as if it were transmitting a zero for each bit of the Turn-Around and Reverse Data Packets portions of the Reverse Link Encapsulation packet. The host toggles a MDDI_Strobe signal at each bit boundary during the two turn-around times and during the time allocated for reverse data packets. (This is the same behavior as if it were transmitting all-zero data.)

The host disables its MDDI data signal line drivers during the time period specified by Turn-Around 1, and the client re-enables its line drivers during the Driver Re-enable field following the time period specified by Turn-Around 2 field. The client reads the Turn-Around Length parameter and drives the data signals toward the host immediately after the last bit in the Turn-Around 1 field. That is, the client clocks new data into the link on certain rising edges of the MDDI strobe as specified in the packet contents description below, and elsewhere. The client uses the Packet Length and Turn-Around Length parameters to know the length of time it has available to send packets to the host. The client may send filler packets or drive the data lines to a zero state when it has no data to send to the host. If the data lines are driven to zero, the host interprets this as a packet with a zero length (not a valid length) and the host does not accept any more packets from the client for the duration of the current Reverse Link Encapsulation Packet.

The Host drives the MDDI_Data signals to the logic-zero level during the All Zero 1 field, and a client drives the MDDI data lines to a logic-zero level for at least one reverse link clock period before the start of the Turn Around 2 field, that is during the All Zero 2 field period. This keeps the data lines in a deterministic state during the Turn Around 1 and Turn Around 2 fields time period. If the client has no more packets to send, it may even disable the data lines after driving them to a logic-zero level because the hibernation bias resistors (discussed elsewhere) keep the data lines at a logic-zero level for the remainder of the Reverse Data Packets field, or a duration of about 16 forward link bytes or more.

In one embodiment, the Reverse Link Request field of the Client Request and Status Packet may be used to inform the host of the number of bytes the client needs in the Reverse Link Encapsulation Packet to send data back to the host. The host attempts to grant the request by allocating at least that number of bytes in the Reverse Link Encapsulation Packet. The host may send more than one Reverse Link Encapsulation Packet in a sub-frame. The client may send a Client Request and Status Packet at almost any time, and the host will interpret the Reverse Link Request parameter as the total number of bytes requested in one sub-frame.

9. Client Capability Packets

A host needs to know the capability of the client (display) it is communicating with in order to configure the host-to-client link in a generally optimum or desired manner. It is recommended that a display send a Client Capability Packet to the host after forward link synchronization is acquired. The transmission of such a packet is considered required when requested by the host using the Reverse Link Flags in the Reverse Link Encapsulation Packet. The Client Capability Packet is used to inform the host of the capabilities of a client. For External Mode every host should be able to receive this packet, and every client should be able to send this packet to fully utilize this interface and protocol. Implementation of this packet is optional for Internal Mode, since the capabilities of the client, such as a display, keyboard or other input/output device, in this situation should already be well defined and known to the host at the time of manufacture or assembly into a single component or unit of some type.

The format of the Client Capability packet in one embodiment is illustrated in FIG. 18. As shown in FIG. 18, for this embodiment, this type of packet is structured to have Packet Length, Packet Type, reserved cClientID, Protocol Version, Min Protocol Version, Data Rate Capability, Interface Type Capability, Number of Alt Displays, Reserved 1, Bitmap Width, Bitmap Height, Display Window Width, Display Window Height. Color Map Size, Color Map RGB Width, RGB Capability, Monochrome Capability, Reserved 2, Y Cr Cb Capability, Bayer Capability, Alpha-Cursor Image Planes, Client Feature Capability, Max Video Frame Rate, Min Video Frame Rate, Min Sub-frame rate, Audio Buffer Depth, Audio Channel Capability, Audio Sample Rate Capability, Audio Sample Resolution, Mic Audio Sample Resolution, Mic Sample Rate Capability, Keyboard Data Format, Pointing Device Data Format, Content Protection Type, Mfr. Name, Product Code, Reserved 3, Serial Number, Week of Mfr., Year of Mfr., and CRC fields. In an exemplary embodiment, this type of packet is generally identified as a Type 66 packet.

10. Keyboard Data Packets

A keyboard data packet is used to send keyboard data from the client device to the host. A wireless (or wired) keyboard may be used in conjunction with various displays or audio devices, including, but not limited to, a head mounted video display/audio presentation device. The Keyboard Data Packet relays keyboard data received from one of several known keyboard-like devices to the host. This packet can also be used on the forward link to send data to the keyboard. A client indicates an ability to send and receive Keyboard Data Packets using the Keyboard Data Field in the Client Capability Packet.

The format of a Keyboard Data Packet is shown in FIG. 19, and contains a variable number of bytes of information from or for a keyboard. As shown in FIG. 19, this type of packet is structured to have Packet Length, Packet Type, bClient ID, Keyboard Data Format, Keyboard Data, and CRC fields. Here, this type of packet is generally identified as a Type 67 packet.

The bClient ID is a reserved field, as before, and the CRC is performed over all bytes of the packet. The Keyboard Data Format field contains a 2 bytes value that describes the keyboard data format. Bits 6 through 0 should be identical to the Keyboard Data Format field in the Client Capability Packet. This value is not to equal 127. Bits 15 through 7 are reserved for future use and are, therefore, currently set to zero.

11. Pointing Device Data Packets

A pointing device data packet is used as a method, structure, or means to send position information from a wireless mouse or other pointing device from the client to the host. Data can also be sent to the pointing device on the forward link using this packet. An exemplary format of a Pointing Device Data Packet is shown in FIG. 20, and contains a variable number of bytes of information from or for a pointing device. As shown in FIG. 20, this type of packet is structured to have Packet Length, Packet Type, bClient ID, Pointing Device Format, Pointing Device Data, and CRC fields. In an exemplary embodiment, this type of packet is generally identified as a Type 68 packet in the 1-byte type field.

12. Link Shutdown Packets

A Link Shutdown Packet is sent from the host to the client as a method or means to indicate that the MDDI data and strobe will be shut down and go into a low-power consumption "hibernation" state. This packet is useful to shut down the link and conserve power after static bitmaps are sent from a mobile communication device to the display, or when there is no further information to transfer from a host to a client for the time being. Normal operation is resumed when the host sends packets again. The first packet sent after hibernation is a sub-frame header packet. The format of a Client Status Packet for one embodiment is shown in FIG. 21. As shown in FIG. 21, this type of packet is structured to have Packet Length, Packet Type, CRC and All Zeros fields. In one embodiment, this type of packet is generally identified as a Type 69 packet in the 1-byte type field.

The packet length field uses 2 bytes to specify the total number of bytes in the packet not including the packet length field. In one embodiment, the Packet Length of this packet is dependent on the Interface Type or link mode in effect at the time when the Link Shutdown Packet is sent. Therefore, the typical packet length becomes 20 bytes for Type 1 mode (22 bytes total in the packet), 36 bytes for a Type 2 mode (38 bytes total in the packet), 68 bytes for a Type 3 mode link (70 bytes total in the packet), and 132 bytes for a Type 4 mode (with 134 bytes total in the packet).

The All Zeros field uses a variable number of bytes to ensure that MDDI_Data signals are at a logic-zero level for a sufficient time to allow the client to begin recovering clock using only MDDI_Stb prior to disabling a host's line drivers. The length of the All Zeros field is dependent on the Interface Type or link operating mode in effect at the time when the Link Shutdown Packet is sent. The length of the All Zeros field is intended to produce 64 pulses on MDDI_Stb for any Interface Type setting. Therefore, the All Zeros length for each interface type becomes 16 bytes for Type 1, 32 bytes for Type 2, 64 bytes for Type 3, and 128 bytes for Type 4.

The CRC field uses 2 bytes that contain a 16-bit CRC of bytes from the Packet Length to the Packet Type.

In the low-power hibernation state, the MDDI_Data0 driver is disabled into a high-impedance state starting after the 16th to 48th MDDI_Stb cycle after the last bit of the All Zeros field. For Type-2, Type-3, or Type-4 links the MDDI_Data1 through MDDI_DataPwr7 signals are also placed in a high-impedance state at the same time that the MDDI_Data0 driver is disabled Either the host or client may cause the MDDI link to "wake up" from the hibernation state as described elsewhere, which is a key advance for and advantage of the present invention.

As described in the definition of the All Zeros field, MDDI_Stb toggles for 64 cycles following the MSB of the CRC field of the Link Shutdown Packet to facilitate an orderly shutdown in the client controller. One cycle is a low-to-high transition followed by a high-to-low transition, or a high-to-low transition followed by a low-to-high transition. After the All Zeros field is sent, the MDDI_Stb driver in the host is disabled.

13. Client Request and Status Packets

The host needs a small amount of information from the client so it can configure the host-to-client link in a generally optimum manner. It is recommended that the client send one Client Request and Status Packet to the host each sub-frame. The client should send this packet as the first packet in the Reverse Link Encapsulation Packet to ensure that it is delivered reliably to the host. The forwarding of this packet is also accomplished when requested by a host using the Reverse Link Flags in the Reverse Link Encapsulation Packet. The Client Request and Status Packet is used to report errors and status to the host. For external mode operation, every host should be able to receive this packet, and every client should be able to send this packet in order to properly or optimally employ the MDD Interface protocol. While it is also recommended that for internal operations, that is internal hosts and internal clients, there should be support for this packet, it is not required.

The format of a Client Request and Status Packet is shown in FIG. 22. As shown in FIG. 22, this type of packet is structured to have Packet Length, Packet Type, cClient ID, Reverse Link Request, Capability Change, Client Busy, CRC Error Count, and CRC fields. This type of packet is generally identified as a Type 70 packet in the 1-byte type field, and typically uses a pre-selected fixed length of 12 bytes.

The Reverse Link Request field may be used to inform the host of the number of bytes the client needs in the Reverse Link Encapsulation Packet to send data back to the host. The host should attempt to grant the request by allocating at least that number of bytes in the Reverse Link Encapsulation Packet. The host may send more than one Reverse Link Encapsulation Packet in a sub-frame in order to accommodate data. The client may send a Client Request and Status Packet at any time and the host will interpret the Reverse Link Request parameter as the total number of bytes requested in one sub-frame. Additional details and specific examples of how reverse link data is sent back to the host are shown below.

14. Bit Block Transfer Packets

The Bit Block Transfer Packet provides a means, structure, or method to scroll regions of the display in any direction. Displays that have this capability will report the capability in bit 0 of the Display Feature Capability Indicators field of the Client Capability Packet. The format for one embodiment of a Bit Block Transfer Packet is shown in FIG. 23. As shown in FIG. 23, this type of packet is structured to have Packet Length, Packet Type, hClient ID, Upper Left X Value, Upper Left Y Value, Window Width, Window Height, Window X Movement, Window Y Movement, and CRC fields. This type of packet is generally identified as a Type 71 packet, and in one embodiment uses a pre-selected fixed length of 15 bytes.

The fields are used to specify the X and Y values of the coordinate of the upper left corner of the window to be moved, the width and height of the window to be moved, and the number of pixels that the window is to be moved horizontally, and vertically, respectively. Positive values for the latter two fields cause the window to be moved to the right, and down, and negative values cause movement to the left and up, respectively.

15. Bitmap Area Fill Packets

Figure 24:
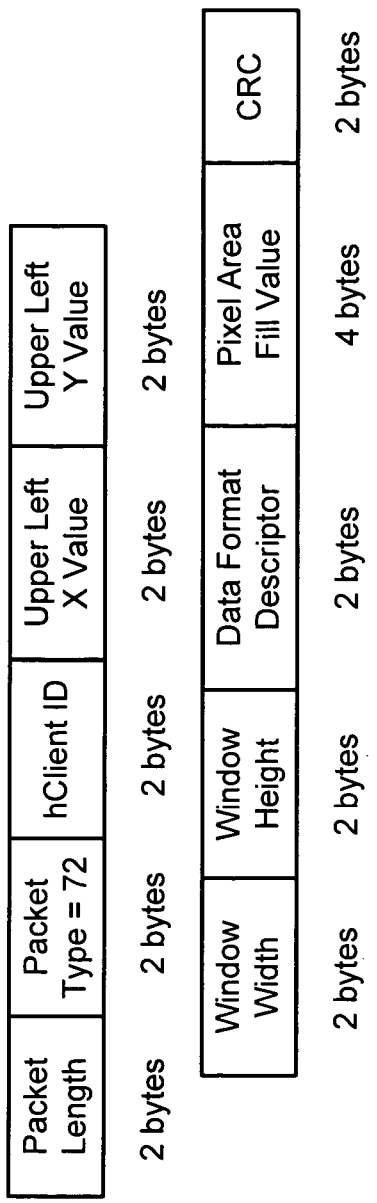
FIG. 24 illustrates the format of a Bitmap Area Fill Packet.

The Bitmap Area Fill Packet provides a means, structure, or method to easily initialize a region of the display to a single color. Displays that have this capability will report the capability in bit 1 of the Client Feature Capability Indicators field of the Client Capability Packet. One embodiment for the format of a Bitmap Area Fill Packet is shown in FIG. 24. As shown in FIG. 24, in this case this type of packet is structured to have Packet Length, Packet Type, hClient ID, Upper Left X Value, Upper Left Y Value, Window Width, Window Height, Data Format Descriptor, Pixel Area Fill Value, and CRC fields. This type of packet is generally identified as a Type 72 packet in the 1-byte type field, and uses a pre-selected fixed length of 17 bytes.

16. Bitmap Pattern Fill Packets

The Bitmap Pattern Fill Packet provides a means or structure to easily initialize a region of the display to a pre-selected pattern. Displays that have this capability will report the capability in bit 2 of the Client Feature Capability field of the Client Capability Packet. The upper left corner of the fill pattern is aligned with the upper left corner of the window to be filled, unless the horizontal or vertical pattern offset is non-zero. If the window to be filled is wider or taller than the fill pattern, then the pattern may repeated horizontally or vertically a number of times to fill the window. The right or bottom of the last repeated pattern is truncated as necessary. If the window is smaller than the fill pattern, then the right side or bottom of the fill pattern may be truncated to fit the window.

If a horizontal pattern offset is non-zero, then the pixels between the left side of the window and the left side plus the horizontal pattern offset are filled with the right-most pixels of the pattern. The horizontal pattern offset is to be less than the pattern width. Similarly, if a vertical pattern offset is non-zero, then the pixels between the top side of the window and the top of the side plus vertical pattern offset are filled with the lower-most pixels of the pattern. The vertical pattern offset is to be less than the pattern height.

Figure 25:
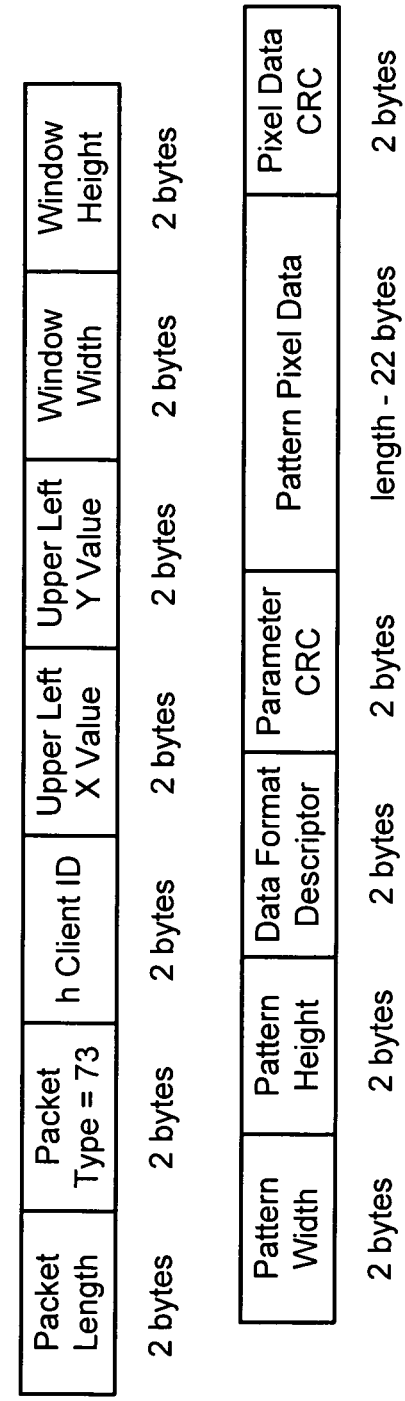
FIG. 25 illustrates the format of a Bitmap Pattern Fill Packet.

One embodiment for the format of a Bitmap Pattern Fill Packet is shown in FIG. 25. As shown in FIG. 25, this type of packet is structured to have Packet Length, Packet Type, hClient ID, Upper Left X Value, Upper Left Y Value, Window Width, Window Height, Pattern Width, Pattern Height, Horizontal Pattern Offset, Vertical Pattern Offset, Data Format Descriptor, Parameter CRC, Pattern Pixel Data, and Pixel Data CRC fields. In some embodiments, this type of packet is generally identified as a Type 73 packet in the 1-byte type field.

17. Communication Link Data Channel Packets

The Communication Link Data Channel Packet provides a structure, means, or method for a client with high-level computing capability, such as a PDA, to communicate with a wireless transceiver such as a cell phone or wireless data port device. In this situation, the MDDI link is acting as a convenient high-speed interface between the communication device and the computing device with the mobile display, where this packet transports data at a Data Link Layer of an operating system for the device. For example, this packet could be used if a web browser, email client, or an entire PDA were built into a mobile display. Displays that have this capability will report the capability in bit 3 of the Client Feature Capability field of the Client Capability Packet.

The format of an embodiment for a Communication Link Data Channel Packet is shown in FIG. 26. As shown in FIG. 26, this type of packet is structured to have Packet Length, Packet Type, hClient ID, Parameter CRC, Communication Link Data, and Communication Data CRC fields. In one embodiment, this type of packet is generally identified as a Type 74 packet in the type field.

18. Interface Type Handoff Request Packets

The Interface Type Handoff Request Packet provides a means, method or structure that enables the host to request that the client or display shift from an existing or current mode to the Type 1 (serial), Type 2 (2-bit parallel), Type 3 (4-bit parallel), or Type 4 (8-bit parallel) modes. Before the host requests a particular mode it should confirm that the client is capable of operating in the desired mode by examining bits 6 and 7 of the Display Feature Capability Indicators field of the Client Capability Packet. One embodiment for the format of a Interface Type Handoff Request Packet is shown in FIG. 27. As shown in FIG. 27, this type of packet is structured to have Packet Length, Packet Type, Interface Type, Reserved 1, and CRC fields. This type of packet is generally identified as a Type 75 packet, and uses a pre-selected fixed length of 4 bytes.

19. Interface Type Acknowledge Packets

The Interface Type Acknowledge Packet is sent by a client and provides a means, method or structure that enables a client to confirm receipt of the Interface Type Handoff Packet. The requested mode, Type 1 (serial), Type 2 (2-bit parallel), Type 3 (4-bit parallel), or Type 4 (8-bit parallel) mode, is echoed back to the host as a parameter in this packet. The format of one embodiment for a Interface Type Acknowledge Packet is shown in FIG. 28. As shown in FIG. 28, this type of packet is structured to have Packet Length, Packet Type, cClient ID, Interface Type, Reserved 1, and CRC fields. This type of packet is generally identified as a Type 76 packet, and uses a pre-selected fixed length of 4 bytes.

20. Perform Type Handoff Packets

The Perform Type Handoff Packet is a means, structure, or method for the host to command the client to handoff to the mode specified in this packet. This is to be the same mode that was previously requested and acknowledged by the Interface Type Handoff Request Packet and Interface Type Acknowledge Packet. The host and client should switch to the agreed upon mode after this packet is sent. The client may lose and re-gain link synchronization during the mode change. The format of one embodiment for a Perform Type Handoff Packet is shown in FIG. 29. As shown in FIG. 29, this type of packet is structured to have Packet Length, Packet Type, Packet Type, Reserve 1, and CRC fields. This type of packet is generally identified as a Type 77 packet in the 1-byte type field, and uses a pre-selected fixed length of 4 bytes.

21. Forward Audio Channel Enable Packets

This packet provides a structure, method, or means that allows a host to enable or disable audio channels in a client. This capability is useful so that a client (a display for example) can power off audio amplifiers or similar circuit elements to save power when there is no audio to be output by the host. This is significantly more difficult to implement implicitly simply using the presence or absence of audio streams as an indicator. The default state when the client system is powered-up is that all audio channels are enabled. The format of one embodiment of a Forward Audio Channel Enable Packet is shown in FIG. 30. As shown in FIG. 30, this type of packet is structured to have Packet Length, Packet Type, hClient ID, Audio Channel Enable Mask, and CRC fields. This type of packet is generally identified as a Type 78 packet in the 1-byte type field, and uses a pre-selected fixed length of 4 bytes.

22. Reverse Audio Sample Rate Packets

This packet allows the host to enable or disable the reverse-link audio channel, and to set the audio data sample rate of this stream. The host selects a sample rate that is defined to be valid in the Client Capability Packet. If the host selects an invalid sample rate then the client will not send an audio stream to the host, and an appropriate error, error value, or error signal, may be sent to the host in the Client Error Report Packet. The host may disable the reverse-link audio stream by setting the sample rate to a value of 255. The default state assumed when the client system is initially powered-up or connected is with the reverse-link audio stream disabled. The format of one embodiment for a Reverse Audio Sample Rate Packet is shown in FIG. 31. As shown in FIG. 31, this type of packet is structured to have Packet Length, Packet Type, hClient ID, Audio Sample Rate, Reserved 1, and CRC fields. This type of packet is generally identified as a Type 79 packet, and uses a pre-selected fixed length of 4 bytes.

23. Digital Content Protection Overhead Packets

This packet provides a structure, method, or means that allows a host and a client to exchange messages related to the digital content protection method being used. Presently two types of content protection are contemplated, Digital Transmission Content Protection (DTCP), or High-bandwidth Digital Content Protection System (HDCP), with room reserved for future alternative protection scheme designations. The method being used is specified by a Content Protection Type parameter in this packet. The format of an embodiment of a Digital Content Protection Overhead Packet is shown in FIG. 32. As shown in FIG. 32, this type of packet is structured to have Packet Length, Packet Type, bClient ID, Content Protection Type, Content Protection Overhead Messages, and CRC fields. This type of packet is generally identified as a Type 80 packet.

24. Transparent Color Enable Packets

The Transparent Color Enable Packet is a structure, method, or means that used to specify which color is transparent in a display and to enable or disable the use of a transparent color for displaying images. Displays that have this capability will report that capability in bit 4 of the Client Feature Capability field of the Client Capability Packet. When a pixel with the value for transparent color is written to the bitmap, the color does not change from the previous value. The format of a Transparent Color Enable Packet is shown in FIG. 33. As shown in FIG. 33, in one embodiment this type of packet is structured to have Packet Length, Packet Type, hClient ID, Transparent Color Enable, Reserved 1, Alpha-Cursor Identifier, Data Format Descriptor, Transparent Pixel Value, and CRC fields. This type of packet is generally identified as a Type 81 packet in the 1-byte type field, and uses a pre-selected fixed length of 10 bytes.

25. Round Trip Delay Measurement Packets

The Round Trip Delay Measurement Packet provides a structure, method, or means that is used to measure the propagation delay from the host to a client (display) plus the delay from the client (display) back to the host. This measurement inherently includes the delays that exist in the line drivers and receivers, and an interconnect sub-system. This measurement is used to set the turn around delay and reverse link rate divisor parameters in the Reverse Link Encapsulation Packet, described generally above. This packet is most useful when the MDDI link is running at the maximum speed intended for a particular application. The packet may be sent in Type 1 mode and at a lower data rate in order to increase the range of the round trip delay measurement. The MDDI_Stb signal behaves as though all zero data is being sent during the following fields: both Guard Times, All Zero, and the Measurement Period. This causes MDDI_Stb to toggle at half the data rate so it can be used as periodic clock in the client during the Measurement Period.

In one embodiment, a client generally indicates an ability to support the Round Trip Delay Measurement Packet through use of bit 18 of the Client Feature Capability Indicators field of the Client Capability Packet. It is recommended that all clients support round trip delay measurement, but it is possible for the host to know the worst-case round trip delay based on a maximum cable delay, and on maximum driver and receiver delays. The host may also know the round-trip delay in advance for an MDDI link used in internal mode, since this is an aspect of known design elements (conductor lengths, circuitry type, and features, and so forth) of the device in which the interface is being used.

The format of a Round Trip Delay Measurement Packet is shown in FIG. 34. As shown in FIG. 34, in one embodiment this type of packet is structured to have Packet Length, Packet Type, hClient ID, Parameter CRC, Guard Time 1, Measurement Period, All Zero, and Guard Time 2 fields. This type of packet is generally identified as a Type 82 packet, and uses a pre-selected fixed length of 159 bits.

Figure 35:
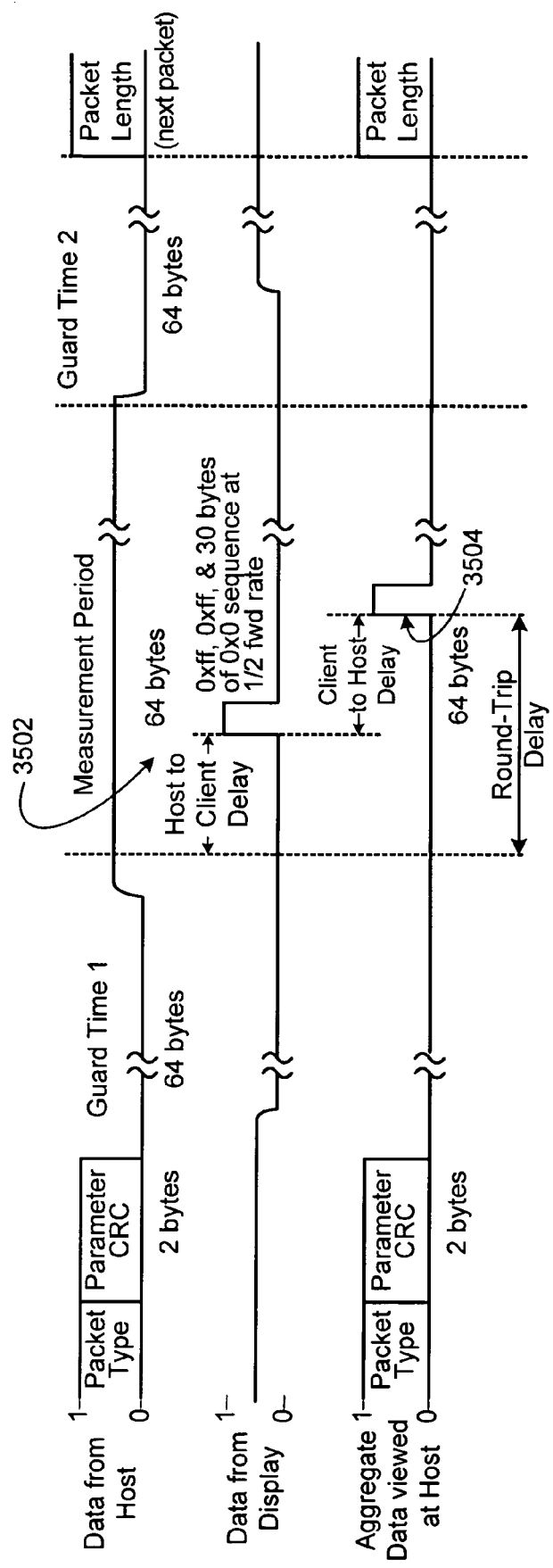
FIG. 35 illustrates the timing of events during the Round Trip Delay Measurement Packet.

The timing of events that take place during the Round Trip Delay Measurement Packet are illustrated in FIG. 35. In FIG. 35, the host transmits the Round Trip Delay Measurement Packet, shown by the presence of the Parameter CRC and Strobe Alignment fields followed by the All Zero and Guard Time 1 fields. A delay 3502 occurs before the packet reaches the client display device or processing circuitry. As the client receives the packet, it transmits the 0xff, 0xff, and 30 bytes of 0x0 pattern as precisely as practical at the beginning of the Measurement Period as determined by the client. The actual time the client begins to transmit this sequence is delayed from the beginning of the Measurement Period from the point of view of the host. The amount of this delay is substantially the time it takes for the packet to propagate through the line drivers and receivers and the interconnect subsystem (cables, conductors). A similar amount of delay 3504 is incurred for the pattern to propagate from the client back to the host.

In order to accurately determine the round trip delay time for signals traversing to and from the client, the host counts the number of forward link bit time periods occurring after the start of the Measurement Period until the beginning of the 0xff, 0xff, and 30 bytes of 0x0 sequence is detected upon arrival. This information is used to determine the amount of time for a round trip signal to pass from the host to the client and back again. Then, about one half of this amount is attributed to a delay created for the one way passage of a signal to the client.

The host and client both drive the line to a logic-zero level during both guard times to keep the MDDI_DATA lines in a defined state. The enable and disable times of the host and client during both guard times are such that the MDDI_Data signals are at a valid low level for any valid round-trip delay time.

26. Forward Link Skew Calibration Packet

The Forward Link Skew Calibration Packet allows a client or display to calibrate itself for differences in the propagation delay of the MDDI_Data signals with respect to the MDDI_Stb signal. Without delay skew compensation, the maximum data rate is generally limited to account for potential worst-case variation in these delays. Generally, this packet is only sent when the forward link data rate is configured to a rate of around 50 Mbps or lower. After sending this packet to calibrate the display, the data rate may be stepped up above 50 Mbps. If the data rate is set too high during the skew calibration process, the display might synchronize to an alias of the bit period which could cause the delay skew compensation setting to be off by more than one bit time, resulting in erroneous data clocking. The highest data rate type of interface or greatest possible Interface Type is selected prior to sending the Forward Link Skew Calibration Packet so that all existing data bits are calibrated.

One embodiment of the format of a Forward Link Skew Calibration Packet is shown in FIG. 56. As shown in FIG. 56, this type of packet is structured to have Packet Length (2 bytes), Packet Type, hClient ID, Parameter CRC, All Zero, Calibration Data Sequence, and CRC fields. This type of packet is generally identified as a Type 83 packet in the type field, and in one embodiment has a pre-selected length of 515.

Virtual Control Panel

The use of a Virtual Control Panel (VCP) allows a host to set certain user controls in a client. By allowing these parameters to be adjusted by the host, the user interface in the client can be simplified because screens that allow a user to adjust parameters such as audio volume or display brightness can be generated by host software rather than by one or more microprocessors in the client. The host has the ability to read the parameter settings in the client and to determine the range of valid values for each control. The client generally has the capability to report back to the host which control parameters can be adjusted.

The control codes (VCP Codes) and associated data values generally specified, are utilized to specify controls and settings in the client. The VCP Codes in the MDDI specification are expanded to 16 bits to preserve proper data field alignment in the packet definitions, and in the future to support supplementary values that are unique to this interface or future enhancements.

27. Request VCP Feature Packet

The Request VCP Feature Packet provides a means, mechanism, or method for the host to request the current setting of a specific control parameter or all valid control parameters. Generally, a client responds to a VCP Packet with the appropriate information in a VCP Feature Reply Packet. In one embodiment, the client indicates an ability to support the Request VCP Feature Packet using bit 13 of the Client Feature Capability Indicators field of the Client Capability Packet.

The format of the Request VCP Feature Packet in one embodiment is shown in FIG. 69. As seen in FIG. 69, this type of packet is structured to have Packet Length, Packet Type, hClient ID, MCCS VCP code, and CRC fields. This type of packet is generally identified in one embodiment as a Type 128, which is indicated in the 2 byte type field. The packet length, which specifies the total number of bytes in the packet not including the packet length field, is typically fixed for this type of packet at a length of 8 bytes.

The hClient ID field is reserved for use as a Client ID in future implementations and is typically set to zero. The MCCS VCP Code field comprises 2 bytes of information that specifies the MCCS VCP Control Code Parameter. A value in the range of 0 to 255 causes a VCP Feature Reply Packet to be returned with a single item in the VCP Feature Reply List corresponding to the specified MCCS code. An MCCS VCP Code of 65535 (0xffff) requests a VCP Feature Reply Packet with a VCP Feature Reply List containing a Feature Reply List Item for each control supported by the client. The values of 256 through 65534, for this field are reserved for future use and presently not in use.

28. VCP Feature Reply Packet

The VCP Feature Reply Packet provides a means, mechanism, or method for a client to respond to a host request with the current setting of a specific control parameter or all valid control parameters. Generally, a client sends the VCP Feature Reply Packet in response to a Request VCP Feature Packet. This packet is useful to determine the current setting of a specific parameter, to determine the valid range for a specific control, to determine if a specific control is supported by the client, or to determine the set of controls that are supported by the client. If a Request VCP Feature is sent that references a specific control that is not implemented in the client then a VCP Feature Reply Packet is returned with a single VCP Feature Reply List item corresponding to the unimplemented control that contains the appropriate error code. In one embodiment, the client indicates an ability to support the VCP Feature Reply Packet using bit 13 of the Client Feature Capability field of the Client Capability Packet.

The format of the VCP Feature Reply Packet in one embodiment is shown in FIG. 70. As seen in FIG. 70, this type of packet is structured to have Packet Length, Packet Type, cClient ID, MCCS Version, Reply Sequence Number, VCP Feature Reply List, and CRC fields. This type of packet is generally identified in one embodiment as a Type 129, as indicated in the 2 byte type field.

The cClient ID field contains information reserved for a Client ID. This field is reserved for future use and is generally set to zero. MCCS Version field contains 2 bytes of information that specifies the Version of the VESA MCCS Specification implemented by the client.

The 2 byte Reply Sequence Number field contains information or data that specifies the sequence number of the VCP Feature Reply Packets returned by the client. The client returns one or more VCP Feature Reply Packets in response to a Request VCP Feature Packet with an MCCS Control Code value of 65535. The client may spread the feature reply list over multiple VCP Feature Reply Packets. In this case, the client assigns a sequence number to each successive packet, and the sequence numbers of the VCP Feature Reply Packets sent in response to a single Request VCP Feature Packet starts at zero and increments by one. The last VCP Feature List Item in the last VCP Feature Reply Packet should contain an MCCS VCP Control Code value equal to 0xffff to identify that the packet is the last one and contains the highest sequence number of the group of packets returned. If only one VCP Feature Reply Packet is sent in response to a Request VCP Feature Packet then the Reply Sequence Number in that single packet is zero and the VCP Feature Reply List contains a record having an MCCS VCP Control Code equal to 0xffff.

The Number of Features in List field contains 2 bytes that specify the number of VCP Feature List Items that are in the VCP Feature Reply List in this packet, while the VCP Feature Reply List field is a group of bytes that contain one or more VCP Feature Reply List Items. The format of a single VCP Feature Reply List Item in one embodiment is shown in FIG. 71.

As shown in FIG. 71, each VCP Feature Reply List Item is 12 bytes in length, and comprises the MCCS VCP Code, Result Code, Maximum Value, and Present Value fields. The 2-byte MCCS VCP Code field contains data or information that specifies the MCCS VCP Control Code Parameter associated with this list item. Only the Control Code values defined in the VESA MCCS Specification version 2 and later are considered as valid for this embodiment. The 2-byte Result Code field contains information that specifies an error code related to the request for information regarding the specified MCCS VCP Control. A value of '0' in this field means there is no error, while a value of '1' means the specified control is not implemented in the client. Further values for this field of 2 through 65535 are currently reserved for future use and implementation of other application contemplated by the art, but are not to be used for now.

The 4-byte Maximum Value field contains a 32-bit unsigned integer that specifies the largest possible value to which the specified MCCS Control can be set. If the requested control is not implemented in the client this value is set to zero. If the value returned is less than 32 bits (4 bytes) in length, then the value is cast into a 32-bit integer leaving the most significant (unused) bytes set to zero. The 4-byte Present Value field contains information that specifies the present value of the specified MCCS VCP Continuous (C) or non-continuous (NC) control. If the requested control is not implemented in the client or if the control is implemented but is a table (T) data type, then this value is set to zero. If the value returned is less than 32 bits (4 bytes) in length per the VESA MCCS specification then the value is cast into a 32-bit integer leaving the most significant (unused) bytes set to zero.

29. Set VCP Feature Packet

The Set VCP Feature Packet provides a means, mechanism, or method for a host to set VCP control values for both continuous and non-continuous controls in a client. In one embodiment, the client indicates the ability to support the Set VCP Feature Packet using bit 13 of the Client Feature Capability field of the Client Capability Packet.

The format of the Set VCP Feature Packet in one embodiment is shown in FIG. 72. As seen in FIG. 72, this type of packet is structured to have Packet Length, Packet Type, hClient ID, MCCS VCP Code, Number of Values in List, Control Value List, and CRC fields. This type of packet is generally identified as a Type 130, as indicated in the 2 byte type field, is 20 bytes long exclusive of the Packet Length field.

The hClient ID field again uses a 2-byte value to specify or act as a Client ID. This field is reserved for future use and is currently set to zero. The MCCS VCP Code field uses 2 bytes of information or values to specify the MCCS VCP Control Code Parameter to be adjusted. The 2-byte Number of Values in List Field contains information or values that specify the number of 16-bit values that exist in the Control Value List. The Control Value List will usually contain one item unless the MCCS Control Code relates to a table in the client. In the case of non-table-related controls, The Control Value List will contain a value that specifies the new value to be written to the control parameter specified by the MCCS VCP Code field. For table-related controls the format of the data in the Control Value List is specified by the parameter description of the specified MCCS VCP Code. If the list contains values that are larger than one byte, then the least-significant byte is transmitted first, consistent with the method defined elsewhere. Finally, the 2-byte CRC field contains a 16-bit CRC of all bytes in the packet including the Packet Length.

30. Request Valid Parameter Packet

The Request Valid Parameter Packet is used as a means or structure useful to request that a client return a Valid Parameter Reply Packet containing a list of parameters supported by the specified non-continuous (NC) or table (T) control. This packet should only specify non-continuous controls or controls that relate to a table in the client, and not specify a MCCS VCP Code value of 65535 (0xffff) to specify all controls. If a non-supported or invalid MCCS VCP Code is specified then an appropriate error value is returned in the Valid Parameter Reply Packet. In one embodiment, the client indicates an ability to support the Request Valid Parameter Packet using bit 13 of the Client Feature Capability field of the Display Capability Packet.

The format of the Request Valid Parameter Packet in one embodiment is shown in FIG. 73. As seen in FIG. 73, this type of packet is structured to have Packet Length, Packet Type, hClient ID, MCCS VCP Code, and CRC fields. This type of packet is generally identified in one embodiment as a Type 131, as indicated in the 2 byte type field.

The packet length, as indicated in the 2-bytes Packet Length Field is generally set to have a total number of bytes in the packet, not including the packet length field of 8. The hClient ID again specifies the Client ID, but is currently reserved for future use, as would be apparent to one skilled in the art, and is set to zero. The 2-byte MCCS VCP Code Filed contains a value that specifies the non-continuous MCCS VCP Control Code Parameter to be queried. The value in this field should correspond to a non-continuous control that is implemented in the client. The values 256 through 65535 (0xffff) are typically reserved or considered as invalid, and are considered as an unimplemented control in the error response.

31. Valid Parameter Reply Packet

A Valid Parameter Reply Packet is sent in response to a Request Valid Parameter Packet. It is used as a means, method, or structure to identify the valid settings for a non-continuous MCCS VCP control or a control that returns the contents of a table. If the control relates to a table in the client, then the VCP Parameter Reply List simply contains the specific list of sequential table values that were requested. If the contents of the table cannot fit into a single Valid Parameter Reply Packet then multiple packets with sequential Reply Sequence Numbers can be sent by the client. In one embodiment, a client indicates an ability to support a Valid Parameter Reply Packet using bit 13 of the Client Feature Capability field of the Client Capability Packet.

A host may request the contents of a table in the following manner: the host sends a Set VCP Feature Packet containing the necessary or desired parameters such as read/write parameter, LUT offset, and RGB selection; then a Request Valid Parameter Packet that specifies the desired control is sent by the host; then the client returns one or more Valid Parameter Reply Packets containing the table data. This sequence of operations performs a similar function as the table reading functions described in the MCCS operation model.

If a specific client parameter is not supported by the client then in one embodiment the corresponding field of this packet will contain a value of 255. For parameters that are used in the client, the corresponding field should contain a value of the parameter in the client.

The format of the Valid Parameter Reply Packet for one embodiment is shown in FIG. 74. As seen in FIG. 74, this type of packet is structured to have Packet Length, Packet Type, cClient ID, MCCS VCP Code, Response Code, Reply Sequence Number, Number Values in List, VCP Parameter Reply List, and CRC fields. This type of packet is generally identified for one embodiment as a Type 132, as indicated in the 2 byte type field.

The cClient ID field is reserved for the future Client ID, as is known from the above discussions, while the 3-byte MCCS VCP Code Packet contains a value that specifies a non-continuous MCCS VCP Control Code Parameter that is described by this packet. If an invalid MCCS VCP Control Code is specified by a Request Valid Parameter Packet, then the same invalid parameter value will be specified in this field with the appropriate value in the Response Code field. If the MCCS Control Code is invalid then the VCP Parameter Reply List will have zero length.

The Response Code field contains 2 bytes of information or values that specify the nature of the response related to the request for information regarding the specified MCCS VCP Control. If the value in this field is equal to 0, then no error is considered as being present for this data type, and the last Valid Parameter Reply Packet in the sequence is sent, it having the highest Reply Sequence Number. If the value in this field is equal to 1, then no error is considered as being present, but other Valid Parameter Reply Packets will be sent that have higher sequence numbers. If the value in this field is equal to 2, then the specified control is not considered as being implemented in the client. If the value in this field id equal to 3, then the specified control is not a non-continuous control (it is a continuous control that always has a valid set of all values from zero to its maximum value). Values for this field equal to 4 through 65535 are reserved for future use and generally not to be used.

The 2-byte Reply Sequence Number field specifies the sequence number of the Valid Parameter Reply Packets returned by the client. The client returns one or more Valid Parameter Reply Packets in response to a Request Valid Parameter Packet. The client may spread the VCP Parameter Reply List over multiple Valid Parameter Reply Packets. In this latter case, the client will assign a sequence number to each successive packet, and set the Response Code to 1 in all but the last packet in the sequence. The last Valid Parameter Reply Packet in the sequence will have the highest Reply Sequence Number and the Response Code contains a value of 0.

The 2-byte Number of Values in List field specifies the number of 16-bit values that exist in the VCP Parameter Reply List. If the Response Code is not equal to zero then the Number of Values in List parameter is zero. The VCP Parameter Reply List field contains a list of 0 to 32760 2-byte values that indicate the set of valid values for the non-continuous control specified by the MCCS Control Code field. The definitions of the non-continuous control codes are specified in the VESA MCCS Specification. Finally, in this embodiment, the CRC field contains a 16-bit CRC of all bytes in the packet including the Packet Length.

Alpha-Cursor Images

The MDD interface and associated inventive protocol and mechanisms for communicating data over a communications link provides support for multiple image planes that overlap each other and can have varying degrees of transparency. A hardware cursor can be implemented using an overlapping image that has a variable X-Y offset. An overview of the Alpha-Cursor functionality and associated protocol support is provided below. The ability to support Alpha-Cursor image packets is defined in the Alpha-Cursor Image Capability Packet, which is sent in response to a Request Specific Status Packet.

32. Alpha-Cursor Image Capability Packet

The Alpha-Cursor Image Capability Packet is used to define the characteristics of the alpha-cursor image and associated transparency maps in a client. In one embodiment, a client indicates an ability to support an Alpha-Cursor Image Capability Packet using a parameter value of 133 in the Valid Parameter Reply List of the Valid Status Reply List Packet. The packet length specified in the packet length field is set to a fixed value of 20 for one embodiment, not including the packet length field.

The format of the Alpha-Cursor Image Capability Packet for one embodiment is shown in FIG. 75. As seen in FIG. 75, this type of packet is structured to have Packet Length, Packet Type, cClient ID, Alpha-Cursor Identifier, Alpha-Cursor Bitmap Width, Alpha-Cursor Bitmap Height, RGB Capability, Monochrome Capability, Reserved 1, Y Cr Cb Capability, Transparency Map Res., Capability Bits, and CRC fields. The cClient ID field is typically reserved for future Client ID use and currently set to zero.

The Alpha Cursor Identifier field (2 bytes) contains a value that identifies a specific alpha-cursor plane. If the client supports n alpha-cursor image planes then the Alpha-Cursor Identifier has a valid range of 0 to n−1. In one embodiment, the value n is specified by the Alpha-Cursor Image Planes field of the Client Capability Packet. The client returns a unique Alpha-Cursor Image Capability Packet for each alpha-cursor image plane.

The 2-byte Alpha-Cursor Bitmap Width field value specifies the width of the alpha-cursor bitmap image expressed as a number of pixels, while the 2-byte Alpha-Cursor Bitmap Height field value specifies the height of the alpha-cursor bitmap image expressed as a number of pixels.

The RGB Capability field uses 2 bytes to specify the number of bits of resolution that can be displayed in RGB format. If the client cannot use the RGB format then this value is zero. The RGB Capability word is composed of three separate values, which in one embodiment are implemented such that: Bits 3 through 0 define the maximum number of bits of blue (the blue intensity) in each pixel; Bits 7 through 4 define the maximum number of bits of green (the green intensity) in each pixel; Bits 11 through 8 define the maximum number of bits of red (the red intensity) in each pixel; and Bits 15 through 12 are reserved for future use in presenting RGB capability information so they are generally set to zero for now.

The 1-byte Monochrome Capability field is used to specify the number of bits of resolution that can be displayed in monochrome format. If a client cannot use the monochrome format then this value is set at zero. Bits 7 through 4 are reserved for future use and are, therefore, generally set to zero. Bits 3 through 0 define the maximum number of bits of grayscale that can exist in each pixel. These four bits make it possible to specify that each pixel consists of 1 to 15 bits. If the value is zero then the monochrome format is not supported by the client.

The 1-byte Reserved 1 field contains a value generally reserved for future use, and, as such, all bits in this field are set to zero. This will cause subsequent 2-byte fields to align to a 16-bit word address and cause 4-byte fields to align to a 32-bit word address.

The 2-byte Y Cb Cr Capability field contains values or information that specifies the number of bits of resolution that can be displayed in Y Cb Cr format. If the client cannot use the Y Cr Cb format then this value is zero. Generally, in one embodiment, the Y Cb Cr Capability word is composed of three separate values with: Bits 3 through 0 defining a maximum number of bits that specify the Cr sample; Bits 7 through 4 defining the maximum number of bits that specify the Cb sample; Bits 11 through 8 defining the maximum number of bits that specify the Y sample; and with Bits 15 through 12 being reserved for future use in presenting Y Cb Cr Capability information or values, but currently being set to zero.

The 1-byte Transparency Map Resolution field contains values or information that specifies the number of bits (depth) in each pixel location of the alpha-cursor image transparency map. This value may range from 1 to 8. If the value is zero then the transparency map is not supported for this alpha-cursor image buffer (the buffer specified by the Alpha-Cursor Identifier Field).

The 1-byte Capability Bits field provides values or information that contains a set of flags that specify capabilities associated with the alpha-cursor image buffer. In one embodiment, the flags are defined such that: Bit 0 acts to select Pixel data in the alpha-Cursor Video Stream Packet to be in a packed format. Bit 1 acts to show that transparency map data in the Alpha-Cursor Transparency Packet is in a packet format. An example of byte-aligned and packed transparency map data is shown in FIG. 76. Bit 2 acts to show that the alpha-cursor image plane supports image offset capability using the Alpha-Cursor Image Offset Packet. Bit 3 acts to show that the alpha-cursor image plane can support a color map data format. The same color map table is used for the alpha-cursor image planes as is used for the main image buffer and scaled video streams. The color map is configured using the Color Map Packet described elsewhere.

Bits 7 through 4 are reserved for future use and are generally, therefore, set to a zero value or logic level.

33. Alpha-Cursor Transparency Map Packet

The Alpha-Cursor Transparency Map Packet defines the contents of the image transparency map for the specified alpha-cursor image plane. Some applications may require a transparency map that is larger than the amount of data that can be transmitted in a single packet. In these cases, multiple Alpha-Cursor Transparency Map Packets may be sent, each with a different subset of the transparency map by using the Transparency Map X and Y Start fields described below. These fields operate in a similar manner as the X Start and Y Start fields of the Video Stream Packet. A client indicates an ability to support the Alpha-Cursor Transparency Map Packet in one embodiment using the Transparency Map Resolution field of the Alpha-Cursor Image Capability Packet for each specific Alpha-Cursor Plane specified by the Alpha-Cursor Identifier field of the Alpha-Cursor Image Capability Packet. The packet length and Client ID fields operate as before for other packets discussed above. In one embodiment, a value of 134 in the Packet Type field is used to identify a packet as a Alpha-Cursor Transparency Map Packet.

The format of the Alpha-Cursor Transparency Map Packet for one embodiment is shown in FIG. 76. As seen in FIG. 76, this type of packet is structured to have Packet Length, Packet Type, hClient ID, Alpha-Cursor Identifier, Transparency Map X Start, Transparency Map Y Start, Transparency Map Resolution, Reserved 1, Parameter CRC, Transparency Map Media, and Transparency Map Data CRC fields.

The 2-byte Alpha Cursor Identifier field has a value that identifies a specific alpha-cursor plane. If the client supports n alpha-cursor image planes then the Alpha-Cursor Identifier has a valid range of 0 to n−1.

The 2-byte Transparency Map X and Y Start fields each specify the absolute X and Y coordinates, where the point (Transparency Map X Start, Transparency Map Y Start) is the first pixel in the Transparency Map Data field below.

The transparency Map Resolution field (1 byte) contains a value that specifies the resolution of the transparency map and whether or not the data is packed. In one embodiment of this field, Bits 3 through 0 define the number of bits of resolution that exist in all transparency map table items. Valid values specify the width to be from 1 to 8 bits. Values 0 and 9 through 15 are considered invalid. This value should match the value returned by a client in the Transparency Map Resolution field in the Alpha-Cursor Image Capability Packet. Bits 6 through 4 are reserved for future use and are, therefore, is generally set to logic-zero at this time. Bit 7 of this byte specifies whether or not the Transparency Map Data is in packed or byte-aligned form. If bit 7 is equal to '1' then the Transparency Map Data is in packed form, and if '0' the data is byte-aligned.

An example of packed and byte-aligned Transparency Map data is shown elsewhere. The value of this bit must match the value of bit 1 of the Capability Bits field of the Alpha-Cursor Image Capability Packet.

The 1 byte Reserved 1 field is reserved for future use, therefore, all bits in this field are generally set equal to a logic-zero level. One purpose of this field is to cause all subsequent 2 byte fields to align to a 16-bit word address and cause 4-byte fields to align to a 32-bit word address. The Parameter CRC field contains a 16-bit CRC of all bytes from the Packet Length to the Reserved 1 field. If this CRC fails to check then the entire packet is to be discarded.

For the Transparency Map Data field, each transparency map location is 1 to 8 bits in width. If a single transparency map cannot fit into one Alpha and Cursor Transparency Map Packet, then the entire transparency map may be specified by sending multiple packets with different Transparency Map Data and Transparency Map X and Y Start values in each packet.

The 2-byte Transparency Map Data CRC field contains a 16-bit CRC of only the Transparency Map Data. If this CRC fails to check then the Transparency Map Data can still be used but the CRC error count is incremented.

34. Alpha-Cursor Image Offset Packet

The Alpha-Cursor Image Offset Packet specifies the X and Y offset of the cursor from the upper left corner of the main display image. The format of the Alpha-Cursor Image Offset Packet is illustrated in FIG. 77. As shown in FIG. 77, in one embodiment, the Alpha-Cursor Image Offset Packet is structured with Packet Length, Packet Type, hClient ID, Alpha-Cursor X Offset, Alpha-Cursor Y Offset, and CRC fields. In one embodiment, a client indicates the ability to support the Alpha-Cursor Image Offset Packet using bit 2 of the Capability Bits field of the Alpha-Cursor Image Capability Packet for each specific Alpha-Cursor Plane specified by the Alpha-Cursor Identifier field of the Alpha-Cursor Image Capability Packet. In one embodiment, the packet length is fixed at 10, as shown in the 2-byte Packet Length field. In one embodiment, a Packet Type of 135 identifies the packet as an Alpha-Cursor Image Offset Packet.

The 2-byte Alpha-Cursor X and Y Offset fields contain values that specify the horizontal and vertical, respectively, offset of the left-most column and top row, respectively of pixels of the cursor image from the left side and top of the main image. The hClient ID—2 bytes that contain a 16-bit unsigned integer reserved for the Client ID. This field is reserved for future use and is generally set to logic-zero levels or values for the bits.

35. Alpha-Cursor Video Stream Packet

The Alpha-Cursor Video Stream Packet carries video data to update a rectangular region of an alpha-cursor image plane. The size of this region may be as small as a single pixel or as large as the entire display. The format of the Alpha-Cursor Video Stream Packet is illustrated in FIG. 78, As shown in FIG. 78, in one embodiment the Alpha-Cursor Video Stream Packet is structured with Packet Length, Packet Type, bClient ID, Video Data Format Attributes, X Left Edge, Y Top Edge, X Right Edge, Y Bottom Edge, X Start, Y Start, Pixel Count, Parameter Crc Pixel Data, and Pixel Data CRC fields. In one embodiment, a client indicates an ability to support the Alpha-Cursor Video Stream Packet and its associated parameters by using the Alpha-Cursor Image Capability Packet for each specific Alpha-Cursor Plane specified by the Alpha-Cursor Identifier field of the Alpha-Cursor Image Capability Packet, and a value of 17 in the packet type field indicates or identifies a packet as being an Alpha-Cursor Video Stream Packet. The hClient ID field (2 bytes) is reserved for future use as a Client ID, and is generally set to zero in the meantime, as would be well understood in the art.

The 2-byte Video Data Format Descriptor field contains information or a value that specifies the format of each pixel in the Pixel Data in the present stream in the present packet. The pixel data format must comply with at least one of the valid formats for the alpha-cursor image plane as defined in the Alpha-Cursor Image Capability Packet. The Video Data Format Descriptor field contains a value that defines the pixel format for the current packet only and does not imply that a constant format will continue to be used for the lifetime of a particular video stream. FIG. 11, above illustrates how the Video Data Format Descriptor is coded. The format is as follows:

In one embodiment, when bits [15:13] are '000' then the video data consists of an array of monochrome pixels where the number of bits per pixel is defined by bits 3 through 0 of the Video Data Format Descriptor word. Bits 11 through 4 are then set to zero. When bits [15:13] are '001' then the video data consists of an array of color pixels that each specify a color through a color map (palette). Bits 5 through 0 of the Video Data Format Descriptor word define the number of bits per pixel, and Bits 11 through 6 are set to zero. When bits [15:13] are '010' then the video data consists of an array of color pixels in raw RGB format where the number of bits per pixel of red is defined by bits 11 through 8, the number of bits per pixel of green is defined by bits 7 through 4, and the number of bits per pixel of blue is defined by bits 3 through 0. The total number of bits in each pixel is the sum of the number of bits used for red, green, and blue.

When bits [15:13] are '011' then the video data consists of an array of video data in 4:2:2 Y Cb Cr format with luminance and chrominance information. The number of bits per pixel of luminance (Y) is defined by bits 11 through 8, the number of bits of the Cb component is defined by bits 7 through 4, and the number of bits of the Cr component is defined by bits 3 through 0. The Cb and Cr components are sent at half the rate as Y. The video samples in the Pixel Data portion of this packet will be organized as follows: Cbn, Yn, Crn, Yn+1, Cbn+2, Yn+2, Crn+2, Yn+3, . . . where Cbn and Cm are associated with Yn and Yn+1, and Cbn+2 and Crn+2 are associated with Yn+2 and Yn+3, and so on. Yn, Yn+1, Yn+2 and Yn+3 are luminance values of four consecutive pixels in a single row from left to right. The ordering of the color components is the same as the Microsoft UYVY FOURCC format. If there are an odd number of pixels in a row (X Right Edge–X Left Edge+1) in the window referenced by the Video Stream Packet then the Cb value corresponding to the last pixel in each row will be followed by the Y value of the first pixel of the next row.

It is recommended that windows using Y Cb Cr format have a width that is an even number of pixels. The Pixel Data in a packet contains an even number of pixels. It may contain an odd or even number of pixels in the case where the last pixel of the Pixel Data corresponds to the last pixel of a row in the window specified in the Video Stream Packet header, i.e. when the X location of the last pixel in the Pixel Data is equal to X Right Edge.

For all five formats, bit 12 (designated as "P" in the figures) specifies whether or not the Pixel Data samples are packed. When the value of bit 12 is '0' then each pixel and each color within each pixel in the Pixel Data field is byte-aligned with an MDDI interface byte boundary. When the value of bit 12 is '1' then each pixel and each color within each pixel in the Pixel Data is packed up against the previous pixel or color within a pixel leaving no unused bits.

In one embodiment, the Pixel Data Attributes field (2 byte) has a series of bit values that are interpreted as follows. Bits 1 and 0 select how the display pixel data is routed. For bit values of '11' data is displayed to or for both eyes, for bit values '10', data is routed only to the left eye, and for bit values '01', data is routed only to the right eye.

Bit 2 of the Pixel Data Attributes field indicates whether or not the Pixel Data is presented in an interlace format, with a value of '0' meaning the pixel data is in the standard progressive format, and that the row number (pixel Y coordinate) is incremented by 1 when advancing from one row to the next. When this bit has a value of '1', the pixel data is in interlace format, and the row number is incremented by 2 when advancing from one row to the next. Bit 3 indicates that the Pixel Data is in alternate pixel format. This is similar to the standard interlace mode enabled by bit 2, but the interlacing is vertical instead of horizontal. When Bit 3 is '0' the Pixel Data is in the standard progressive format, and the column number (pixel X coordinate) is incremented by 1 as each successive pixel is received. When Bit 3 is '1' the Pixel Data is in alternate pixel format, and the column number is incremented by 2 as each pixel is received.

Bit 4 of the Pixel Data Attributes field indicates whether or not the Pixel data is related to a display or a camera, as where data is being transferred to or from an internal display for a wireless phone or similar device or even a portable computer, or such other devices as discussed above, or the data is being transferred to or from a camera built into or directly coupled to the device. When Bit 4 is '0' the Pixel data is being transferred to or from a display frame buffer. When Bit 4 is '1' Pixel data is being transferred to or from a camera or video device of some type, such devices being well known in the art.

Bit 5 of the Pixel Data Attributes field is reserved for future use or applications of the MDD interface and is, therefore, generally set as zero value or '0'.

Bits 7 and 6 of the Pixel Data Attributes field are Display Update Bits that specify a frame buffer where the pixel data is to be written. The more specific effects are discussed elsewhere. For bit values of '01' Pixel data is written to the offline image buffer. For bit values of '00' Pixel data is written to the image buffer used to refresh the display. For bit values of '11' Pixel data is written to all image buffers. The bit values or combination of '10' is treated as an invalid value or designation and Pixel data is ignored and not written to any of the image buffers. This value may have use for future applications of the interface. Bits 8 through 15 of the Pixel Data Attributes field are reserved for future use and are, therefore, generally set as zero.

In one embodiment, the 2-byte X Start and Y Start fields specify the absolute X and Y coordinates of the point (X Start, Y Start) for the first pixel in the Pixel Data field. The 2-byte X Left Edge and Y Top Edge fields specify the X coordinate of the left edge and Y coordinate of the top edge of the alpha-cursor image window filled by the Pixel Data field, while the X Right Edge and Y Bottom Edge fields specify the X coordinate of the right edge, and the Y coordinate of the bottom edge of the alpha-cursor image window being updated.

The Pixel Count field (2 bytes) specifies the number of pixels in the Pixel Data field below. The 2-byte Parameter CRC field contains a CRC of all bytes from the Packet Length to the Pixel Count. If this CRC fails to check then the entire packet is discarded.

The Pixel Data field contains the raw video information that is to be displayed, and which is formatted in the manner described by the Video Data Format Descriptor field. The data is transmitted one "row" at a time as discussed elsewhere. The Pixel Data CRC field (2 bytes) contains a 16-bit CRC of only the Pixel Data. If a CRC verification of this value fails then the Pixel Data can still be used, but the CRC error count is incremented.

Scaled Video Stream Images

The MDD Interface or protocol mechanism, structure, means, or method provides support for scaled video stream images that allow the host to send an image to the client that is scaled larger or smaller than the original image, and the scaled image is copied to a main image buffer. An overview of the Scaled Video Stream functionality and associated protocol support is provided elsewhere. An ability to support scaled video streams is defined by or within the Scaled Video Stream Capability Packet, which is sent in response to a Request Specific Status Packet.

36. Scaled Video Stream Capability Packet

The Scaled Video Stream Capability Packet defines the characteristics of the scaled video stream source image in or used by a client. The format of the Scaled Video Stream Capability Packet is shown generally in FIG. 79. As seen in FIG. 79, in one embodiment, a Scaled Video Stream Capability Packet is structured to have Packet Length, Packet Type, cClient ID, Max Number of Streams, Source Max X Size, Source Max Y size, RGB Capability, Monochrome Capability, Reserved 1, Y Cr Cb Capability, Reserved 2, and CRC fields. The packet length, in one embodiment, is selected to be a fixed 20 bytes, as shown in the length field, including the 2-byte cClient ID field, which is reserved for use for a Client ID, otherwise set to zero, and the CRC field. In one embodiment, the client indicates an ability to support the Scaled Video Stream Capability Packet using a parameter value of 143 in the Valid Parameter Reply List of the Valid Status Reply List Packet.

The 2-byte Maximum Number of Streams field contains a value to identify the maximum number of simultaneous scaled video streams that may be allocated at one time. In one embodiment, a client should deny a request to allocate a scaled video stream if the maximum number of scaled video streams is already allocated. If less than the maximum number of scaled video streams are allocated the client may also deny an allocation request based on other resource limitations in the client.

The Source Maximum X Size and Y size fields (2 bytes) specify values for the maximum width and height, respectively, of the scaled video stream source image expressed as a number of pixels.

The RGB Capability field uses values to specify the number of bits of resolution that can be displayed in RGB format. If the scaled video stream cannot use the RGB format then this value is set equal to zero. The RGB Capability word is composed of three separate unsigned values with: Bits 3 through 0 defining a maximum number of bits of blue (the blue intensity) in each pixel, Bits 7 through 4 defining the maximum number of bits of green (the green intensity) in each pixel, and Bits 11 through 8 defining the maximum number of bits of red (the red intensity) in each pixel, while Bits 15 through 12 are reserved for future use in future capability definitions, and are generally set to zero.

The 1-byte Monochrome Capability field contains a value that specifies the number of bits of resolution that can be displayed in monochrome format. If the scaled video stream cannot use the monochrome format then this value is set to zero. Bits 7 through 4 are reserved for future use and should, therefore, be set to zero ('0') for current applications, although this may change over time, as will be appreciated by those skilled in the art. Bits 3 through 0 define the maximum number of bits of grayscale that can exist in each pixel. These four bits make it possible to specify that each pixel consists of 1 to 15 bits. If the value is zero, then the monochrome format is not supported by the scaled video stream.

The Reserved 1 field (here 1 byte) is reserved for future use in providing values related to the Scaled Video Stream Packet information or data. Therefore, currently, all bits in this field are set to a logic '0'. One purpose of this field is to cause all subsequent 2-byte fields to align to a 16-bit word address and cause 4-byte fields to align to a 32-bit word address.

The 2-byte Y Cb Cr Capability field contains values that specify the number of bits of resolution that can be displayed in Y Cb Cr format. If the scaled video stream cannot use the Y Cb Cr format then this value is zero. The Y Cb Cr Capability word is composed of three separate unsigned values with: Bits 3 through 0 defining the maximum number of bits that specify the Cr sample; Bits 7 through 4 defining the maximum number of bits that specify the Cb sample; Bits 11 through 8 defining the maximum number of bits specify the Y sample; and with Bits 15 through 12 being reserved for future use and is generally set to zero.

The 1-byte Capability Bits field contains a set of flags that specify capabilities associated with the scaled video stream. The flags are defined as follows: Bit 0 covers Pixel data in the Scaled Video Stream Packet can be in a packed format. An example of packed and byte-aligned pixel data is shown earlier in FIG. 12. Bit 1 is reserved for future use and is generally set to zero; Bit 2 is also reserved for future use and is set to zero; Bit 3 covers scaled video streams that can be specified in the color map data format. The same color map table is used for the scaled video streams as is used for the main image buffer and the alpha-cursor image planes. The color map is configured using the Color Map Packet described elsewhere; and Bits 7 through 4 are reserved for future use and are generally set to be zero.

The Reserved 2 field (here 1 byte) is reserved for future use in providing values related to the Scaled Video Stream Packet information or data. Therefore, currently, all bits in this field are set to a logic '0'. One purpose of this field is to cause all subsequent 2-byte fields to align to a 16-bit word address and cause 4-byte fields to align to a 32-bit word address.

37. Scaled Video Stream Setup Packet

The Scaled Video Stream Setup Packet is used to define the parameters of the scaled video stream and the client uses the information to allocate internal storage for buffering and scaling of the image. A stream may be de-allocated by sending this packet with the X Image Size and Y Image Size fields equal to zero. Scaled video streams that have been de-allocated may be reallocated later with the same or different stream parameters. In one embodiment a client indicates an ability to support the Scaled Video Stream Setup Packet using a parameter value of 143 in the Valid Parameter Reply List of the Valid Status Reply List Packet, and by using a non-zero value in the Maximum Number of Streams field of the Scaled Video Stream Capability Packet.

The format of the Scaled Video Stream Setup Packet is shown generally in FIG. 80. As seen in FIG. 80, in one embodiment, a Scaled Video Stream Setup Packet is structured to have Packet Length Packet Type, hClient, Stream ID, Visual Data Format Descriptor, Pixel Data Attributes, X Left Edge, Y Top Edge, X Right Edge, Y Bottom Edge, X Image Size, Y Image Size, and CRC fields.

The 2-byte Packet Length field specifies the total number of bytes in the packet not including the packet length field. In one embodiment, this packet length is fixed at 24. The 2-byte Packet Type field employs a value of 136 to identify the packet as a Scaled Video Stream Setup Packet. The 2-byte hClient ID field is reserved for future use as a Client ID, and is generally set to an all bits at logic-zero value for the moment, or until a protocol user determines what ID values are to be used, as would be known.

The Stream ID field uses 2 bytes to specify a unique identifier for the Stream ID. This value is assigned by the host and ranges in value from zero to the maximum Stream ID value specified in the Client Capability Packet. The host must manage the use of Stream ID values carefully to ensure that each active stream is assigned a unique value, and that streams that are no longer active are de-allocated or reassigned.

In one embodiment, the Video Data Format Descriptor field uses 2 bytes to specify the format of each pixel in the Pixel Data in the present stream in the present packet. The pixel data format should comply with at least one of the valid formats for the alpha-cursor image plane as defined in the Alpha-Cursor Image Capability Packet. The Video Data Format Descriptor defines the pixel format for the current packet only and does not imply that a constant format will continue to be used for the lifetime of a particular video stream. FIG. 11 illustrates an embodiment of how the Video Data Format Descriptor is coded, and as discussed above for other packets.

The 2-byte Pixel Data Attributes filed has values that are interpreted as follows:

Bits 1 and 0 select the display where the pixel data is to be routed.

Bits [1:0]=11 or 00—data is displayed to both eyes

Bits [1:0]=10—data is routed to the left eye only.

Bits [1:0]=01—data is routed to the right eye only.

Bit 2 indicates whether or not the Pixel Data is in interlace format. When Bit 2 is 0, then the Pixel Data is in the standard progressive format. The row number (pixel Y coordinate) is incremented by 1 when advancing from one row to the next. When Bit 2 is 1, then the Pixel Data is in interlace format. The row number (pixel Y coordinate) is incremented by 2 when advancing from one row to the next.

Bit 3 indicates whether or not the Pixel Data is in alternate pixel format. This is similar to the standard interlace mode enabled by bit 2, but the interlacing is vertical instead of horizontal. When Bit 3 is 0, the Pixel Data is in the standard progressive format. The column number (pixel X coordinate) is incremented by 1 as each successive pixel is received. When Bit 3 is 1, then the Pixel Data is in alternate pixel format. The column number (pixel X coordinate) is incremented by 2 as each pixel is received.

Bit 4 indicates whether the Pixel data is related to the display or the camera. When Bit 4 is 0, the Pixel Data is to or from the display frame buffer. When Bit 4 is 1, the Pixel Data is to or from the camera. Bit 5 is reserved for future use and is, therefore, generally set to be zero.

Bits 7 and 6 are the Display Update Bits that specify the frame buffer where the pixel data is to be written. The effects of the Frame Update Bits are described in more detail elsewhere. When Bits [7:6] are '01', the Pixel data is written to the offline image buffer. When Bits [7:6] are '00', the Pixel data is written to the image buffer used to refresh the display. When Bits [7:6] are '11', the Pixel data is written to all image buffers. If Bits [7:6] are '10', this is treated as an invalid value. These bits are currently reserved for future use. In this situation, Pixel data would be ignored and not written to any of the image buffers.

Bits 8 through 15 are reserved for future use and are generally set to logic-zero level or values.

38. Sealed Video Stream Acknowledgement Packet

The Scaled Video Stream Acknowledgement Packet allows a client to acknowledge the receipt of a Scaled Video Stream Setup Packet. The client can indicate an ability to support the Scaled Video Stream Acknowledgement Packet via a parameter value of 143 in the Valid Parameter Reply List of the Valid Status Reply List Packet and via a non-zero value in the Maximum Number of Streams field of the Scaled Video Stream Capability Packet.

The format of the Scaled Video Stream Acknowledgement Packet is shown generally in FIG. 81. As seen in FIG. 81, in one embodiment, a Scaled Video Stream Acknowledgement Packet is structured to have Packet Length, Packet Type, cClient, Stream ID, ACK Code, and CRC fields. The 2-byte Packet Length field is used to specify the total number of bytes, excluding the packet length field, with a value of 10 for this packet type, while a Packet Type of 137 identifies a packet as a Scaled Video Stream Acknowledgement Packet.

The 2-byte cClient ID field is reserved for future use for the Client ID, and is generally set to zero. The 2-byte Stream ID field specifies a unique identifier for the Stream ID. This is the same value assigned by the host in the Scaled Video Stream Setup Packet.

The 2-byte Ack Code field provides values containing a code that describes the outcome of an attempt to update the specified scaled video stream. In one embodiment, the codes are defined as follows:
  0—The stream allocation attempt was successful.
  1—the stream de-allocation attempt was successful.
  2—invalid attempt to allocate a stream ID that has already been allocated.
  3—invalid attempt to de-allocate a stream ID that is already de-allocated.
  4—the client does not support scaled video streams
  5—the stream parameters are inconsistent with the capability of the client.
  6—stream ID value larger than the maximum value allowed by the client.
  7—insufficient resources available in the client to allocate the specified stream.

The 2-byte CRC field contains the CRC of all bytes in the packet including the Packet Length.

39. Scaled Video Stream Packet

The Scaled Video Stream Packet is used to transmit the pixel data associated with a specific scaled video stream. The size of the region reference by this packet is defined by the Scaled Video Stream Setup Packet. The client can indicate an ability to support the Scaled Video Stream Packet via a parameter value of 143 in the Valid Parameter Reply List of the Valid Status Reply List Packet and using a successful scaled video stream allocation response in the Ack Code field of the Scaled Video Stream Acknowledgement Packet.

The format of one embodiment of the Scaled Video Stream Packet is shown generally in FIG. 82. As seen in FIG. 82, a Scaled Video Stream Packet is structured to have Packet Length, Packet Type, hClient ID, Stream ID, Parameter CRC, Pixel Count, Pixel Data, and Pixel Data CRC fields. The 2-byte Packet Type field uses a value of 18 to identify a packet as a Scaled Video Stream Packet. The hClient ID field is reserved for the Client ID, and generally set to zero. As before, the 2-byte Stream ID field specifies a unique identifier for the Stream ID. This value is specified by the host in the Scaled Video Stream Setup Packet and confirmed in the Scaled Video Stream Acknowledgement Packet.

The 2-byte Pixel Count field specifies the number of pixels in the Pixel Data field below. The 2-byte Parameter CRC field has the CRC of all bytes from the Packet Length to the Pixel Count. If this CRC fails to check then the entire packet is discarded. The 2-byte Pixel Data field contains the raw video information that is to be scaled and then displayed. Data is formatted in the manner described by the Video Data Format Descriptor field. The data is transmitted a row at a time as defined previously.

The 2-byte Pixel Data CRC field contains a CRC of only the Pixel Data. If this CRC fails to check then the Pixel Data can still be used but the CRC error count is incremented.

40. Request Specific Status Packet

The Request Specific Status Packet provides a means, mechanism, or method for a host to request that the client send a capability or status packet back to the host as specified in this packet. The client returns the packet of the specified type in the next Reverse Link Encapsulation Packet. The client will generally set bit 17 in the Client Feature Capability field of the Client Capability Packet if the client has the capability to respond to the Request Specific Status Packet. A convenient method for the host to use to determine all of the types of status packets to which a client can respond is to use the Valid Status Reply List Packet described elsewhere. The client can indicate an ability to respond with the Valid Status Reply List Packet using bit 21 of Client Feature Capability field of the Client Capability Packet.

The format of one embodiment of a Request Specific Status Packet is shown generally in FIG. 83. As seen in FIG. 83, a Request Specific Status Packet is structured to have Packet Length, Packet Type, hClient ID, Status Packet ID, and CRC fields. Packet Length field specifies the total number of bytes in the packet not including the packet length field, and is generally fixed at a value of 10 for this packet type. A Packet Type of 138 identifies the packet as a Request Specific Status Packet. The hClient ID field (2 bytes) is reserved for future use for a Client ID, and is set to zero for now, while a 2-byte Status Packet ID field specifies the type of capability or status packet that the client is going to send to the host. Typical packets types are:
  66—Client Capability Packet is sent by the client.
  133—Alpha-Cursor Image Capability Packet is sent by the client.
  139—Valid Status Reply List Packet is sent that identifies the exact types of capability and status packets that the client can send.
  140—Packet Processing Delay Parameters Packet is sent by the client.
  141—Personal Client Capability Packet is sent by the client.
  142—Client Error Report Packet is sent by the client.
  143—Scaled Video Stream Capability Packet is sent by the client.
  144—Client Identification Packet is sent by the client.

Packet Types 56 through 63 can be used for manufacturer-specific capability and status identifiers.

The CRC field again contains a CRC of all bytes in the packet including the Packet Length.

41. Valid Status Reply List Packet

The Valid Status Reply List Packet provides the host with a structure, means, or method to have a list of status and capability packets to which the client has the capability to respond. A client can indicate an ability to support the Valid Status Reply List Packet using bit 21 of Client Feature Capability field of the Client Capability Packet.

The format of one embodiment of a Valid Status Reply List Packet is shown generally in FIG. 84. As seen in FIG. 84, a Valid Status Reply List Packet is structured to have Packet Length, Packet Type, cClient ID, Number of Values in List, Valid Parameter Reply List, and CRC fields. The packet length for this type of packet is generally fixed at a value of 10, and a type value of 139 identifies the packet as a Valid Status Reply Packet. The cClient ID field is reserved for future use as the Client ID, and is generally be set to zero. The 2-byte Number of Values in List field specifies the number of items in the following Valid Parameter Reply List.

The Valid Parameter Reply List field contains a list of 2-byte parameters that specify the types of capability or status packets that the client can send to the host. If the client has indicated that it can respond to the Request Specific Status Packet (using bit 21 of the Client Feature Capability field the in the Client Capability Packet) then it is capable of sending at least the Client Capability Packet (Packet Type=66) and the Valid Status Reply List Packet (Packet Type=139). The Packet Types that can be sent by the client and may be included in this list, along with their respective assignments for purposes of the one embodiment, are:

66—Client Capability Packet.
133—Alpha-Cursor Image Capability Packet.
139—Valid Status Reply List Packet, that identifies the exact types of capability and status packets that the client can send.
140—Packet Processing Delay Parameters Packet.
141—Personal Display Capability Packet.
142—Client Error Report Packet.
143—Scaled Video Stream Capability Packet.
144—Client Identification Packet.
145—Alternate Display Capability Packet.

Packet Types 56 through 63 can be used for manufacturer-specific capability and status identifiers.

The CRC field contains a CRC of all bytes in the packet including the Packet Length.

42. Packet Processing Delay Parameters Packet

The Packet Processing Delay Parameters Packet provides a set of parameters to allow the host to compute the time required to complete the processing associated with the reception of a specific packet type. Some commands sent by the host cannot be completed by the client in zero time. The host may poll the status bits in the Client Request and Status Packet to determine if certain functions have been completed by the client, or the host may compute the completion time using the parameters returned by the client in the Packet Processing Delay Parameters Packet. The client can indicate an ability to support the Packet Processing Delay Parameters Packet using a parameter value of 140 in the Valid Parameter Reply List of the Valid Status Reply List Packet.

The format of one embodiment of a Packet Processing Delay Parameters Packet is shown generally in FIG. 85A. As seen in FIG. 85A, a Packet Processing Delay Parameters Packet is structured to have Packet Length, Packet Type, cClient ID, Number of List Items, Delay Parameters List, and CRC fields. The packet length for this type of packet is generally fixed at a value of 10, and a type value of 140 identifies the packet as a Packet Processing Delay Parameters Packet. The cClient ID field is reserved for future use as the Client ID, and is generally be set to zero. The 2-byte Number of List items field specifies the number of items in the following Valid Parameter Reply List.

The Delay Parameters List field is a list containing one or more Delay Parameter List items. The format for one embodiment of a single Delay Parameters List item is shown in FIG. 85B, where Packet Type for Delay, Pixel Delay, Horizontal Pixel Delay, Vertical Pixel Delay, and Fixed Delay fields are shown.

Each Delay Parameters List Item is generally restricted to be 6 bytes in length, and is further defined as follows. The 2-byte Packet Type for Delay field specifies the Packet Type for which the following delay parameters apply. The Pixel Delay field (1 byte) comprises an index to a delay value. The value read from the table is multiplied by the total number of pixels in the destination field of the packet. The total number of pixels is the width times the height of the destination area of the bitmap referenced by the packet. The 1-byte Horizontal Pixel Delay field contains a value that is an index to a delay value table (same table as DPVL). The value read from the table is multiplied by the width (in pixels) of the destination field of the packet. The 1-byte Vertical Pixel Delay field contains a value that is an index to a delay value table (generally uses the same table as DPVL). The value read from the table is multiplied by the height (in pixels) of the destination field of the packet.

The Fixed Delay field uses 1 byte as an index to a delay value table (same table as DPVL). The value read from the table is a fixed delay parameter that represents a time required to process the packet that is unrelated to any parameter values specified in the packet. The total delay, or packet processing completion time delay, is determined according to the relationship:

$$Delay = (PacketProcessingDelay(PixelDelay) \cdot TotalPixels) + (PacketProcessingDelay(HorizontalPixelDelay) \cdot Width) + (PacketProcessingDelay(VerticalPixelDelay) \cdot Height) + PacketProcessingDelay(FixedDelay)$$

For some packets, the Total Pixels, Width, or Height do not apply because those parameters are not referenced in the corresponding packet. In those cases, the corresponding Pixel Delay parameter is generally set to be zero.

43. Personal Display Capability Packet

The Personal Display Capability Packet provides a set of parameters that describe the capabilities of a personal display device, such as a head-mounted display or display glasses. This enables the host to customize the display information according to the specific capabilities of a client. A client, on the other hand, indicates an ability to send the Personal Display Capability Packet by using a corresponding parameter in the Valid Parameter Reply List of the Valid Status Reply List Packet.

The format of one embodiment of a Personal Display Capability Packet is shown generally in FIG. 86. As seen in FIG. 86, a Personal Display Capability Packet is structured to have Packet Length, Packet Type, cClient ID, Sub-Pixel Layout, Pixel Shape, Horizontal Field of View, Vertical Field of View, Visual Axis Crossing, Lf./Rt. Image, See Through, Maximum Brightness, Optical Capability, Minimum IPD, Maximum IPD, Points of Field of Curvature List and CRC fields. In one embodiment, the Packet Length field value is fixed at 68. A Packet Type value of 141 identifies a packet as a Personal Display Capability Packet. The cClient ID field is reserved for future use and is generally set to zero for now.

The Sub-Pixel Layout field specifies the physical layout of a sub-pixel from top to bottom and left to right, using values of: 0 to indicate that a sub-pixel layout is not defined; 1 to indicate red, green, blue stripe; 2 to indicate blue, green, red stripe; 3 to indicate a quad-pixel, having a 2-by-2 sub-pixel arrangement of red at the top left, blue at the bottom right, and two green sub-pixels, one at the bottom left and the other at the top right; 4 to indicate a quad-pixel, with a 2-by-2 sub-pixel arrangement of red at the bottom left, blue at the top right, and two green sub-pixels, one at the top left and the other at the bottom right; 5 to indicate a Delta (Triad); 6 to indicate a mosaic with red, green, and blue overlayed (e.g. LCOS display with field-sequential color); and with values 7 through 255 being generally reserved for future use.

The Pixel Shape field specifies the shape of each pixel that is composed of a specific configuration sub-pixels, using a value of: 0 to indicate that a sub-pixel shape is not defined; 1 to indicate round; 2 to indicate square; 3 to indicate rectangular; 4 to indicate oval; 5 to indicate elliptical; and with the values 6 through 255 being reserved for future use in indicating desired shapes, as can be appreciated by one skilled in the art.

A 1-byte Horizontal Field of View (HFOV) field specifies the horizontal field of view in 0.5 degree increments (e.g. if the HFOV is 30 degrees, this value is 60). If this value is zero then the HFOV is not specified.

A 1-byte Vertical Field of View (VFOV) field specifies the vertical field of view in 0.5 degree increments (e.g. if the VFOV is 30 degrees, this value is 60). If this value is zero then the VFOV is not specified.

A 1-byte Visual Axis Crossing field specifies the visual axis crossing in 0.01 diopter (1/m) increments (e.g. if the visual axis crossing is 2.22 meters, this value is 45). If this value is zero then the Visual Axis Crossing is not specified.

A 1-byte Left/Right Image Overlap field specifies the percentage of overlap of the left and right image. The allowable range of the image overlap in percent is 1 to 100. Values of 101 to 255 are invalid and are generally not to be used. If this value is zero then the image overlap is not specified.

A 1-byte See Through field specifies the see-through percentage of image. The allowable range of see-through in percent is 0 to 100. Values of 101 to 254 are invalid and are not to be used. If this value is 255 then the see-through percentage is not specified. A 1-byte Maximum Brightness field specifies the maximum brightness in increments of 20 nits (e.g. if the maximum brightness is 100 nits, this value is 5). If this value is zero then the maximum brightness is not specified.

A 2-byte Optical Capability Flags field contains various fields that specify optical capabilities of the display. These bit values are generally assigned according to:

Bits 15 through 5 are reserved for future use and are generally set to a logic-zero state.

Bit 4 selects Eye Glass Focus Adjustment, with a value of '0' meaning the display has no eye glass focus adjustment, and a value of '1' meaning the display has an eye glass focus adjustment.

Bits 3 through 2 select a Binocular Function according to: a value of 0 means the display is binocular and can display 2-dimensional (2D) images only; 1 means the display is binocular and can display 3-dimensional (3D) images; 2 means the display is monocular, and 3 is reserved for future use.

Bits 1 through 0 select Left-Right Field Curvature Symmetry, with a value of 0 meaning Field curvature not defined. If this field is zero then all field curvature values from A1 through E5 are set to zero except for point C3, which specifies a focal distance of the display or be set to zero to indicate the focal distance is not specified. A value of 1 means Left and Right displays have the same symmetry; 2 means Left and right displays are mirrored on the vertical axis (column C); and 3 is reserved for future use.

The 1-byte Inter-Pupillary Distance (IPD) Minimum field specifies the minimum inter-pupillary distance in millimeters (mm). If this value is zero then the minimum inter-pupillary distance is not specified. The 1-byte Inter-Pupillary Distance (IPD) Maximum field specifies the maximum inter-pupillary distance in millimeters (mm). If this value is zero then the maximum inter-pupillary distance is not specified.

The Points of Field Curvature List field contains a list of 25 2-byte parameters that specify the focal distance in thousandths of a diopter (1/m) with a range of 1 to 65535 (e.g. 1 is 0.001 diopters and 65535 is 65.535 diopters). The 25 elements in the Points of Field Curvature List are labeled A1 through E5 as shown below. The points are to be evenly distributed over the active area of the display. Column C corresponds to the vertical axis of the display and row 3 corresponds to the horizontal axis of the display. Columns A and E correspond to the left and right edges of the display, respectively. And rows 1 and 5 correspond to the top and bottom edges of the display, respectively. The order of the 25 points in the list is: A1, B1, C1, D1, E1, A2, B2, C2, D2, E2, A3, B3, C3, D3, E3, A4, B4, C4, D4, E4, A5, B5, C5, D5, E5.

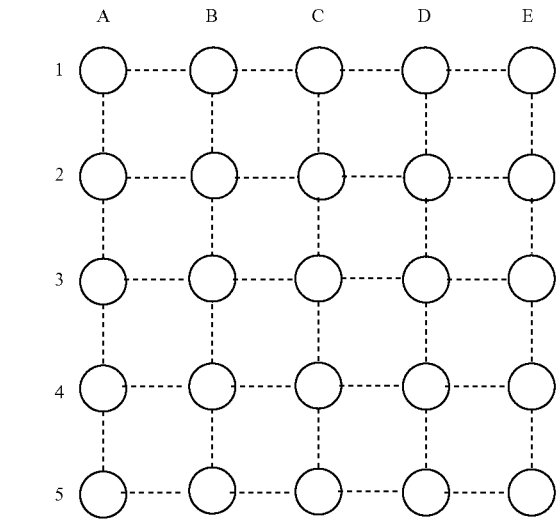

The CRC field contains a CRC of all bytes in the packet including the Packet Length.

44. Client Error Report Packet

The Client Error Report Packet acts as a mechanism or means for allowing a client to provide a list of operating errors to the host. The client may detect a wide range of errors in the course of its normal operation as a result of receiving certain commands from the host. Examples of these errors include: the client may have been commanded to operate in a mode that it does not support, the client may have received a packet containing certain parameters that are out of range or are beyond the capability of the client, the client may have been commanded to enter a mode in an improper sequence. The Client Error Report Packet may be used to detect errors during normal operation, but is most useful to the system designer and integrator to diagnose problems in development and integration of host and client systems. A client indicates its ability to send a Client Error Report Packet using a parameter value of 142 in the Valid Parameter Reply List of the Valid Status Reply List Packet.

The format of one embodiment of a Client Error Report Packet is shown generally in FIG. 87A. As seen in FIG. 87A, a Client Error Report Packet is structured to have Packet Length, Packet Type, cClient ID, Number of List Items, Error Code List, and CRC fields. A Packet Type value of 142 identifies a packet as a Client Error Report Packet. The cClient ID field is reserved for future use and is generally set to zero for now. The Number of List Items field (2 bytes) specifies the number of items in the following Error Code List. The Error Code List field (here 8 bytes) is a list containing one or more Error Report List items. The format of a single Error Report List item is shown in FIG. 87B.

In one embodiment, as shown in FIG. 87B, each Error Report List Item is exactly 4 bytes in length, and has a structure in one embodiment comprising: a 2-byte Display Error Code field that specifies the type of error being reported, a 2-byte Error Sub-code field specifies a greater level of detail regarding the error defined by the Client Error Code packet. The specific definition of each Client Error Code is defined by the manufacturer of the client. An Error Sub-code does not have to be defined for every Display Error Code, and in those cases where the Error Sub-code is not defined the value is set to zero. The specific definition of each Error Sub-code is defined by the manufacturer of the client.

45. Client Identification Packet

The Client Identification Packet allows a client to return identifying data in response to a Request Specific Status Packet. In one embodiment, a client indicates an ability to send the Client Identification Packet using a parameter value of 144 in the Valid Parameter Reply List of the Valid Status Reply List Packet. It is useful for the host to be able to determine the client device manufacturer name and model number by reading this data from the client. The information may be used to determine if the client has special capabilities that cannot described in the Client Capability Packet. There are potentially two methods, means, or mechanisms for reading identification information from the client. One is through use of the Client Capability Packet, which contains fields similar to those in the base EDID structure. The other method is through use of the Client Identification Packet that contains a richer set of information compared to the similar fields in the Client Capability Packet. This allows a host to identify manufacturers that have not been assigned a 3-character EISA code, and allows serial numbers to contain alphanumeric characters.

The format of one embodiment of a Client Identification Packet is shown generally in FIG. 88. As seen in FIG. 88, a Client Identification Packet is structured to have Packet Length, Packet Type, cClient ID, Week of Mfr, Year of Mfr., Length of Mfr Name, Length of Product Name, Length of Serial Number, Manufacturer Name String, Product Name String, Serial Number String, and CRC fields.

The 2 byte Packet Type field contains a value that identifies the packet as a Client Identification Packet. This value is selected to be 144 in one embodiment. The cClient ID field (2 bytes) again is reserved for future use for the Client ID, and is generally set to zero. The CRC field (2 bytes) contains a 16-bit CRC of all bytes in the packet including the Packet Length.

A 1-byte Week of Manufacture field contains a value that defines the week of manufacture of the display. In at least one embodiment, this value is in the range of 1 to 53 if it is supported by the client. If this field is not supported by the client, then it is generally set to zero. A 1-byte Year of Manufacture field contains a value that defines the year of manufacture of the client (display). This value is an offset from the year 1990 as a starting point, although other base years could be used. Years in the range of 1991 to 2245 can be expressed by this field. Example: the year 2003 corresponds to a Year of Manufacture value of 13. If this field is not supported by the client it should be set to a value of zero.

The Length of Mfr Name, Length of Product Name, and Length of Serial Number fields each contain 2-byte values that specify the length of the Manufacturer Name String field including any null termination or null pad characters, the length of the Product Name String field including any null termination or null pad characters, and the length of the Serial Number String field including any null termination or null pad characters, respectively.

The Manufacturer Name String, Product Name String, and Serial Number String fields each contain a variable number of bytes specified by the Length Mfr Name, Product Name, and Serial Number fields, respectively, that contain an ASCII string that specifies the manufacturer, product name, and alphanumeric serial number of the display, respectively. Each of these strings is terminated by at least one null character.

46. Alternate Display Capability Packet

The Alternate Display Capability Packet indicates the capability of the alternate displays attached to the MDDI client controller. It is sent in response to a Request Specific Status Packet. When prompted, a client device sends an Alternate Display Capability Packet for each alternate display that is supported. The client can indicate an ability to send the Alternate Display Capability Packet via a parameter value of 145 in the Valid Parameter Reply List of the Valid Status Reply List Packet.

For MDDI systems operated in internal mode it may be common to have more than one display connected to an MDDI client controller. An example application is a mobile phone with a large display on the inside of the flip and a smaller display on the outside. It is not necessary for an internal mode client to return an Alternate Display Capability Packet for two potential reasons. First, the host may already be programmed or otherwise informed of the capabilities during manufacture since they are used in a common device or housing. Second, due to assembly of the two, the client cannot easily be disconnected or separated from a connection to the host, and the host may contain a hard-coded copy of the client capabilities, or at least know they do not change with a change in client, as otherwise might occur.

The Number of Alt Displays field of the Client Capability Packet is used to report that more than one display is attached and the Alternate Display Capability Packet reports the capability of each alternate display. The video stream packet contains 4 bits in the Pixel Data Attributes field to address each alternate display in the client device.

The format of one embodiment of a Alternate Display Capability Packet is shown generally in FIG. 89. As seen in FIG. 89, an Alternate Display Capability Packet is structured to have Packet Length, Packet Type, cClient ID, Alt Display Number, Reserved 1, Bitmap Width, Bitmap Height, Display Window Width, Display Window Height, Color Map RGB Width, RGB Capability, Monochrome Capability, Reserved 2, Y Cb Cr Capability, Display Feature Capability, Reserved 3, and CRC fields. A Packet Type value of 145 identifies a packet as a Alternate Display Capability Packet. The cClient ID field is reserved for a Client ID for future use and generally set to zero.

The Alt Display Number field uses 1 byte to indicate the identity of the alternate display with an integer in the range of 0 to 15. The first alternate display is typically designated as number 0 and the other alternate displays are identified with unique Alt Display Number values with the largest value used being the total number of alternate displays minus 1. Values larger than the total number of alternate displays minus 1 are not used. Example: a mobile phone having a primary display and a caller-ID display connected to an MDDI client has one alternate display, so the Alt Display Number of the caller-ID display is zero and the Number of Alt Displays field of the Client Capability Packet has a value of 1.

The Reserved 1 field (1 byte) is reserved for future use. All bits in this field are set to zero. One purpose of this field is to cause all subsequent 2 byte fields to align to a 16-bit word address and cause 4-byte fields to align to a 32-bit word address.

The Bitmap Width field uses 2 bytes that specify the width of the bitmap expressed as a number of pixels. The Bitmap Height field uses 2 bytes that specify the height of the bitmap expressed as a number of pixels. The Display Window Width field uses 2 bytes that specify the width of the display window expressed as a number of pixels. The Display Window Height field uses 2 bytes that specify the height of the display window expressed as a number of pixels.

The Color Map RGB Width field uses 2 bytes that specify the number of bits of the red, green, and blue color components that can be displayed in the color map (palette) display mode. A maximum of 8 bits for each color component (red, green, and blue) can be used. Even though 8 bits of each color component are sent in the Color Map Packet, only the number of least significant bits of each color component defined in this field are used. If the display client cannot use the color map (palette) format then this value is zero. The color map RGB Width word is composed of three separate unsigned values:

Bits 3 through 0 define the maximum number of bits of blue in each pixel with values of 0 to 8 being considered valid. Bits 7 through 4 define the maximum number of bits of green in each pixel with values of 0 to 8 being considered valid. Bits 11 through 8 define the maximum number of bits of red in each pixel with values of 0 to 8 being considered valid. Bits 14 through 12 are reserved for future use and are generally set to zero. Bit 15 is used to indicate the ability of a client to accept Color Map pixel data in packed or unpacked format. When Bit 15 is set to a logic-one level, this indicates that the client can accept Color Map pixel data in either packed or unpacked format. If bit 15 is set to a logic-zero, this indicates that the client can accept Color Map pixel data only in unpacked format.

RGB Capability field uses 2 bytes to specify the number of bits of resolution that can be displayed in RGB format. In one embodiment, if the client cannot use the RGB format then this value is set equal to zero. The RGB Capability word is composed of three separate unsigned values: Bits 3 through 0 define the maximum number of bits of blue (the blue intensity) in each pixel, Bits 7 through 4 define the maximum number of bits of green (the green intensity) in each pixel, and Bits 11 through 8 define the maximum number of bits of red (the red intensity) in each pixel. Bits 14 through 12 are reserved for future use and are set to zero. Bit 15 is used to indicate the ability of a client to accept RGB pixel data in packed or unpacked format. When Bit 15 is set to a logic-one level, this indicates that the client can accept RGB pixel data in either packed or unpacked format. If bit 15 is set to a logic-zero, this indicates that the client can accept RGB pixel data only in unpacked format.

The 1 byte Monochrome Capability field contains a value or information to specify the number of bits of resolution that can be displayed in monochrome format. If the client cannot use the monochrome format then this value is set equal to zero. Bits 6 through 4 are reserved for future use and are generally set to zero. Bits 3 through 0 define the maximum number of bits of grayscale that can exist in each pixel. These four bits make it possible to specify that each pixel consists of 1 to 15 bits. If the value is zero then the monochrome format is not supported by the client. Bit 7 when set to one indicates that the client can accept monochrome pixel data in either packed or unpacked format. If bit 7 is set to zero this indicates that the client can accept monochrome pixel data only in unpacked format.

The Reserved 2 field is a 1 byte wide field reserved for future use and generally has all bits in this field set to logic-zero level. In one embodiment, one purpose of this field is to cause all subsequent 2 byte fields to align to a 16-bit word address and cause 4-byte fields to align to a 32-bit word address.

A 2-byte Y Cb Cr Capability field specifies the number of bits of resolution that can be displayed in Y Cb Cr format. If the client cannot use the Y Cb Cr format then this value is zero. The Y Cb Cr Capability word is composed of three separate unsigned values: Bits 3 through 0 define the maximum number of bits that specify the Cb sample, Bits 7 through 4 define the maximum number of bits that specify the Cr sample, Bits 11 through 8 define the maximum number of bits that specify the Y sample, and Bits 14 through 12 are reserved for future use and are set to zero. Bit 15 when set to one indicates that the client can accept Y Cb Cr pixel data in either packed or unpacked format. If bit 15 is set to zero this indicates that the client can accept Y Cb Cr pixel data only in unpacked format.

A 1 byte Bayer Capability field specifies the number of bits of resolution, pixel group, and pixel order that can be transferred in Bayer format. If the client cannot use the Bayer format then this value is set at zero. The Bayer Capability field is composed of the following values: Bits 3 through 0 define the maximum number of bits of intensity that exist in each pixel, Bits 5 through 4 define the pixel group pattern that may be required, Bits 8 through 6 define a pixel order that is required, and Bits 14 through 9 are reserved for future use and are set to zero. Bit 15 when set to one indicates that the client can accept Bayer pixel data in either packed or unpacked format. If bit 15 is set to zero, this indicates that the client can accept Bayer pixel data only in unpacked format.

The 2-byte CRC field contains a 16-bit CRC of all bytes in the packet including the Packet Length.

47. Register Access Packet

The Register Access Packet provides either a host or a client with a means, mechanism, or method to access configuration and status registers in the opposite end of the MDDI link. These registers are likely to be unique for each display or device controller. These registers already exist in many displays that require setting configurations, modes of operation, and have other useful and necessary settings. The Register Access Packet allows the MDDI host or client to both write to a register and request to read a register using the MDDI link. When the host or client requests to read a register the opposite end should respond by sending the register data in the same packet type, but also by indicating that this is the data read from a particular register with the use of the Read/Write Info field. The Register Access Packet may be used to read or write multiple registers by specifying a register count greater than 1. A client indicates an ability to support the Register Access Packet using bit 22 of Client Feature Capability field of the Client Capability Packet.

The format of one embodiment of a Register Access Packet is shown generally in FIG. 90. As seen in FIG. 90, a Register Access Packet is structured to have Packet Length, Packet Type, bClient ID, Read/Write Flags, Register Address, Parameter CRC, Register Data List and Register Data CRC fields. A Packet Type value of 146 identifies a packet as Register Access Packet. The bClient ID field is reserved for future use and is generally set to zero for now.

The 2-byte Read/Write Flags field specifies the specific packet as either a write, or a read, or a response to a read, and provides a count of the data values.

Bits 15 through 14 act as Read/Write Flags. If Bits[15:14] are '00' then this packet contains data to be written to a register addressed by the Register Address field. The data to be written to the specified registers is contained in the Register Data List field. If Bits[15:14] are '10' then this is a request for data from one or more registers addressed by the Register Address field. If Bits[15:14] are '11' then that packet contains data that was requested in response to a Register Access Packet having bits 15:14 of the Read/Write Flags set to '10'. The Register Address field contains the address of the register corresponding to the first Register Data List item, and the Register Data List field contains data that was read from the address or addresses. If Bits[15:14] are '01' this is treated as an invalid value, this value is reserved for future use and is not used.

Bits 13:0 use a 14-bit unsigned integer to specify the number of 32-bit Register Data items to be transferred in the Register Data List field. If bits 15:14 equal '00' then bits 13:0 specify the number of 32-bit register data items that are contained in the Register Data List field to be written to registers starting at the register specified by the Register Address field. If bits 15:14 equal '10' then bits 13:0 specify the number of 32-bit register data items that the receiving device sends to a device requesting that the registers be read. The Register Data List field in this packet contain no items and is of zero length. If bits 15:14 equal '11' then bits 13:0 specify the number of 32-bit register data items that have been read from registers that are contained in the Register Data List field. Bits 15:14 are not currently set equal to '01', which is considered an invalid value, and otherwise reserved for future designations or use.

The Register Address field uses 4 bytes to indicate the register address that is to be written to or read from. For addressing registers whose addressing is less than 32 bits, the upper bits are set to zero.

The 2-byte Parameter CRC field contains a CRC of all bytes form the Packet Length to the Register Address. If this CRC fails to check then the entire packet is discarded.

The Register Data List field contains a list of 4-byte register data values to be written to client registers or values that were read from client device registers.

The 2-byte Register Data CRC field contains a CRC of only the Register Data List. If this CRC fails to check then the Register Data may still be used, but the CRC error count is incremented.

D. Packet CRC

The CRC fields appear at the end of the packets and sometimes after certain more critical parameters in packets that may have a significantly large data field, and thus, an increased likelihood of errors during transfer. In packets that have two CRC fields, the CRC generator, when only one is used, is re-initialized after the first CRC so that the CRC computations following a long data field are not affected by the parameters at the beginning of the packet.

Figure 36:
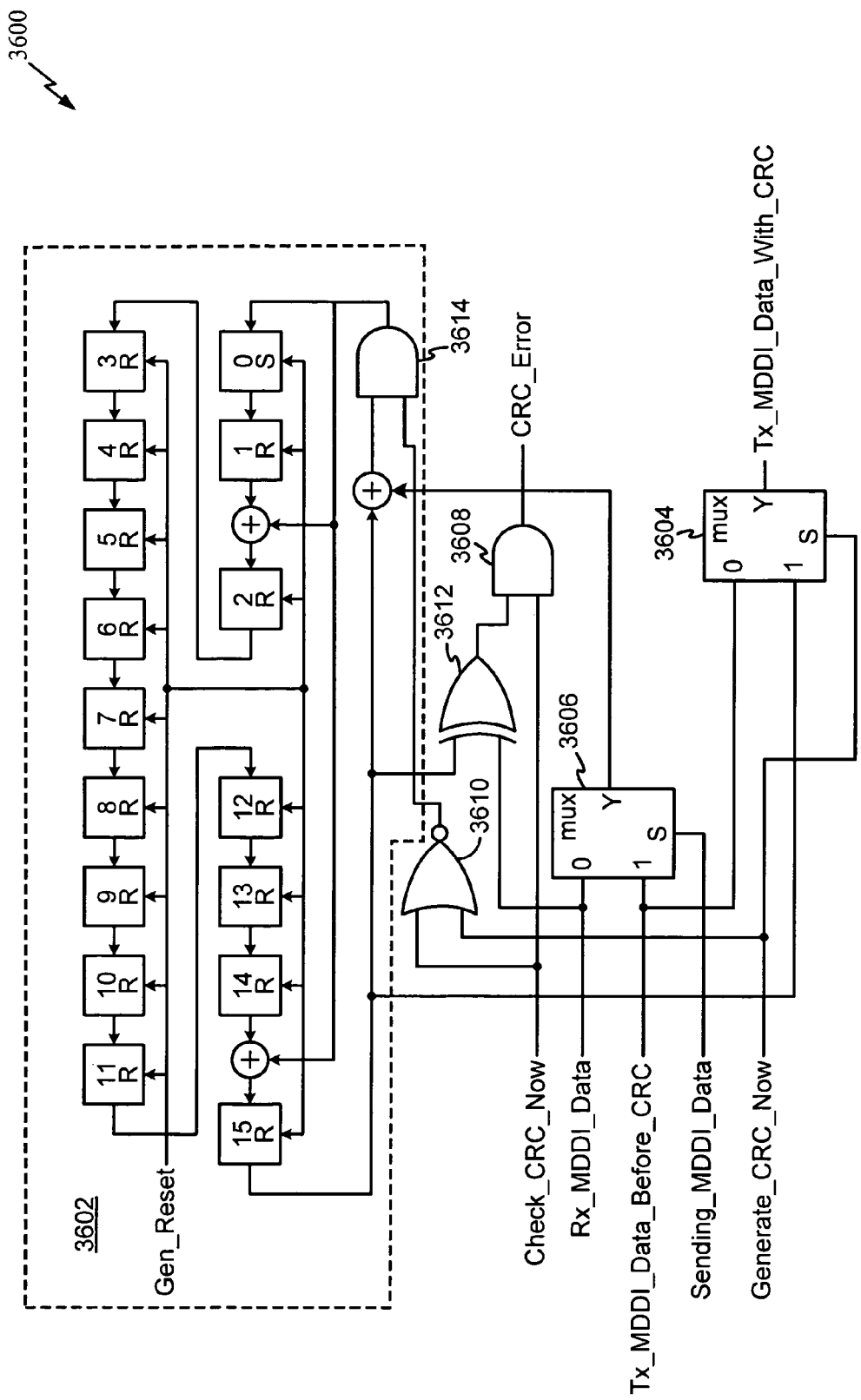
FIG. 36 illustrates a sample implementation of a CRC generator and checker useful for implementing the invention.

In an exemplary embodiment, the polynomial used for the CRC calculation is known as the CRC-16, or X16+X15+X2+X0. A sample implementation of a CRC generator and checker 3600 useful for implementing the invention is shown in FIG. 36. In FIG. 36, a CRC register 3602 is initialized to a value of 0x0001 just prior to transfer of the first bit of a packet which is input on the Tx_MDDI_Data_Before_CRC line, then the bytes of the packet are shifted into the register starting with the LSB first. Note that the register bit numbers in this figure correspond to the order of the polynomial being used, and not the bit positions used by the MDDI. It is more efficient to shift the CRC register in a single direction, and this results in having CRC bit 15 appear in bit position 0 of the MDDI CRC field, and CRC register bit 14 in MDDI CRC field bit position 1, and so forth until MDDI bit position 14 is reached.

As an example, if the packet contents for the Client Request and Status Packets are: 0x000c, 0x0046, 0x000, 0x0400, 0x00, 0x00, 0x0000 (or represented as a sequence of bytes as: 0x0c, 0x00, 0x46, 0x00, 0x00, 0x00, 0x00, 0x04, 0x00, 0x00, 0x00, 0x00), and are submitted using the inputs of the multiplexors 3604 and 3606, and NAND gate 3608, the resulting CRC output on the Tx_MDDI_Data_With_CRC line is 0xd9aa (or represented as a sequence as 0xaa, 0xd9).

When CRC generator and checker 3600 is configured as a CRC checker, the CRC that is received on the Rx_MDDI_Data line is input to multiplexor 3604 and NAND gate 3608, and is compared bit by bit with the value found in the CRC register using NOR gate 3610, exclusive-OR (XOR) gate 3612, and AND gate 3614. If there are any errors, as output by AND gate 3614, the CRC is incremented once for every packet that contains a CRC error by connecting the output of gate 3614 to the input of register 3602. Note that the example circuit shown in the diagram of FIG. 36 can output more than one CRC error signal within a given CHECK_CRC_NOW window (see FIG. 37B). Therefore, the CRC error counter generally only counts the first CRC error instance within each interval where CHECK_CRC_NOW is active. If configured as a CRC generator the CRC is clocked out of the CRC register at the time coinciding with the end of the packet.

Figure 37A:
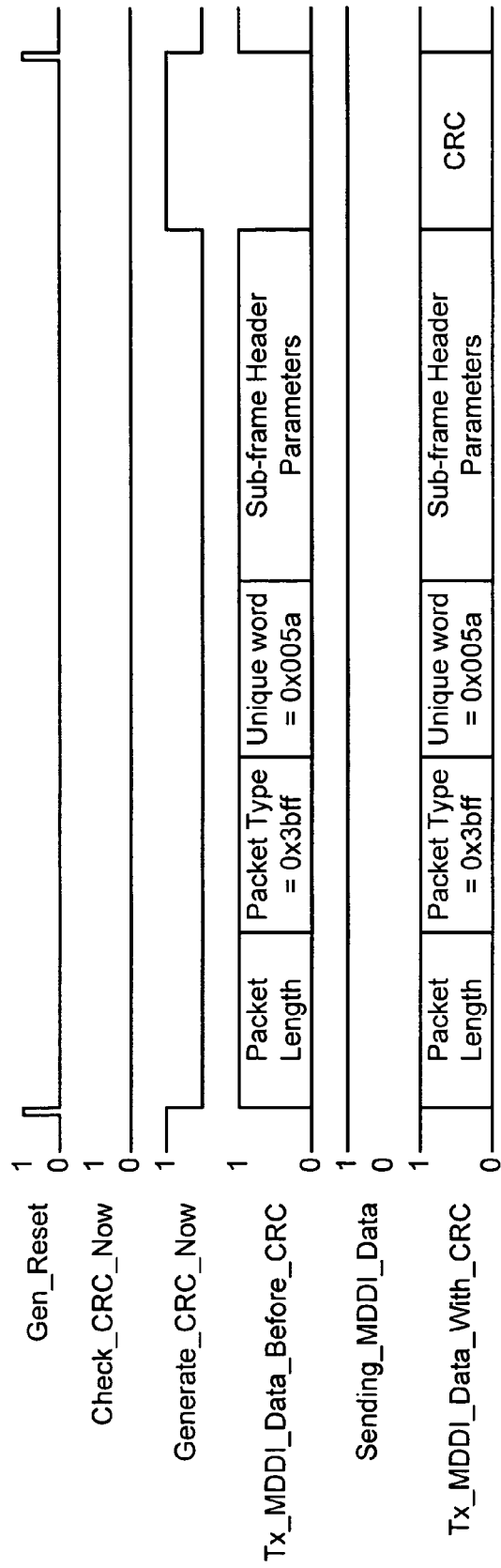
FIG. 37A illustrates the timing of CRC signals for the apparatus of FIG. 36 when sending data packets.
Figure 37B:
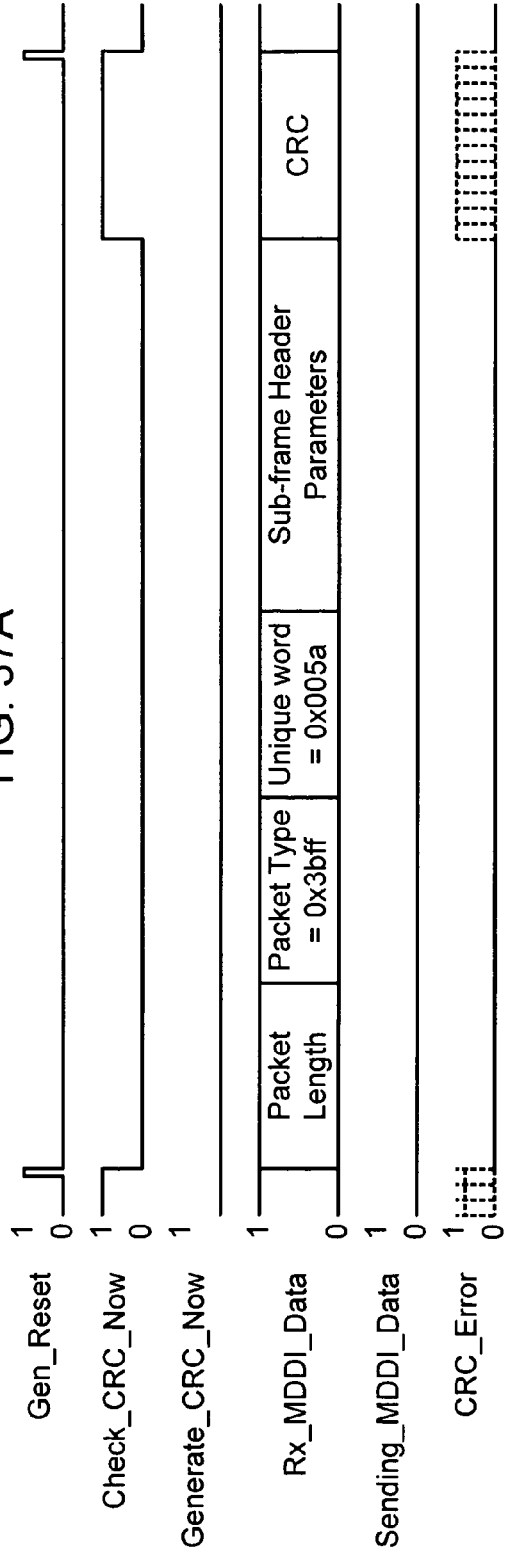
FIG. 37B illustrates the timing of CRC signals for the apparatus of FIG. 36 when receiving data packets.

The timing for the input and output signals, and the enabling signals, is illustrated graphically in FIGS. 37A and 37B. The generation of a CRC and transmission of a packet of data are shown in FIG. 37A with the state (0 or 1) of the Gen_Reset, Check_CRC_Now, Generate_CRC_Now, and Sending_MDDI_Data signals, along with the Tx_MDDI_Data_Before_CRC and Tx_MDDI_Data_With_CRC signals. The reception of a packet of data and checking of the CRC value are shown in FIG. 37B, with the state of the Gen_Reset, Check_CRC_Now, Generate_CRC_Now, and Sending_MDDI_Data signals, along with the Rx_MDDI_Data and CRC error signals.

E. Error Code Overload for Packet CRC

Whenever only data packets and CRC are being transferred between the host and client, there are no error codes being accommodated. The only error is a loss of synchronization. Otherwise, one has to wait for the link to timeout from a lack of a good data transfer path or pipeline and then reset the link and proceed. Unfortunately, this is time consuming and somewhat inefficient.

Figure 65:
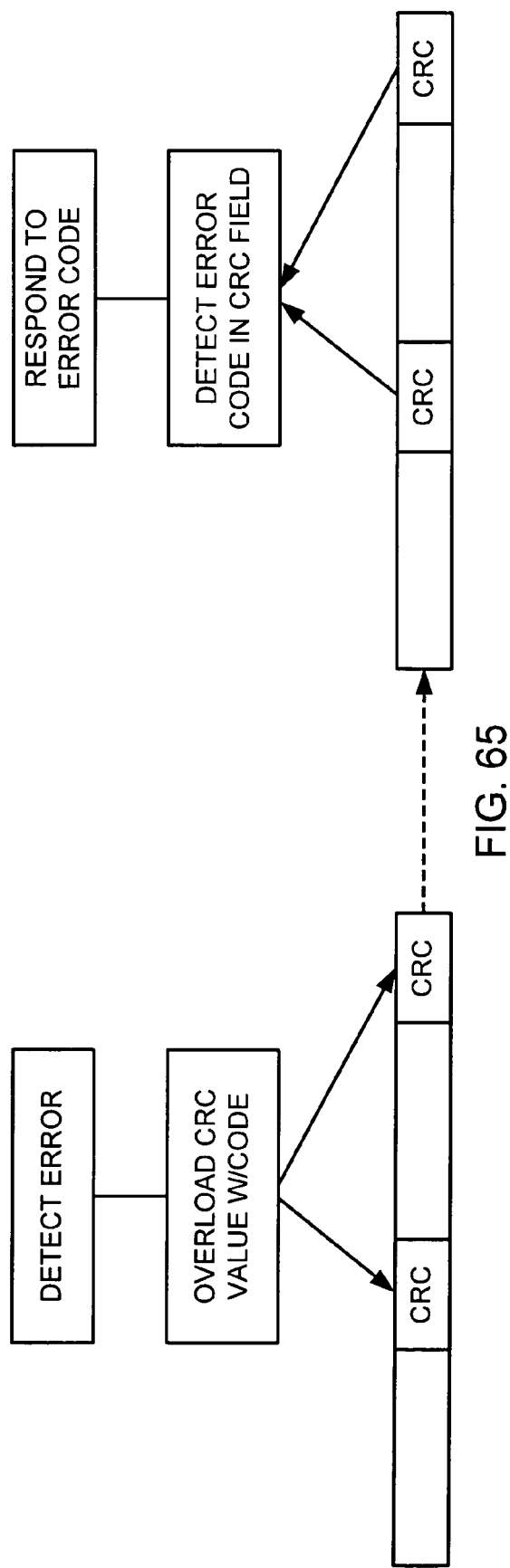
FIG. 65 illustrates exemplary error code transfer processing.

For use in one embodiment, a new technique has been developed in which the CRC portion of packets is used to transfer error code information. This is generally shown in FIG. 65. That is, one or more error codes are generated by the processors or devices handling the data transfer which indicate specific predefined errors or flaws that might occur within the communication processing or link. When an error is encountered, that the appropriate error code is generated and transferred using the bits for the CRC of a packet. That is, the CRC value is overloaded, or overwritten, with the desired error code, which can be detected on the receiving end by an error monitor or checker that monitors the values of the CRC field. For those cases in which the error code matches the CRC value for some reason, the compliment of the error is transferred to prevent confusion.

In one embodiment, to provide a robust error warning and detection system, the error code may be transferred several times, using a series of packets, generally all, that are transferred or sent after the error has been detected. This occurs until the point at which the condition creating the error is cleared from the system, at which point the regular CRC bits are transferred without overloading by another value.

This technique of overloading the CRC value provides a much quicker response to system errors while using a minimal amount of extra bits or fields.

Figure 66:
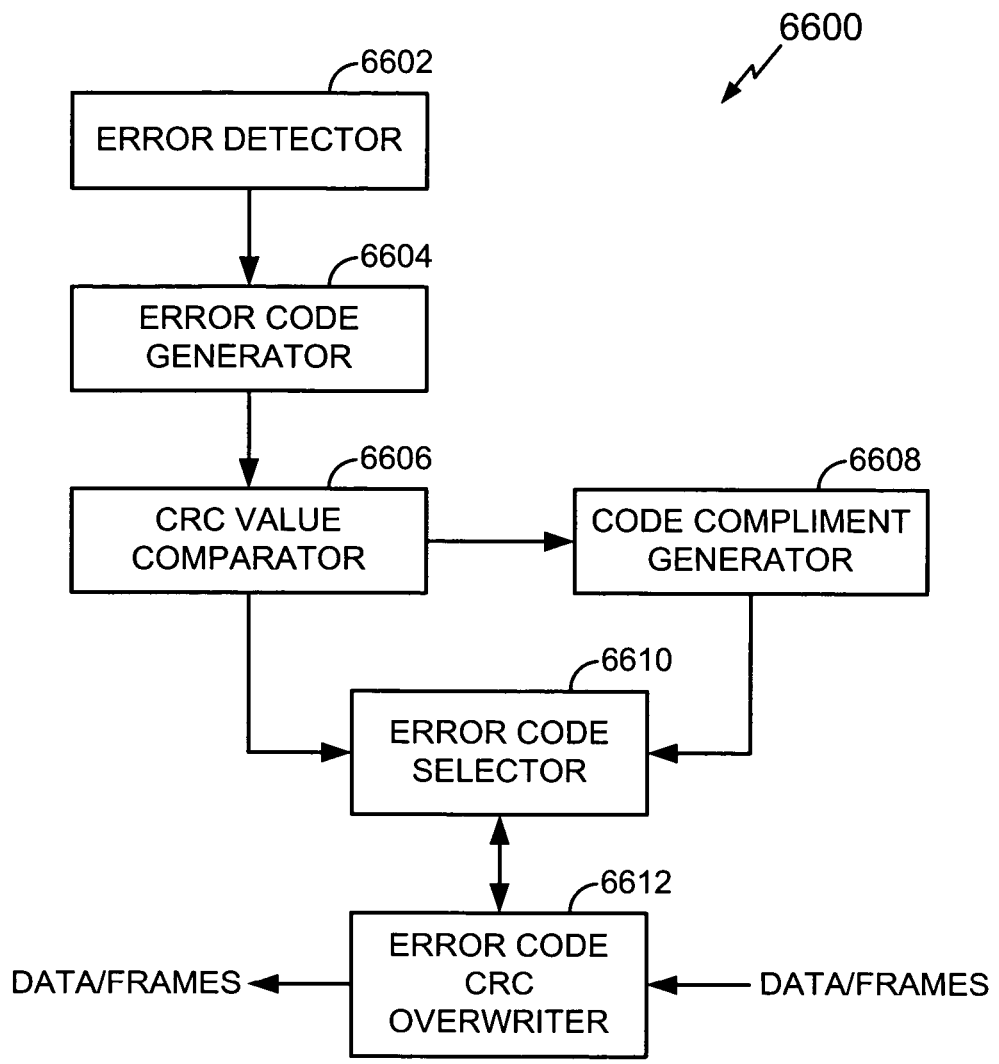
FIG. 66 illustrates apparatus useful for error code transfer processing.

As shown in FIG. 66, a CRC overwriting mechanism or apparatus 6600 is shown using an error detector or detections means 6602, which can form part of other circuitry previously described or known, detects the presence or existence of errors within the communication link or process. An error code generator or means 6604, which can be formed as part of other circuitry or use techniques such as look up tables to store pre-selected error messages, generates one or more error codes to indicate specific predefined errors or flaws that have been detected as occurring. It is readily understood that devices 6602 and 6604 can be formed as a single circuit or device as desired, or as part of a programmed sequence of steps for other known processors and elements.

A CRC value comparator or comparison means 6606 is shown for checking to see if the selected error code or codes are the same as the CRC value being transferred. If that is the case then a code compliment generator or generation means or device is used to provide the compliment of the error codes as to not be mistaken as the original CRC pattern or value and confuse or complicate the detection scheme. An error code selector or selection means element or device 6610 then selects the error code or value it is desired to insert or overwrite, or their respective compliments as appropriate. An error code CRC over-writer or over writing mechanism or means 6612 is a device that receives the data stream, packets, and the desired codes to be inserted and overwrites the corresponding or appropriate CRC values, in order to transfer the desired error codes to a receiving device.

As mentioned, the error code may be transferred several times, using a series of packets, so the over-writer 6612 may utilize memory storage elements in order to maintain copies of the codes during processing or recall these codes from previous elements or other known storage locations which can be used to store or hold their values as needed, or as desired.

Figure 67A:
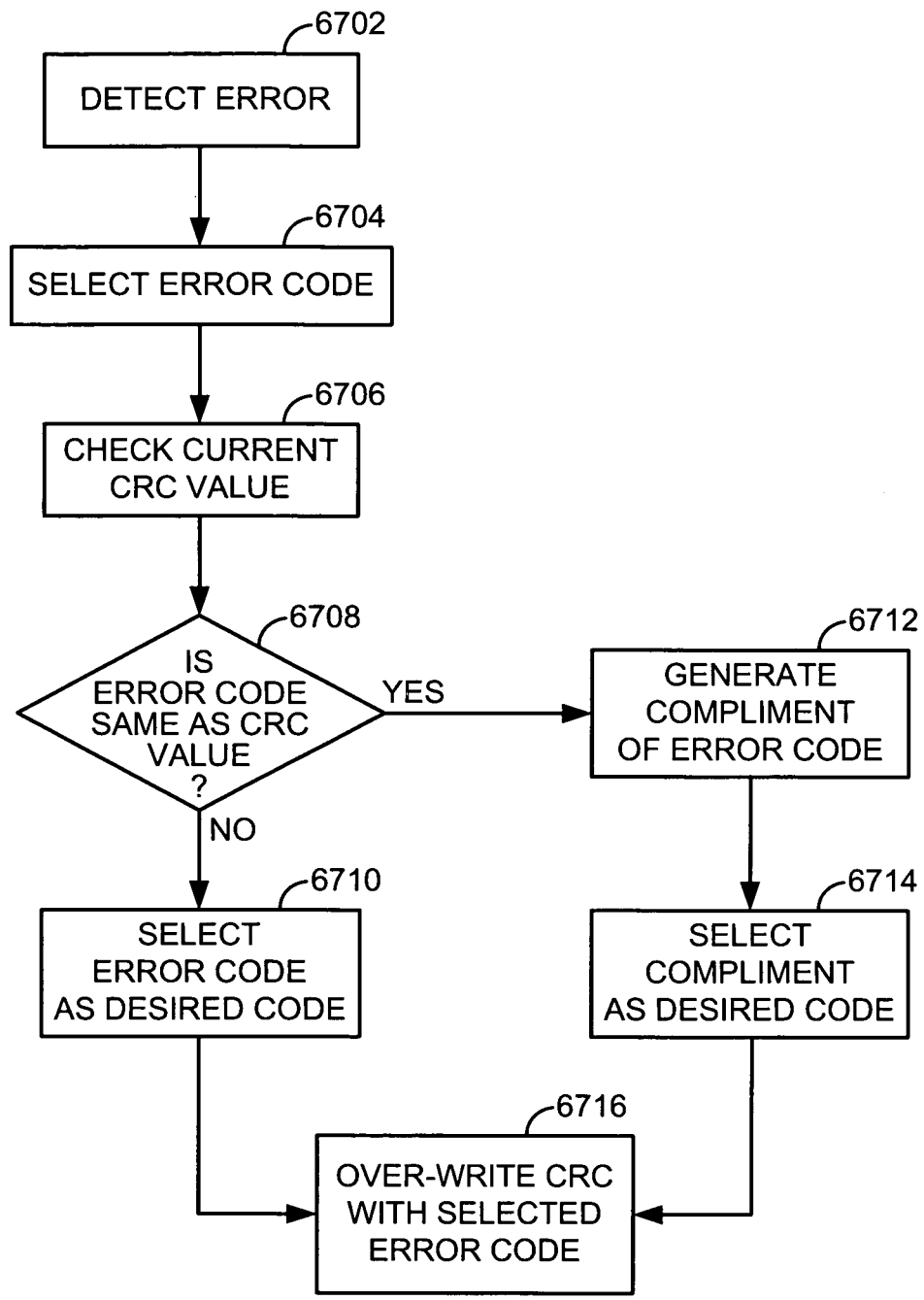
FIG. 67A illustrates error code transfer processing for code overloading.
Figure 67B:
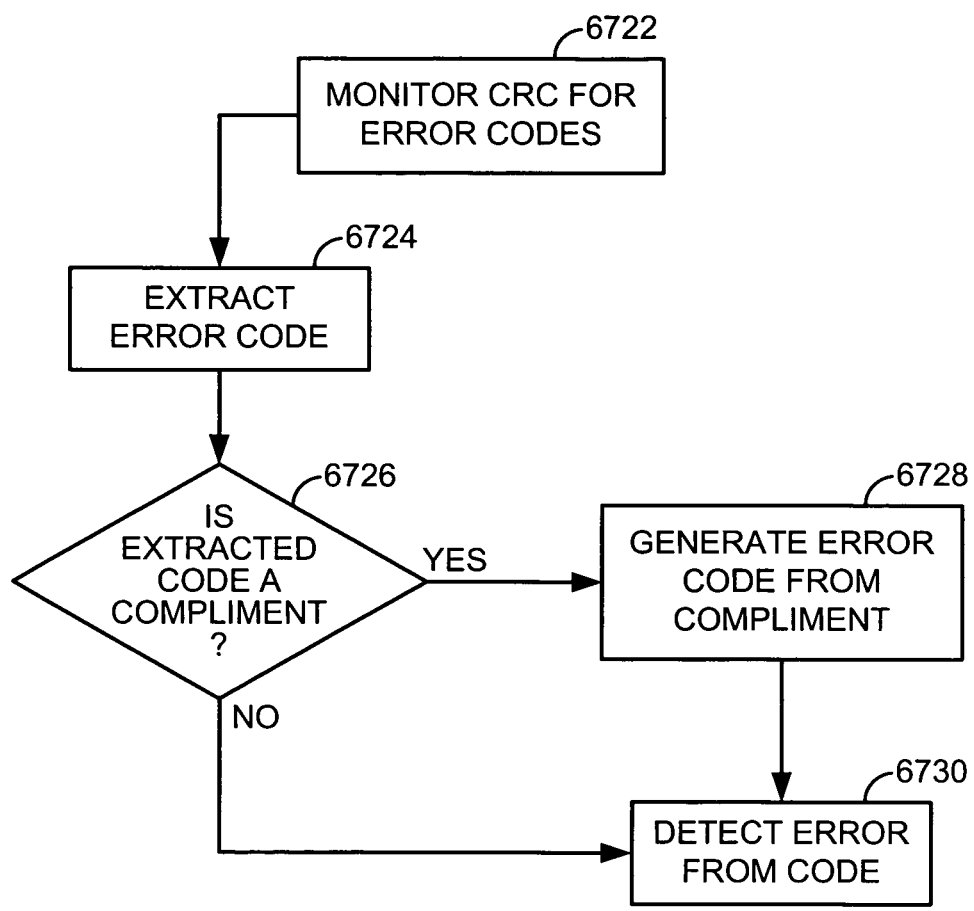
FIG. 67B illustrates error code transfer processing for code reception.

The general processing the overwriting mechanism of FIG. 66 is implementing is shown in additional detail in FIGS. 67A and 67B. In 67A an error, one or more, is detected in step 6702 in the communication data or process and an error code is selected in step 6704 to indicate this condition. At the same time, or at an appropriate point, the CRC value to be replaced is checked in a step 6706, and compared to the desired error code in step 6708. The result of this comparison, as discussed earlier, is a determination as to whether or not the desired code, or other representative values, will be the same as the CRC value present. If this is the case, then processing proceeds to a step 6712 where the compliment, or in some cases another representative value, as desired, is selected as the code to insert. One it has been determined what error codes or values are to be inserted in steps 6710 and 6714, that appropriate code is selected for insertion. These steps are illustrated as separate for purposes of clarity but generally represent a single choice based on the output of the step 6708 decision. Finally, in step 6716 the appropriate values are overwritten in the CRC location for transfer with the packets being targeted by the process.

On the packet reception side, as shown in FIG. 67B, the packet CRC values are being monitored in a step 6722. Generally, the CRC values are being monitored by one or more processes within the system to determine if an error in data transfer has occurred and whether or not to request a retransmission of the packet or packets, or to inhibit further operations and so forth, some of which is discussed above. As part of such monitoring the information can also be used to compare values to known or preselected error codes, or representative values and detect the presence of errors. Alternatively, a separate error detection process and monitor can be implemented. If a code appears to be present it is extracted or otherwise noted in step 6724 for further processing. A determination can be made in step 6726 as to whether or not this is the actual code or a compliment, in which case an additional step 6728 is used to translate the value to the desired code value. In either case the resulting extracted code, compliment, or other recovered values are then used to detect what error has occurred form the transmitted code in step 6730.

V. Link Hibernation

The MDDI link can enter the hibernation state quickly and wake up from hibernation quickly. This responsiveness allows a communicating system or device to force the MDDI link into hibernation frequently to reduce power consumption, since it can wake up again for use very quickly. In one embodiment, as an external mode client wakes up from hibernation for the first time it does so at a data rate and with strobe pulse timing that is consistent with a 1 Mbps rate, that is, the MDDI_Stb pair should toggle at a 500 kHz rate. Once characteristics of the client have been discovered by or communicated to the host, then the host may wake up the link at generally any rate from 1 Mbps to the maximum rate at which the client can operate. Internal mode clients may wake up at any rate at which both the host and client can operate. This is also generally applicable to the first time an internal mode client wakes up.

In one embodiment, when the link wakes up from hibernation the host and client exchange a sequence of pulses. These pulses can be detected using low-speed line receivers that consume only a fraction of the current as the differential receivers required to receive the signals at the maximum link operating speed. Either the host or client can wake up the link, so the wake-up protocol is designed to handle possible contention that can occur if both host and client attempt to wake up simultaneously.

During the hibernation state the MDDI_Data and MDDI_Stb differential drivers are disabled and the differential voltage across all differential pairs is zero volts. The differential line receivers used to detect the sequence of pulses during the wake-up from hibernation have an intentional voltage offset. In one embodiment, the threshold between a logic-one and logic-zero level in these receivers is approximately 125 mV. This causes an un-driven differential pair to be seen as a logic-zero level during the link wake-up sequence.

In order to enter a Hibernation State, the host sends 64 MDDI_Stb cycles after the CRC of the Link Shutdown Packet. The host disables the MDDI_Data0 output of the host in the range of 16 to 56 MDDI_Stb cycles (including output disable propagation delays) after the CRC. The host finishes sending the 64 MDDI_Stb cycles after the CRC of the Link Shutdown packet before it initiates the wake-up sequence. In one embodiment, the host-initiated wake-up is defined as the host having to wait at least 100 nsec after MDDI_Data0 reaches a valid logic-one level before driving pulses on MDDI_Stb. In one embodiment, the client waits at least 60 MDDI_Stb cycles after the CRC of the Link Shutdown Packet before it drives MDDI_Data0 to a logic-one level to attempt to wake-up the host.

In order to "wake-up" from a Hibernation State, several actions or processes are undertaken. When the client, here a display, needs data or communication, service, from the host it drives the MDDI_Data0 line to a logic-one state for around 70 to 1000 μsec, while MDDI_Stb is inactive and keeps MDDI_Data0 driven to a logic-one level for about 70 MDDI_Stb cycles (over a range of 60 to 80) after MDDI_Stb becomes active, although other periods can be used as desired. The client then disables the MDDI_Data0 driver by placing it into a high-impedance state.

If MDDI_Stb is active during hibernation, although unlikely, then the client might only drive MDDI_Data0 to a logic-one state for about 70 MDDI_Stb cycles (over a range of 60 to 80). This action causes the host to start or restart data traffic on the forward link (208) and to poll the client for its status.

The host must detect the presence of the request pulse and begins the startup sequence of first driving the MDDI_Stb to logic-zero level and MDDI_Data0 to a logic-high level for at least around 100 nsec. And then while toggling MDDI_Stb continue to drive MDDI_Data0 to a logic-one level for about 150 MDDI_Stb cycles (a range of 140 to 160) and to logic-zero for about 50 MDDI_Stb cycles. The client should not send a service request pulse if it detects MDDI_Data0 in the logic-one state for more than 80 MDDI_Stb cycles. When the client has detected MDDI_Data0 at a logic-one level for 60 to 80 MDDI_Stb cycles it begins to search for the interval where the host drives MDDI_Data0 to a logic-zero level for 50 MDDI_Stb cycles. After the host drives MDDI_Data0 to a logic-zero level for a duration of 50 MDDI_Stb cycles, then the host starts sending packets on the link. The first packet sent is a Sub-frame Header Packet. The client begins to look for the Sub-frame Header Packet after MDDI_Data0 is at a logic-zero level for 40 MDDI_Stb cycles of the 50 cycle interval. The nature of selection of the times and tolerances of time intervals related to the hibernation processing and start up sequence are discussed further below. (See FIGS. 68A-C below.)

The host may initiate the wake-up by first enabling MDDI_Stb and simultaneously drive it to a logic-zero level. MDDI_Stb should not be driven to a logic-one level until pulses are output as described below. After MDDI_Stb reaches a logic-zero level the host enables MDDI_Data0 and simultaneously drives it to a logic-one level. MDDI_Data0 should not be driven to a logic-zero level until the interval where it is driven to a logic-zero level for an interval of 50 MDDI_Stb pulses as described below. The host should wait at least 100 nsec after MDDI_Data0 reaches a valid logic-one level before driving pulses on MDDI_Stb. This timing relationship occurs while considering the worst-case output enable delays. This substantially guarantees that a client has sufficient time to fully enable its MDDI_Stb receiver after being awakened by a logic-one level on MDDI_Data0 that was driven by the host.

An example of the processing steps for a typical client service request event 3800 with no contention is illustrated in FIG. 38, where the events are labeled for convenience in illustration using the letters A, B, C, D, E, F, and G. The process commences at point A when the host sends a Link Shutdown Packet to the client device to inform it that the link will transition to a low-power hibernation state. In a next step, the host enters the low-power hibernation state by disabling the MDDI_Data0 driver and setting the MDDI_Stb driver to a logic zero, as shown at point B. MDDI_Data0 is driven to a logic-zero level by a high-impedance bias network. After some period of time, the client sends a service request pulse to the host by driving MDDI_Data0 to a logic one level as seen at point C. The host still asserts the logic-zero level using the high-impedance bias network, but the driver in the client forces the line to a logic one level. Within 50 μsec, the host recognizes the service request pulse, and asserts a logic one level on MDDI_Data0 by enabling its driver, as seen at point D. The client then ceases from attempting to assert the service request pulse, and the client places its driver into a high-impedance state, as seen at point E. The host drives MDDI_Data0 to a logic-zero level for 50 μsec, as shown at point F, and also begins to generate MDDI_Stb in a manner consistent with the logic-zero level on MDDI_Data0. The client begins to look for the Sub-frame Header Packet after MDDI_Data0 is at a logic-zero level for 40 MDDI_Stb cycles. After asserting MDDI_Data0 to a logic-zero level and driving MDDI_Stb for 50 μsec, the host begins to transmit data on the forward link by sending a Sub-frame Header Packet, as shown at point G.

A similar example is illustrated in FIG. 39 where a service request is asserted after the link restart sequence has begun, and the events are again labeled using the letters A, B, C, D, E, F, and G. This represents a worst case scenario where a request pulse or signal from the client comes closest to corrupting the Sub-frame Header Packet. The process commences at point A when the host again sends a Link Shutdown Packet to the client device to inform it that the link will transition to a low-power hibernation state. In a next step, the host enters the low-power hibernation state by disabling the MDDI_Data0 driver and setting the MDDI_Stb driver to a logic-zero level, as shown at point B. As before, MDDI_Data0 is driven to a logic-zero level by a high-impedance bias network. After a period of time, the host begins the link restart sequence by driving MDDI_Data0 to a logic-one level for 150 μsec as seen at point C. Prior to 50 μsec passing after the link restart sequence begins the display also asserts MDDI_Data0 for a duration of 70 μsec, as seen at point D. This happens because the display has a need to request service from the host and does not recognize that the host has already begun the link restart sequence. The client then ceases attempting to assert the service request pulse, and the client places its driver into a high-impedance state, as seen at point E. The host continues to drive MDDI_Data0 to a logic-one level. The host drives MDDI_Data0 to a logic-zero level for 50 μsec, as shown at point F, and also begins to generate MDDI_Stb in a manner consistent with the logic zero level on MDDI_Data0. After asserting MDDI_Data0 to a logic-zero level, and driving MDDI_Stb for 50 μsec, the host begins to transmit data on the forward link by sending a Sub-frame Header Packet, as shown at point G.

From the above discussion, one sees that the prior solution involved having the host go through two states as part of a wakeup sequence. For the first state, the host drives the MDDI_Data0 signal high for 150 μs, and then drives the MDDI_Data0 signal low for 50 us while activating the MDDI_Stb line, and then begins to transmit MDDI packets. This process works well to advance the state of the art in terms of data rates achievable using the MDDI apparatus and methods. However, as stated earlier, more speed in terms of reduced response time to conditions or being able to more quickly select the next step or process, are the ability to simplify processing or elements, are always in demand.

Applicants have discovered a new inventive approach to wake-up processing and timing in which the host uses a clock cycle based timing for the signal toggling. In this configuration, the host starts toggling MDDI_Stb from 0 to 10 μsec after the host drives the MDDI_Data0 signal high at the beginning of the wake-up sequence, and does not wait until the signal is driven low. During a wake-up sequence, the host toggles MDDI_Stb as though the MDDI_Data0 signal were always at a logic-zero level. This effectively removes the concept of time from the client side, and the host changes from the prior 150 μs and 50 μs periods for the first two states, to 150 clock cycles and 50 clock cycles, for these periods.

The host now becomes responsible for driving that data line high, and within 10 clock cycles starting to transmit a strobe signal as if the data line was zero. After the host has driven the data line high for 150 clock cycles, the host drives the data line low for 50 clock cycles while continuing to transmit the strobe signal. After it has completed both of these processes, the host can begin to transmit the first sub-frame header packet.

On the client side, the client implementation can now use the generated clock to calculate the number of clock cycles that the data line is first high, and then low. The number of clock cycles that need to occur in both the data line driven high state is 150 and data line driven low state is 50. This means that for a proper wakeup sequence, the client should be able to count at least 150 continuous clock cycles of the data line being high, followed by at least 50 continuous clock cycles of the data line being low. Once these two conditions are met, the client can begin to search for the unique word of the first sub-frame. A break in this pattern is used as a basis to return the counters to an initial state in which the client again looks for the first 150 continuous clock cycles of the data line being high.

A client implementation of the invention for host based wakeup from hibernation is very similar to the initial start-up case except that the clock rate is not forced to start at 1 Mbps, as discussed earlier. Instead the clock rate can be set to resume at whatever previous rate was active when the communication link went into hibernation. If the host begins transmission of a strobe signal as described above, the client should be able to again count at least 150 continuous clock cycles of the data line being high, followed by at least 50 continuous clock cycles of the data line being low. Once these two conditions have been met, the client can begin the search for the unique word.

A client implementation of the invention for client based wakeup from hibernation is similar to the host based wakeup except that it starts by having the client driving the data line. The client can asynchronously drive the data line without a clock to wake up the host device. Once the host recognizes that the data line is being driven high by the client, it can begin its wakeup sequence. The client can count the number of clock cycles generated by the host starting or during its wakeup process. Once the client counts 70 continuous clock cycles of the data being high, it can stop driving the data line high. At this point, the host should already be driving the data line high as well. The client can then count another 80 continuous clock cycles of the data line being high to reach the 150 clock cycles of the data line being high, and can then look for 50 clock cycles of the data line being low. Once these three conditions have been met the client can begin to look for the unique word.

An advantage of this new implementation of wake-up processing is that it removes the need for a time measuring device. Whether this is an oscillator, or capacitor discharge circuit, or other such known devices, the client no longer needs such external devices to determine the start up conditions. This saves money and circuit area when implementing controllers, counters, and so forth on a client device board. While this may not be as advantageous to the client, for the host, this technique should also potentially simplify the host in terms of very high density logic (VHDL) being used for core circuitry. The power consumption of using the data and strobe lines as the wakeup notification and measurement source will also be lower since no external circuitry will need to be running for the core elements to be waiting for a host based wakeup. The number of cycles or clock periods used are exemplary and other periods can be used as will be apparent to one skilled in the art.

To clarify and illustrate the operation of this new technique, the timing of MDDI_Data0, MDDI_Stb, and various operations relative to the clock cycles are shown in FIGS. 68A, 68B, and 68C.

An example of the processing steps for a typical Host-initiated Wake-up with no contention is illustrated in FIG. 68A, where the events are again labeled for convenience in illustration using the letters A, B, C, D, E, F, and G. The process commences at point A when the host sends a Link Shutdown Packet to the client device to inform it that the link will transition to a low-power hibernation state. In a next step, point B, the host toggles MDDI_Stb for about 64 cycles (or as desired for system design) to allow processing by the client to be completed prior to stopping MDDI_Stb from toggling, which stops the recovered clock in the client device. The host also initially sets MDDI_Data0 to logic-zero level and then disables the MDDI_Data0 output in the range of 16 to 48 cycles (generally including output disable propagation delays) after the CRC. It may be desirable to place high-speed receivers for MDDI_Data0 and MDDI_Stb in the client in a low power state some time after the 48 cycles after the CRC and prior to the next stage (C). The client places its high-speed receivers for MDDI_Data0 and MDDI_Stb into hibernation any time after the rising edge of the $48^{th}$ MDDI_Stb cycle after the CRC of the Link Shutdown Packet. It is recommended that the client place its high-speed receivers for MDDI_Data0 and MDDI_Stb into hibernation before the rising edge of the $64^{th}$ MDDI_Stb cycle after the CRC of the Link Shutdown Packet.

The host enters the low-power hibernation state at point or step C, by disabling the MDDI_Data0 and MDDI_Stb drivers and placing a host controller in a low power hibernation state. One can also set the MDDI_Stb driver to a logic-zero level (using a high-impedance bias network) or to continue toggling during hibernation, as desired. The client is also in a low power level hibernation state.

After some period of time, the host commences the link restart sequence at point D, by enabling the MDDI_Data0 and MDDI_Stb driver output. The host drives MDDI_Data0 to a logic-one level and MDDI_Stb to a logic-zero level for as long as it should take for the drivers to fully enable their respective outputs. The host typically waits around 200 nanoseconds after these outputs reach desired logic levels before driving pulses on MMDI_Stb. This allows the client time to prepare to receive.

With the host drivers enabled and MDDI_Data0 being driven to a logic-one level, the host begins to toggle MDDI_Stb for a duration of 150 MDDI_Stb cycles, as seen at point E. The host drives MDDI_Data0 to a logic zero level for 50 cycles, as shown at point F, and the client begins to look for the Sub-frame Header Packet after MDDI_Data0 is at a logic-zero level for 40 MDDI_Stb cycles. The host begins to transmit data on the forward link by sending a Sub-frame Header Packet, as shown at point G.

An example of the processing steps for a typical Client-initiated Wake-up with no contention is illustrated in FIG. 68B, where the events are again labeled for convenience in illustration using the letters A, B, C, D, E, F, G, H, and I. As before, the process commences at point A when the host sends a Link Shutdown Packet to inform the client that the link will transition to the low power state.

At point B, the host toggles MDDI_Stb for about 64 cycles (or as desired for system design) to allow processing by the client to be completed prior to stopping MDDI_Stb from toggling, which stops the recovered clock in the client device. The host also initially sets MDDI_Data0 to a logic-zero level and then disables the MDDI_Data0 output in the range of 16 to 48 cycles (generally including output disable propagation delays) after the CRC. It may be desirable to place high-speed receivers for MDDI_Data0 and MDDI_Stb in the client in a low power state some time after the 48 cycles after the CRC and prior to the next stage (C).

The host enters the low-power hibernation state at point or step C, by disabling the MDDI_Data0 and MDDI_Stb drivers and placing a host controller in a low power hibernation state. One can also set the MDDI_Stb driver to a logic-zero level (using a high-impedance bias network) or to continue toggling during hibernation, as desired. The client is also in a low power level hibernation state.

After some period of time, the client commences the link restart sequence at point D, by enabling the MDDI_Stb receiver, and also enabling an offset in the MDDI_Stb receiver to guarantee the state of the received version of MDDI_Stb is a logic-zero level in the client before the host enables its MDDI_Stb driver. It may be desirable for the client to enable the offset slightly ahead of enabling the receiver to ensure the reception of a valid differential signal and inhibit erroneous signals, as desired. The Client enables the MDDI_Data0 driver while driving the MDDI_Data0 line to a logic one level. It is allowed for MDDI_Data0 and MDDI_Stb to be enabled simultaneously if the time to enable the offset and the standard MDDI_Stb differential receiver is less than 100 nsec.

Within about 1 msec., point E, the host recognizes the service request pulse from the client, and the host begins the link restart sequence by enabling the MDDI_Data0 and MDDI_Stb driver outputs. The host drives MDDI_Data0 to a logic-one level and MDDI_Stb to a logic-zero level for as long as it should take for the drivers to enable their respective outputs. The host typically waits around 200 nanoseconds after these outputs reach desired logic levels before driving pulses on MDDI_Stb. This allows the client time to prepare to receive.

With the host drivers enabled and MDDI_Data0 being driven to a logic-one level, the host begins outputting pulses on MDDI_Stb for a duration of 150 MDDI_Stb cycles, as seen at point F. When the client recognizes the first pulse on MDDI_Stb it disables the offset in its MDDI_Stb receiver. The client continues to drive MDDI_Data0 to a logic-one level for 70 MDDI_Stb cycles, and disables its MDDI_Data0 driver at point G. The host continues to drive MDDI_Data0 to a logic-one level for a duration of 80 additional MDDI_Stb pulses, and at point H drives MDDI_Data0 to a logic-zero level.

As seen at points G and H, the host drives MDDI_Data0 to a logic-zero level for 50 cycles, and the client begins to look for the Sub-frame Header Packet after MDDI_Data0 is at a logic-zero level for 40 MDDI_Stb cycles. After driving MDDI_Stb for a duration of 50 cycles, the host begins to transmit data on the forward link by sending a Sub-frame Header Packet, as shown at point I.

An example of the processing steps for a typical Host-initiated Wake-up with contention from the client, that is the client also wants to wake up the link, is illustrated in FIG. 68C. The events are again labeled for convenience in illustration using the letters A, B, C, D, E, F, G, H, and I. As before, the process commences at point A when the host sends a Link Shutdown Packet to inform the client that the link will transition to the low power state, proceeds to point B where MDDI_Stb is toggled for about 64 cycles (or as desired for system design) to allow processing by the client to be completed, and then to point C, where the host enters the low-power hibernation state, by disabling the MDDI_Data0 and MDDI_Stb drivers and placing a host controller in a low power hibernation state. After some period of time, the host commences the link restart sequence at point D, by enabling the MDDI_Data0 and MDDI_Stb driver output, and begins to toggle MDDI_Stb for a duration of 150 MDDI_Stb cycles, as seen at point E.

At up to 70 MDDI_Stb cycles after point E, here point F, the client has not yet recognized that the host is driving MDDI_Data0 to a logic-one level so the client also drives MDDI_Data0 to a logic-one level. This occurs here because the client has a desire to request service but does not recognize that the host it is trying to communicate with has already begun the link restart sequence. At point G, the client ceases to drive MDDI_Data0, and places its driver into a high impedance state by disabling its output. The host continues to drive MDDI_Data0 to a logic-one level for 80 additional cycles.

The host drives MDDI_Data0 to a logic zero level for 50 cycles, as shown at point H, and the client begins to look for the Sub-frame Header Packet after MDDI_Data0 is at a logic-zero level for 40 MDDI_Stb cycles. The host begins to transmit data on the forward link by sending a Sub-frame Header Packet, as shown at point I.

VI. Interface Electrical Specifications

In the example embodiments, Data in a Non-Return-to-Zero (NRZ) format is encoded using a data-strobe signal or DATA-STB format, which allows clock information to be embedded in the data and strobe signals. The clock can be recovered without complex phase lock loop circuitry. Data is carried over a bi-directional differential link, generally implemented using a wire-line cable, although other conductors, printed wires, or transfer elements can be used, as stated earlier. The strobe signal (STB) is carried over a uni-directional link which is driven only by the host. The strobe signal toggles value (0 or 1) whenever there is a back-to-back state, 0 or 1, that remains the same on the Data line or signal.

Figure 40:
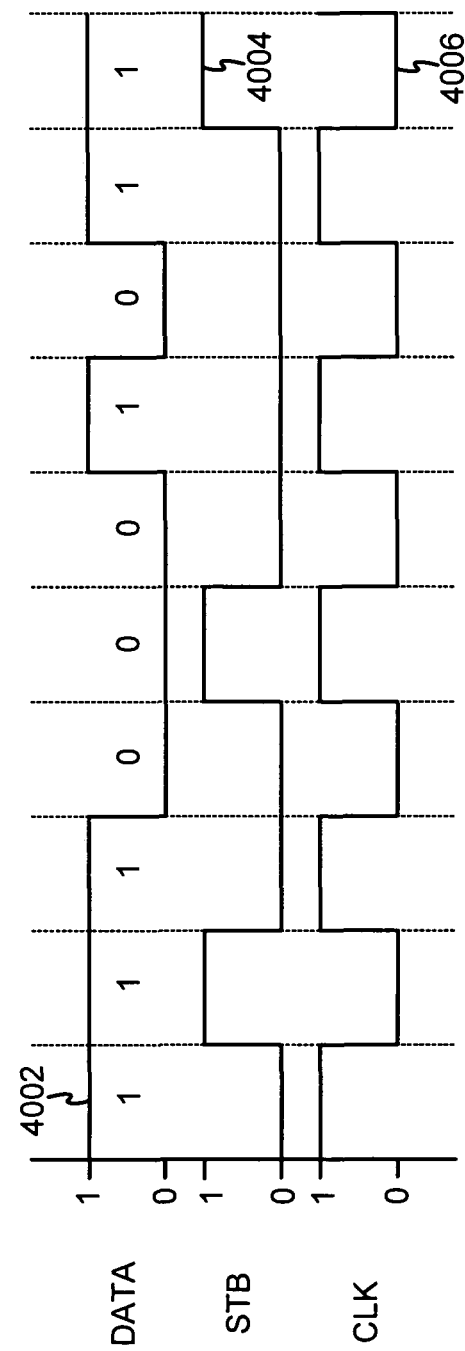
FIG. 40 illustrates how a data sequence can be transmitted using DATA-STB encoding.

An example of how a data sequence such as bits "1110001011" can be transmitted using DATA-STB encoding is shown in graphical form in FIG. 40. In FIG. 40, a DATA signal 4002 is shown on the top line of a signal timing chart and a STB signal 4004 is shown on a second line, each time aligned as appropriate (common starting point). As time passes, when there is a change of state occurring on the DATA line 4002 (signal), then the STB line 4004 (signal) maintains a previous state, thus, the first '1' state of the DATA signal correlates with the first 'O' state for the STB signal, its starting value. However, if or when the state, level, of the DATA signal does not change then the STB signal toggles to the opposite state or '1' in the present example, as is the case in FIG. 40 where the DATA is providing another '1' value. That is, there is one and only one transition per bit cycle between DATA and STB. Therefore, the STB signal transitions again, this time to '0' as the DATA signal stays at '1' and holds this level or value as the DATA signal changes level to 'O'. When the DATA signal stays at '1', the STB signal toggles to the opposite state or '1' in the present example, and so forth, as the DATA signal changes or holds levels or values.

Upon receiving these signals, an exclusive-OR (XOR) operation is performed on the DATA and STB signals to produce a clock signal 4006, which is shown on the bottom of the timing chart for relative comparison with the desired data and strobe signals. An example of circuitry useful for generating the DATA and STB outputs or signals from input data at the host, and then recovering or recapturing the data from the DATA and STB signals at the client, is shown in FIG. 41.

Figure 41:
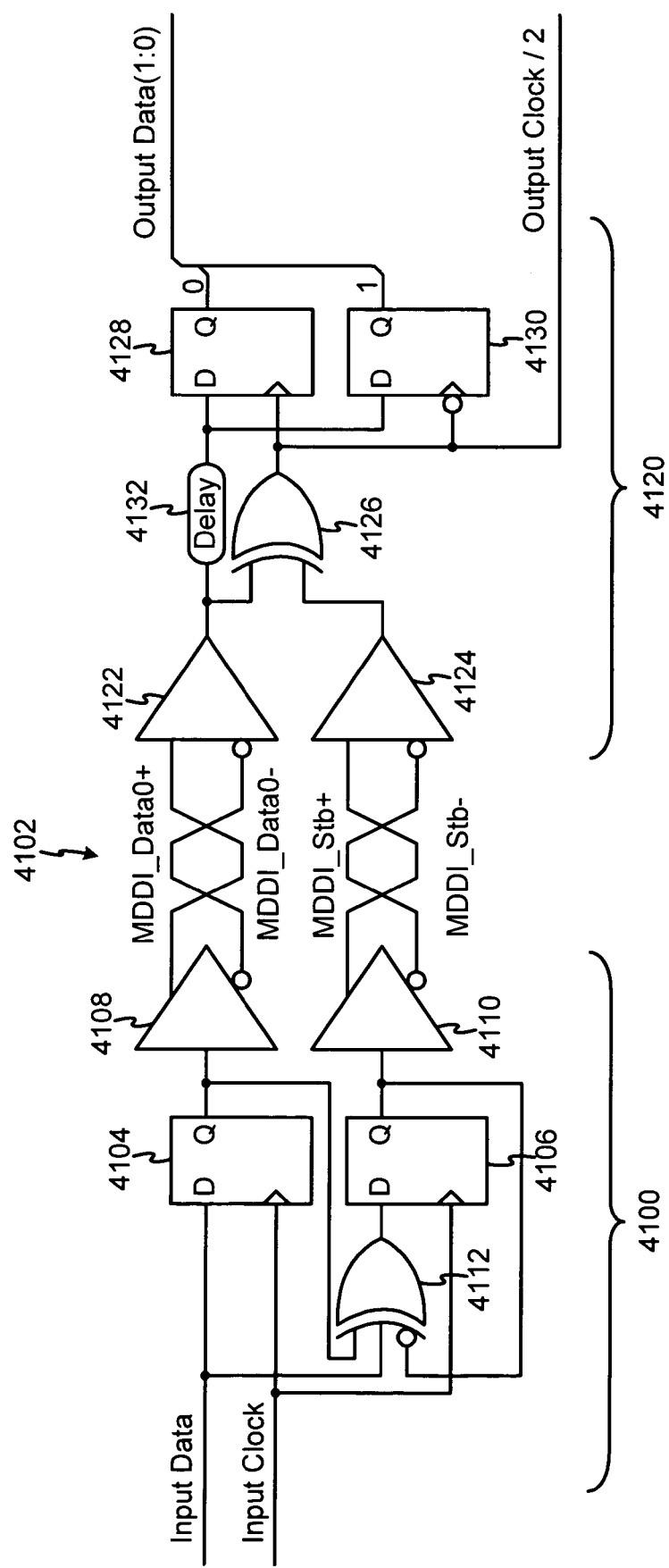
FIG. 41 illustrates circuitry useful for generating the DATA and STB signals from input data at the host, and then recovering the data at the client.

In FIG. 41, a transmission portion 4100 is used to generate and transmit the original DATA and STB signals over an intermediary signal path 4102, while a reception portion 4120 is used to receive the signals and recover the data. As shown in FIG. 41, in order to transfer data from a host to a client, the DATA signal is input to two D-type flip-flop circuit elements 4104 and 4106 along with a clock signal for triggering the circuits. The two flip-flop circuit outputs (Q) are then split into a differential pair of signals MDDI_Data0+, MDDI_Data0− and MDDI_Stb+, MDDI_Stb−, respectively, using two differential line drivers 4108 and 4110 (voltage mode). A three-input exclusive-NOR (XNOR) gate, circuit, or logic element 4112 is connected to receive the DATA and outputs of both flip-flops, and generates an output that provides the data input for the second flip-flop, which in turn generates the MDDI_Stb+, MDDI_Stb− signals. For convenience, the XNOR gate has the inversion bubble placed to indicate that it is effectively inverting the Q output of the flip-flop that generates the Strobe.

In reception portion 4120 of FIG. 41, the MDDI_Data0+, MDDI_Data0− and MDDI_Stb+, MDDI_Stb− signals are received by each of two differential line receivers 4122 and 4124, which generate single outputs from the differential signals. The outputs of the amplifiers are then input to each of the inputs of a two-input exclusive-OR (XOR) gate, circuit, or logic element 4126 which produces the clock signal. The clock signal is used to trigger each of two D-type flip-flop circuits 4128 and 4130 which receive a delayed version of the DATA signal, through delay element 4132, one of which (4128) generates data '0' values and the other (4130) data '1' values. The clock has an independent output from the XOR logic as well. Since the clock information is distributed between the DATA and STB lines, neither signal transitions between states faster than half of the clock rate. Since the clock is reproduced using the exclusive-OR processing of the DATA and STB signals, the system effectively tolerates twice the amount of skew between the input data and clock compared to the situation when a clock signal is sent directly over a single dedicated data line.

The MDDI Data pairs, MDDI_Stb+, and MDDI_Stb− signals are operated in a differential mode to maximize immunity from the negative affects of noise. Each differential pair is parallel-terminated with the characteristic impedance of the cable or conductor being used to transfer signals. Generally, all parallel-terminations reside in the client device. This is near the differential receiver for forward traffic (data sent from the host to the client), but it is at the driving end of the cable or other conductors or transfer elements for reverse traffic (data sent from the client to the host). For reverse traffic the signal is driven by the client, reflected by the high impedance receiver at the host, and is terminated at the client. This avoids the need for a double termination that would increase current consumption. It also functions at data rates greater than the reciprocal of the round-trip delay in the cable. The MDDI_Stb+ and MDDI_Stb− conductors or signals are only driven by the host.

Figure 42:
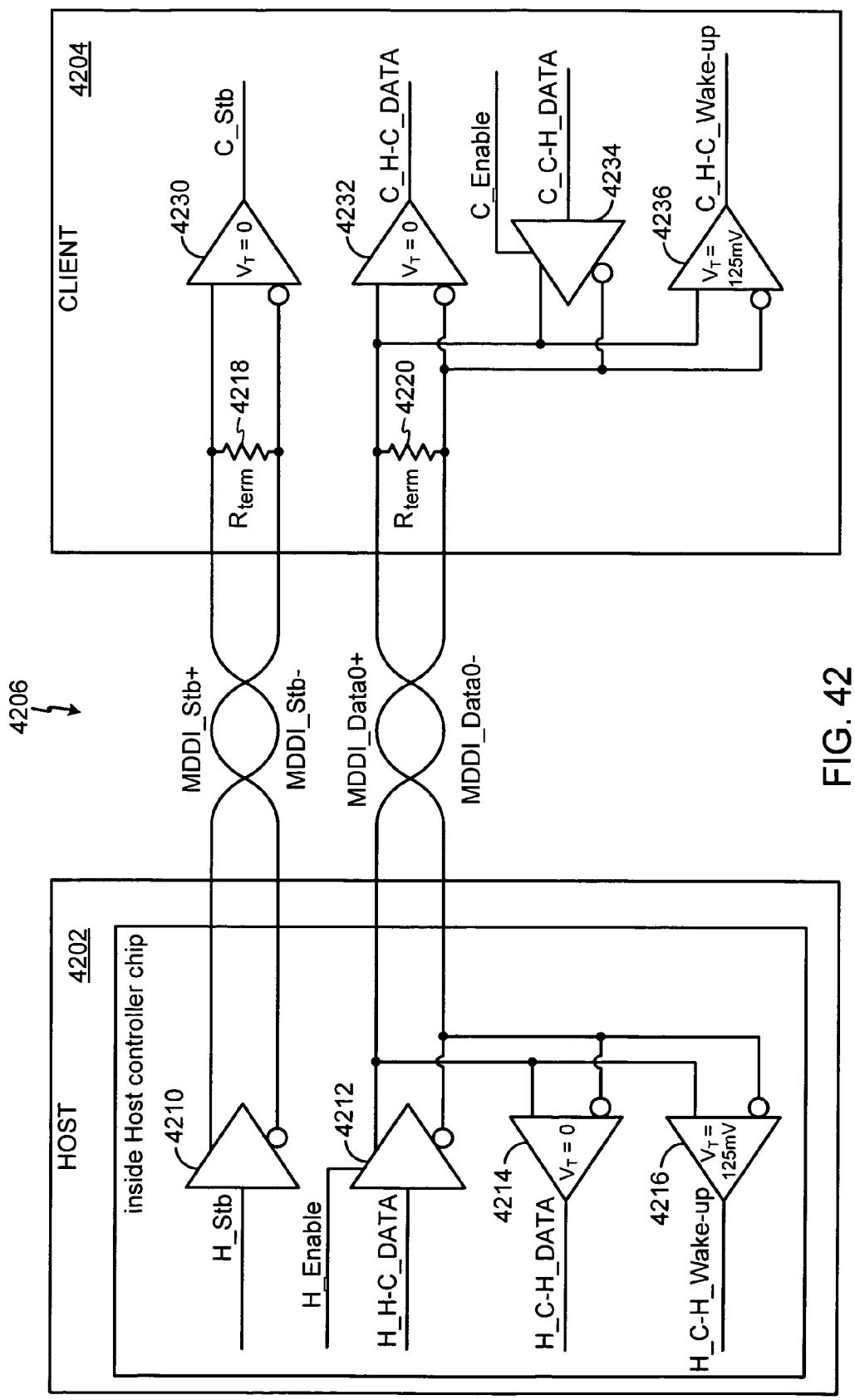
FIG. 42 illustrates drivers and terminating resistors useful for implementing one embodiment.

An exemplary configuration of elements useful for achieving the drivers, receivers, and terminations for transferring signals as part of the inventive MDD interface are shown in FIG. 42. This exemplary interface uses low voltage sensing, here 200 mV, with less than 1 volt power swings and low power drain. The driver of each signal pair has a differential current output. While receiving MDDI packets the MDDI_Data and MDDI_Stb pairs use a conventional differential receiver with a voltage threshold of zero volts. In the hibernation state the driver outputs are disabled and the parallel-termination resistors pull the voltage on each signal pair to zero volts. During hibernation a special receiver on the MDDI_Data0 pair has an offset input threshold of positive 125 mV, which causes the hibernation line receiver to interpret the un-driven signal pair as a logic-zero level.

Sometimes the host or client simultaneously drive the differential pair to a logic-one level or a logic-zero level to guarantee a valid logic-level on the pair when the direction of data flow changes (from host-to-client or client-to-host). The output voltage range and output specifications are still met with simultaneously driven outputs driven to the same logic level. In some systems it may be necessary to drive a small current into the terminated differential pair to create a small offset voltage at certain times during hibernation and when the link is waking up from the hibernation state. In those situations, the enabled offset-current bias circuits drive the current levels referred to as: $I_{ESD\text{-}and\text{-}Rx}$–internal ESD diode and differential receiver input with $I_{ESD\text{-}and\text{-}Rx} \leq 1$ µA typically; $I_{TX\text{-}Hi\text{-}Z}$–differential driver output in the high-impedance state, with $I_{Tx\text{-}Hi\text{-}Z} \leq 1$ µA typically; and $I_{external\text{-}ESD}$–the leakage through the external ESD protection diodes, with $I_{external\text{-}ESD} \leq 3$ µA typically.

Figure 101:
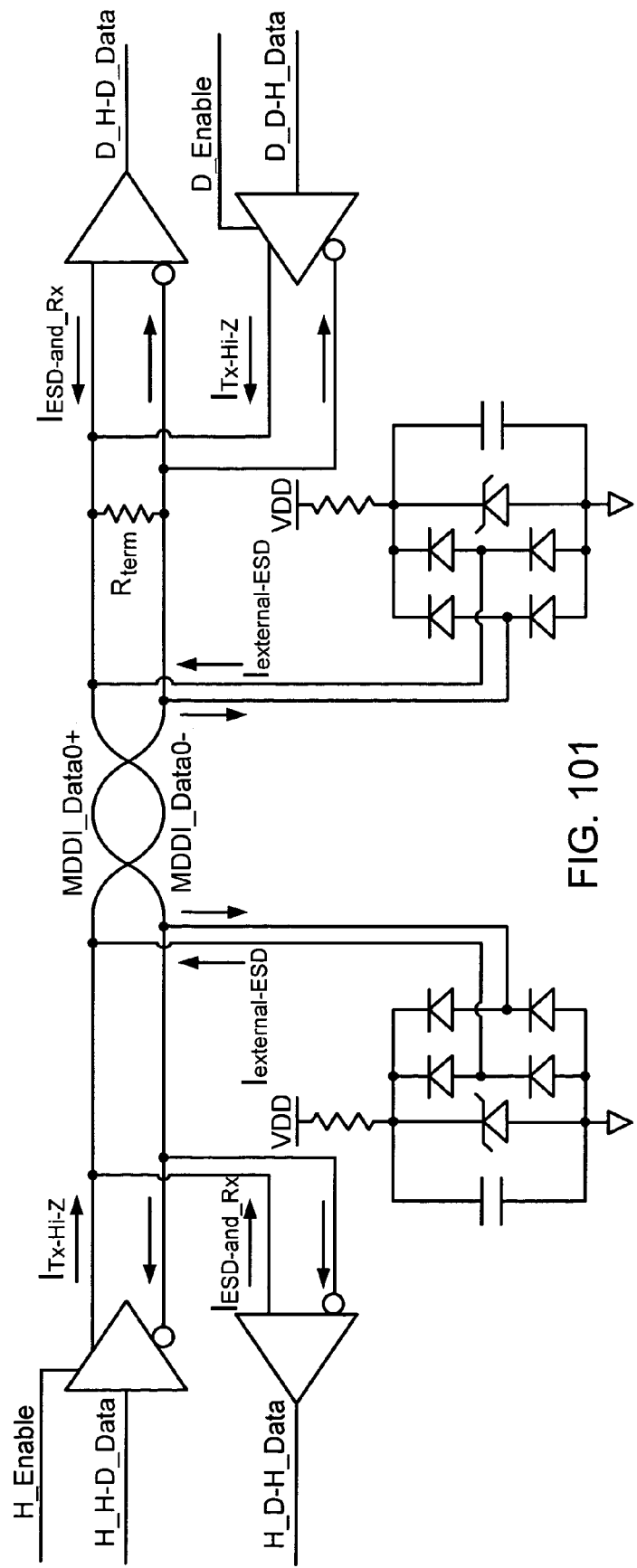
FIG. 101 illustrates leakage current analysis.

Each of these leakage currents is illustrated in FIG. 101. The pull-up and pull-down circuits must achieve the minimum differential voltage under the worst-case leakage conditions described above when all occur simultaneously. The total leakage is ≤4 µA for internal mode without external ESD protection diodes and ≤10 µA for external mode with external ESD protection.

The electrical parameters and characteristics of the differential line drivers and line receivers are described in Table VIII. Functionally, the driver transfers the logic level on the input directly to a positive output, and the inverse of the input to a negative output. The delay from input to outputs is well-matched to the differential line which is driven differentially. In most implementations, the voltage swing on the outputs is less than the swing on the input to minimize power consumption and electromagnetic emissions. Table VIII presents a minimum voltage swing to be around 0.5V. However, other values can be used, as would be known by those skilled in the art, and the inventors contemplate a smaller value in some embodiments, depending on design constraints.

The differential line receivers have the same characteristic as a high-speed voltage comparator. In FIG. 41, the input without the bubble is the positive input and the input with the bubble is the negative input. The output is a logic one if: (Vinput+)−(Vinput−) is greater than zero. Another way to describe this is a differential amplifier with very large (virtually infinite) gain with the output clipped at logic 0 and 1 voltage levels.

The delay skew between different pairs should be minimized to operate the differential transmission system at the highest potential speed.

In FIG. 42, a host controller 4202 and a client or display controller 4204 are shown transferring packets over the communication link 4206. The host controller employs a series of three drivers 4210, 4212, and 4214 to receive the host DATA and STB signals to be transferred, as well as to receive the client Data signals to be transferred, while the client employs the three drivers 4230, 4232, and 4234. The driver responsible for passage of the host DATA (4212) employs an enable signal input to allow activation of the communication link generally only when transfer from the host to the client is desired. Since the STB signal is formed as part of the transfer of data, no additional enable signal is employed for that driver (4212). The inputs of each of the client DATA and STB receivers (4132, 4230) have termination impedances or resistors 4218 and 4220, respectively paced across them. Driver 4234 in the client controller is used to prepare the data signals being transferred from the client to the host, where driver 4214 on the input side, processes the data.

The special receivers (drivers) 4216 and 4236 are coupled or connected to the DATA lines, and generate or use the 125 mV voltage offset previously discussed, as part of the hibernation control discussed elsewhere. The offsets cause the hibernation line receivers to interpret un-driven signal pairs as a logic-zero level.

The above drivers and impedances can be formed as discrete components or as part of a circuit module, or an application specific integrated circuit (ASIC) which acts as a more cost effective encoder or decoder solution.

It can be easily seen that power is transferred to the client device, or display, from the host device using the signals labeled HOST_Pwr and HOST_Gnd over a pair of conductors. The HOST_Gnd portion of the signal acts as the reference ground and the power supply return path or signal for the client device. The HOST_Pwr signal acts as the client device power supply which is driven by the host device In an exemplary configuration, for low power applications, the client device is allowed to draw up to 500 mA. The HOST_Pwr signal can be provided from portable power sources, such as but not limited to, a lithium-ion type battery or battery pack residing at the host device, and may range from 3.2 to 4.3 volts with respect to HOST_Gnd.

VII. Timing Characteristics

A. Overview

Figure 43:
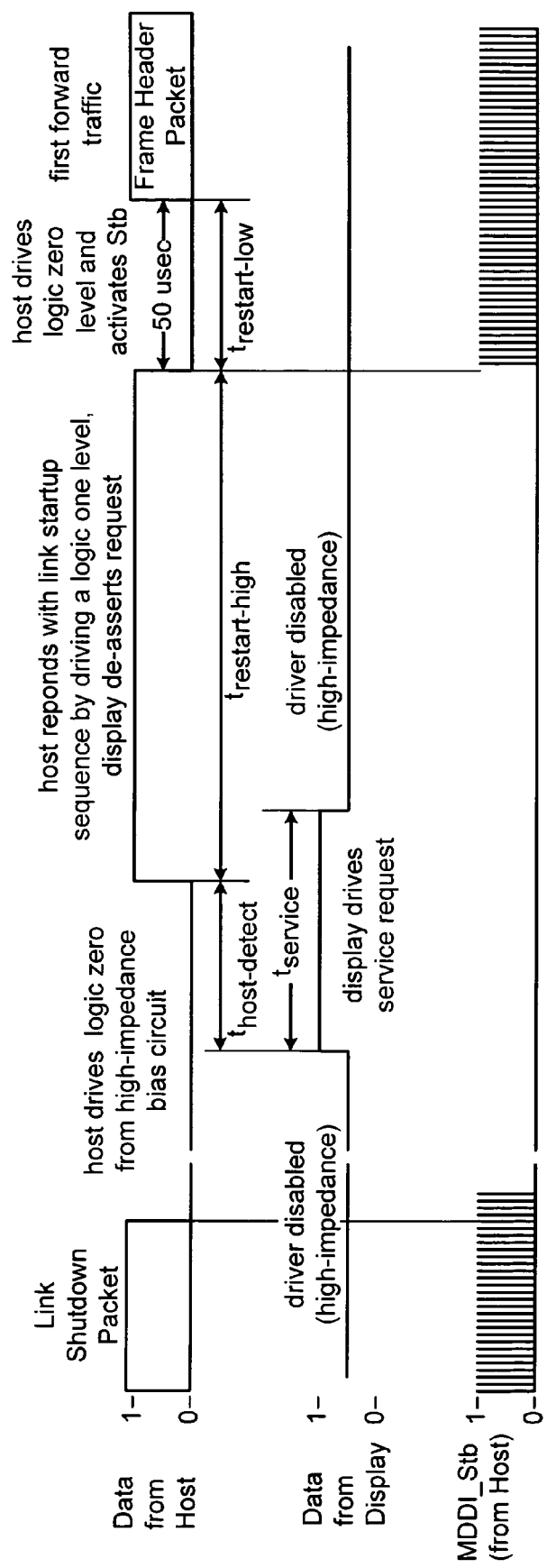
FIG. 43 illustrates steps and signal levels employed by a client to secure service from the host and by the host to provide such service.

The steps and signal levels employed by a client to secure service from the host and by the host to provide such service, are illustrated in FIG. 43. In FIG. 43, the first part of signals being illustrated shows a Link Shutdown Packet being transferred from the host and the data line is then driven to a logic zero state using the high-impedance bias circuit. No data is being transmitted by the client display, or host, which has its driver disabled. A series of strobe pulses for the MDDI_Stb signal line can be seen at the bottom, since MDDI_Stb is active during the Link Shutdown Packet. Once this packet ends and the logic level changes to zero as the host drives the bias circuit and logic to zero, the MDDI_Stb signal line changes to a logic-zero level as well. This represents the termination of the last signal transfer or service from the host, and could have occurred at any time in the past, and is included to show the prior cessation of service, and the state of the signals prior to service commencement. If desired, such as signal can be sent just to reset the communication link to the proper state without a 'known' prior communication having been undertaken by this host device.

As shown in FIG. 43, the signal output from the client is initially set at a logic level of zero. In other words, the client output is at a high impedance, and the driver is disabled. When service is being requested, the client enables its driver and sends a service request to the host, which is a period of time, designated $t_{service}$, during which the line is driven to a logic one level. A certain amount of time then passes or may be needed before the host detects the request, termed $t_{host\text{-}detect}$, after which the host responds with a link startup sequence by driving the signal to a logic one level. At this point, the client de-asserts the request, and disables the service request driver so that the output line from the client goes to a zero logic level again. During this time, the MDDI_Stb signal is at a logic zero level.

The host drives the host data output at the '1' level for a period termed restart-high, after which the host drives the logic level to zero and activates MDDI_Stb for a period termed $t_{restart\text{-}low}$, after which the first forward traffic begins with a Sub-Frame Header Packet, and the forward traffic packets are then transferred. The MDDI_Stb signal is active during the $t_{restart\text{-}low}$ period and the subsequent Sub-Frame Header Packet.

Tables VII and VIII show representative times or processing periods for the length of the various periods discussed above, and the relationship to exemplary minimum and maximum data rates, where:

$$t_{bit} = \frac{1}{\text{Link\_Data\_Rate}},$$

where Link_Data_Rate is the bit rate of a single data pair.

TABLE VII

| Parameter | Description | Min. | Typ. | Max. | Units |
|---|---|---|---|---|---|
| $t_{service}$ | Duration of display service request pulse | 60 | 70 | 80 | μsec |
| $t_{restart\text{-}high}$ | Duration of host link restart high pulse | 140 | 150 | 160 | μsec |
| $t_{restart\text{-}low}$ | Duration of host link restart low pulse | 40 | 50 | 60 | μsec |
| $t_{display\text{-}detect}$ | Time for display to detect link restart sequence | 1 | | 50 | μsec |
| $t_{host\text{-}detect}$ | Time for host to detect service request pulse | 1 | | 50 | μsec |
| $t_{st\text{-}stb}$ | Time from MDDI_Data0 high to MDDI_Stb toggling | 0 | | 10 | μsec |
| $1/t_{bit\text{-}min\text{-}perf}$ | Link data rate for a minimum performance device | 1 | | 1000 | kbps |
| $1/t_{bit\text{-}min\text{-}perf}$ | Link data rate for a minimum performance device | 0.001 | | 1.1 | Mbps |
| $1/t_{bit\text{-}max\text{-}perf}$ | Maximum link data rate range for a device, external | 0.001 | | 400 | Mbps |
| $1/t_{bit\text{-}max\text{-}perf}$ | Maximum link data rate range for a device, internal | | | 550 | Mbps |
| | Reverse Link data rate | 0.0005 | | 50 | Mbps |
| $t_{bit}$ | Period of one forward link data bit, external mode | 2.5 | | $10^6$ | nsec |
| $t_{bit}$ | Period of one forward link data bit, internal mode | 1.8 | | $10^6$ | nsec |

TABLE VIII

| Parameter | Description | Min. | Typ. | Max. | Units |
|---|---|---|---|---|---|
| $t_{restart\text{-}high}$ | Duration of host link restart high pulse | 140 | 150 | 160 | Stb clks |
| $t_{restart\text{-}low}$ | Duration of host link restart low pulse | 50 | 50 | 50 | Stb clks |
| $t_{stb\text{-}data\text{-}enabl}$ | MDDI_Stb completely enabled to MDDI_Data0 enabled link restart sequence | 0 | | | μsec |
| $t_{client\text{-}startup}$ | Time for host to hold MDDI_Stb at logic-zero level after MDDI_Data0 reaches logic-high level | 100 | | | nsec |
| $t_{host\text{-}detect}$ | Time from MDDI_Data0 high to MDDI_Stb toggling | 0 | | 1000 | μsec |
| $T_{client\text{-}detect}$ | Time for client to detect MDDI_Data0 at logic-high level performance device | 60 | | 80 | Stb clks |

TABLE VIII-continued

| Parameter | Description | Min. | Typ. | Max. | Units |
|---|---|---|---|---|---|
| $t_{stb\text{-}startup}$ | Time for host to hold MDDI_Stb at logic-zero level before host begins toggling MDDI_Stb | 100 | | | nsec |

Those skilled in the art will readily understand that the functions of the individual elements illustrated in FIGS. 41 and 42, are well known, and the function of the elements in FIG. 42 is confirmed by the timing diagram in FIG. 43. Details about the series terminations and hibernation resistors that are shown in FIG. 42 were omitted from FIG. 41 because that information is unnecessary for a description of how to perform the Data-Strobe encoding and recover the clock from it.

B. Data-Strobe Timing Forward Link

Figure 44:
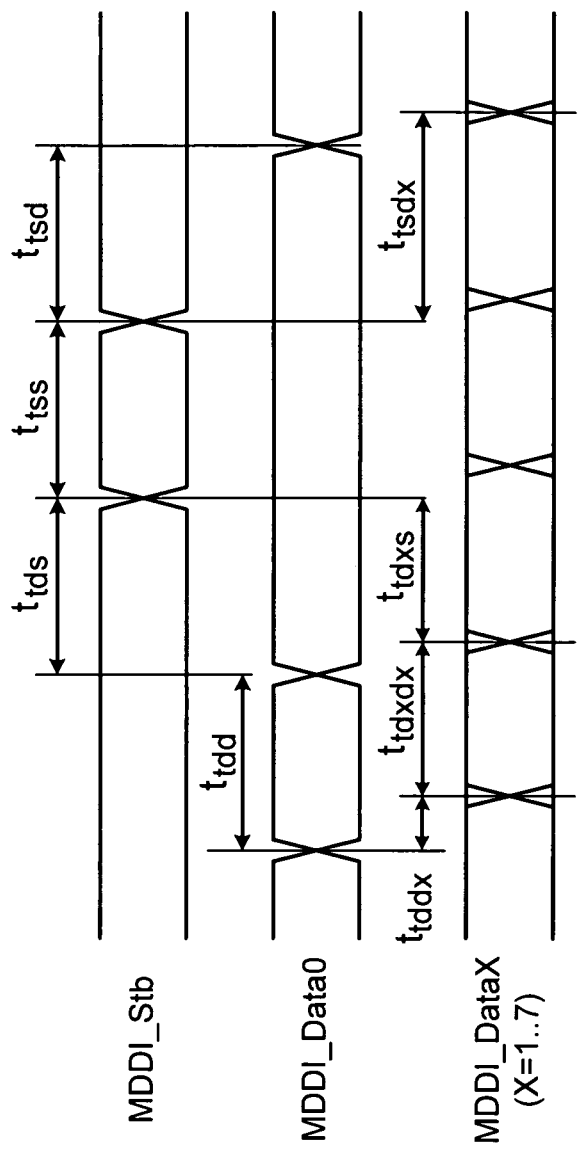
FIG. 44 illustrates relative spacing between transitions on the Data0, other data lines (DataX), and the strobe lines (Stb).

The switching characteristics for the transfer of data on the forward link from the host driver output is shown in Table IX. Table IX presents a tabular form of the minimum and maximum desired, versus typical times for certain signal transitions to occur. For example, the typical length of time for a transition to occur from the start to the end of a data value (output of a '0' or '1'), a Data0 to Data0 transition, termed $t_{dd}$-(host-output), is $t_{tbit}$ while the minimum time is about ttbit−0.5 nsec., and the maximum is about $t_{tbit}$+0.5 nsec. The relative spacing between transitions on the Data0, other data lines (DataX), and the strobe lines (Stb), is illustrated in FIG. 44 where the Data0 to Strobe, Strobe to Strobe, Strobe to Data0, Data0 to non-Data0, non-Data0 to non-Data0, non-Data0 to Strobe, and Strobe to non-Data0 transitions are shown, which are referred to as $t_{tds\text{-}(host\text{-}output)}$, $t_{tss\text{-}(host\text{-}output)}$, $t_{tsd\text{-}(host\text{-}output)}$, $t_{tddx\text{-}(host\text{-}output)}$, $t_{tdxdx\text{-}(host\text{-}output)}$, $t_{tdxs\text{-}(host\text{-}output)}$, and $t_{tsdx\text{-}(host\text{-}output)}$, respectively.

Figure 45:
FIG. 45 illustrates the presence of a delay in response that can occur when a host disables the host driver after transferring a packet.
Figure 46:
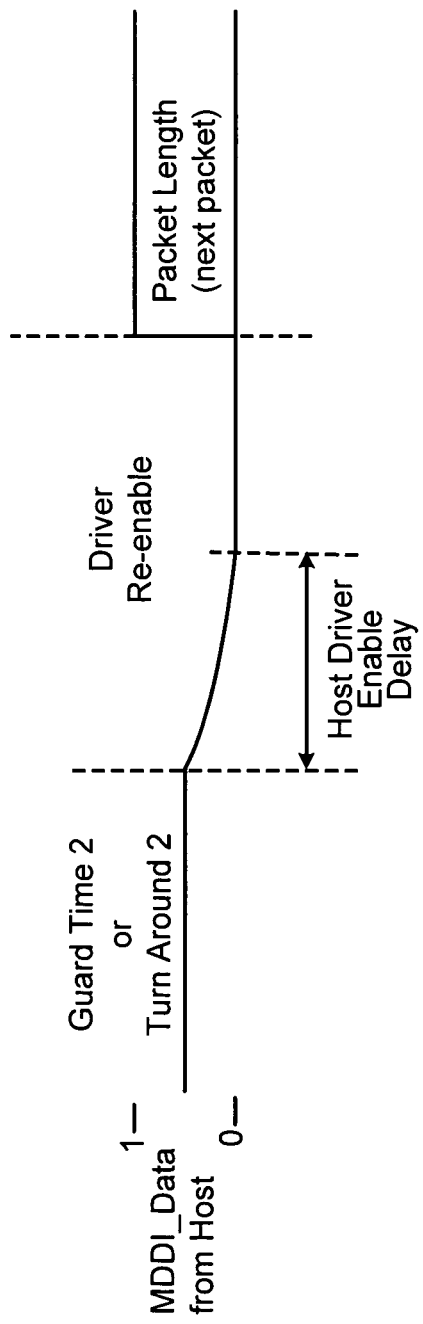
FIG. 46 illustrates the presence of a delay in response that can occur when a host enables the host driver to transfer a packet.

FIGS. 45 and 46 illustrate the presence of a delay in response that can occur when the host disables or enables the host driver, respectively. In the case of a host forwarding certain packets, such as the Reverse Link Encapsulation Packet or the Round Trip Delay Measurement Packet, the host disables the line driver after the desired packets are forwarded, such as the Parameter CRC, Strobe Alignment, and All Zero packets illustrated in FIG. 45 as having been transferred. However, as shown in FIG. 45, the state of the line does not necessarily switch from '0' to a desired higher value instantaneously, although this is potentially achievable with certain control or circuit elements present, but takes a period of time termed the host Driver Disable Delay period to respond. While it could occur virtually instantly such that this time period is 0 nanoseconds (nsec.) in length, it could more readily extend over some longer period with 10 nsec. being a desired maximum period length, which occurs during the Guard Time 1 or Turn Around 1 packet periods.

Looking in FIG. 46, one sees the signal level change undergone when the host Driver is enabled for transferring a packet such as the Reverse Link Encapsulation Packet or the Round Trip Delay Measurement Packet. Here, after the Guard Time 2 or Turn Around 2 packet periods, the host driver is enabled and begins to drive a level, here '0', which value is approached or reached over a period of time termed the Host

TABLE IX

| Parameter | Description | Min. | Typ. | Max. | Units |
|---|---|---|---|---|---|
| $t_{tdd\text{-}(host\text{-}output)}$ | Data0 to Data0 transition | $t_{tbit}$ − 0.5 | $t_{tbit}$ | $t_{tbit}$ + 0.5 | nsec |
| $t_{tds\text{-}(host\text{-}output)}$ | Data0 to Strobe transition | $t_{tbit}$ − 0.8 | $t_{tbit}$ | $t_{tbit}$ + 0.8 | nsec |
| $t_{tss\text{-}(host\text{-}output)}$ | Strobe to Strobe transition | $t_{tbit}$ − 0.5 | $t_{tbit}$ | $t_{tbit}$ + 0.5 | nsec |
| $t_{tsd\text{-}(host\text{-}output)}$ | Strobe to Data0 transition | $t_{tbit}$ − 0.8 | $t_{tbit}$ | $t_{tbit}$ + 0.8 | nsec |
| $t_{tddx\text{-}(host\text{-}output)}$ | Data0 to non-Data0 transition | | $t_{tbit}$ | | nsec |
| $t_{tdxdx\text{-}(host\text{-}output)}$ | non-Data0 to non-Data0 transition | $t_{tbit}$ − 0.5 | $t_{tbit}$ | $t_{tbit}$ + 0.5 | nsec |
| $t_{tdxs\text{-}(host\text{-}output)}$ | non-Data0 to Strobe transition | | $t_{tbit}$ | | nsec |
| $t_{tsdx\text{-}(host\text{-}output)}$ | Strobe to non-Data0 transition | | $t_{tbit}$ | | nsec |

The typical MDDI timing requirements for the client receiver input for the same signals transferring data on the forward link is shown in Table X. Since the same signals are being discussed but time delayed, no new figure is needed to illustrate the signal characteristics or meaning of the respective labels, as would be understood by those skilled in the art.

Driver Enable Delay period, which occurs during the Driver Re-enable period, prior to the first packet being sent.

A similar process occurs for the drivers and signal transfers for the client device, here a display. The general guidelines for the length of these periods, and their respective relationships are shown in Table XI, below.

TABLE X

| Parameter | Description | Min. | Typ. | Max. | Units |
|---|---|---|---|---|---|
| $t_{tdd\text{-}(display\text{-}input)}$ | Data0 to Data0 transition | $t_{tbit}$ − 1.0 | $t_{tbit}$ | $t_{tbit}$ + 1.0 | nsec |
| $t_{tds\text{-}(display\text{-}input)}$ | Data0 to Strobe transition | $t_{tbit}$ − 1.5 | $t_{tbit}$ | $t_{tbit}$ + 1.5 | nsec |
| $t_{tss\text{-}(display\text{-}input)}$ | Strobe to Strobe transition | $t_{tbit}$ − 1.0 | $t_{tbit}$ | $t_{tbit}$ + 1.0 | nsec |
| $t_{tsd\text{-}(display\text{-}input)}$ | Strobe to Data0 transition | $t_{tbit}$ − 1.5 | $t_{tbit}$ | $t_{tbit}$ + 1.5 | nsec |
| $t_{tddx\text{-}(host\text{-}output)}$ | Data0 to non-Data0 transition | | $t_{tbit}$ | | nsec |
| $t_{tdxdx\text{-}(host\text{-}output)}$ | non-Data0 to non-Data0 transition | | $t_{tbit}$ | | nsec |
| $t_{tdxs\text{-}(host\text{-}output)}$ | non-Data0 to Strobe transition | | $t_{tbit}$ | | nsec |
| $t_{tsdx\text{-}(host\text{-}output)}$ | Strobe to non-Data0 transition | | $t_{tbit}$ | | nsec |

TABLE XI

| Description | Min. | Max. | Units |
|---|---|---|---|
| Host Driver Disable Delay | 0 | 10 | nsec |
| Host Driver Enable Delay | 0 | 2.0 | nsec |
| Display Driver Disable Delay | 0 | 10 | nsec |
| Display Driver Enable Delay | 0 | 2.0 | nsec |

C. Data-Strobe Timing Reverse Link

Figure 47:
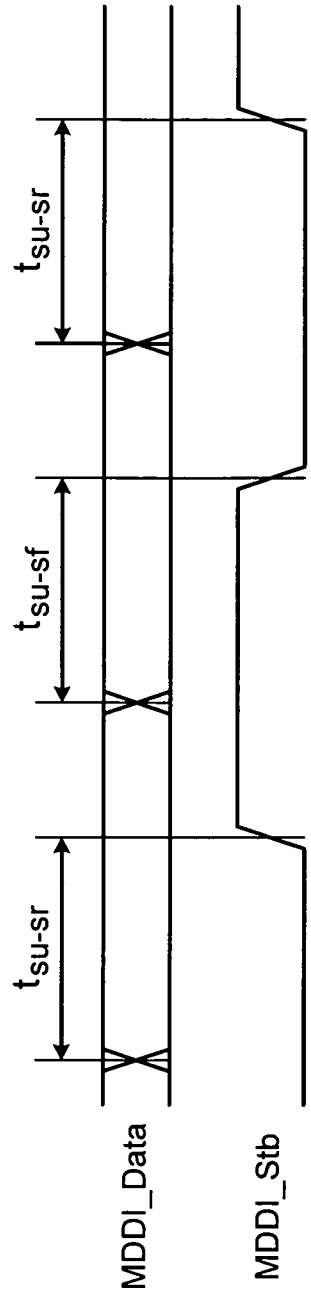
FIG. 47 illustrates the relationship at the host receiver input between the timing of the data being transferred and the leading and trailing edges of the strobe pulses.
Figure 48:
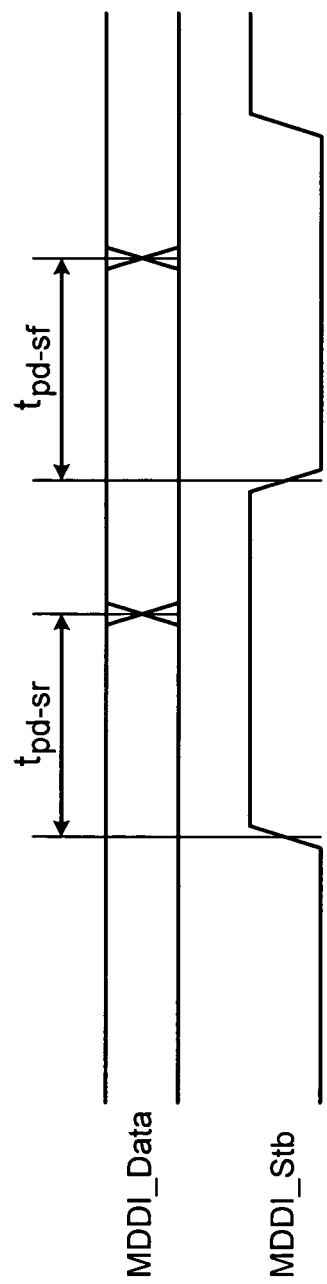
FIG. 48 illustrates switching characteristics and corresponding client output delay developed by the reverse data timing.

The switching characteristics and timing relationships for the data and strobe signals used to transfer data on the reverse link from the client driver output are shown in FIGS. 47, and 48. The typical times for certain signal transitions are discussed below. FIG. 47 illustrates the relationship at the host receiver input between the timing of the data being transferred and the leading and trailing edges of the strobe pulses. That is, what is referred to as the set-up time for the rising or leading edge of the strobe signals, $t_{su-sr}$ and the set-up time for the trailing or falling edge of the strobe signals, $t_{su-sf}$. A typical length of time for these set-up periods is on the order of a minimum of 8 nanoseconds.

FIG. 48 illustrates the switching characteristics and corresponding client output delay developed by the reverse data timing. In FIG. 48, one can see the relationship between the timing of the data being transferred and the leading and trailing edges of the strobe pulses accounting for induced delay. That is, what is referred to as the propagation delay between the rising or leading edge of the strobe signals and the data (valid), $t_{pd-sr}$, and the propagation delay between the data and the trailing or falling edge of the strobe signals, $t_{pd-sf}$. A typical maximum length of time for these propagation delay periods is on the order of 8 nanoseconds.

VIII. Implementation of Link Control (Link Controller Operation)

A. State Machine Packet Processor

Packets being transferred over a MDDI link are dispatched very rapidly, typically at a rate on the order of 300 Mbps or more, such as 400 Mbps, although lower rates are certainly accommodated, as desired. This type of bus or transfer link speed is too great for currently commercially available (economical) general-purpose microprocessors or the like to control. Therefore, a practical implementation to accomplish this type of signal transfer is to utilize a programmable state machine to parse the input packet stream to produce packets that are transferred or redirected to the appropriate audio-visual subsystem for which they are intended. Such devices are well known and use circuits generally dedicated to a limited number of operations, functions, or states to achieve a desired high speed or very high speed operation.

General purpose controllers, processors, or processing elements, can be used to more appropriately act upon or manipulate some information such as control or status packets, which have lower speed demands. When those packets (control, status, or other pre-defined packets) are received, the state machine should pass them through a data buffer or similar processing element to the general-purpose processor so the packets can be acted upon to provide a desired result (effect) while the audio and visual packets are transferred to their appropriate destination for action. If future, microprocessors or other general purpose controllers, processors, or processing elements are manufactured to achieve higher data rate processing capabilities, then the states or state machine discussed below might also be implemented using software control of such devices, typically as programs stored on a storage element or media.

The general purpose processor function can be realized in some embodiments by taking advantage of the processing power, or excess cycles available for, microprocessors (CPUs) in computer applications, or controllers, processors, digital signal processors (DSPs), specialized circuits, or ASICs found in wireless devices, in much the same manner as some modems or graphics processors utilize the processing power of CPUs found in computers to perform some functions and reduce hardware complexity and costs. However, this cycle sharing or usage can negatively impact the processing speed, timing, or overall operation of such elements, so in many applications, dedicated circuits or elements are preferred for this general processing.

Figure 49:
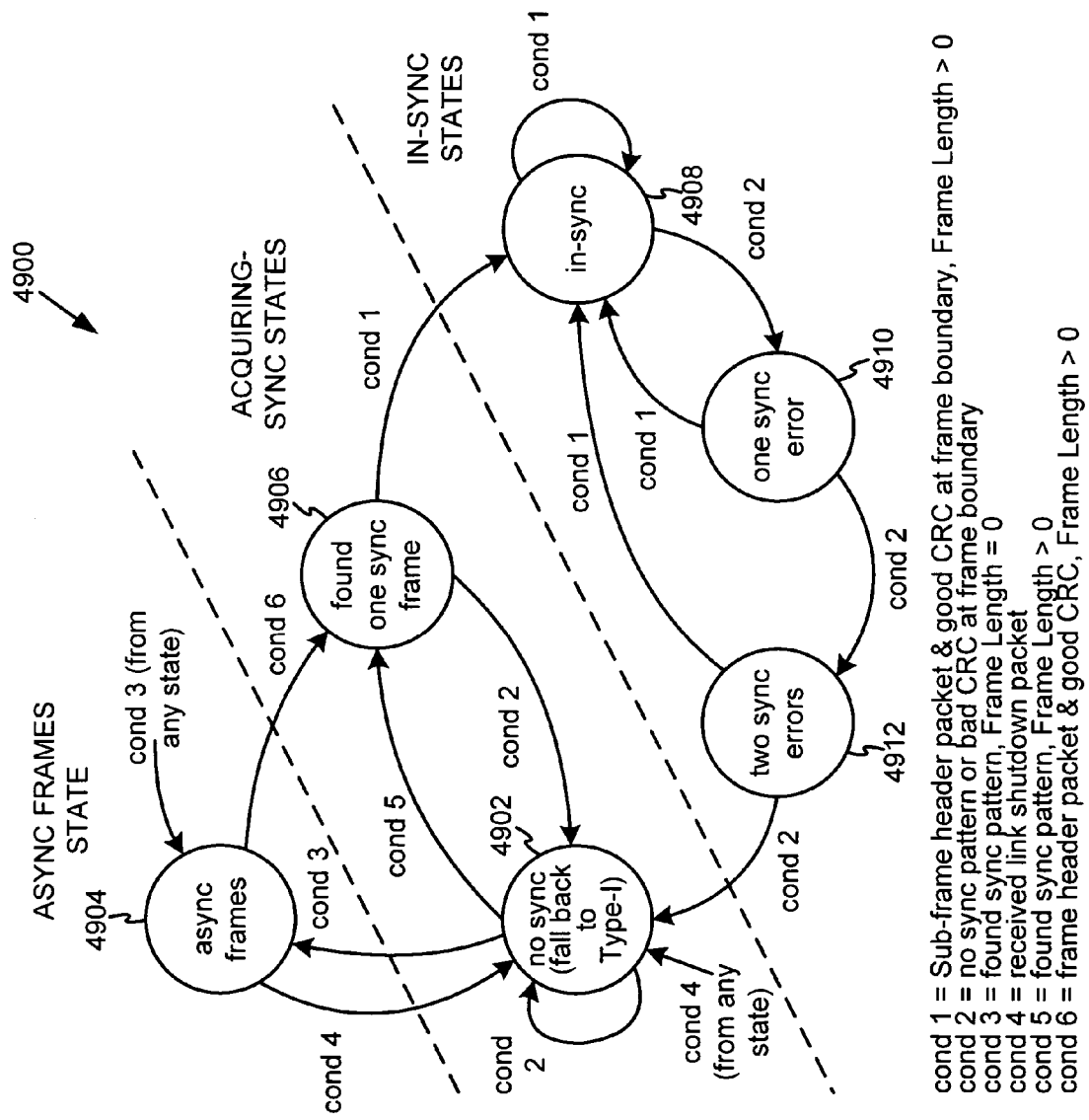
FIG. 49 illustrates a high level diagram of signal processing steps and conditions by which synchronization can be implemented using a state machine.

In order for image data to be viewed on a display (microdisplay), or to reliably receive all packets sent by the host device, the client signal processing is synchronized with the forward link channel timing. That is, signals arriving at the client and the client circuits need to be substantially time synchronized for proper signal processing to occur. A high level diagram of states achieved by signal for one embodiment is presented in the illustration of FIG. 49. In FIG. 49, the possible forward link synchronization "states" for a state machine 4900 are shown being categorized as one ASYNC FRAMES STATE 4904, two ACQUIRING SYNC STATES 4902 and 4906, and three IN-SYNC STATES 4908, 4910, and 4912.

As shown by starting step or state 4902, the display or client, such as a presentation device, starts in a pre-selected "no sync" state, and searches for a unique word in the first sub-frame header packet that is detected. It is to be noted that this no sync state represents the minimum communication setting or "fall-back" setting in which a Type 1 interface is selected. When the unique word is found during the search, the client saves the sub-frame length field. There is no checking of the CRC bits for processing on this first frame, or until synchronization is obtained. If this sub-frame length is zero, then sync state processing proceeds accordingly to a state 4904 labeled here as the "async frames" state, which indicates that synchronization has not yet been achieved. This step in the processing is labeled as having encountered cond 3, or condition 3, in FIG. 49. Otherwise, if the frame length is greater than zero, then the sync state processing proceeds to a state 4906 where the interface state is set as "found one sync frame." This step in the processing is labeled as encountering cond 5, or condition 5, in FIG. 49. In addition, if the state machine sees a frame header packet and good CRC determination for a frame length greater than zero, processing proceeds to the "found one sync frame" state. This is labeled as meeting cond 6, or condition 6, in FIG. 49.

In each situation in which the system is in a state other than "no sync," if a packet with a good CRC result is detected, then the interface state is changed to the "in-sync" state 4908. This step in the processing is labeled as having encountered cond 1, or condition 1, in FIG. 49. On the other hand, if the CRC in any packet is not correct, then the sync state processing proceeds or returns to the interface state 4902 of "NO SYNC FRAME" state. This portion of the processing is labeled as encountering cond 2, or condition 2, in the state diagram of FIG. 49.

B. Acquisition Time for Sync

The interface can be configured to accommodate a certain number of "sync errors" prior to deciding that synchronization is lost and returning to the "NO SYNC FRAME" state. In FIG. 49, once the state machine has reached the "IN-SYNC STATE" and no errors are found, it is continuously encountering a cond 1 result, and remains in the "IN-SYNC" state. However once one cond 2 result is detected, processing changes the state to a "one-sync-error" state 4910. At this point, if processing results in detecting another cond 1 result, then the state machine returns to the "in-sync" state, otherwise it encounters another cond 2 result, and moves to a "TWO-SYNC-ERRORS" state 4912. Again, if a cond 1 occurs, processing returns the state machine to the "IN-SYNC" state. Otherwise, another cond 2 is encountered and the state machine returns to the "no-sync" state. It is also understandable that should the interface encounter a "link shutdown packet," then this will cause the link to terminate data transfers and return to the "no-sync frame" state as there is nothing to synchronize with, which is referred to as meeting cond 4, or condition 4, in the state diagram of FIG. 49.

It is understood that it is possible for there to be a repeating "false copy" of the unique word which may appear at some fixed location within the sub-frame. In that situation, it is highly unlikely that the state machine will synchronize to the sub-frame because the CRC on the sub-frame Header Packet must also be valid when processed in order for the MDD interface processing to proceed to the "IN SYNC" state.

The sub-frame length in the sub-frame Header Packet may be set to zero to indicate that the host will transmit only one sub-frame before the link is shut down, and the MDD interface is placed in or configured into an idle hibernation state. In this case, the client must immediately receive packets over the forward link after detecting the sub-frame Header Packet because only a single sub-frame is sent before the link transitions to the idle state. In normal or typical operations, the sub-frame length is non-zero and the client only processes forward link packets while the interface is in those states collectively shown as "IN-SYNC" states in FIG. 49.

An external mode client device may be attached to the host while the host is already transmitting a forward link data sequence. In this situation, the client must synchronize to the host. The time required for a client to synchronize to the forward link signal is variable depending on the sub-frame size and the forward link data rate. The likelihood of detecting a "false copy" of the unique word as part of the random, or more random, data in the forward link is greater when the sub-frame size is larger. At the same time, the ability to recover from a false detection is lower, and the time taken to do so is longer, when a forward link data rate is slower.

C. Initialization

As stated earlier, at the time of "start-up," the host configures the forward link to operate at or below a minimum required, or desired, data rate of 1 Mbps, and configures the sub-frame length and media-frame rate appropriately for a given application. That is, both the forward and reverse links begin operation using the Type 1 interface. These parameters are generally only going to be used temporarily while the host determines the capability or desired configuration for the client display (or other type of client device). The host sends or transfers a sub-frame Header Packet over the forward link followed by a Reverse Link Encapsulation Packet which has bit '0' of the Request Flags set to a value of one (1), in order to request that the display or client responds with a Client Capability Packet. Once the display acquires synchronization on (or with) the forward link, it sends a Client Capability Packet and a Client Request and Status Packet over the reverse link or channel.

The host examines the contents of the Client Capability Packet in order to determine how to reconfigure the link for optimal or a desired level of performance. The host examines the Protocol Version and Minimum Protocol Version fields to confirm that the host and client use versions of the protocol that are compatible with each other. The protocol versions generally remain as the first two parameters of the client capability Packet so that compatibility can be determined even when other elements of the protocol might not be compatible or completely understood as being compatible.

D. CRC Processing

For all packet types, the packet processor state machine ensures that the CRC checker is controlled appropriately or properly. It also increments a CRC error counter when a CRC comparison results in one or more errors being detected, and it resets the CRC counter at the beginning of each sub-frame being processed.

E. Alternative Loss of Synchronization Check

While the above series of steps or states work to produce higher data rates or throughput speed, Applicants have discovered that an alternative arrangement or change in the conditions the client uses to declare that there is a loss of synchronization with the host, can be used effectively to achieve even higher data rates or throughput. The new inventive embodiment has the same basic structure, but with the conditions for changing states changed. Additionally a new counter is implemented to aid in making checks for sub-frame synchronization. These steps and conditions are presented relative to FIG. 63, which illustrates a series of states and conditions useful in establishing the operations of the method or state machine. Only the "ACQUIRING-SYNC STATES" and "IN-SYNC STATES" portions are shown for clarity. In addition, since the resulting states are substantially the same, as is the state machine itself, they use the same numbering. However, the conditions for changing states (and the state machine operation) vary somewhat, so that all are renumbered for clarity between the two figures (1, 2, 3, 4, 5, and 6, versus 61, 62, 63, 64, and 65), as a convenience in identifying differences. Since the ASYNC FRAME state is not considered in this discussion, one state (4904) and condition (6) are no longer used in the figure.

Figure 63:
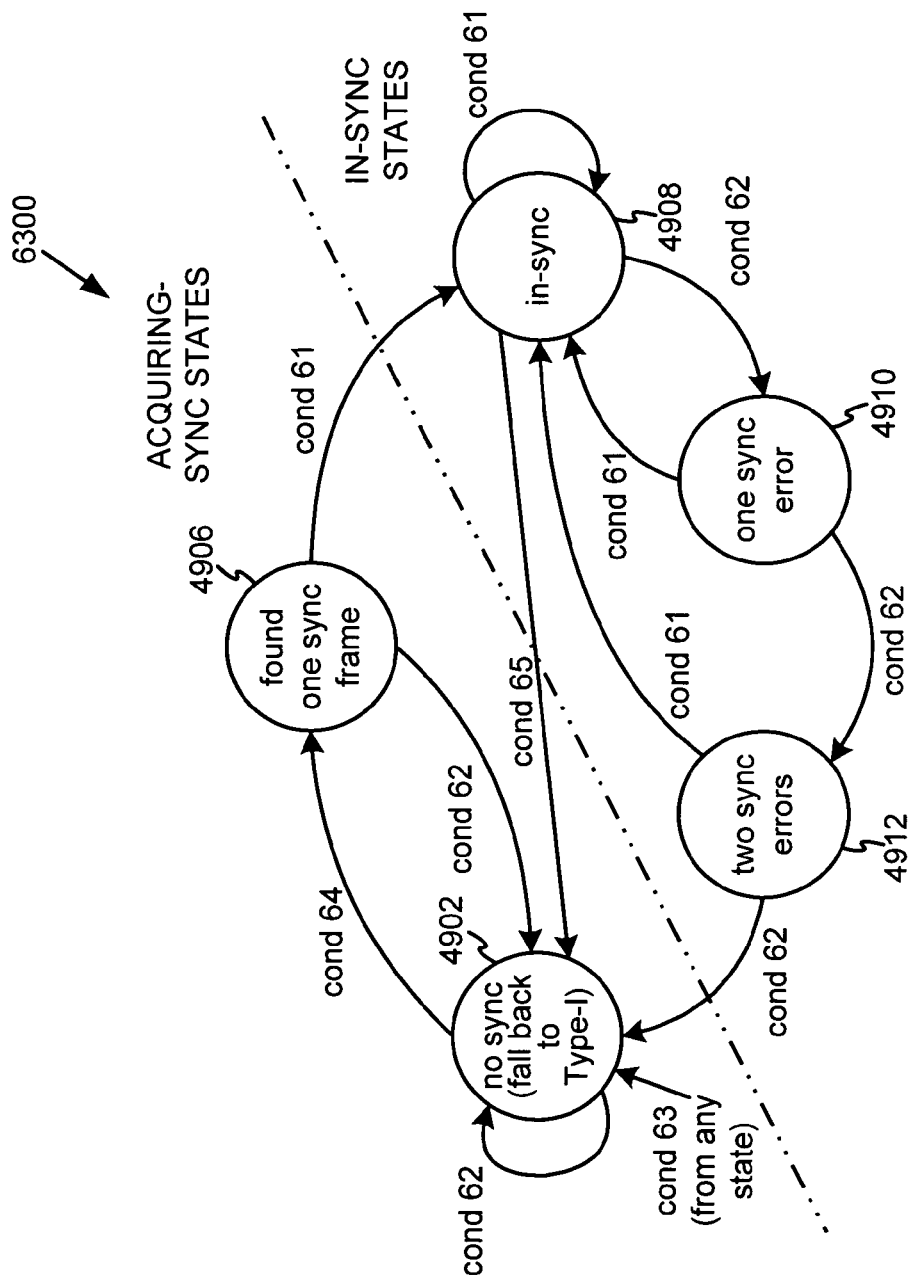
FIG. 63 illustrates a high level diagram of alternative signal processing steps and conditions by which synchronization can be implemented using a state machine.

In FIG. 63, the system or client (for display or presentation) starts with state machine 5000 in the pre-selected "no sync" state 4902, as in FIG. 49. The first state change for changing states from the no-sync condition 4902 is in condition 64 which is the discovery of the sync pattern. Assuming that the CRC of the sub-frame header also passes on this packet (meets condition 61), the state of the packet processor state machine can be changed to the in-sync state 4908. A sync error, condition 62, will cause the state machine to shift to state 4910, and a second occurrence to state 4912. However, it has been discovered that any CRC failure of an MDDI packet will cause the state machine to move out of in-sync state 4908, to the one sync error state 4910. Another CRC failure of any MDDI packet will cause a move to the two sync failure state 4912. A packet decoded with a correct CRC value will cause the state machine to return to the in-sync state 4908.

What has been changed is to utilize the CRC value or determination for 'every' packet. That is, to have the state machine look at the CRC value for every packet to determine a loss of synchronization instead of just observing sub-frame header packets. In this configuration or process, a loss of synchronization is not determined using the unique word and just sub-frame header CRC values.

This new interface implementation allows the MDDI interface link to recognize synchronization failures much more quickly, and, therefore, to recover from them more quickly, as well.

To make this system more robust, the client should also add or utilize a sub-frame counter. The client then checks for the presence of the unique word at the time it is expected to arrive or occur in a signal. If the unique word does not occur at the correct time, the client can recognize that a synchronization failure has occurred much more quickly than if it had to wait several (here three) packet times or periods that were greater than a sub-frame length. If the test for the unique word indicates it is not present, in other words that the timing is incorrect, then the client can immediately declare a link loss of synchronization and move to the no-sync state. The process of checking for the proper unique word presence, adds a condition 65 (cond 65) to the state machine saying that the unique word is incorrect. If a sub-frame packet is expected to be received on the client and doesn't match up, the client can immediately go to the no-sync state 4902, saving additional time waiting for multiple sync errors (condition 62) normally encountered traversing through states 4910 and 4912.

This change uses an additional counter or counting function in the client core to count sub-frame length. In one embodiment, a count down function is used and the transfer of any packet that was currently being processed is interrupted to check for the sub-frame unique word if the counter has expired. Alternatively, the counter can count up, with the count being compared to a desired maximum or particular desired value, at which point the current packet is checked. This process protects the client from decoding packets that are incorrectly received on the client with extraordinarily long packet lengths. If the sub-frame length counter needed to interrupt some other packet that was being decoded, a loss of synchronization can be determined since no packet should cross a sub-frame boundary.

IX. Packet Processing

For each type of packet discussed above that the state machine receives, it undertakes a particular processing step or series of steps to implement operation of the interface. Forward link packets are generally processed according to the exemplary processing listed in Table XII below.

TABLE XII

| Packet type | Packet processor state machine response |
| --- | --- |
| Sub-Frame Header (SH) | Confirms good packet, captures sub-frame length field, and sends packet parameters to a general purpose processor. |
| Filler (F) | Ignores data. |
| Video Stream (VS) | Interprets the Video Data Format Descriptor and other parameters, unpacks packed pixel data when necessary, translates pixels through the color map if necessary, and writes pixel data to appropriate locations in the bitmap. |
| Audio Stream (AS) | Sends audio sample rate setting to audio sample clock generator, separates audio samples of specified size, unpacks audio sample data when necessary, and routes audio samples to appropriate audio sample FIFO |
| Color Map (CM) | Reads color map size and offset parameters, and writes the color map data to a color map memory or storage location. |
| Reverse Link Encapsulation (REL) | Facilitates sending packets in reverse direction at the appropriate time. Reverse link flags are examined, and Client Capability packets are sent as necessary. Client Request and Status packets are also sent as appropriate. |
| Client Capability (CC) | Sends this type of packet when requested by a host using the reverse link flags field of the Reverse Link Encapsulation Packet. |
| Keyboard (K) | Passes these packets to and from a general purpose processor that communicates with a keyboard type device, if one is present, and use is desired. |

TABLE XII-continued

| Packet type | Packet processor state machine response |
| --- | --- |
| Pointing Device (PD) | Passes these packets to and from a general purpose processor that communicates with a pointing type device, if one is present, and use is desired. |
| Link Shutdown (LS) | Records fact link is shut down and informs a general-purpose processor. |
| Client Service Request and Status (CSRS) | Sends this packet as the first packet in the Reverse Link Encapsulation packet. |
| Bit Block Transfer (BPT) | Interprets packet parameters, such as Video Data Format Descriptor, determines which pixels to move first, and moves pixels in bitmap as required. |
| Bitmap Area Fill (BAF) | Interprets packet parameters, translates pixels through color map if necessary, and writes pixel data to appropriate locations in bitmap, |
| Bitmap Pattern Fill (BPF) | Interprets packet parameters, unpacks packed pixel data if necessary, translates pixels through color map if necessary, and writes pixel data to appropriate locations in bitmap. |
| Communication Link Channel (CLC) | Sends this data directly to a general-purpose processor. |
| Client Service Request (CSR) during hibernation | General-purpose processor controls the low-level functions of sending request and detects contention with link restarting on its own. |
| Interface Type Handoff Request (ITHR) and Interface Type Acknowledge (ITA) | May pass these packets to and from the general-purpose processor. The logic to receive this type of packet and formulate a response with an acknowledgment is substantially minimal. Therefore, this operation could also be implemented within the packet processor state machine. The resulting handoff occurs as a low-level physical layer action and is not likely to affect the functionality or functioning of the general-purpose processor. |
| Perform Type Handoff (PTH) | May act on such packets either directly or by transferring them to the general-purpose processor, also commanding hardware to undergo a mode change. |

X. Reducing the Reverse Link Data Rate

Figure 50:
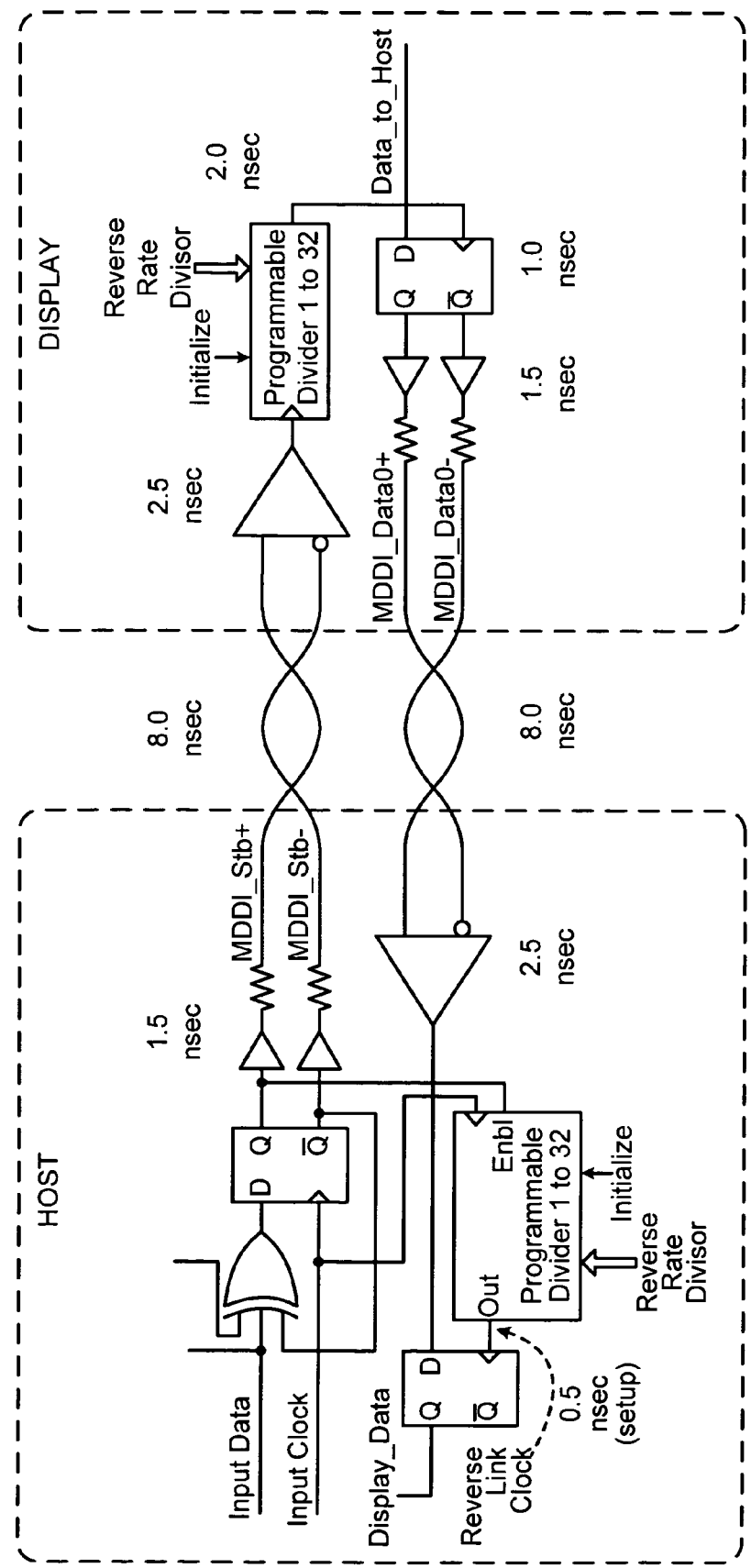
FIG. 50 illustrates typical amounts of delay encountered for signal processing on the forward and reverse paths in a system employing the MDDI.

It has been observed by the inventors that certain parameters used for the host link controller can be adjusted or configured in a certain manner in order to achieve a maximum or more optimized (scale) reverse link data rate, which is very desirable. For example, during the time used to transfer the Reverse Data Packets field of the Reverse Link Encapsulation Packet, the MDDI_Stb signal pair toggles to create a periodic data clock at half the forward link data rate. This occurs because the host link controller generates the MDDI_Stb signal that corresponds to the MDDI_Data0 signal as if it were sending all zeroes. The MDDI_Stb signal is transferred from the host to a client where it is used to generate a clock signal for transferring reverse link data from the client, with which reverse data is sent back to the host. An illustration of typical amounts of delay encountered for the signal transfer and processing on the forward and reverse paths in a system employing the MDDI, is shown in FIG. 50. In FIG. 50, a series of delay values 1.5 nsec., 8.0 nsec., 2.5 nsec., 2.0 nsec., 1.0 nsec., 1.5 nsec., 8.0 nsec., and 2.5 nsec., are shown near processing portions for the Stb+/− generation, cable transfer-to-client, client receiver, clock generation, signal clocking, Data0+/− generation, cable transfer-to-host, and host receiver stages, respectively.

Depending on the forward link data rate and signal processing delays encountered, it may require more time than one cycle on the MDDI_Stb signal for this "round trip" effect or set of events to be completed, which results in the consumption undesirable amounts of time or cycles. To circumvent this problem, the Reverse Rate Divisor makes it possible for one bit time on the reverse link to span multiple cycles of the MDDI_Stb signal. This means that the reverse link data rate is less than the forward link rate.

It should be noted that the actual length of signal delays through the interface may differ depending on each specific host-client system or hardware being used. Although not required, each system can generally be made to perform better by using the Round Trip Delay Measurement Packet to measure the actual delay in a system so that the Reverse Rate Divisor can be set to an optimum value. The host may support either basic data sampling which is simper but operates at a slower speed or advanced data sampling that is more complex but supports higher reverse data rates. The client capability to support both methods is considered the same.

A round-trip delay is measured by having the host send a Round Trip Delay Measurement Packet to the client. The client responds to this packet by sending a sequence of ones back to the host inside of, or during, a pre-selected measurement window in that packet called the Measurement Period field. The detailed timing of this measurement was described previously. The round-trip delay is used to determine the rate at which the reverse link data can be safely sampled.

Figure 51:
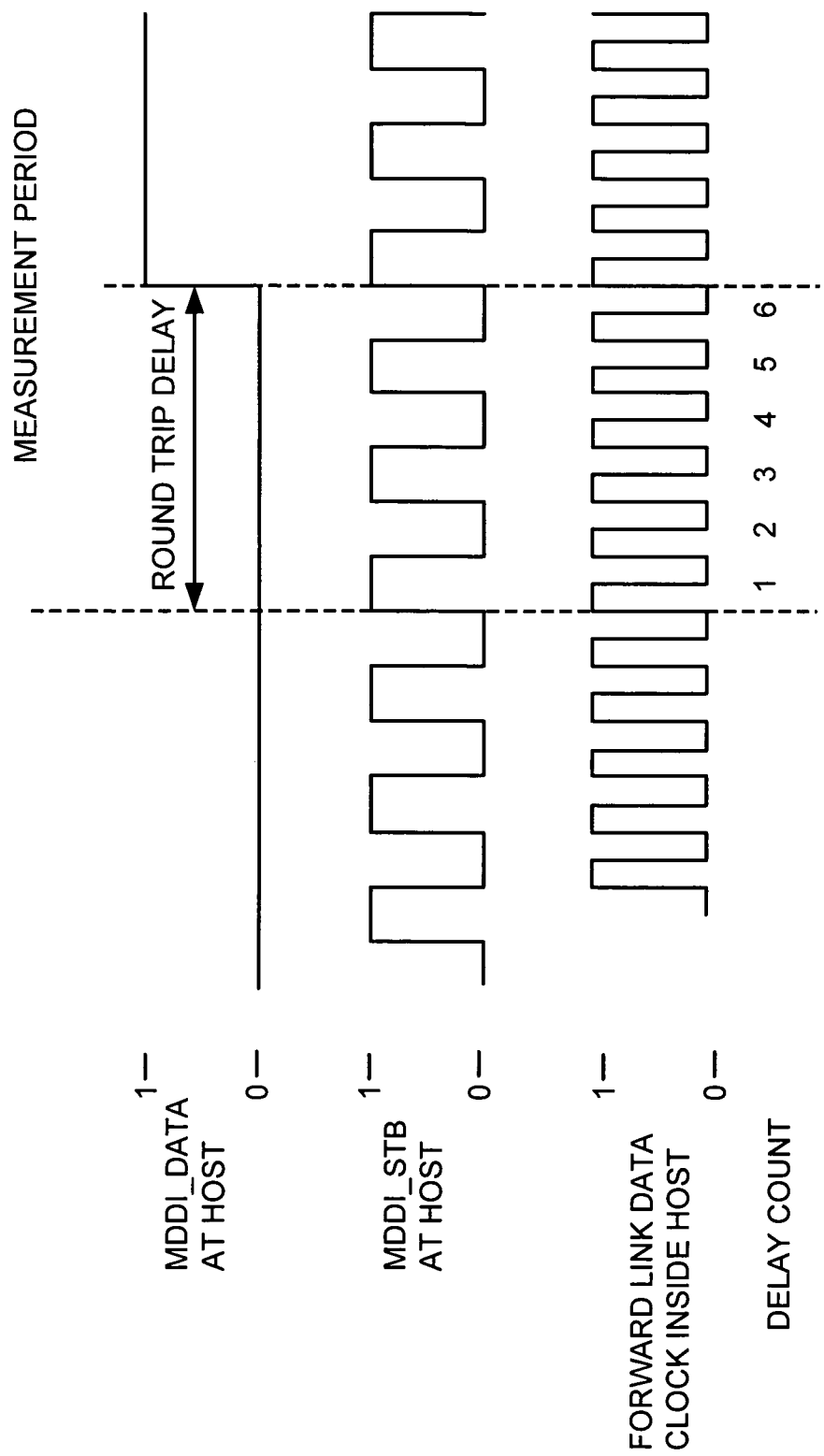
FIG. 51 illustrates marginal round trip delay measurement.

The round-trip delay measurement consists of determining, detecting, or counting the number of forward link data clock intervals occurring between the beginning of the Measurement Period field and the beginning of the time period when the 0xff, 0xff, 0x00 response sequence is received back at the host from the client. Note that it is possible that the response from the client could be received a small fraction of a forward link clock period before the measurement count was about to increment. If this unmodified value is used to calculate the Reverse Rate Divisor it could cause bit errors on the reverse link due to unreliable data sampling. An example of this situation is illustrated in FIG. 51, where signals representing MDDI_Data at host, MDDI_Stb at host, forward link data clock inside the host, and a Delay Count are illustrated in graphical form. In FIG. 51, the response sequence was received from the client a fraction of a forward link clock period before the Delay Count was about to increment from 6 to 7. If the delay is assumed to be 6, then the host will sample the reverse data just after a bit transition or possibly in the middle of a bit transition. This could result in erroneous sampling at the host. For this reason, the measured delay should typically be incremented by one before it is used to calculate the Reverse Rate Divisor.

The Reverse Rate Divisor is the number of MDDI_Stb cycles the host should wait before sampling the reverse link data. Since MDDI_Stb is cycled at a rate that is one half of the forward link rate, the corrected round-trip delay measurement needs to be divided by 2 and then rounded up to the next integer. Expressed as a formula, this relationship is:

$$\text{reverse\_rate\_divisor} = RoundUpToNextInteger\left(\frac{\text{round\_trip\_delay} + 1}{2}\right)$$

For the example given, this becomes:

$$\text{reverse\_rate\_divisor} = RoundUpToNextInteger\left(\frac{6+1}{2}\right) = 4$$

If the round trip delay measurement used in this example were 7 as opposed to 6, then the Reverse Rate Divisor would also be equal to 4.

The reverse link data is sampled by the host on the rising edge of the Reverse Link Clock. There is a counter or similar known circuit or device present in both the host and client (display) to generate the Reverse Link Clock. The counters are initialized so that the first rising edge of the Reverse Link Clock occurs at the beginning of the first bit in the Reverse Link Packets field of the Reverse Link Encapsulation packet. This is illustrated, for the example given below, in FIG. 52. The counters increment at each rising edge of the MDDI_Stb signal, and the number of counts occurring until they wrap around is set by the Reverse Rate Divisor parameter in the Reverse Link Encapsulation Packet. Since the MDDI_Stb signal toggles at one half of the forward link rate, then the reverse link rate is one half of the forward link rate divided by the Reverse Rate Divisor. For example, if the forward link rate is 200 Mbps and the Reverse Rate Divisor is 4 then the reverse link data rate is expressed as:

$$\frac{1}{2} \cdot \frac{200 \text{ Mbps}}{4} = 25 \text{ Mbps}$$

Figure 52:
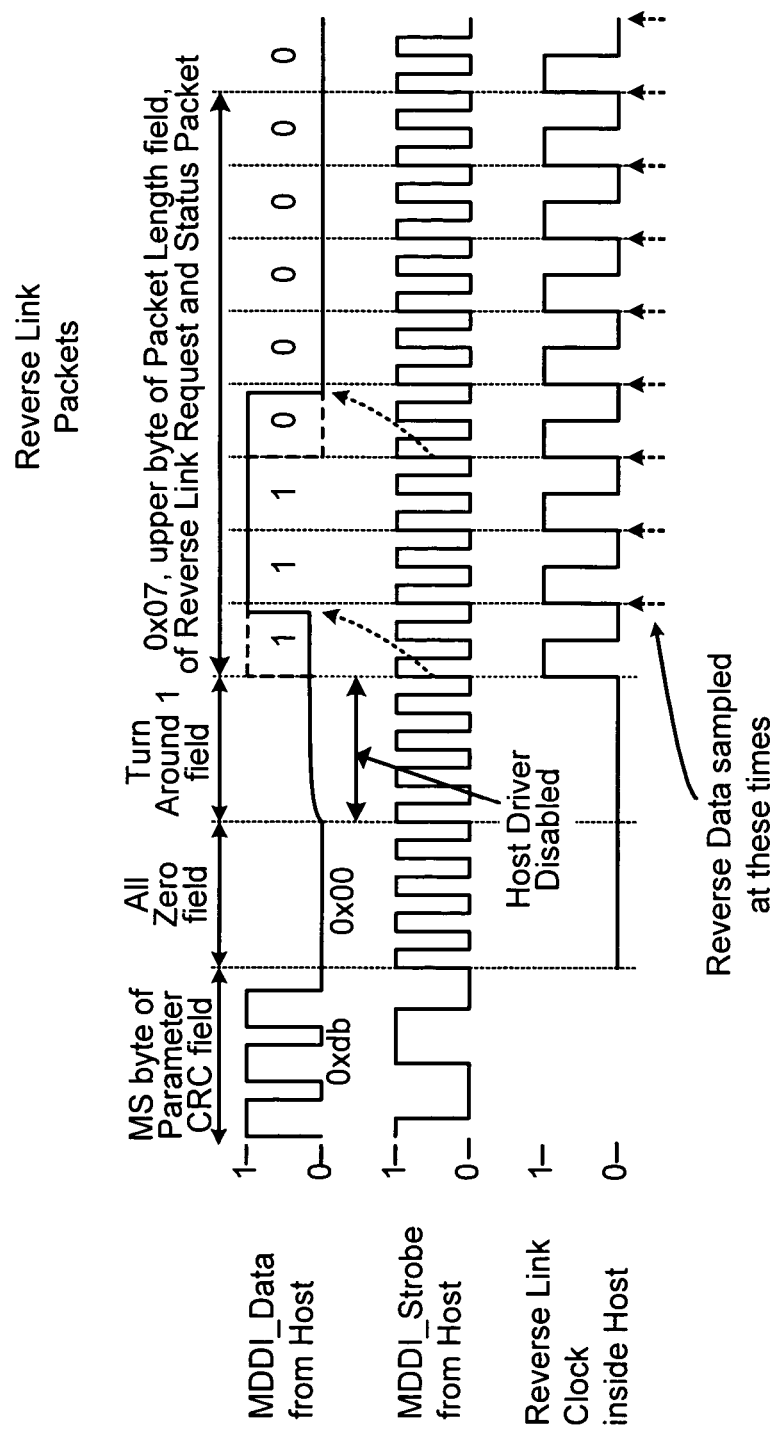
FIG. 52 illustrates Reverse Link data rate changes.

An example showing the timing of the MDDI_Data0 and MDDI_Stb signal lines in a Reverse Link Encapsulation Packet is shown in FIG. 52, where the packet parameters used for illustration have the values:

| | |
|---|---|
| Packet Length = 1024 (0x0400) | Turn Around 1 Length = 1 |
| Packet Type = 65 (0x41) | Turn Around 2 Length = 1 |
| Reverse Link Flags = 0 | Reverse Rate Divisor = 2 |
| Parameter CRC = 0xdb43 | All Zero is 0x00 |

Packet data between the Packet Length and Parameter CRC fields is:
0x00, 0x04, 0x41, 0x00, 0x02, 0x01, 0x01, 0x43, 0xdb, 0x00, . . .

The first reverse link packet returned from the client is the Client Request and Status Packet having a Packet Length of 7 and a packet type of 70. This packet begins with the byte values 0x07, 0x00, 0x46, . . . and so forth. However, only the first byte (0x07) is visible in FIG. 52. This first reverse link packet is time-shifted by nearly one reverse link clock period in the figure to illustrate an actual reverse link delay. An ideal waveform with zero host to client round-trip delay is shown as a dotted-line trace.

The MS byte of the Parameter CRC field is transferred, preceded by packet type, then the all zero field. The strobe from the host is switching from one to zero and back to one as the data from the host changes level, forming wider pulses. As the data goes to zero, the strobe switches at the higher rate, only the change in data on the data line causes a change near the end of the alignment field. The strobe switches at the higher rate for the remainder of the figure due to the fixed 0 or 1 levels of the data signal for extended periods of time, and the transitions falling on the pulse pattern (edge).

The reverse link clock for the host is at zero until the end of the Turn Around 1 period, when the clock is started to accommodate the reverse link packets. The arrows in the lower portion of the figure indicate when the data is sampled, as would be apparent from the remainder of the disclosure. The first byte of the packet field being transferred (here 11000000) is shown commencing after Turn Around 1, and the line level has stabilized from the host driver being disabled. The delay in the passage of the first bit, and as seen for bit three, can be seen in the dotted lines for the Data signal.

Figure 53:
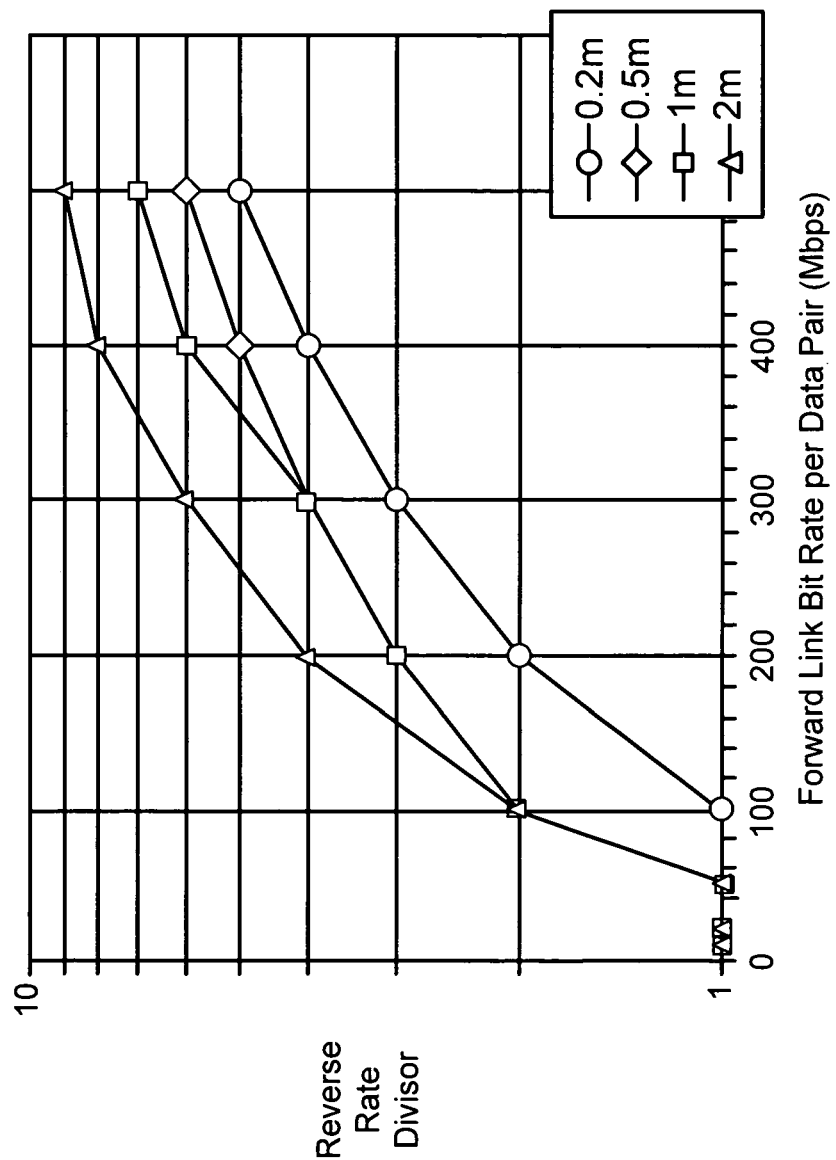
FIG. 53 illustrates a graphical representation of values of the Reverse Rate Divisor versus forward link data rate.

In FIG. 53, one can observe typical values of the Reverse Rate Divisor based on the forward link data rate. The actual Reverse Rate Divisor is determined as a result of a round-trip link measurement to guarantee proper reverse link operation. A first region 5302 corresponds to an area of safe operation, a second region 5304 corresponds to an area of marginal performance, while a third region 5306 indicates settings that are unlikely to function properly.

The round-trip delay measurement and Reverse Rate Divisor setting are the same while operating with any of the Interface Type settings on either the forward or reverse link because they are expressed and operated on in terms of units of actual clock periods rather than numbers of bits transmitted or received.

XI. Turn-Around and Guard Times

As discussed earlier, the Turn Around 1 field in the Reverse Link Encapsulation Packet and the Guard Time 1 field in the Round Trip Delay Measurement Packet designate values for lengths of time that allow for the host interface drivers to be disabled before the client interface drivers are enabled. Turn Around 2 and Guard Time 2 fields provide time values which allow the client drivers to be disabled before the host drivers are enabled. The Guard Time 1 and Guard Time 2 fields are generally filled with pre-set or pre-selected values for lengths that are not meant to be adjusted. Depending on the interface hardware being used, these values may be developed using empirical data and adjusted in some instances to improve operation.

Several factors contribute to a determination of the length of Turn Around 1 and these are the forward link data rate, and the maximum disable time of the MDDI_Data drivers in the host. The maximum host driver disable time is specified in Table XI, where it shows that the drivers take about 10 nsec. maximum to disable and about 2 nsec. to enable. The minimum number of forward link clocks required for the host driver to be disabled is expressed according to the relationship:

$$\text{Clocks\_to\_disable}_{TA1} = \frac{ForwardLinkDataRate}{InterfaceTypeFactor_{FWD}} \cdot HostDriverDisableDelay_{max}$$

The allowed value range of Turn Around 1 is expressed according to the relationship:

$$\text{Turn\_Around\_1} \geq RoundUpToNextInteger\left(\frac{\text{Clocks\_to\_disable}_{TA1}}{8} \cdot InterfaceTypeFactor_{FWD}\right)$$

where the Interface Type Factor is 1 for Type 1, 2 for Type 2, 4 for Type 3, and 8 for Type-4.

Combining the two equations from above, one can see that the Interface Type Factor term cancels out, and Turn Around 1 is defined as:

$$\text{Turn\_Around\_1} = RoundUpToNextInteger\left(\frac{ForwardLinkDataRate \cdot HostDriverDisableDelay_{max}}{8}\right)$$

For example, a 1500 Mbps Type 3 forward link would use a Turn Around 1 delay of:

$$\text{Turn\_Around\_1} = RoundUpToNextInteger\left(\frac{1500 \text{ Mbps} \cdot 10n \text{ sec}}{8}\right) = 2 \text{ Bytes}$$

As the round trip delay increases, the timing margin improves from the point in time when the host is disabled to the time the client is enabled.

The factors that determine the length of time generally used for Turn Around 2 are the forward link data rate, the maximum disable time of the MDDI_Data drivers in the client, and the round-trip delay of the communication link. The calculation of the time required to disable the client driver is essentially the same as that for the host driver discussed above, and is defined according to the relationship:

$$\text{Clocks\_to\_disable}_{TA2} = \frac{ForwardLinkDataRate}{InterfaceTypeFactor_{FWD}} \cdot DisplayDriverDisableDelay_{max}$$

and the allowed value range for Turn Around 2 is expressed as:

$$\text{Turn\_Around\_2} \geq RoundUpToNextInteger\left(\frac{\text{Clocks\_to\_disable}_{TA2} + \text{round\_trip\_delay} + 1}{\left(\frac{8}{InterfaceTypeFactor_{FWD}}\right)}\right)$$

For example, a 1500 Mbps Type 3 forward link with a round-trip delay of 10 forward link clocks typically uses a Turn Around 2 delay on the order of:

$$\text{Clocks\_to\_disable}_{TA2} = \frac{1500 \text{ Mbps}}{4} \cdot 10n \text{ sec} = 3.75$$

$$\text{Turn\_Around\_2} \geq RoundUpToNextInteger\left(\frac{3.75 + 10 + 1}{\left(\frac{8}{4}\right)}\right) = 8$$

XII. Alternative Reverse Link Timing

While the use of timing and guard bands discussed above work to achieve a high data transfer rate interface, the inventors have discovered a technique to allow for reverse bit lengths that are shorter than the round trip time, by changing the reverse timing discovery.

As presented above, the previous approach to the timing of the reverse link is configured such that the number of clock cycles is counted from the last bit of the Guard Time 1 of a reverse timing packet until the first bit is sampled on the rising edge of an 10 clock. That is the clock signal(s) used to time the inputs and outputs for the MDD interface. The calculation for the reverse rate divisor is then given by:

$$\text{reverse\_rate\_divisor} = RoundUpToNextInteger\left(\frac{\text{round\_trip\_delay} + 1}{2}\right)$$

This provides a bit width equal to the round trip delay which results in a very reliable reverse link. However, the reverse link has been shown to be capable of running faster, or at a higher data transfer rate, which the inventors want to take advantage of. A new inventive technique allows utilizing additional capabilities of the interface to reach higher speeds.

This is accomplished by having the host count the number of clock cycles until a one is sampled, but with the host sampling the data line on both the rising and falling edges during the reverse timing packet. This allows the host to pick the most useful or even optimal sampling point within the reverse bit to ensure that the bit is stable. That is, to find the most useful or optimal rising edge to sample data on for reverse traffic reverse encapsulation packets. The optimal sampling point depends on both the reverse link divisor and whether the first one was detected on a rising edge or a falling edge. The new timing method allows the host to just look for the first edge of the 0xFF 0xFF 0x00 pattern sent by the client for reverse link timing to determine where to sample in a reverse encapsulation packet.

Figure 64:
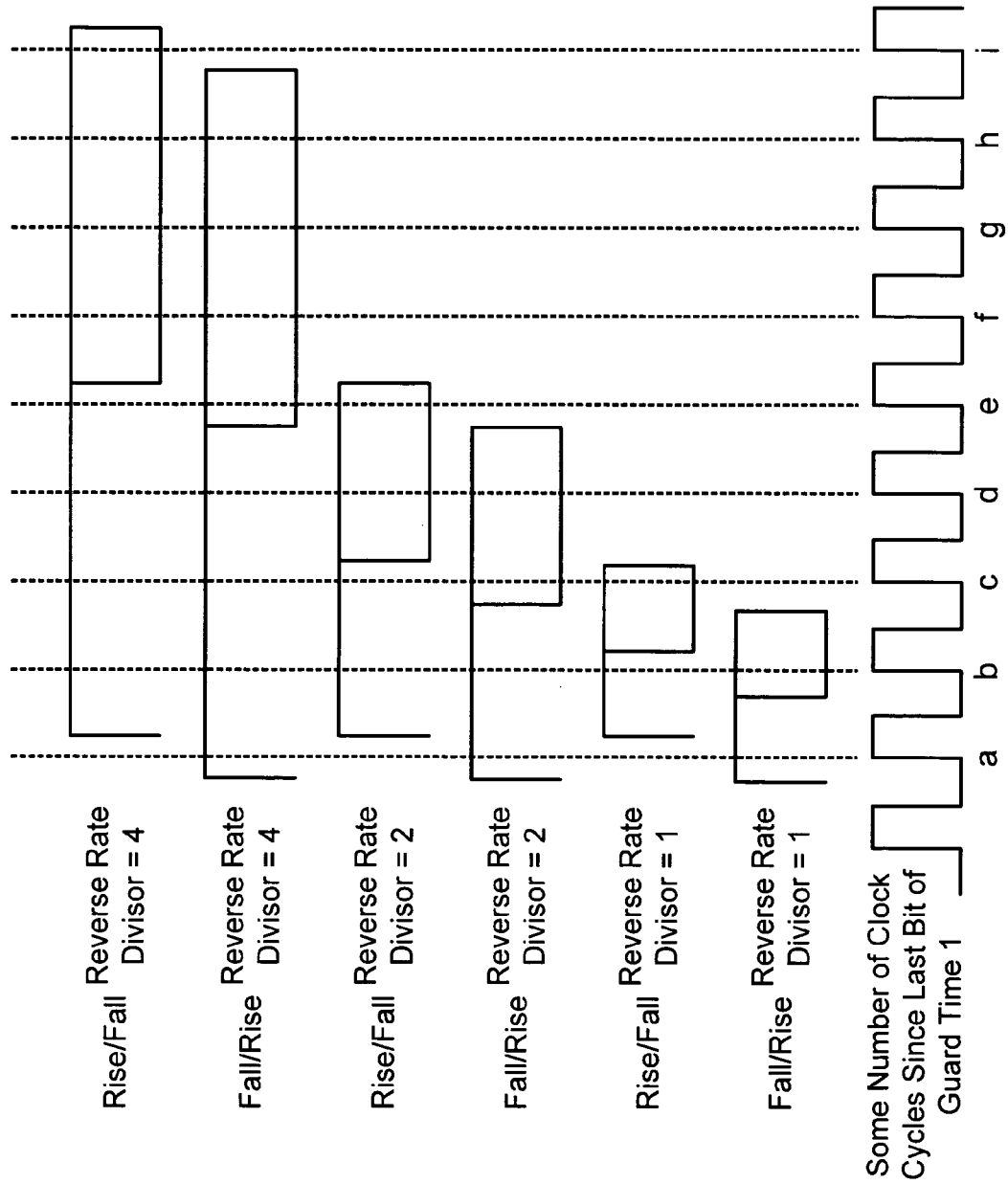
FIG. 64 illustrates exemplary relative timing between a series of clock cycles and the timing of a various reverse link packets bits and divisor values.

Examples of the arriving reverse bit and how that bit would look for various reverse rate divisors, is illustrated in FIG. 64, along with a number of clock cycles that have occurred since the last bit of Guard Time 1. In FIG. 64, one can see that if the first edge occurs between a rising and falling edge (labeled as rise/fall), the optimal sampling point for a reverse rate divisor of one, the optimal sample point is a clock cycle edge labeled 'b', as that is the only rising edge occurring within the period of the reverse bit. For a reverse rate divisor of two, the optimal sampling point is probably still clock cycle leading edge 'b' as cycle edge 'c' is closer to a bit edge than 'b'. For a reverse rate divisor of four, the optimal sampling point is probably clock cycle edge 'd', as it is closer to the back edge of the reverse bit where the value has probably stabilized.

Returning to FIG. 64, if, however, the first edge occurs between a falling and rising edge (labeled as fall/rise), the optimal sampling point for a reverse rate divisor of one is sampling point clock cycle edge 'a', as that is the only rising edge within the reverse bit time period. For a reverse rate divisor of two, the optimal sampling point is edge 'b', and for a reverse rate divisor of four the optimal sampling point is edge 'c'.

One can see that as the reverse rate divisors get larger and larger, the optimal sampling point becomes easier to ascertain or select, as it should be the rising edge that is closest to the middle.

The host can use this technique to find the number of rising clock edges before the rising data edge of the timing packet data is observed on the data line. It can then decide, based on whether the edge occurs between a rising and falling edge or between a falling and rising edge, and what the reverse rate divisor is, how many additional clock cycles to add to a number counter, to reasonably ensure that the bit is always sampled as close to the middle as possible.

Once the host has selected or determined the number of clock cycles, it can "explore" various reverse rate divisors with the client to determine if a particular reverse rate divisor will work. The host (and client) can start with a divisor of one and check the CRC of the reverse status packet received from the client to determine if this reverse rate functions appropriately to transfer data. If the CRC is corrupt, there is probably a sampling error, and the host can increase the reverse rate divisor and try to request a status packet again. If the second requested packet is corrupt, the divisor can be increased again and the request made again. If this packet is decoded correctly, this reverse rate divisor can be used for all future reverse packets.

This method is effective and useful because the reverse timing should not change from the initial round trip timing estimate. If the forward link is stable, the client should continue to decode forward link packets even if there are reverse link failures. Of course, it is still the responsibility of the host to set a reverse link divisor for the link, since this method does not guarantee a perfect reverse link. In addition, the divisor will depend primarily on the quality of the clock that is used to generate an 10 clock. If that clock has a significant amount of jitter, there is a greater possibility of a sampling error. This error probability increases with the amount of clock cycles in the round trip delay.

This implementation appears to work best for Type 1 reverse data, but may present problems for Type 2 through Type 4 reverse data due to the skew between data lines potentially being too great to run the link at the rate that works best for just one data pair. However, the data rate probably does not need to be reduced to the previous method even with Type 2 through Type 4 for operation. This method may also work best if duplicated on each data line to select the ideal or an optimal clock sample location. If they are at the same sample time for each data pair, this method would continue to work. If they are at different sample periods, two different approaches may be used. The first is to select a desired or more optimized sample location for each data point, even if it is not the same for each data pair. The host can then reconstruct the data stream after sampling all of the bits from the set of data pairs: two bits for Type 2, four bits for Type 3, and eight bits for Type 4. The other option is for the host to increase the reverse rate divisor such that the data bits for every data pair can be sampled at the same clock edge.

XIII. Effects of Link Delay and Skew

Delay skew on the forward link between the MDDI_Data pairs and MDDI_Stb can limit the maximum possible data rate unless delay skew compensation is used. The differences in delay that cause timing skew are due to the controller logic, the line drivers and receivers, and the cable and connectors as outlined below.

A. Link Timing Analysis Limited by Skew (MDDI Type-1)

1. Delay and Skew Example of a Type 1 Link

Figure 57:
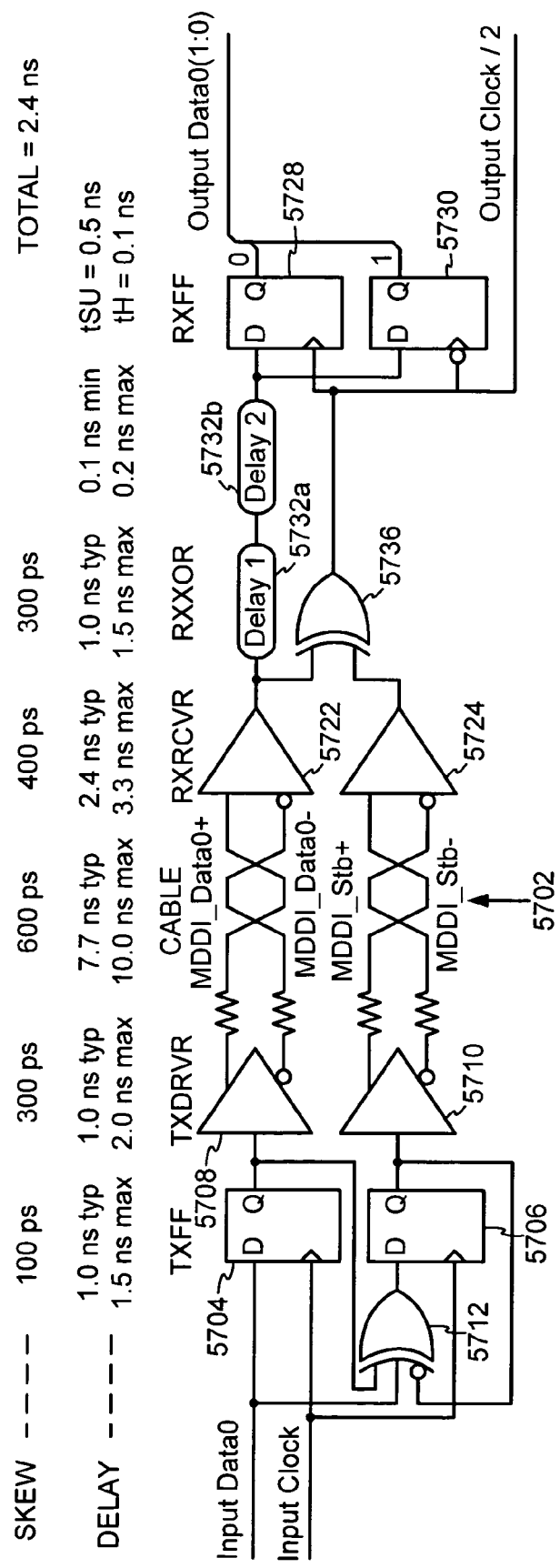
FIG. 57 illustrates typical values for propagation delay and skew in an Type 1 Link interface.

A typical interface circuit similar to that shown in FIG. 41, is shown in FIG. 57 for accommodating a Type 1 interface link. In FIG. 57, exemplary or typical values for propagation delay and skew are shown for each of several processing or interface stages of an MDDI Type 1 forward link. Skew in the delay between MDDI_Stb and MDDI_Data0 causes the duty-cycle of the output clock to be distorted. Data at the D input of the receiver flip-flop (RXFF) stage using flip-flops 5728, 5732, changes slightly after the clock edge so that it can be sampled reliably. The figure shows two cascaded delay lines 5732a and 5732b being used to solve two different problems with creating this timing relationship. In the actual implementation these may be combined into a single delay element.

Figure 58:
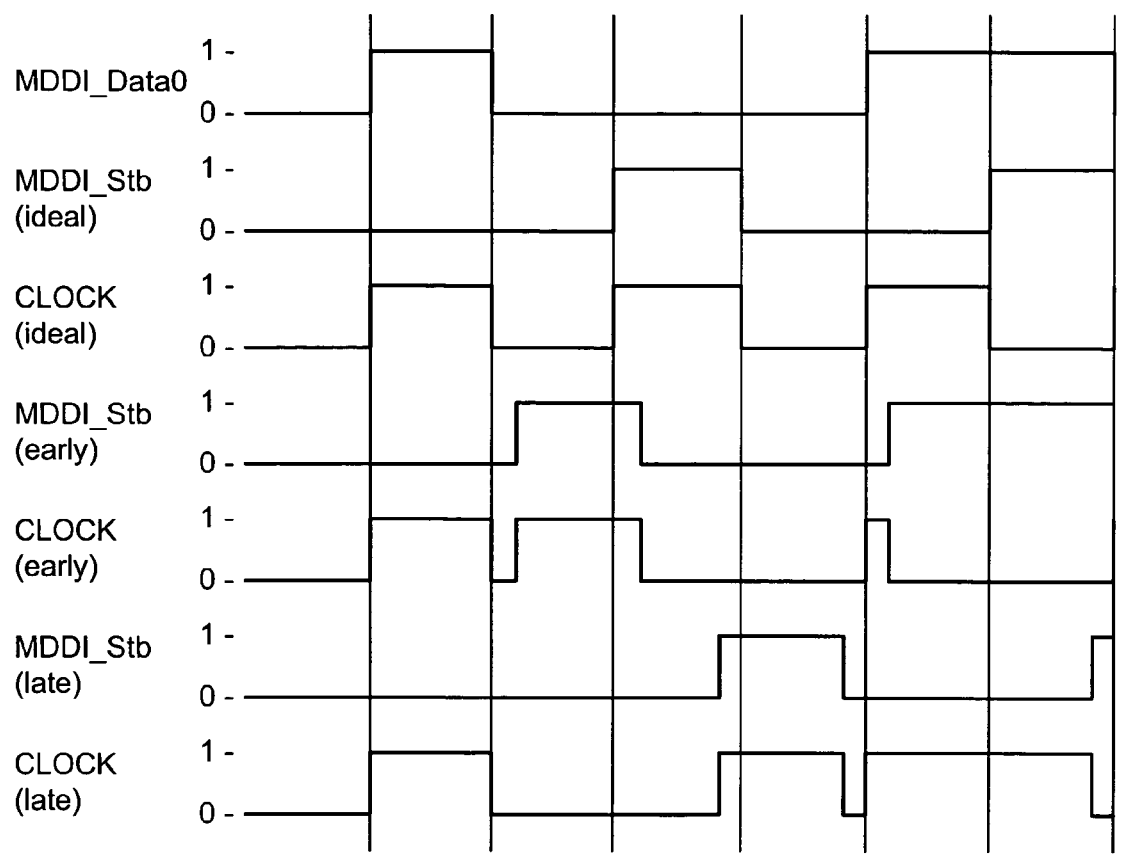
FIG. 58 illustrates Data, Stb, and Clock Recovery Timing on a Type 1 Link for exemplary signal processing through the interface.

Data, Stb, and Clock Recovery Timing on a Type 1 Link for exemplary signal processing through the interface are illustrated in FIG. 58.

The total delay skew that is significant generally arises or comes from the sum of the skew in the following stages: transmitter flip-flop (TXFF) with flip-flops 5704, 5706; transmitter driver (TXDRVR) with drivers 5708, 5710; the CABLE 5702; receiver line receiver (RXRCVR) with receivers 5722, 5724; and receiver XOR logic (RXXOR). Delay1 5732a should match or exceed the delay of the XOR gate 5736 in the RXXOR stage which is determined by the relationship:

$$t_{PD\text{-}min(Delay\,1)} \geq t_{PD\text{-}max(XOR)}$$

It is desirable to meet this requirement so that the D input of receiver flip-flop 5728, 5732 does not change before its clock input. This is valid if the hold-time of RXFF is zero.

The purpose or function of Delay2 is to compensate for the hold-time of the RXFF flip-flop according to the relationship:

$$t_{PD\text{-}min(Delay\,2)} = t_{H(RXFF)}$$

In many systems this will be zero because the hold time is zero, and of course in that case the maximum delay of Delay2 can also be zero.

The worst-case contribution to skew in the receiver XOR stage is in the data-late/strobe-early case where Delay1 is at a maximum value and the clock output from the XOR gate comes as early as possible according to the relationship:

$$t_{SKEW\text{-}max(RXXOR)} = t_{PD\text{-}max(Delay\,1)} - t_{PD\text{-}min(XOR)}$$

In this situation, the data may change between two bit periods, n and n+1, very close to the time where bit n+1 is clocked into the receiver flip-flop.

The maximum data rate (minimum bit period) of an MDDI Type 1 link is a function of the maximum skew encountered through all the drivers, cable, and receivers in the MDDI link plus the total data setup into the RXFF stage. The total delay skew in the link up to the output of the RXRCVR stage can be expressed as:

$$t_{SKEW\text{-}max(LINK)} = t_{SKEW\text{-}max(TXFF)} + t_{SKEW\text{-}max(TXDRVR)} + t_{SKEW\text{-}max(CABLE)} + t_{SKEW\text{-}max(RXRCVR)}$$

and the minimum bit period is given by:

$$t_{BIT\text{-}min} = t_{SKEW\text{-}max(LINK)} + 2 \cdot t_{B\text{-}TP4} + t_{Asymmetry} + t_{SKEW\text{-}max(RXXOR)} + t_{jitter\text{-}host} + t_{PD\text{-}max(Delay\,2)} + t_{SU(RXFF)}$$

In the example shown in FIG. 57 for external mode, $t_{SKEW\text{-}max(LINK)} = 1000$ psec and the minimum bit period can be expressed as:

$$t_{BIT\text{-}max} = 1000 + 2 \cdot 125 + 625 + 125 + 200 + 0 + 100 = 2300 \text{ p sec},$$

or stated as approximately 434 Mbps.

B. Link Timing Analysis for MDDI Type 2, 3, and 4

Figure 59:
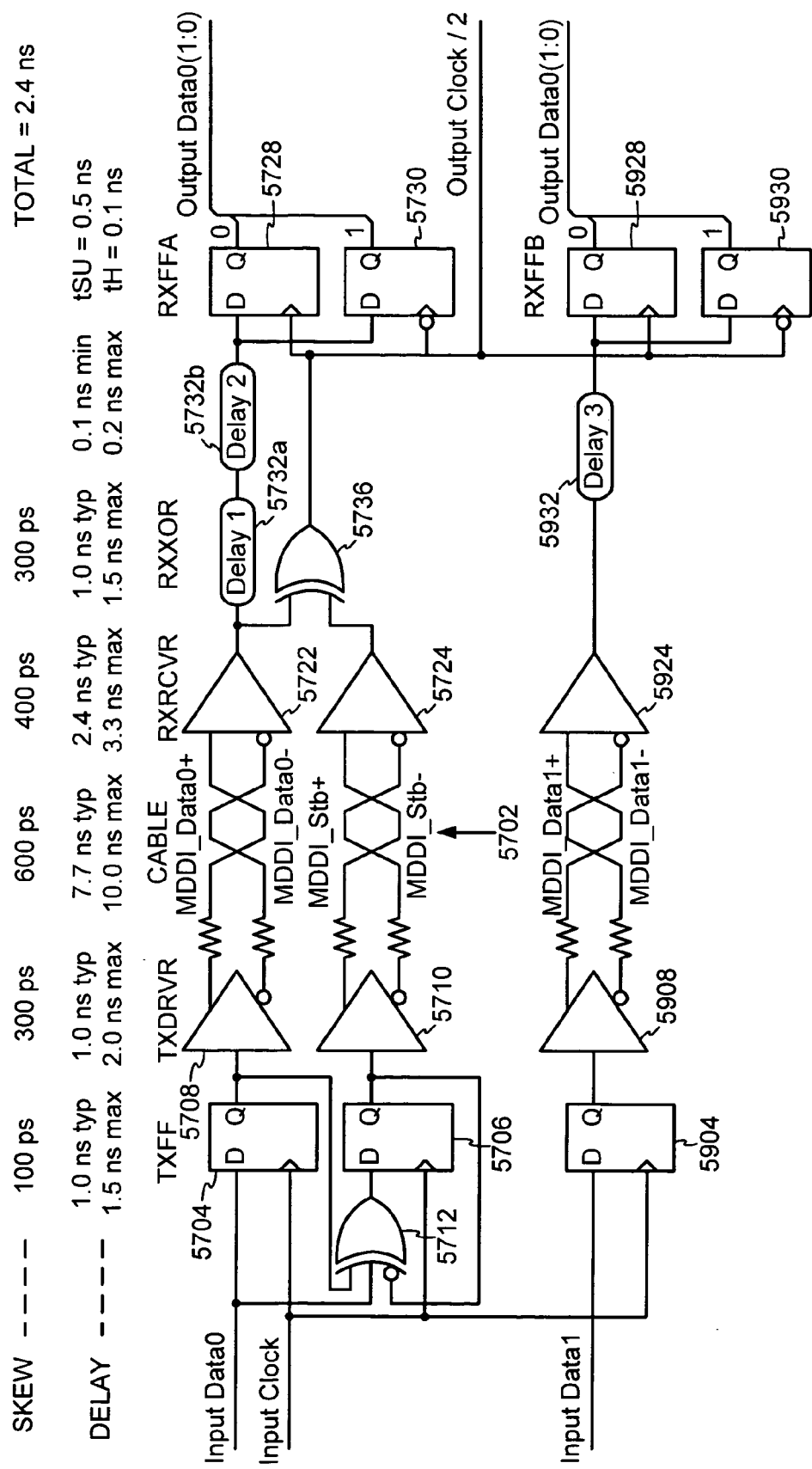
FIG. 59 illustrates typical values for propagation delay and skew in Type 2, Type 3 or Type 4 Link interfaces.
Figure 60A:
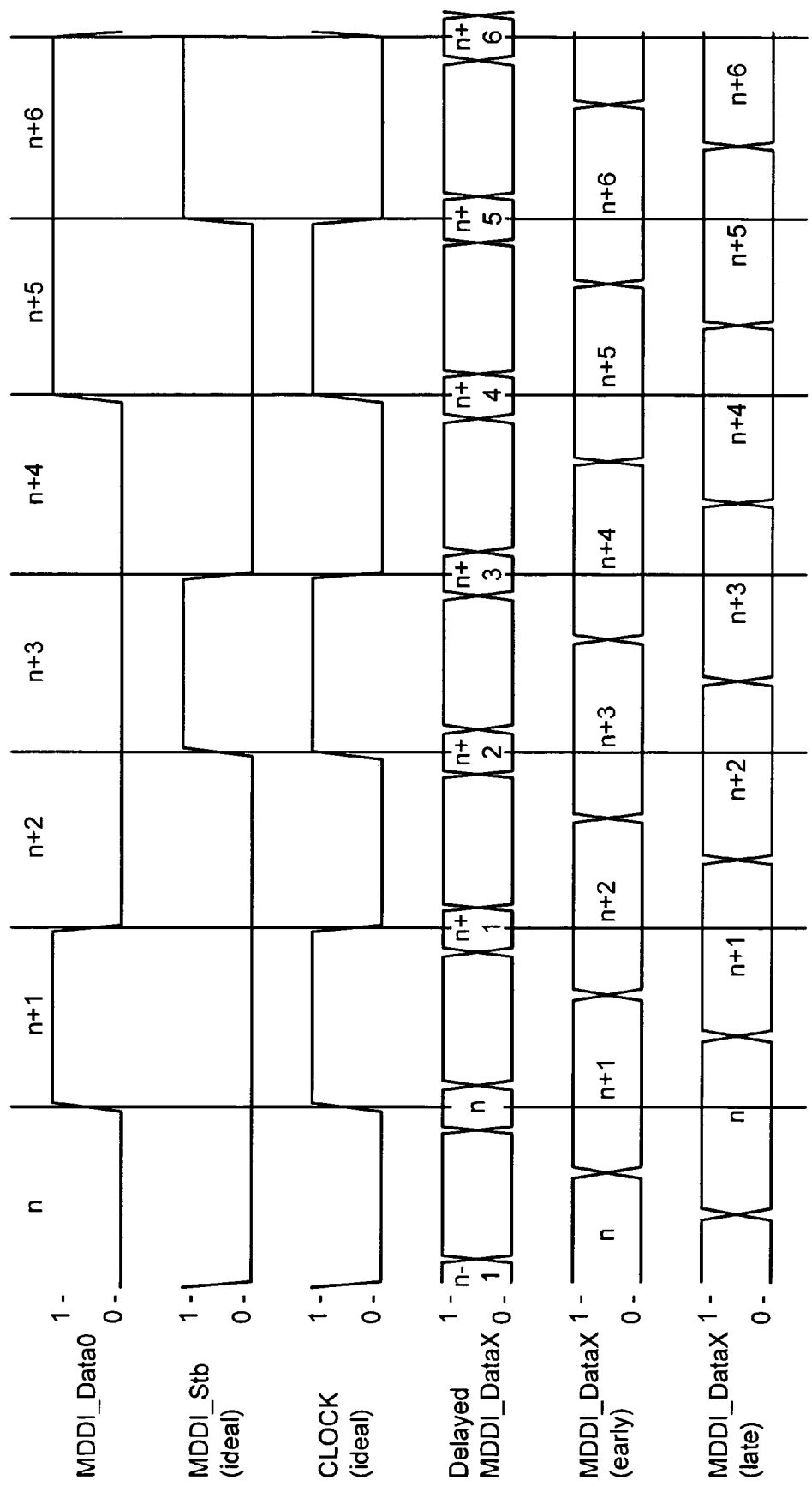
FIGS. 60A, 60B, and 60C illustrate different possibilities for the timing of two data signals and MDDI_Stb with respect to each other, being ideal, early, and late, respectively.
Figure 60B:
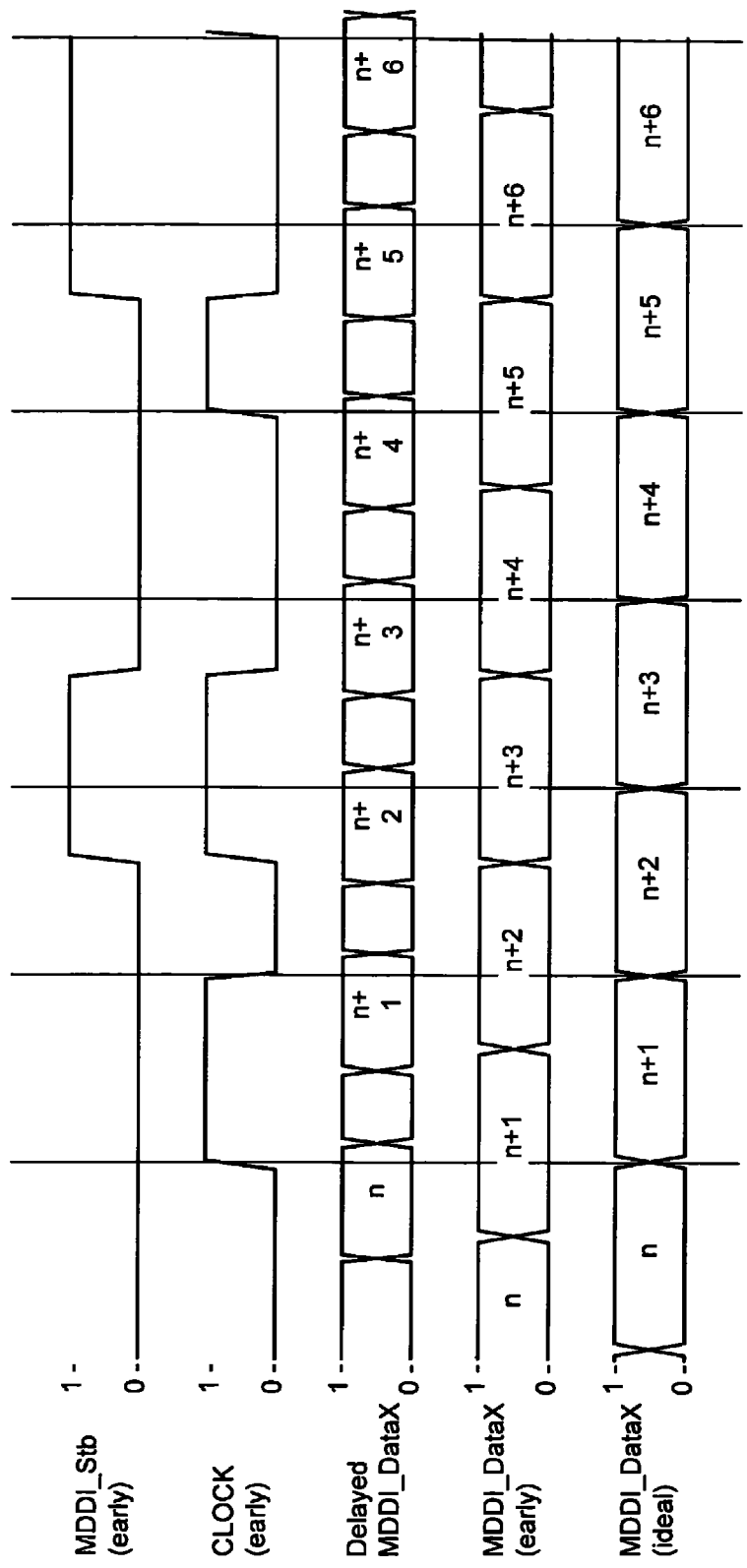
Figure 60C:
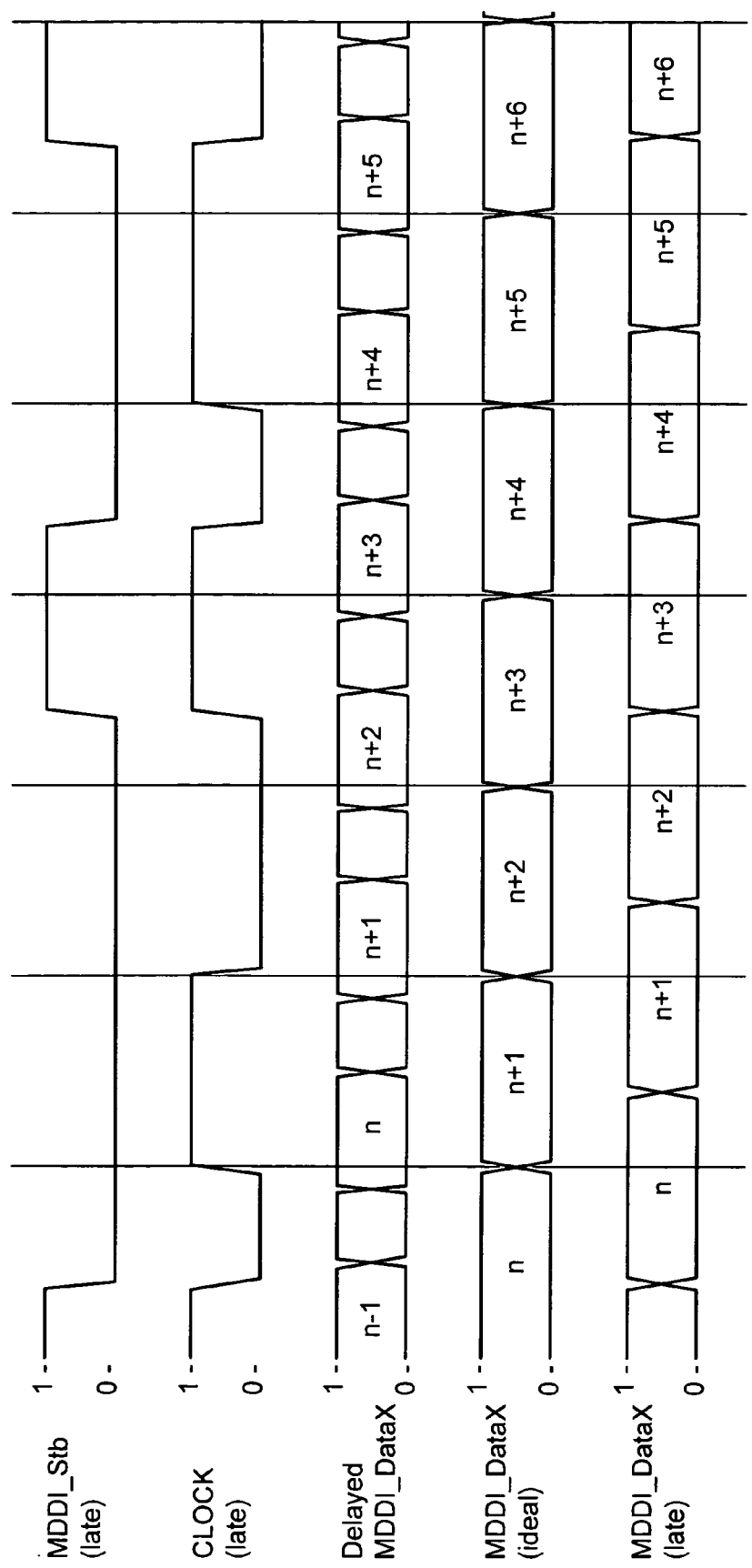

A typical interface circuit similar to that shown in FIGS. 41 and 57, is shown in FIG. 59 for accommodating Type 2, III, and IV interface links. Additional elements are used in the TXFF (5904), TXDRVR (5908), RXRCVCR (5922), and RXFF (5932, 5928, 5930) stages to accommodate the additional signal processing. In FIG. 59, exemplary or typical values for propagation delay and skew are shown for each of several processing or interface stages of an MDDI Type 2 forward link. In addition to skew in the delay between MDDI_Stb and MDDI_Data0 affecting the duty-cycle of the output clock, there is also skew between both of these two signals and the other MDDI_Data signals. Data at the D input of the receiver flip-flop B (RXFFB) stage consisting of flip-flops 5928 and 5930, is changed slightly after the clock edge so it can be sampled reliably. If MDDI_Data1 arrives earlier than MDDI_Stb or MDDI_Data0 then MDDI_Data1 should be delayed to be sampled by at least the amount of the delay skew. To accomplish this, data is delayed using the Delay3 delay line. If MDDI_Data1 arrives later than MDDI_Stb and MDDI_Data0 and it is also delayed by Delay3 then the point where MDDI_Data1 changes is moved closer to the next clock edge. This process determines an upper limit of the data rate of an MDDI Type 2, 3, or 4 link. Some exemplary different possibilities for the timing or skew relationship of two data signals and MDDI_Stb with respect to each other is illustrated in FIGS. 60A, 60B, and 60C.

In order to sample data reliably in RXFFB when MDDI_DataX arrives as early as possible, Delay3 is set according to the relationship:

$$t_{PD\text{-}min(Delay\,3)} \geq t_{SKEW\text{-}max(LINK)} + t_{H(RXFFB)} + t_{PD\text{-}max(XOR)}$$

The maximum link speed is determined by the minimum allowable bit period. This is most affected when MDDI_DataX arrives as late as possible. In that case, the minimum allowable cycle time is given by:

$$t_{BIT\text{-}min} = t_{SKEW\text{-}max(LINK)} + t_{PD\text{-}max(Delay\,3)} + t_{SU(RXFFB)} - t_{PD\text{-}min(XOR)}$$

The upper bound of link speed is then:

$$t_{PD\text{-}max(Delay\,3)} = t_{PD\text{-}min(Delay\,3)}$$

and given that assumption:

$$t_{BIT\text{-}min(lower\text{-}bound)} = 2 \cdot t_{SKEW\text{-}max(LINK)} + t_{PD\text{-}max(XOR)} + t_{SU(RXFFB)} + t_{H(RXFFB)}$$

In the example given above, the lower bound of the minimum bit period is given by the relationship:

$$t_{BIT\text{-}min(lower\text{-}bound)} = 2 \cdot (1000 + 2 \cdot 125 + 625 + 200) + 1500 + 100 + 0 = 5750 \text{ p sec},$$

which is approximately 174 Mbps.

This is much slower than the maximum data rate that can be used with a Type 1 link. The automatic delay skew compensation capability of MDDI significantly reduces the affect that delay skew has on the maximum link rate factor is just on-the-edge of valid data setup. The calibrated skew between MDDI_Data0 and MDDI_Stb is:

and the minimum bit period is:

$$t_{BIT\text{-}min\text{-}Calibrated} = t_{SKEW\text{-}max(Calibrated)} + 2 \cdot t_{B\text{-}TP4} + t_{Asymmetry} + t_{jitter\text{-}host} + t_{SKEW\text{-}max(RXAND+RXXOR)} + t_{SU(RXFF)}$$

In the example shown in FIG. 8-5, $t_{SKEW\text{-}max(Data0\text{-}Stb\text{-}Calibrated)} = 300$ psec and the minimum bit period:

$$t_{BIT\text{-}min\text{-}Calibrated} = 300 + 2 \cdot 125 + 625 + 200 + 175 + 100 = 1650 \text{ p sec},$$

approximately 606 Mbps.

In order to sample data reliably in RXFFB when MDDI_Data1 arrives as early as possible, the associated programmable delay is adjusted to the optimal setting with an accuracy of one tap, and an additional tap delay is added for safety. The maximum link speed is determined by the minimum allowable bit period. This is most affected when MDDI_Data1 arrives as late as possible. In that case the minimum allowable cycle time is:

$$t_{BIT\text{-}min\text{-}Data1\text{-}Calibrated} = 2 \cdot t_{TAP\text{-}Spacing\text{-}max} + 2 \cdot t_{TA\text{-}TP4}$$

In the example given in FIG. 8-5, the lower bound of the minimum bit period based on sampling MDDI_Data1 is:

$$t_{BIT\text{-}min\text{-}Data1\text{-}Calibrated} = 2 \cdot 150 + 2 \cdot 125 = 550 \text{ p sec}$$

XIV. Physical Layer Interconnection Description

Figure 61:
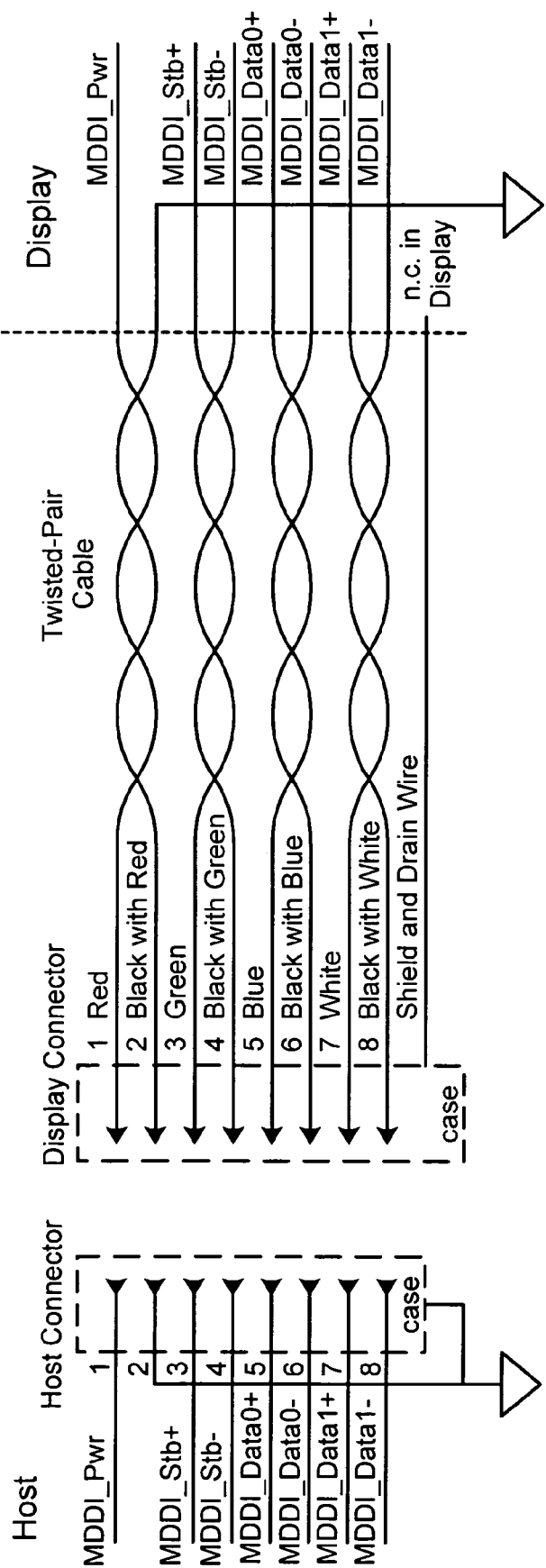
FIG. 61 illustrates interface pin assignments exemplary connectors used with a Type-I/Type 2 interfaces.

Physical connections useful for implementing an interface according to the present invention can be realized using commercially available parts such as part number 3260-8S2(01)

as manufactured by Hirose Electric Company Ltd. on the host side, and part number 3240-8P-C as manufactured by Hirose Electric Company Ltd. on the client device side. An exemplary interface pin assignment or "pinout" for such connectors used with a Type-1/Type 2 interfaces is listed in Table XIII, and illustrated in FIG. 61.

TABLE XIII

| Signal Name | Pin Number | Color | Signal Name | Pin Number | Color |
|---|---|---|---|---|---|
| MDDI_Pwr | 1 | White | MDDI_Gnd | 2 | Black paired w/White |
| MDDI_Stb+ | 3 | Green | MDDI_Stb− | 4 | Black paired w/Green |
| MDDI_Data0+ | 7 | Blue | MDDI_Data0− | 8 | Black paired w/Blue |
| MDDI_Data1+ | 11 | Brown | MDDI_Data1− | 12 | Black paired w/Brn |
| MDDI_Data2+ | 15 | Red | MDDI_Data2− | 16 | Black paired w/Red |
| MDDI_Data3+ | 19 | Orange | MDDI_Data3− | 20 | Black paired w/Org |
| MDDI_Data4+ | 17 | TBD1 | MDDI_Data4− | 18 | Black paired w/TBD1 |
| MDDI_Data5+ | 13 | TBD2 | MDDI_Data5− | 14 | Black paired W/TBD2 |
| MDDI_Data6+ | 9 | TBD3 | MDDI_Data6− | 10 | Black paired W/TBD3 |
| MDDI_Data7+ | 5 | TBD4 | MDDI_Data7− | 6 | Black paired W/TBD4 |
| | | | Shield | | |

The shield is connected to the HOST_Gnd in the host interface, and a shield drain wire in the cable is connected to the shield of the client connector. However, the shield and drain wire are not connected to the circuit ground inside of a client.

Interconnection elements or devices are chosen or designed in order to be small enough for use with mobile communication and computing devices, such as PDAs and wireless telephones, or portable game devices, without being obtrusive or unaesthetic in comparison to relative device size. Any connectors and cabling should be durable enough for use in the typical consumer environment and allow for small size, especially for the cabling, and relatively low cost. The transfer elements should accommodate data and strobe signals that are differential NRZ data having a transfer rate up to around 450 Mbps for Type 1 and Type 2 and up to 3.6 Gbps for the 8-bit parallel Type 4 version.

For internal mode applications there are either no connectors in the same sense for the conductors being used or such connection elements tend to be very miniaturized. One example is zero insertion force "sockets" for receiving integrated circuits or elements housing either the host or client device. Another example is where the host and client reside on printed circuit boards with various interconnecting conductors, and have "pins" or contacts extending from housings which are soldered to contacts on the conductors for interconnection of integrated circuits.

XV. Operation

Figure 54A:
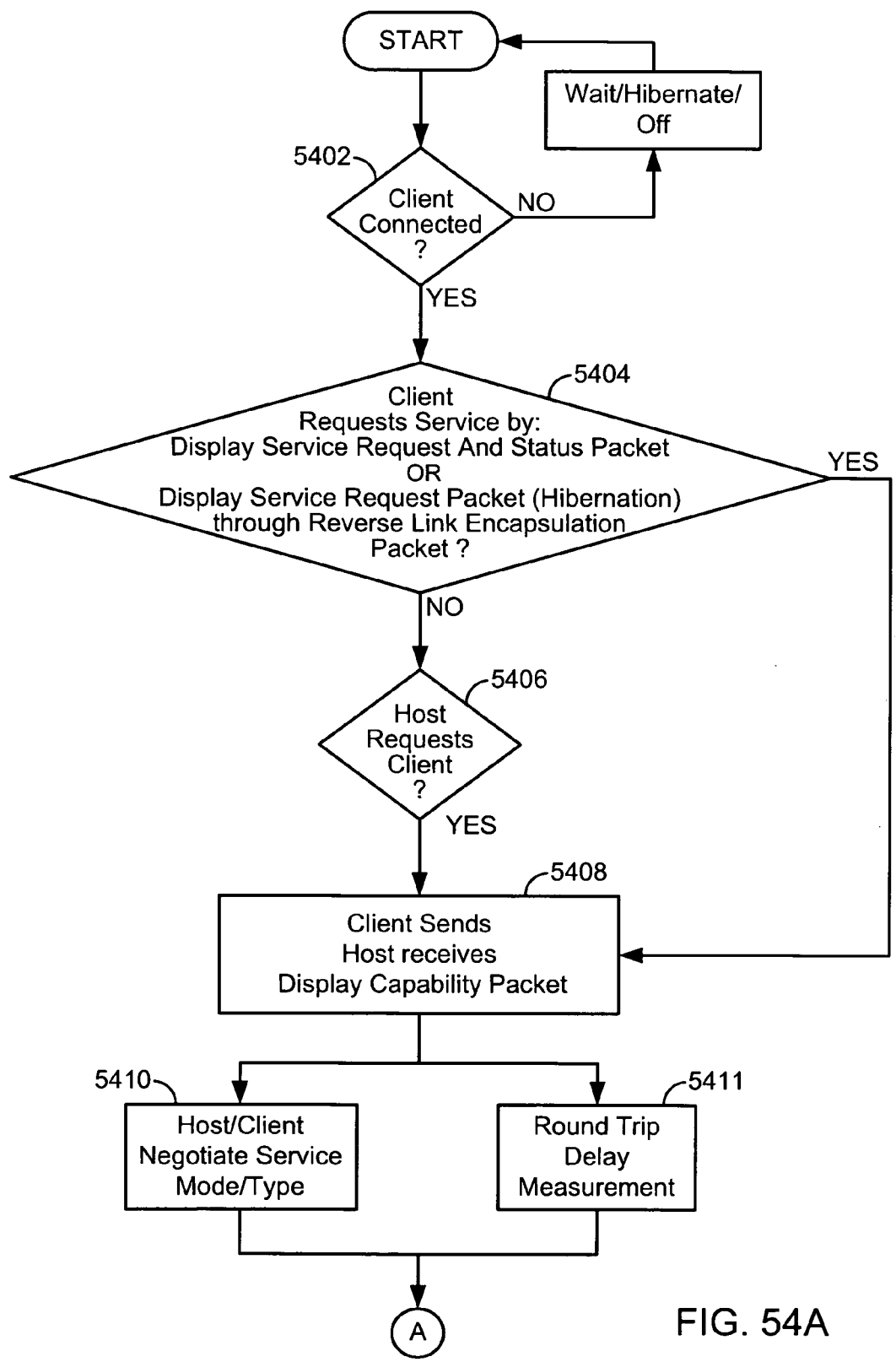
FIGS. 54A and 54B illustrate steps undertaken in the operation of an interface.
Figure 54B:
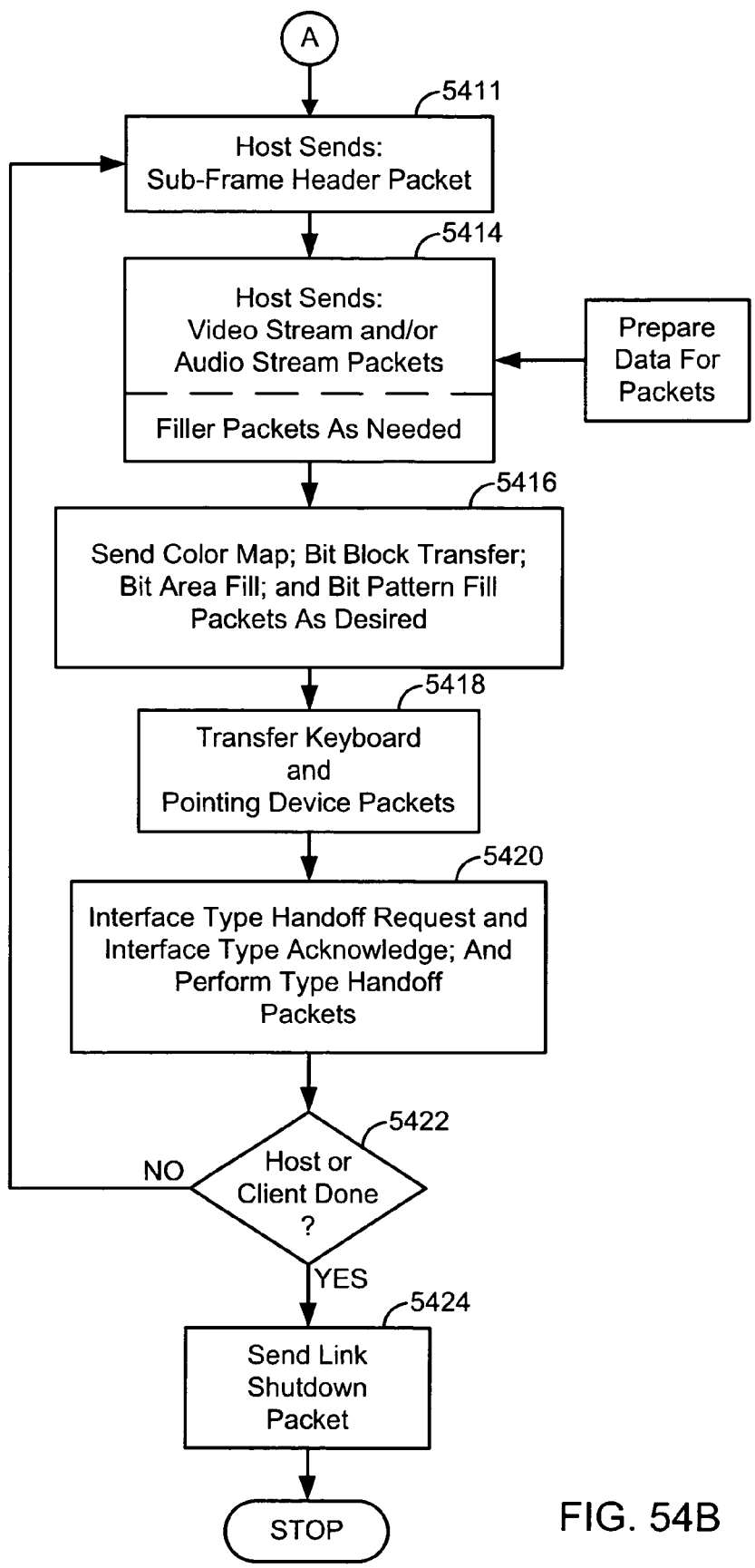
Figure 55:
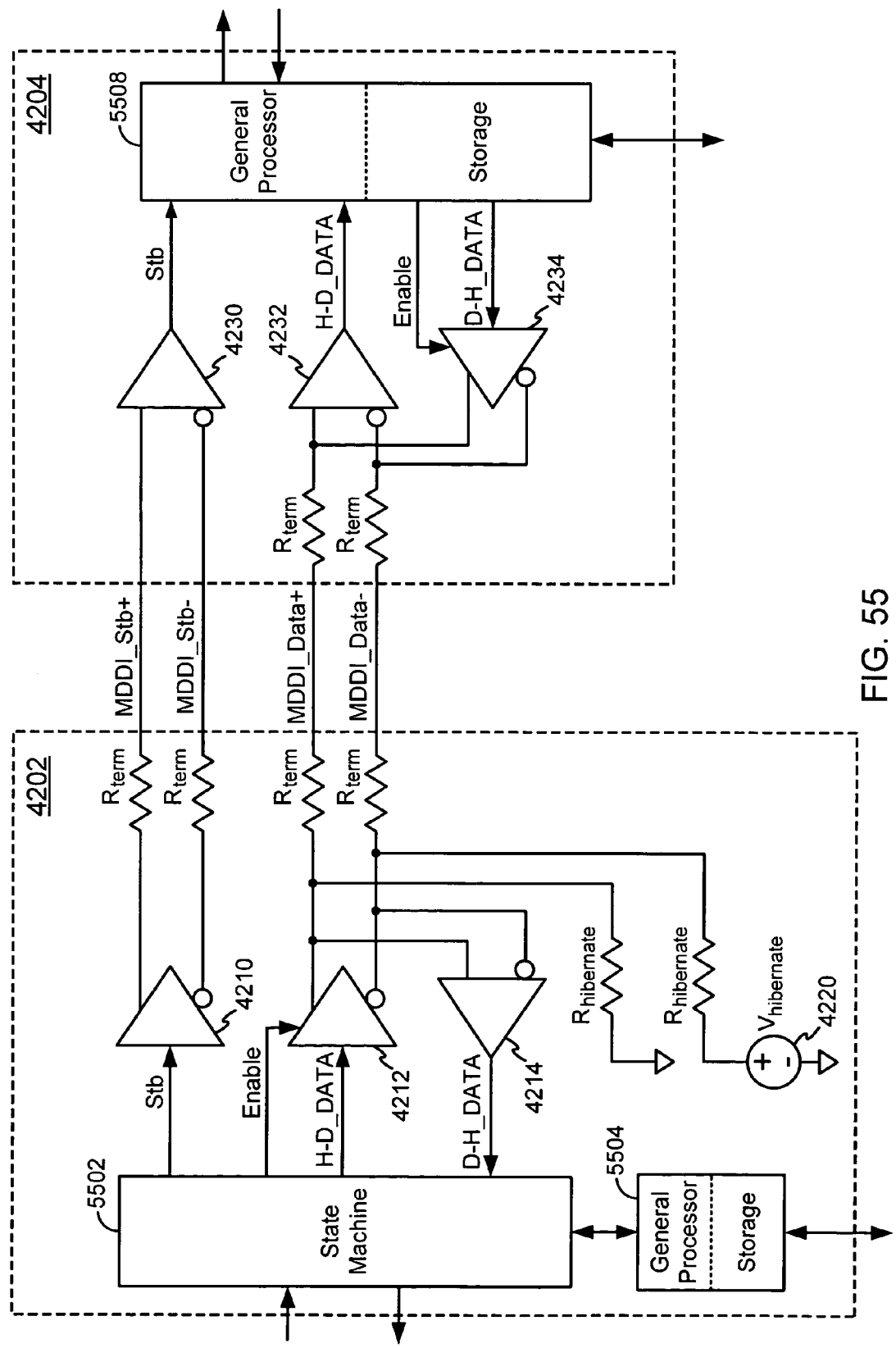
FIG. 55 illustrates an overview of the interface apparatus processing packets.

A summary of the general steps undertaken in processing data and packets during operation of an interface using embodiments of the invention is shown in FIGS. 54A and 54B, along with an overview of the interface apparatus processing the packets in FIG. 55. In these figures, the process starts in a step 5402 with a determination as to whether or not the client and host are connected using a communication path, here a cable. This can occur through the use of periodic polling by the host, using software or hardware that detects the presence of connectors or cables or signals at the inputs to the host (such as is seen for USB interfaces), or other known techniques. If there is no client connected to the host, then it can simply enter a wait state of some predetermined length, depending upon the application, go into a hibernation mode, or be inactivated to await future use which might require a user to take action to reactivate the host. For example, when a host resides on a computer type device, a user might have to click on a screen icon or request a program that activates the host processing to look for the client. Again, simple plug in of a USB type connection could activate host processing, depending on the capabilities and configuration of the host or resident host software.

Once a client is connected to the host, or visa versa, or detected as being present, either the client or the host sends appropriate packets requesting service in steps 5404 and 5406. The client could send either Client Service Request or Status packets in step 5404. It is noted that the link, as discussed above, could have been previously shut down or be in hibernation mode so this may not be a complete initialization of the communication link that follows. Once the communication link is synchronized and the host is trying to communicate with the client, the client also provides a Client Capabilities packet to the host, as in step 5408. The host can now begin to determine the type of support, including transfer rates, the client can accommodate.

Generally, the host and client also negotiate the type (rate/speed) of service mode to be used, for example Type 1, Type 2, and so forth, in a step 5410. Once the service type is established the host can begin to transfer information. In addition, the host may use Round Trip Delay Measurement Packets to optimize the timing of the communication links in parallel with other signal processing, as shown in step 5411.

As stated earlier, all transfers begin with a Sub-Frame Header Packet, shown being transferred in step 5412, followed by the type of data, here video and audio stream packets, and filler packets, shown being transferred in step 5414. The audio and video data will have been previously prepared or mapped into packets, and filler packets are inserted as needed or desired to fill out a required number of bits for the media frames. The host can send packets such as the Forward Audio Channel Enable Packets to activate sound devices. In addition, the host can transfer commands and information using other packet types discussed above, here shown as the transfer of Color Map, Bit Block Transfer or other packets in step 5416. Furthermore, the host and client can exchange data relating to a keyboard or pointing devices using the appropriate packets.

During operation, one of several different events can occur which lead to the host or client desiring a different data rate or type of interface mode. For example, a computer or other device communicating data could encounter loading conditions in processing data that causes a slow down in the preparation or presentation of packets. A client device receiving the data could change from a dedicated AC power source to a more limited battery power source, and either not be able to transfer in data as quickly, process commands as readily, or not be able to use the same degree of resolution or color depth under the more limited power settings. Alternatively, a restrictive condition could be abated or disappear allowing either device to transfer data at higher rates. This being more desirable, a request can be made to change to a higher transfer rate mode.

If these or other types of known conditions occur or change, either the host or client may detect them and try to renegotiate the interface mode. This is shown in step 5420, where the host sends Interface Type Handoff Request Packets to the client requesting a handoff to another mode, the client sends Interface Type Acknowledge Packets confirming a change is sought, and the host sends Perform Type Handoff Packets to make the change to the specified mode.

Although, not requiring a particular order of processing, the client and host can also exchange packets relating to data intended for or received from pointing devices, keyboards, or other user type input devices associated primarily with the client, although such elements may also be present on the host side. These packets are typically processed using a general processor type element and not the state machine (5502). In addition, some of the commands discussed above will also be processed by the general processor. (5504, 5508)

After data and commands have been exchanged between the host and client, at some point a decision is made as to whether or not additional data is to be transferred or the host or client is going to cease servicing the transfer. This is shown in step 5422. If the link is to enter either a hibernation state or be shut down completely, the host sends a Link Shutdown packet to the client, and both sides terminate the transfer of data.

The packets being transferred in the above operations processing will be transferred using the drivers and receivers previously discussed in relation to the host and client controllers. These line drivers and other logic elements are connected to the state machine and general processors discussed above, as illustrated in the overview of FIG. 55. In FIG. 55, a state machine 5502 and general processors 5504 and 5508 may further be connected to other elements not shown such as a dedicated USB interface, memory elements, or other components residing outside of the link controller with which they interact, including, but not limited to, the data source, and video control chips for view display devices.

The processors, and state machine provide control over the enabling and disabling of the drivers as discussed above in relation to guard times, and so forth, to assure efficient establishment or termination of communication link, and transfer of packets.

XVI Display Frame Buffers

Video data buffering requirements are different for moving video images compared to computer graphics. Pixel data is most often stored in a local frame buffer in the client so the image on the client can be refreshed locally.

Figure 91A:
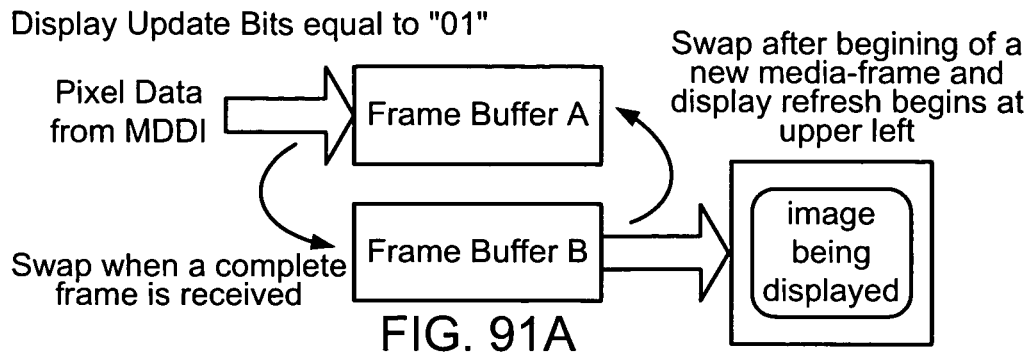
FIG. 91A-91C illustrate use of two display buffers to reduce visible artifacts.

When full-motion video is being displayed (nearly every pixel in the display changes each Media Frame) it is usually preferred to store the incoming pixel data in one frame buffer while the image on the display is being refreshed from a second frame buffer. More than two display buffers may be used to eliminate visible artifacts as described below. When an entire image has been received in one frame buffer then the roles of the buffers can be swapped, and the newly received image is then used to refresh the display and the other buffer is filled with the next frame of the image. This concept is illustrated in FIG. 91A, where pixel data is written to the offline image buffer by setting the Display Update bits to "01."

Figure 91B:
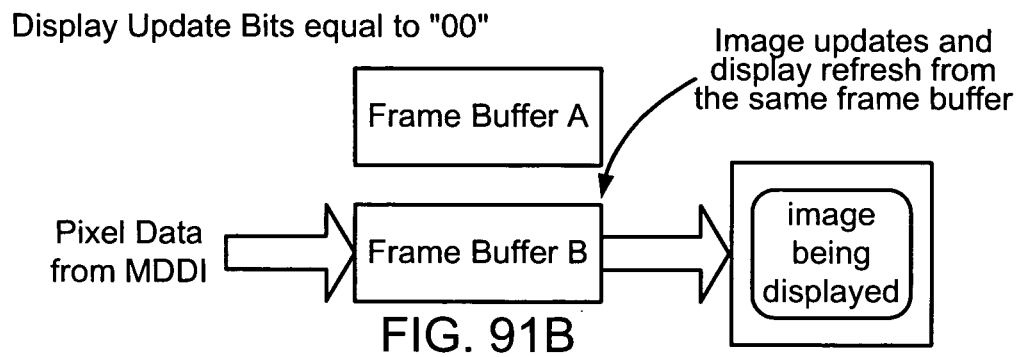

In other applications the host needs to update only a small portion of the image without having to repaint the entire image. In this situation it is desired to write the new pixels directly to the buffer being used to refresh the display, as illustrated in detail FIG. 91B.

Figure 91C:
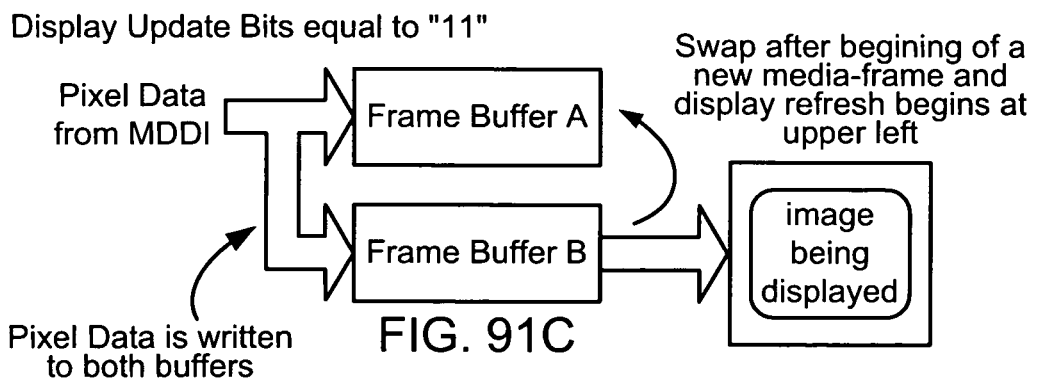

In applications that have a fixed image with a small video window it is easiest to write the fixed image to both buffers (display update bits equal to "11") as shown in FIG. 91C, and subsequently write the pixels of the moving image to the offline buffer by setting the display update bits to "01."

The following rules describe the useful manipulation of buffer pointers while simultaneously writing new information to the client and refreshing the display. Three buffer pointers exist: current_fill points to the buffer currently being filled from data over the MDDI link. just_filled points to the buffer that was most recently filled. being_displayed points to the buffer currently being used to refresh the display. All three buffer pointers may contain values from 0 to N−1 where N is the number of display buffers, and N≥2. Arithmetic on buffer pointers is mod N, e.g. when N=3 and current_fill=2, incrementing current_fill causes current_fill to be set to 0. In the simple case where N=2, just_filled is always the complement of current_fill. On every MDDI Media Frame boundary (Sub-frame Header Packet with the Sub-frame Count field equal so zero) perform the following operations in the order specified: set just_filled equal to current_fill, and set current_fill equal to current_fill+1.

MDDI Video Stream Packets update the buffers according to the structure or methodology of: when Display Update Bits equal to '01', pixel data is written to the buffer specified by current_fill; when Display Update Bits equal to '00', pixel data is written to the buffer specified by just_filled; and when Display Update Bits equal to "11," pixel data is written to all buffers. The display is refreshed from the buffer specified by the being_displayed pointer. After the display refreshes the last pixel in one frame refresh epoch and before it begins to refresh the first pixel in the next frame refresh epoch the display update process performs the operation of setting being_refreshed equal to just_filled;

The Video Stream Packet contains a pair of Display Update Bits that specify the frame buffer where the pixel data is to be written. The Client Capability Packet has three additional bits that indicate which combinations of the Display Update Bits are supported in the client In many cases, computer-generated images need to be incrementally updated based on user input or derived from information received from a computer network. Display Update Bit combinations "00" and "11" support this mode of operation by causing the pixel data to be written to the frame buffer being displayed or to both frame buffers.

When accommodating video images, FIG. 92 illustrates how video images are displayed using a pair of frame buffers when video data is transmitted over the MDDI link with the Display Update Bits equal to "01." After a media-frame boundary is detected on the MDDI link, the display refresh process will begin refreshing from the next frame buffer when the refresh process for the frame currently being refreshed is completed.

An important assumption related to FIG. 92 is that the image is received from the host as a continuous stream of pixels that are transmitted in the same order that the client uses to read the pixels from the frame buffer to refresh the display (usually upper-left, reading row by row, to the bottom-right corner of the screen. This is an important detail in the cases where the Display Refresh and Image Transfer operations reference the same frame buffer.

It is necessary for the display refresh frame rate to be greater than the image transfer frame rate to avoid displaying partial images. FIG. 93 shows how image fragmentation can occur with a slow display refresh rate that is the display refresh is slower than the image transfer.

In an image that contains a combination of computer graphic images and moving video pictures the video pixel data might occupy a small portion of a media-frame. This could be significant in situations where the display refresh operation and the image transfer reference the same frame buffer. These situations are shown by a cross-hatched shading in FIG. 94, where the pixels read from the buffer to refresh the display might be the pixels written to the buffer two frames ago, or they may correspond to the frame immediately being written to the same frame buffer.

The use of three frame buffers in the client will resolve the problem of the small window of contention for access to a frame buffer as shown in FIG. 95.

However, there is still a problem if the display refresh rate is less than the media-frame rate over the MDDI link as shown in FIG. 96.

Figure 97:
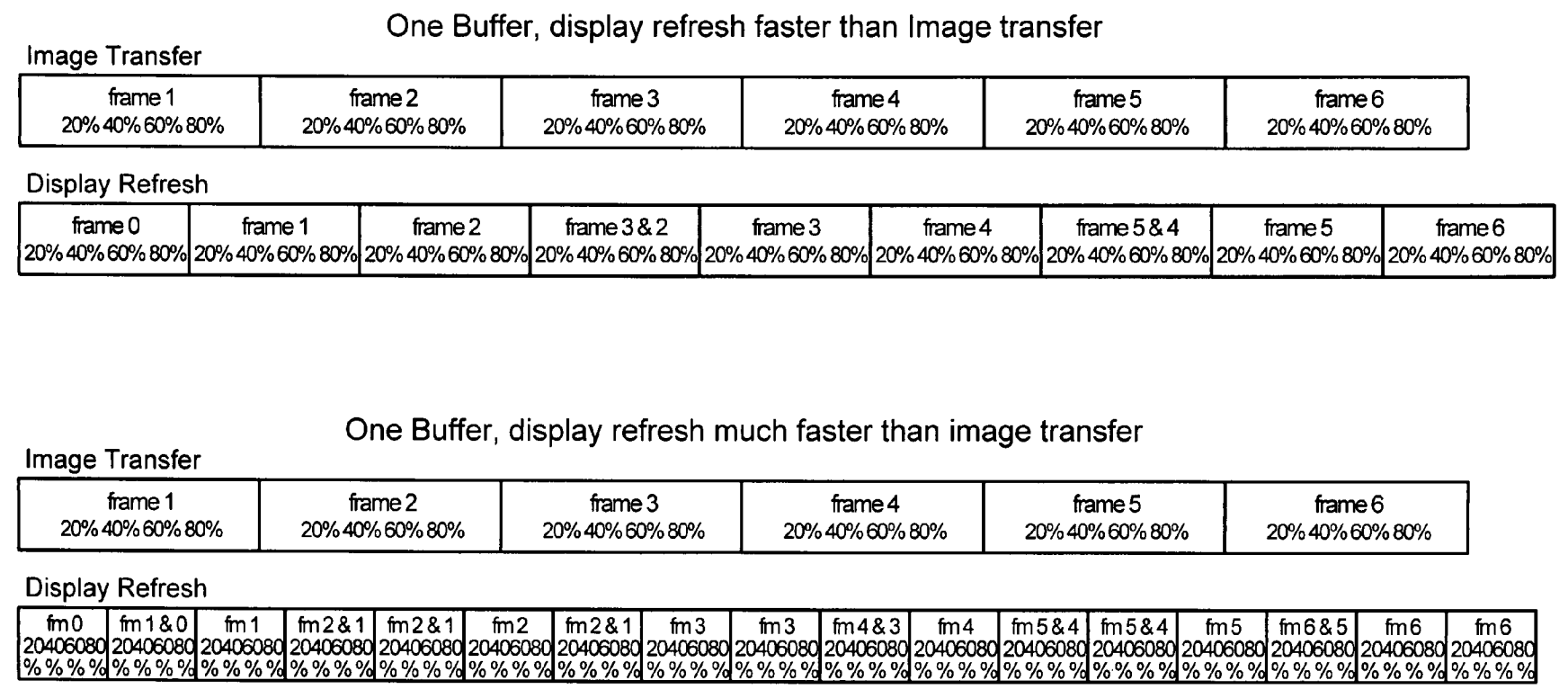

The use of a single buffer for moving video images is somewhat problematic as shown FIG. 97. With the display refresh faster than the image transfer into the buffer, the image being refreshed sometimes will show the upper portion of the frame being written and the lower portion of the image will be the frame previously transferred. With the display refresh faster than the image transfer (the preferred mode of operation) there will be more frequent instances of frames showing a similar split image.

XVII. Delay Value Table

The Packet Processing Delay Parameters Packet uses a table-lookup function to calculate the predicted delay to process certain commands in the client. Values in the table increase in a logarithmic fashion to provide a very wide dynamic range of delay values. An exemplary table of delay values useful for implementing embodiments of the invention is found in Table XX below, with corresponding index values versus delay values.

TABLE XX

0 - no_delay
1 - 46 ps
2 - 51 ps
3 - 56 ps
4 - 62 ps
5 - 68 ps
6 - 75 ps
7 - 83 ps
8 - 91 ps
9 - 100 ps
10 - 110 ps
11 - 120 ps
12 - 130 ps
13 - 150 ps
14 - 160 ps
15 - 180 ps
16 - 200 ps
17 - 220 ps
18 - 240 ps
19 - 260 ps
20 - 290 ps
21 - 320 ps
22 - 350 ps
23 - 380 ps
24 - 420 ps
25 - 460 ps
26 - 510 ps
27 - 560 ps
28 - 620 ps
29 - 680 ps TABLE XX-continued 30 - 750 ps
31 - 830 ps
32 - 910 ps
33 - 1.0 ns
34 - 1.1 ns
35 - 1.2 ns
36 - 1.3 ns
37 - 1.5 ns
38 - 1.6 ns
39 - 1.8 ns
40 - 2.0 ns
41 - 2.2 ns
42 - 2.4 ns
43 - 2.6 ns
44 - 2.9 ns
45 - 3.2 ns
46 - 3.5 ns
47 - 3.8 ns
48 - 4.2 ns
49 - 4.6 ns
50 - 5.1 ns
51 - 5.6 ns
52 - 6.2 ns
53 - 6.8 ns
54 - 7.5 ns
55 - 8.3 ns
56 - 9.1 ns
57 - 10 ns
58 - 11 ns
59 - 12 ns
60 - 13 ns
61 - 15 ns
62 - 16 ns
63 - 18 ns
64 - 20 ns
65 - 22 ns
66 - 24 ns
67 - 26 ns
68 - 29 ns
69 - 32 ns
70 - 35 ns
71 - 38 ns
72 - 42 ns
73 - 46 ns
74 - 51 ns
75 - 56 ns
76 - 62 ns
77 - 68 ns
78 - 75 ns
79 - 83 ns
80 - 91 ns
81 - 100 ns
82 - 110 ns
83 - 120 ns
84 - 130 ns
85 - 150 ns
86 - 160 ns
87 - 180 ns
88 - 200 ns
89 - 220 ns
90 - 240 ns
91 - 260 ns
92 - 290 ns
93 - 320 ns
94 - 350 ns
95 - 380 ns
96 - 420 ns
97 - 460 ns
98 - 510 ns
99 - 560 ns
100 - 620 ns
101 - 680 ns
102 - 750 ns
103 - 830 ns
104 - 910 ns
105 - 1.0 us
106 - 1.1 us
107 - 1.2 us
108 - 1.3 us
109 - 1.5 us TABLE XX-continued

| Index | Value |
|---|---|
| 110 | 1.6 us |
| 111 | 1.8 us |
| 112 | 2.0 us |
| 113 | 2.2 us |
| 114 | 2.4 us |
| 115 | 2.6 us |
| 116 | 2.9 us |
| 117 | 3.2 us |
| 118 | 3.5 us |
| 119 | 3.8 us |
| 120 | 4.2 us |
| 121 | 4.6 us |
| 122 | 5.1 us |
| 123 | 5.6 us |
| 124 | 6.2 us |
| 125 | 6.8 us |
| 126 | 7.5 us |
| 127 | 8.3 us |
| 128 | 9.1 us |
| 129 | 10 us |
| 130 | 11 us |
| 131 | 12 us |
| 132 | 13 us |
| 133 | 15 us |
| 134 | 16 us |
| 135 | 18 us |
| 136 | 20 us |
| 137 | 22 us |
| 138 | 24 us |
| 139 | 26 us |
| 140 | 29 us |
| 141 | 32 us |
| 142 | 35 us |
| 143 | 38 us |
| 144 | 42 us |
| 145 | 46 us |
| 146 | 51 us |
| 147 | 56 us |
| 148 | 62 us |
| 149 | 68 us |
| 150 | 75 us |
| 151 | 83 us |
| 152 | 91 us |
| 153 | 100 us |
| 154 | 110 us |
| 155 | 120 us |
| 156 | 130 us |
| 157 | 150 us |
| 158 | 160 us |
| 159 | 180 us |
| 160 | 200 us |
| 161 | 220 us |
| 162 | 240 us |
| 163 | 260 us |
| 164 | 290 us |
| 165 | 320 us |
| 166 | 350 us |
| 167 | 380 us |
| 168 | 420 us |
| 169 | 460 us |
| 170 | 510 us |
| 171 | 560 us |
| 172 | 620 us |
| 173 | 680 us |
| 174 | 750 us |
| 175 | 830 us |
| 176 | 910 us |
| 177 | 1.0 ms |
| 178 | 1.1 ms |
| 179 | 1.2 ms |
| 180 | 1.3 ms |
| 181 | 1.5 ms |
| 182 | 1.6 ms |
| 183 | 1.8 ms |
| 184 | 2.0 ms |
| 185 | 2.2 ms |
| 186 | 2.4 ms |
| 187 | 2.6 ms |
| 188 | 2.9 ms |
| 189 | 3.2 ms |
| 190 | 3.5 ms |
| 191 | 3.8 ms |
| 192 | 4.2 ms |
| 193 | 4.6 ms |
| 194 | 5.1 ms |
| 195 | 5.6 ms |
| 196 | 6.2 ms |
| 197 | 6.8 ms |
| 198 | 7.5 ms |
| 199 | 8.3 ms |
| 200 | 9.1 ms |
| 201 | 10 ms |
| 202 | 11 ms |
| 203 | 12 ms |
| 204 | 13 ms |
| 205 | 15 ms |
| 206 | 16 ms |
| 207 | 18 ms |
| 208 | 20 ms |
| 209 | 22 ms |
| 210 | 24 ms |
| 211 | 26 ms |
| 212 | 29 ms |
| 213 | 32 ms |
| 214 | 35 ms |
| 215 | 38 ms |
| 216 | 42 ms |
| 217 | 46 ms |
| 218 | 51 ms |
| 219 | 56 ms |
| 220 | 62 ms |
| 221 | 68 ms |
| 222 | 75 ms |
| 223 | 83 ms |
| 224 | 91 ms |
| 225 | 100 ms |
| 226 | 110 ms |
| 227 | 120 ms |
| 228 | 130 ms |
| 229 | 150 ms |
| 230 | 160 ms |
| 231 | 180 ms |
| 232 | 200 ms |
| 233 | 220 ms |
| 234 | 240 ms |
| 235 | 260 ms |
| 236 | 290 ms |
| 237 | 320 ms |
| 238 | 350 ms |
| 239 | 380 ms |
| 240 | 420 ms |
| 241 | 460 ms |
| 242 | 510 ms |
| 243 | 560 ms |
| 244 | 620 ms |
| 245 | 680 ms |
| 246 | 750 ms |
| 247 | 830 ms |
| 248 | 910 ms |
| 249 | 1.0 sec |
| 250 | 1.1 sec |
| 251 | 1.2 sec |
| 252 | 1.3 sec |
| 253 | 1.5 sec |
| 254 | 1.6 s |
| 255 | indefinite |

The delay is computed by performing a table lookup using the specified parameter as an index into the table. This means a delay is equal to PacketProcessingTable(index). For example: if one of the parameters from the Delay Parameters List Item is an 8-bit value equal to 134, then the delay is equal to PacketProcessingTable(134) which is 16 μsec. The value 255 indicates that the command completion time cannot be determined by calculation, and that the host will check the Graphics Busy Flags in the Client Request and Status Packet or MCCS VCP Control Parameter B7h.

In some cases this delay is multiplied by the height, width, or number of pixels in the destination image and added to other delays to compute the overall packet processing delay.

XVIII Multiple Client Support

The current protocol version does not appear to directly support multiple client devices. However, most packets contain a reserved Client ID field that can be used to address specific client devices in a system with multiple clients. Currently, for many applications this client ID or these client IDs are set to be zero. The sub-frame header packet also contains a field to indicate whether or not the host supports a multiple client system. Therefore, there is a manner in which multiple client devices would likely be connected and addressed in future applications of the MDD interface or protocol to aid system designers to plan for future compatibility with multiple client hosts and clients.

Figure 98:
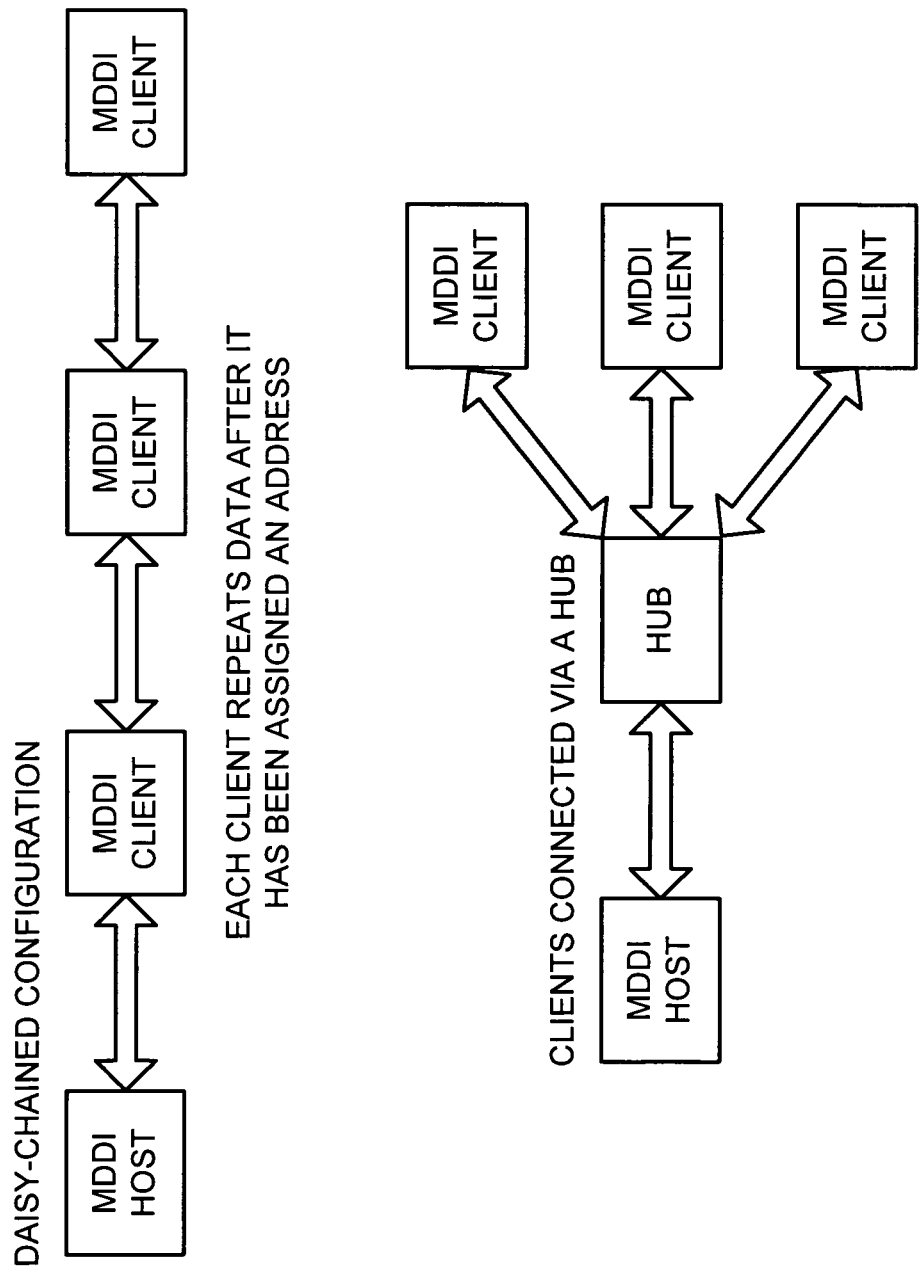
FIG. 98 illustrates host-client connection via daisy-chain and hub.
Figure 99:
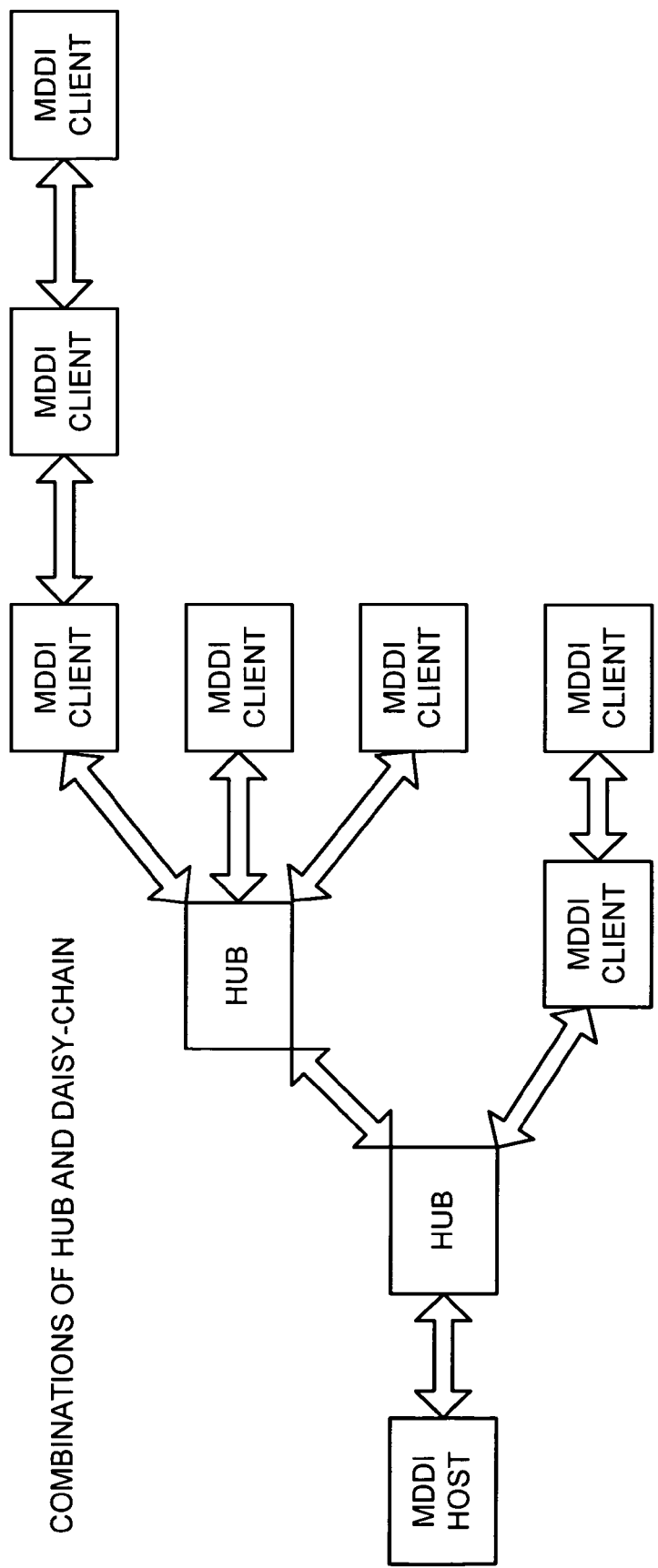
FIG. 99 illustrates client devices connected via a combination of hubs and daisy chains.

In systems having multiple clients it is useful for clients to be connected to the host using a daisy-chain of clients, or using hubs, as shown in FIG. 98, or using a combination of these techniques as shown in FIG. 99.

XVIII. Addendum

In addition to the formats, structures, and contents discussed above for the various packets used to implement the architecture and protocol for embodiments of the invention, more detailed field contents or operations are presented here for some of the packet types. These are presented here to further clarify their respective use or operations to enable those skilled in the art to more readily understand and make use of the invention for a variety of applications. Only a few of the fields not already discussed are discussed further here. In addition, these fields are presented with exemplary definitions and values in relation to the embodiments presented above. However, such values are not to be taken as limitations of the invention, but represent one or more embodiments useful for implementing the interface and protocol, and not all embodiments need be practiced together or at the same time. Other values can be used in other embodiments to achieve the desired presentation of data or data rate transfer results, as will be understood by those skilled in the art.

A. For Video Stream Packets

In one embodiment, the Pixel Data Attributes field (2 byte) has a series of bit values that are interpreted as follows. Bits 1 and 0 select how the display pixel data is routed. For bit values of '11' data is displayed to or for both eyes, for bit values '10', data is routed only to the left eye, and for bit values '01', data is routed only to the right eye, and for bit values of '00' the data is routed to an alternate display as may be specified by bits 8 through 11 discussed below.

Bit 2 indicates whether or not the Pixel Data is presented in an interlace format, with a value of '0' meaning the pixel data is in the standard progressive format, and that the row number (pixel Y coordinate) is incremented by 1 when advancing from one row to the next. When this bit has a value of '1', the pixel data is in interlace format, and the row number is incremented by 2 when advancing from one row to the next. Bit 3 indicates that the Pixel Data is in alternate pixel format. This is similar to the standard interlace mode enabled by bit 2, but the interlacing is vertical instead of horizontal. When Bit 3 is '0' the Pixel Data is in the standard progressive format, and the column number (pixel X coordinate) is incremented by 1 as each successive pixel is received. When Bit 3 is '1' the Pixel Data is in alternate pixel format, and the column number is incremented by 2 as each pixel is received.

Bit 4 indicates whether or not the Pixel data is related to a display or a camera, as where data is being transferred to or from an internal display for a wireless phone or similar device or even a portable computer, or such other devices as discussed above, or the data is being transferred to or from a camera built into or directly coupled to the device. When Bit 4 is '0' the Pixel data is being transferred to or from a display frame buffer. When Bit 4 is '1' Pixel data is being transferred to or from a camera or video device of some type, such devices being well known in the art.

Bit 5 is used to indicate when the pixel data contains the next consecutive row of pixels in the display. This is considered the case when Bit 5 is set equal to '1'. When bit 5 is set to '1' then the X Left Edge, Y Top Edge, X Right Edge, Y Bottom Edge, X Start, and Y Start parameters are not defined and are ignored by the client. When Bit 15 is set at a logic-one level, this indicates that the pixel data in this packet is the last row of pixels in the image. Bit 8 of the Client Feature Capability Indicators field of the Client Capability Packet indicates whether this feature is supported.

Bits 7 and 6 are Display Update Bits that specify a frame buffer where the pixel data is to be written. The more specific effects are discussed elsewhere. For bit values of '01' Pixel data is written to the offline image buffer. For bit values of '00' Pixel data is written to the image buffer used to refresh the display. For bit values of '11' Pixel data is written to all image buffers. The bit values or combination of '10' is treated as an invalid value or designation and Pixel data is ignored and not written to any of the image buffers. This value may have use for future applications of the interface.

Bits 8 through 11 form a 4-bit unsigned integer that specifies an alternate display or display location where pixel data is to be routed. Bits 0 and 1 are set equal to '00' in order for the display client to interpret bits 8 through 11 as an alternate display number. If bits 0 and 1 are not equal to '00' then bits 8 through 11 are set to logic-zero levels.

Bits 12 through 14 are reserved for future use and are generally set to logic-zero levels. Bit 15, as discussed, is used in conjunction with bit 5, and setting bit 15 to logic-one indicates that the row of pixels in the Pixel Data field is the last row of pixels in a frame of data. The next Video Stream Packet having bit 5 set to logic-one will correspond to the first row of pixels of the next video frame.

The 2-byte X Start and Y Start fields specify the absolute X and Y coordinates of the point (X Start, Y Start) for the first pixel in the Pixel Data field. The 2-byte X Left Edge and Y Top Edge fields specify the X coordinate of the left edge and Y coordinate of the top edge of the screen window filled by the Pixel Data field, while the X Right Edge and Y Bottom Edge fields specify the X coordinate of the right edge, and the Y coordinate of the bottom edge of the window being updated.

The Pixel Count field (2 bytes) specifies the number of pixels in the Pixel Data field below.

The Parameter CRC field (2 bytes) contains a CRC of all bytes from the Packet Length to the Pixel Count. If this CRC fails to check then the entire packet is discarded.

The Pixel Data field contains the raw video information that is to be displayed, and which is formatted in the manner described by the Video Data Format Descriptor field. The data is transmitted one "row" at a time as discussed elsewhere. When Bit 5 of the Pixel Data Attributes field is set at logic level one, then the Pixel Data field contains exactly one row of pixels, with the first pixel being transmitted corresponding to the left-most pixel and the last pixel transmitted corresponding to the right-most pixel.

The Pixel Data CRC field (2 bytes) contains a 16-bit CRC of only the Pixel Data. If a CRC verification of this value fails then the Pixel Data can still be used, but the CRC error count is incremented.

B. For Audio Stream Packets

In one embodiment, the Audio Channel ID field (1 byte) uses an 8 bit unsigned integer value to identify a particular audio channel to which audio data is sent by the client device. The physical audio channels are specified in or mapped to physical channels by this field as values of 0, 1, 2, 3, 4, 5, 6, or 7 which indicate the left front, right front, left rear, right rear, front center, sub-woofer, surround left, and surround right channels, respectively. An audio channel ID value of 254 indicates that the single stream of digital audio samples is sent to both the left front and right front channels. This simplifies communications for applications such as where a stereo headset is used for voice communication, productivity enhancement apps are used on a PDA, or other applications where a simple User Interface generates warning tones. Values for the ID field ranging from 8 through 253, and 255 are currently reserved for use where new designs desire additional designations, as anticipated by those skilled in the art.

The Reserved 1 field (1 byte) is generally reserved for future use, and has all bits in this field set to zero. One function of this field is to cause all subsequent 2 byte fields to align to a 16-bit word address and cause 4-byte fields to align to a 32-bit word address.

The Audio Sample Count field (2 bytes) specifies the number of audio samples in this packet.

The Bits Per Sample and Packing field contains 1 byte that specifies the packing format of audio data. In one embodiment, the format generally employed is for Bits 4 through 0 to define the number of bits per PCM audio sample. Bit 5 then specifies whether or not the Digital Audio Data samples are packed. As mentioned above, FIG. 12 illustrates the difference between packed and byte-aligned audio samples. A value of '0' for Bit 5 indicates that each PCM audio sample in the Digital Audio Data field is byte-aligned with the interface byte boundary, and a value of '1' indicates that each successive PCM audio sample is packed up against the previous audio sample. This bit is effective only when the value defined in bits 4 through 0 (the number of bits per PCM audio sample) is not a multiple of eight. Bits 7 through 6 are reserved for use where system designs desire additional designations and are generally set at a value of zero.

The Audio Sample Rate field (1 byte) specifies the audio PCM sample rate. The format employed is for a value of 0 to indicate a rate of 8,000 samples per second (sps), a value of 1 indicates 16,000 sps., value of 2 for 24,000 sps, value of 3 for 32,000 sps, value of 4 for 40,000 sps, value of 5 for 48,000 sps, value of 6 for 11,025 sps, value of 7 for 22,050 sps, and value of 8 for 44,100 sps, respectively, with values of 9 through 255 being reserved for future use, so they are currently set to zero.

The Parameter CRC field (2 bytes) contains a 16-bit CRC of all bytes from the Packet Length to the Audio Sample Rate. If this CRC fails to check appropriately, then the entire packet is discarded. The Digital Audio Data field contains the raw audio samples to be played, and is usually in the form of a linear format as unsigned integers. The Audio Data CRC field (2 bytes) contains a 16-bit CRC of only the Audio Data. If this CRC fails to check, then the Audio Data can still be used, but the CRC error count is incremented.

C. For User-Defined Stream Packets

In one embodiment, the 2-byte Stream ID Number field is used to identify a particular user defined stream. The contents of the Stream Parameters and Stream Data fields, are typically defined by the MDDI equipment manufacturer. The 2-byte Stream Parameter CRC field contains a 16-bit CRC of all bytes of the stream parameters starting from the Packet Length to the Audio Coding byte. If this CRC fails to check, then the entire packet is discarded. Both the Stream Parameters and Stream Parameter CRC fields may be discarded if not needed by an end application of the MDD interface, that is, they are considered optional. The 2-byte Stream Data CRC field contains a CRC of only the Stream Data. If this CRC fails to check appropriately, then use of the Stream Data is optional, depending on the requirements of the application. Use of the stream data contingent on the CRC being good, generally requires that the stream data be buffered until the CRC is confirmed as being good. The CRC error count is incremented if the CRC does not check.

D. For Color Map Packets

The 2-byte hClient ID field contains information or values that are reserved for a Client ID, as used previously. Since this field is generally reserved for future use, the current value is set to zero, by setting the bits to '0'.

The 2-byte Color Map Item Count field uses values to specify the total number of 3-byte color map items that are contained in the Color Map Data field, or the color map table entries that exist in the Color Map Data in this packet. In this embodiment, the number of bytes in the Color Map Data is 3 times the Color Map Item Count. The Color Map Item Count is set equal to zero to send no color map data. If the Color Map Size is zero then a Color Map Offset value is generally still sent but it is ignored by the display. The Color Map Offset field (4 bytes) specifies the offset of the Color Map Data in this packet from the beginning of the color map table in the client device.

A 2-byte Parameter CRC field contains a CRC of all bytes from the Packet Length to the Audio Coding byte. If this CRC fails to check then the entire packet is discarded.

For the Color Map Data field, the width of each color map location is a specified by the Color Map Item Size field, where in one embodiment the first part specifies the magnitude of blue, the second part specifies the magnitude of green, and the third part specifies the magnitude of red. The Color Map Size field specifies the number of 3-byte color map table items that exist in the Color Map Data field. If a single color map cannot fit into one Video Data Format and Color Map Packet, then the entire color map may be specified by sending multiple packets with different Color Map Data and Color Map Offsets in each packet. The number of bits of blue, green, and red in each color map data item is generally the same as specified in the Color Map RGB Width field of the Display Capability Packet.

A 2-byte Color Map Data CRC field contains a CRC of only the Color Map Data. If this CRC fails to check then the Color Map Data can still be used but the CRC error count is incremented.

Figure 100:
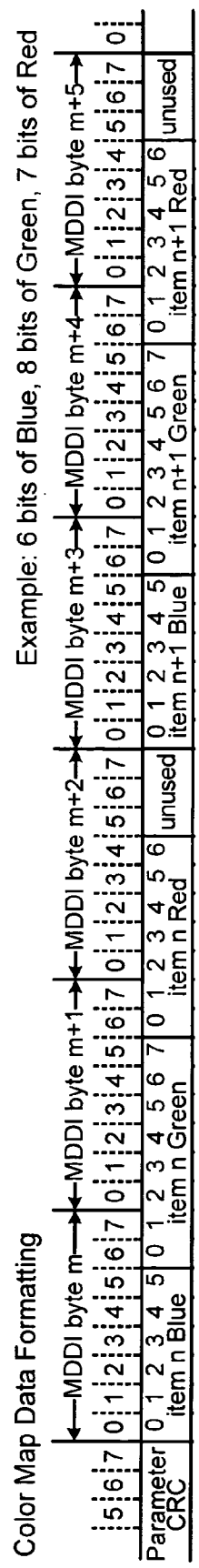
FIG. 100 illustrates a color map.

Each color map data item is to be transmitted in the order: blue, green, red, with the least significant bit of each component transmitted first. The individual red, green, and blue components of each color map item are packed, but each color map item (the least significant bit of the blue component) should be byte-aligned. FIG. 100 illustrates an example of color map data items with 6 bits of blue, 8 bits of green, and 7 bits of red. For this example, the Color Map Item Size in the Color Map Packet is equal to 21, and the Color Map RGB Width field of the Client Capability Packet is equal to 0x0786.

E. For Reverse Link Encapsulation Packets

The Parameter CRC field (2 bytes) contains a 16-bit CRC of all bytes from the Packet Length to the Turn-Around Length. If this CRC fails to check, then the entire packet is discarded.

In one embodiment, the Reverse Link Flags field (1 byte) contains a set of flags to request information from the client. If a bit (for example, Bit 0) is set to a logic-one level, then the host requests the specified information from the display using the Client Capability Packet. If the bit is set to a logic-zero level, then the host does not need the information from the client. The remaining bits (here Bits 1 through 7) are reserved for future use and are set to zero. However, more bits can be used as desired to set flags for the reverse link.

The Reverse Rate Divisor field (1 byte) specifies the number of MDDI_Stb cycles that occur in relation to the reverse link data clock. The reverse link data clock is equal to the forward link data clock divided by two times the Reverse Rate Divisor. The reverse link data rate is related to the reverse link data clock and the Interface Type on the reverse link. In this embodiment, for a Type 1 interface the reverse data rate equals the reverse link data clock, for Type 2, Type 3, and Type 4 interfaces the reverse data rates equal two times, four times, and eight times the reverse link data clock, respectively.

The All Zero 1 field contains a group of bytes, here 8, that is set equal to zero in value by setting the bits at a logic-zero level, and is used to ensure that all MDDI_Data signals are at a logic-zero level for a sufficient time to allow the client to begin recovering clock using only MDDI_Stb prior to disabling the host's line drivers during the Turn-Around 1 field. In one embodiment, the length of the All Zero 1 field is greater than or equal to the number of forward link byte transmission times in the round-trip delay of the cable.

The Turn-Around 1 Length field (1 byte) specifies the total number of bytes that are allocated for Turn-Around 1, establishing the first turn-around period. The number of bytes specified by the Turn-Around 1 Length parameter are allocated to allow the MDDI_Data line drivers in the client to enable, before the line drivers in the host are disabled. The client enables its MDDI_Data line drivers during bit 0 of Turn-Around 1 and the host disables its outputs so as to be completely disabled prior to the last bit of Turn-Around 1. The timing of the enabling of the client driver and disabling of the host driver processes are such that one or both drive the MDDI_Data signals to a logic-zero level throughout Turn Around 1 as seen by the line receivers at the host. The MDDI_Stb signal behaves as though MDDI_Data0 were at a logic-zero level during the entire Turn Around 1 period. A more complete description of the setting of Turn-Around 1 is given above.

The Reverse Data Packets field contains a series of data packets transferred from the client to host. The client may send filler packets or drive the MDDI_Data lines to a logic-zero state or level when it has no data to send to the host. In this embodiment, if the MDDI_Data lines are driven to zero, the host will interpret this as a packet with a zero length (not a valid length) and the host will accept no additional packets from the client for the duration of the current Reverse Link Encapsulation Packet.

The Turn-Around 2 Length field (1 byte) specifies the total number of bytes that are allocated for Turn-Around 2, for establishing a second turn-around period. The number of bytes specified by the Turn-Around Length parameter are allocated to allow the MDDI_Data line drivers in the host to enable before the line drivers in the client are disabled. The host enables its MDDI_Data line drivers during bit 0 of the first byte in Turn-Around 2, and the client disables its outputs so that they are generally completely disabled prior to the last bit of Turn-Around 2. The timing of the disabling of the client driver and the enabling of the host driver processes are such that one or both drive the MDDI_Data signals to a logic-zero level throughout, or during the entire, Turn Around 2 period, as seen by the line receivers in the host. The MDDI_Stb signal behaves as though the MDDI_Data0 were at a logic-zero level during substantially the entire Turn Around 2 period. A description of the setting of Turn-Around 2 is given above.

The Reverse Data Packets field contains a series of data packets being transferred from the client to a host. As stated earlier, Filler packets are sent to fill the remaining space that is not used by other packet types.

The All Zero 2 field contains a group of bytes (8 in this embodiment) that is set equal to zero in value by setting the bits at a logic-zero level, and is used to ensure that all MDDI_Data signals are at a logic-zero level for a sufficient time to allow the client to begin recovering clock using both MDDI_Data0 and MDDI_Stb after enabling the host's line drivers following the Turn-Around 2 field.

F. For Client Capability Packets

As illustrated for one embodiment, the Protocol Version field uses 2 bytes to specify a protocol version used by the client. The initial version is currently set equal to one, and will be changed over time as new versions are generated as would be known, while the Minimum Protocol Version field uses 2 bytes to specify the minimum protocol version that the client can employ or interpret. In this case, a zero value is also a valid value. The Data Rate Capability field (2 bytes) specifies the maximum data rate the client can receive on each data pair on the forward link of the interface, and is specified in the form of megabits per second (Mbps). The Interface Type Capability field (1 byte) specifies the interface types that are supported on the forward and reverse links. A bit set to '1' indicates that a specified interface type is supported, and a bit set to '0' indicates that the specified type is not supported. Hosts and clients should support at least Type 1 on the forward and reverse lines. There is no requirement to support a contiguous range of interface types. For example, it would be perfectly valid to support only Type 1 and Type 3, but not Type 3 and Type 4 in an interface. It is also not necessary for the forward and reverse links to operate with the same interface type. However, when a link comes out of hibernation both forward and reverse links should commence operating in Type 1 mode, until other modes may be negotiated, selected, or otherwise approved for use by both the host and client.

The supported interfaces are indicated in one embodiment by selecting Bit 0, Bit 1, or Bit 2 to select either a Type 2 (2 bit), Type 3 (4 bit), or Type 4 (8 bit) mode on the forward link, respectively; and Bit 3, Bit 4, or Bit 5 to select either a Type 2, Type 3, or Type 4 mode on the reverse link, respectively; with Bits 6 and 7 being reserved and generally set to zero at this time. The Bitmap Width and Height fields, here each being 2 bytes, specify the width and height of the bitmap, respectively, in pixels.

The Monochrome Capability field (1 byte) is used to specify the number of bits of resolution that can be displayed in a monochrome format. If a display cannot use a monochrome format then this value is set at zero. Bits 7 through 4 are reserved for future use and are, thus, set as zero. Bits 3 through 0 define the maximum number of bits of grayscale that can exist for each pixel. These four bits make it possible to specify values of 1 to 15 for each pixel. If the value is zero then monochrome format is not supported by the display.

The Bayer Capability field uses 1 byte to specify the number of bits of resolution, pixel group, and pixel order that can be transferred in Bayer format. If the client cannot use the Bayer format then this value is zero. The Bayer Capability field is composed of the following values: Bits 3 through 0 define the maximum number of bits of intensity that exist in each pixel, while Bits 5 through 4 define the pixel group pattern that is required, while Bits 8 through 6 define the pixel order that is required; with Bits 14 through 9 being reserved for future use and generally set to zero in the meantime. Bit

15, when set to a logic-one level indicates that the client can accept Bayer pixel data in either packed or unpacked format. If bit 15 is set to zero this indicates that the client can accept Bayer pixel data only in unpacked format.

The Color Map Capability field (3 bytes) specifies the maximum number of table items that exist in the color map table in the display. If the display cannot use the color map format then this value is set at zero.

The RGB Capability field (2 bytes) specifies the number of bits of resolution that can be displayed in RGB format. If the display cannot use the RGB format then this value is equal to zero. The RGB Capability word is composed of three separate unsigned values where: Bits 3 through 0 define the maximum number of bits of blue, Bits 7 through 4 define the maximum number of bits of green, and Bits 11 through 8 define the maximum number of bits of red in each pixel. Currently, Bits 14 through 12 are reserved for future use and are generally set to zero. Bits 14 through 12 are reserved for future use and generally set to zero. Bit 15, when set to a logic-one level indicates that the client can accept RGB pixel data in either packed or unpacked format. If bit 15 is set to a logic-zero level, this indicates that the client can accept RGB pixel data only in unpacked format.

The Y Cr Cb Capability field (2 bytes) specifies the number of bits of resolution that can be displayed in Y Cr Cb format. If the display cannot use the Y Cr Cb format then this value is set equal to zero. The Y Cr Cb Capability word is composed of three separate unsigned values where: Bits 3 through 0 define the maximum number of bits in the Cb sample, Bits 7 through 4 define the maximum number of bits in the Cr sample, Bits 11 through 8 define the maximum number of bits in the Y sample, and Bits 15 through 12 are currently reserved for future use and are set to zero.

The Client Feature Capability field uses 4 bytes that contain a set of flags that indicate specific features in the client that are supported. A bit set to a logic-one level indicates the capability is supported, while a bit set to a logic-zero level indicates the capability is not supported. In one embodiment, the value for Bit 0 indicates whether or not Bitmap Block Transfer Packet (packet type 71) is supported. The value for Bits 1, 2, and 3 indicate whether or not Bitmap Area Fill Packet (packet type 72), Bitmap Pattern Fill Packet (packet type 73), or Communication Link Data Channel Packet (packet type 74), respectively, are supported. The value for Bit 4 indicates whether or not the client has the capability to make one color transparent using the Transparent Color Enable Packet, while values for Bits 5 and 6 indicate if the client can accept video data or audio data in packed format, respectively, and the value for Bit 7 indicates whether or not the client can send a reverse-link video stream from a camera. The value for Bit 8 indicates whether or not the client has the ability to receive a full line of pixel data and ignore display addressing as specified by bit 5 of the Pixel Data Attributes field of the Video Stream Packet, and the client can also detect frame sync or end of video frame data using bit 15 of the Pixel Data Attributes Field.

The value for Bits 11 and 12 indicate when the client is communicating either with a pointing device and can send and receive Pointing Device Data Packets, or with a keyboard and can send and receive Keyboard Data Packets, respectively. The value for Bit 13 indicates whether or not the client has the ability to set one or more audio or video parameters by supporting the VCP Feature packets: Request VCP Feature Packet, VCP Feature Reply Packet, Set VCP Feature Packet, Request Valid Parameter Packet, and Valid Parameter Reply Packet. The value for Bit 14 indicates whether or not the client has the ability to write pixel data into the offline display frame buffer. If this bit is set to a logic-one level then the Display Update Bits (bits 7 and 6 of the Pixel Data Attributes field of the Video Stream Packet) may be set to the values '01'.

The value for Bit 15 indicates when the client has the ability to write pixel data into only the display frame buffer currently being used to refresh the display image. If this bit is set to one then the Display Update Bits (bits 7 and 6 of the Pixel Data Attributes field of the Video Stream Packet) may be set to the values '00'. The value for Bit 16 indicates when the client has the ability to write pixel data from a single Video Stream Packet into all display frame buffers. If this bit is set to one then the Display Update Bits (bits 7 and 6 of the Pixel Data Attributes field of the Video Stream Packet) may be set to the value '11'.

The value for Bit 17 indicates when a client has the ability to respond to the Request Specific Status Packet, the value for Bit 18 indicates when the client has the ability to respond to the Round Trip Delay Measurement Packet, and the value for Bit 19 indicates when the client has the ability to the Forward Link Skew Calibration Packet.

The value for Bit 21 indicates when the client has the ability to interpret the Request Specific Status Packet and respond with the Valid Status Reply List Packet. The client indicates an ability to return additional status in the Valid Parameter Reply List field of the Valid Status Reply List Packet as described elsewhere.

The value for Bit 22 indicates whether or not the client has the ability to respond to the Register Access Packet. Bits 9 through 10, 20, and 23 through 31 are currently reserved for future use or alternative designations useful for system designers and are generally set equal to zero.

The Display Video Frame Rate Capability field (1 byte) specifies the maximum video frame update capability of the display in frames per second. A host may choose to update the image at a slower rate than the value specified in this field.

The Audio Buffer Depth field (2 bytes) specifies the depth of the elastic buffer in a Display which is dedicated to each audio stream.

The Audio Channel Capability field (2 bytes) contains a group of flags that indicate which audio channels are supported by the client or client connected device. A bit set to one indicates the channel is supported, and a bit set to zero indicates that channel is not supported. The Bit positions are assigned to the different channels, for example Bit positions 0, 1, 2, 3, 4, 5, 6, and 7 in one embodiment, indicate the left front, right front, left rear, right rear, front center, sub-woofer, surround left, and surround right channels, respectively. Bits 8 through 14 are currently reserved for future use, and are generally set to zero. In one embodiment Bit 15 is used to indicate if the client provides support for the Forward Audio Channel Enable Packet. If this is the case, Bit 15 set to a logic-one level. If, however, the client is not capable of disabling audio channels as a result of the Forward Audio Channel Enable Packet or if the client does not support any audio capability, then this bit is set to a logic-zero level or value.

A 2-byte Audio Sample Rate Capability field, for the forward link, contains a set of flags to indicate the audio sample rate capability of the client device. Bit positions are assigned to the different rates accordingly, such as Bits 0, 1, 2, 3, 4, 5, 6, 7, and 8 being assigned to 8,000, 16,000, 24,000, 32,000, 40,000, 48,000, 11,025, 22,050, and 44,100 samples per second (SPS), respectively, with Bits 9 through 15 being reserved for future or alternative rate uses, as desired, so they are currently set to '0'. Setting a bit value for one of these bits to '1' indicates that that particular sample rate is supported, and setting the bit to '0' indicates that that sample rate is not supported.

The Minimum Sub-frame Rate field (2 bytes) specifies the minimum sub-frame rate in frames per second. The minimum sub-frame rate keeps the client status update rate sufficient to read certain sensors or pointing devices in the client.

A 2-byte Mic Sample Rate Capability field, for the reverse link, contains a set of flags that indicate the audio sample rate capability of a microphone in the client device. For purposes of the MDDI, a client device microphone is configured to minimally support at least an 8,000 sample per second rate. Bit positions for this field are assigned to the different rates with bit positions 0, 1, 2, 3, 4, 5, 6, 7, and 8, for example, being used to represent 8,000, 16,000, 24,000, 32,000, 40,000, 48,000, 11,025, 22,050, and 44,100 samples per second (SPS), respectively, with Bits 9 through 15 being reserved for future or alternative rate uses, as desired, so they are currently set to '0'. Setting a bit value for one of these bits to '1' indicates that that particular sample rate is supported, and setting the bit to '0' indicates that that sample rate is not supported. If no microphone is connected then each of the Mic Sample Rate Capability bits are set equal to zero.

The Keyboard Data Format field (here 1 byte) specifies whether or not a keyboard is connected to the client system and the type of keyboard that is connected. In one embodiment, the value established by Bits 6 through 0 is used to define the type of keyboard that is connected. If the value is zero (0) then the keyboard type is considered as unknown. For a value of 1, the keyboard data format is considered to be a standard PS-2 style. Currently values in the range of 2 through 125 are not in use, being reserved for use of system designers and interface incorporators or product developers to define specific keyboard or input devices for use with the MDD interface and corresponding clients or hosts. A value of 126 is used to indicate that the keyboard data format is user-defined, while a value of 127 is used to indicate that a keyboard cannot be connected to this client. In addition, Bit 7 can be used to indicate whether or not the keyboard can communicate with the client. The intended use of this bit is to indicate when the keyboard can communicate with the client using a wireless link. Bit 7 would be set to a zero level if bits 6 through 0 indicate that a keyboard cannot be connected to the client. Therefore, for one embodiment, when the value of Bit 7 is 0, the keyboard and client cannot communicate, while if the value of Bit 7 is 1, the keyboard and client have acknowledged that they can communicate with each other.

The Pointing Device Data Format field (here 1 byte) specifies whether or not a pointing device is connected to the client system and the type of pointing device that is connected. In one embodiment, the value established by Bits 6 through 0 is used to define the type of pointing device that is connected. If the value is zero (0) then the pointing device type is considered as unknown. For a value of 1, the pointing device data format is considered to be a standard PS-2 style. Currently values in the range of 2 through 125 are not in use, being reserved for use of system designers and interface incorporators or product developers to define specific pointing device or input devices for use with the MDD interface and corresponding clients or hosts. A value of 126 is used to indicate that the pointing device data format is user-defined, while a value of 127 is used to indicate that a pointing device cannot be connected to this client. In addition, Bit 7 can be used to indicate whether or not the pointing device can communicate with the client. The intended use of this bit is to indicate when the keyboard can communicate with the client using a wireless link. Bit 7 would be set to a zero level if bits 6 through 0 indicate that a pointing device cannot be connected to the client. Therefore, for one embodiment, when the value of Bit 7 is 0, the pointing device and client cannot communicate, while if the value of Bit 7 is 1, the pointing device and client have acknowledged that they can communicate with each other.

The Content Protection Type field (2 bytes) contains a set of flags that indicate the type of digital content protection that is supported by the Display. Currently, bit position 0 is used to indicate when DTCP is supported and bit position 1 is used to indicate when HDCP is supported, with bit positions 2 through 15 being reserved for use with other protection schemes as desired or available, so they are currently set to zero.

The Mfr Name field (here 2 bytes) contains the EISA 3-character ID of the manufacturer, packed into three 5-bit characters in the same manner as in the VESA EDID specification. The character 'A' is represented as 00001 binary, the character 'Z' is represented as 11010 binary, and all letters between 'A' and 'Z' are represented as sequential binary values that correspond to the alphabetic sequence between 'A' and 'Z'. The most significant bit of the Mfr Name field is unused and is generally set to logic-zero for now until a use is made in the future implementations. Example: a manufacturer represented by the string "XYZ" would have a Mfr Name value of 0x633a. If this field is not supported by the client it is generally set to zero. Product Code field uses 2 bytes to contain a product code assigned by the display manufacturer. If this field is not supported by the client it is generally set to zero.

Reserved 1, Reserved 2, and Reserved 3 fields (here 2 bytes each) are reserved for future use in imparting information. All bits in these field are generally be set to a logic-zero level. The purpose of such fields is currently to cause all subsequent 2 byte fields to align to a 16-bit word address and cause 4-byte fields to align to a 32-bit word address.

Serial Number filed uses 4 bytes in this embodiment to specify the serial number of the display in numeric form. If this field is not supported by the client it is generally set to zero. The Week of Manufacture field uses 1 byte to define the week of manufacture of the display. This value is typically in the range of 1 to 53 if it is supported by the client. If this field is not supported by the client it is set to zero. The Year of Manufacture field is 1 byte that defines the year of manufacture of the display. This value is an offset from the year 1990. Years in the range of 1991 to 2245 can be expressed by this field. Example: the year 2003 corresponds to a Year of Manufacture value of 13. If this field is not supported by the client it is set to zero.

The CRC field (here 2 bytes) contains a 16-bit CRC of all bytes in the packet including the Packet Length.

G. For Client Request and Status Packets

The Reverse Link Request field (3 byte) specifies the number of bytes the client needs in the reverse link in the next sub-frame to send information to the host.

The CRC Error Count field (1 byte) indicates how many CRC errors have occurred since the beginning of the media-frame. The CRC count is reset when a sub-frame header packet with a Sub-frame Count of zero is sent. If the actual number of CRC errors exceeds 255 then this value generally saturates at 255.

The Capability Change field uses 1 byte to indicate a change in the capability of the client. This could occur if a user connects a peripheral device such as a microphone, keyboard, or display, or for some other reason. When Bits[7:0] are equal to 0, then the capability has not changed since the last Client Capability Packet was sent. However, when Bits [7:0] are equal to 1 to 255, the capability has changed. The Client Capability Packet is examined to determine the new display characteristics.

The Client Busy Flags field uses 2 bytes to indicate that the client is performing a specific function and is not ready to yet accept another packet related to that function. A bit set to a logic-one level or value indicates that the particular function is currently being performed by the client and that the related function in the client is busy. If the related function in the client is ready, the bit is set t a logic-zero. The client should return a busy status (bit set to one) for all functions that are not supported in the client.

In one embodiment these bytes are interpreted according to the relationship: if Bit 0 is a '1' then the bitmap block transfer function is busy, while if Bit 1 is a '1', then a bitmap area fill function is busy, and if Bit 2 is a '1', then a bitmap pattern fill function is busy. Currently, Bits 3 through 15 remain reserved for future use and are generally set to a logic-one level or state to indicate a busy status in case these bits are assigned in the future.

H. For Bit Block Transfer Packets

The Window Upper Left Coordinate X Value and Y Value fields use 2 bytes each to specify the X and Y value of the coordinates of the upper left corner of the window to be moved. The Window Width and Height fields use 2 bytes each to specify the width and height of the window to be moved. The Window X Movement and Y Movement fields use 2 bytes each to specify the number of pixels that the window is to be moved horizontally and vertically, respectively. Typically, these coordinates are configured such that positive values for X cause the window to be moved to the right, and negative values cause movement to the left, while positive values for Y cause the window to be moved down, and negative values cause upward movement.

I. For Bitmap Area Fill Packets

Window Upper Left Coordinate X Value and Y Value fields use 2 bytes each to specify the X and Y value of the coordinates of the upper left corner of the window to be filled. The Window Width and Height fields (2 bytes each) specify the width and height of the window to be filled. The Video Data Format Descriptor field (2 bytes) specifies the format of the Pixel Area Fill Value. The format is the same as the same field in the Video Stream Packet. The Pixel Area Fill Value field (4 bytes) contains the pixel value to be filled into the window specified by the fields discussed above. The format of this pixel is specified in the Video Data Format Descriptor field.

J. For Bitmap Pattern Fill Packets

Window Upper Left Coordinate X Value and Y Value fields use 2 bytes each to specify the X and Y value of the coordinates of the upper left corner of the window to be filled. The Window Width and Height fields (2 bytes each) specify the width and height of the window to be filled. The Pattern Width and Pattern Height fields (2 bytes each) specify the width and height, respectively, of the fill pattern. The Horizontal Pattern Offset field (2 bytes) specifies a horizontal offset of the pixel data pattern from the left edge of the specified window to be filled. The value being specified is to be less than the value in the Pattern Width Field. The Vertical Pattern Offset field (2 bytes) specifies a vertical offset of the pixel data pattern from the top edge of the specified window to be filled. The value being specified is to be less than the value in the Pattern Height field.

The 2-byte Video Data Format Descriptor field specifies the format of the Pixel Area Fill Value. FIG. 11 illustrates how the Video Data Format Descriptor is coded. The format is the same as the same field in the Video Stream Packet.

The Parameter CRC field (2 bytes) contains a CRC of all bytes from the Packet Length to the Video Format Descriptor. If this CRC fails to check then the entire packet is discarded. The Pattern Pixel Data field contains raw video information that specifies the fill pattern in the format specified by the Video Data Format Descriptor. Data is packed into bytes, and the first pixel of each row is to be byte-aligned. The fill pattern data is transmitted a row at a time. The Pattern Pixel Data CRC field (2 bytes) contains a CRC of only the Pattern Pixel Data. If this CRC fails to check then the Pattern Pixel Data can still be used but the CRC error count is incremented.

K. Communication Link Data Channel Packets

The Parameter CRC field (2 bytes) contain a 16-bit CRC of all bytes from the Packet Length to the Packet Type. If this CRC fails to check then the entire packet is discarded.

The Communication Link Data field contains the raw data from the communication channel. This data is simply passed on to the computing device in the display.

The Communication Link Data CRC field (2 bytes) contains a 16-bit CRC of only the Communication Link Data. If this CRC fails to check then the Communication Link Data is still used or useful, but the CRC error count is incremented.

L. For Interface Type Handoff Request Packets

The Interface Type field (1 byte) specifies the new interface type to use. The value in this field specifies the interface type in the following manner. If the value in Bit 7 is equal to '0' the Type handoff request is for the forward link, if it is equal to '1', then the Type handoff request is for the reverse link. Bits 6 through 3 are reserved for future use, and are generally set to zero. Bits 2 through 0 are used to define the interface Type to be used, with a value of 1 meaning a handoff to Type 1 mode, value of 2 a handoff to Type 2 mode, a value of 3 a handoff to Type 3 mode, and a value of 4 a handoff to Type 4 mode. The values of '0' and 5 through 7 are reserved for future designation of alternative modes or combinations of modes.

M. For Interface Type Acknowledge Packets

The Interface Type field (1 byte) has a value that confirms the new interface type to use. The value in this field specifies the interface type in the following manner. If Bit 7 is equal to '0' the Type handoff request is for the forward link, alternatively, if it is equal to '1' the Type handoff request is for the reverse link. Bit positions 6 through 3 are currently reserved for use in designating other handoff types, as desired, and are generally set to zero. However, bit positions 2 through 0 are used define the interface Type to be used with a value of '0' indicating a negative acknowledge, or that the requested handoff cannot be performed, values of '1', '2', '3', and '4' indicating handoff to Type 1, Type 2, Type 3, and Type 4 modes, respectively. Values of 5 through 7 are reserved for use with alternative designations of modes, as desired.

N. For Perform Type Handoff Packets

The 1-byte Interface Type field indicates the new interface type to use. The value present in this field specifies the interface type by first using the value of Bit 7 to determine whether or not the Type handoff is for the forward or reverse links. A value of '0' indicates the Type handoff request is for the forward link, and a value of '1' the reverse link. Bits 6 through 3 are reserved for future use, and as such are generally set to a value of zero. However, Bits 2 through 0 are used to define the interface Type to be used, with the values 1, 2, 3, and 4 specifying the use of handoff to Type 1, Type 2, Type 3, and Type 4 modes, respectively. The use of values 0 and 5 through 7 for these bits is reserved for future use.

O. For Forward Audio Channel Enable Packets

The Audio Channel Enable Mask field (1 byte) contains a group of flags that indicate which audio channels are to be enabled in a client. A bit set to one enables the corresponding channel, and a bit set to zero disables the corresponding channel Bits 0 through 5 designate channels 0 through 5 which address left front, right front, left rear, right rear, front center, and sub-woofer channels, respectively. Bits 6 and 7 are reserved for future use, and in the mean time are generally set equal to zero.

P. For Reverse Audio Sample Rate Packets

The Audio Sample Rate field(1 byte) specifies the digital audio sample rate. The values for this field are assigned to the different rates with values of 0, 1, 2, 3, 4, 5, 6, 7, and 8 being used to designate 8,000, 16,000, 24,000, 32,000, 40,000, 48,000, 11,025, 22,050, and 44,100 samples per second (SPS), respectively, with values of 9 through 254 being reserved for use with alternative rates, as desired, so they are currently set to '0'. A value of 255 is used to disable the reverse-link audio stream.

The Sample Format field (1 byte) specifies the format of the digital audio samples. When Bits[1:0] are equal to '0', the digital audio samples are in linear format, when they are equal to 1, the digital audio samples are in µ-Law format, and when they are equal to 2, the digital audio samples are in A-Law format. Bits[7:2] are reserved for alternate use in designating audio formats, as desired, and are generally set equal to zero.

Q. For The Digital Content Protection Overhead Packets

The Content Protection Type field (1 byte) specifies the digital content protection method that is used. A value of '0' indicates Digital Transmission Content Protection (DTCP) while a value of 1 indicates High-bandwidth Digital Content Protection System (HDCP). The value range of 2 through 255 is not currently specified but is reserved for use with alternative protection schemes as desired. The Content Protection Overhead Messages field is a variable length field containing content protection messages sent between the host and client.

R. For The Transparent Color Enable Packets

The Transparent Color Enable field (1 byte) specifies when transparent color mode is enabled or disabled. If Bit 0 is equal to 0 then transparent color mode is disabled, if it is equal to 1 then transparent color mode is enabled and the transparent color is specified by the following two parameters. Bits 1 through 7 of this byte are reserved for future use and are typically set equal to zero.

The Video Data Format Descriptor field (2 bytes) specifies the format of the Pixel Area Fill Value. FIG. 11 illustrates how the Video Data Format Descriptor is coded. The format is generally the same as the same field in the Video Stream Packet.

The Pixel Area Fill Value field uses 4 bytes allocated for the pixel value to be filled into the window specified above. The format of this pixel is specified in the Video Data Format Descriptor field.

S. For the Round Trip Delay Measurement Packets

The 2-byte Packet Length field specifies the total number of bytes in the packet not including the packet length field, and in one embodiment is selected to have a fixed length of 159. The 2-byte Packet Type field that identifies this packet type with a value of 82, identifying a packet as a Round Trip Delay Measurement Packet. The hClient ID field, as before is reserved for future use as a Client ID, and is generally set to zero.

In one embodiment, the Parameter CRC field (2 bytes) contains a 16-bit CRC of all bytes from the Packet Length to the Packet Type. If this CRC fails to check then the entire packet is discarded.

The Guard Time 1 field (here 64 bytes) is used to allow the MDDI_Data line drivers in the client to enable before the line drivers in the host are disabled. The client enables its MDDI_Data line drivers during bit 0 of Guard Time 1 and the host disenables its line drivers so as to be completely disabled prior to the last bit of Guard Time 1. The host and client both drive a logic-zero level during Guard Time 1 when they are not disabled. Another purpose of this field is to ensure that all MDDI_Data signals are at a logic-zero level for a sufficient time to allow the client to begin recovering a clock or clock signal using only MDDI_Stb prior to disabling the host's line drivers.

The Measurement Period field is a 64 byte window used to allow the client to respond with two bytes of 0xff, and 30 bytes of 0x0 at half the data rate used on the forward link. This data rate corresponds to a Reverse Link Rate Divisor of 1. The client returns this response immediately at the time it perceives as being the beginning of the Measurement Period. This response from the client will be received at a host at precisely the round trip delay of the link plus logic delay in the client after the beginning of the first bit of the Measurement Period at the host.

The All Zero 1 field (2 bytes) contains zeroes to allow the MDDI_Data line drivers in the host and client to overlap so that MDDI_Data is always driven. The host enables MDDI_Data line drivers during bit 0 of Guard Time 2, and the client also drives the signal to a logic-zero level as it did at the end of the Measurement Period.

The value in the Guard Time 2 field (64 bytes) allows overlap of the Measurement Period driven by the client when the round trip delay is at the maximum amount that can be measured in the Measurement Period. The Client disables its line drivers during bit 0 of Guard Time 2 and the Host enables its line drivers immediately after the last bit of Guard Time 2. The host and client both drive a logic-zero level during Guard Time 2 when they are not disabled. Another purpose of this field is to ensure that all MDDI_Data signals are at a logic-zero level for a sufficient time to allow the client to begin recovering a clock signal using both MDDI_Data0 and MDDI_Stb after enabling the line drivers for a host.

T. For the Forward Link Skew Calibration Packets

In one embodiment, the Parameter CRC field (2 bytes) contains a 16-bit CRC of all bytes from the Packet Length to the Packet Type. If this CRC fails to check then the entire packet is discarded.

The All Zero 1 field uses 1 byte to ensure that there will be an transitions on the MDDI_Stb at the end of the Parameter CRC field.

The Calibration Data Sequence field contains a data sequence that causes the MDDI_Data signals to toggle at every data period. The length of the Calibration Data Sequence field is determined by the interface being used on the forward link. During the processing of the Calibration Data Sequence, the MDDI host controller sets all MDDI_Data signals equal to the strobe signal. The client clock recovery circuit should use only MDDI_Stb rather than MDDI_Stb Xor MDDI_Data0 to recover the data clock while the Calibration Data Sequence field is being received by the client Display. Depending on the exact phase of the MDDI_Stb signal at the beginning of the Calibration Data Sequence field, the Calibration Data Sequence will generally be one of the following based on the interface Type being used when this packet is sent:

Type I—(64 byte data sequence) 0xaa, 0xaa . . . or 0x55, 0x55 . . .

Type II—(128 byte data sequence) 0xcc, 0xcc . . . or 0x33, 0x33 . . .

Type III—(256 byte data sequence) 0xf0, 0xf0 . . . or 0x0f, 0x0f . . .

Type IV—(512 byte data sequence) 0xff, 0x00, 0xff, 0x00 . . . or 0x00, 0xff, 0x00, 0xff . . .

Figure 62A:
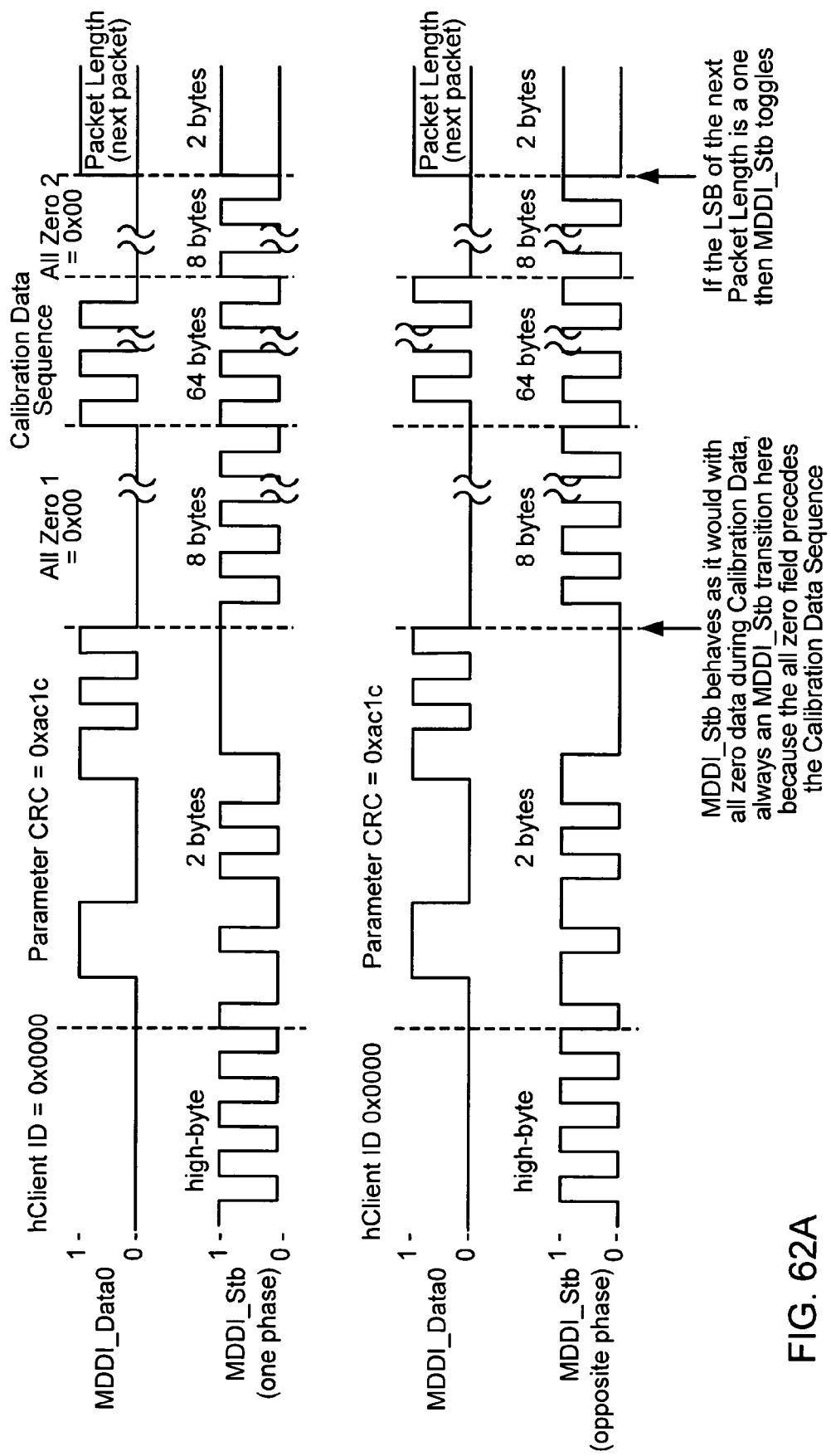
FIGS. 62A and 62B illustrate possible MDDI_Data and MDDI_Stb waveforms for both Type 1 and Type 2 Interfaces, respectively.
Figure 62B:
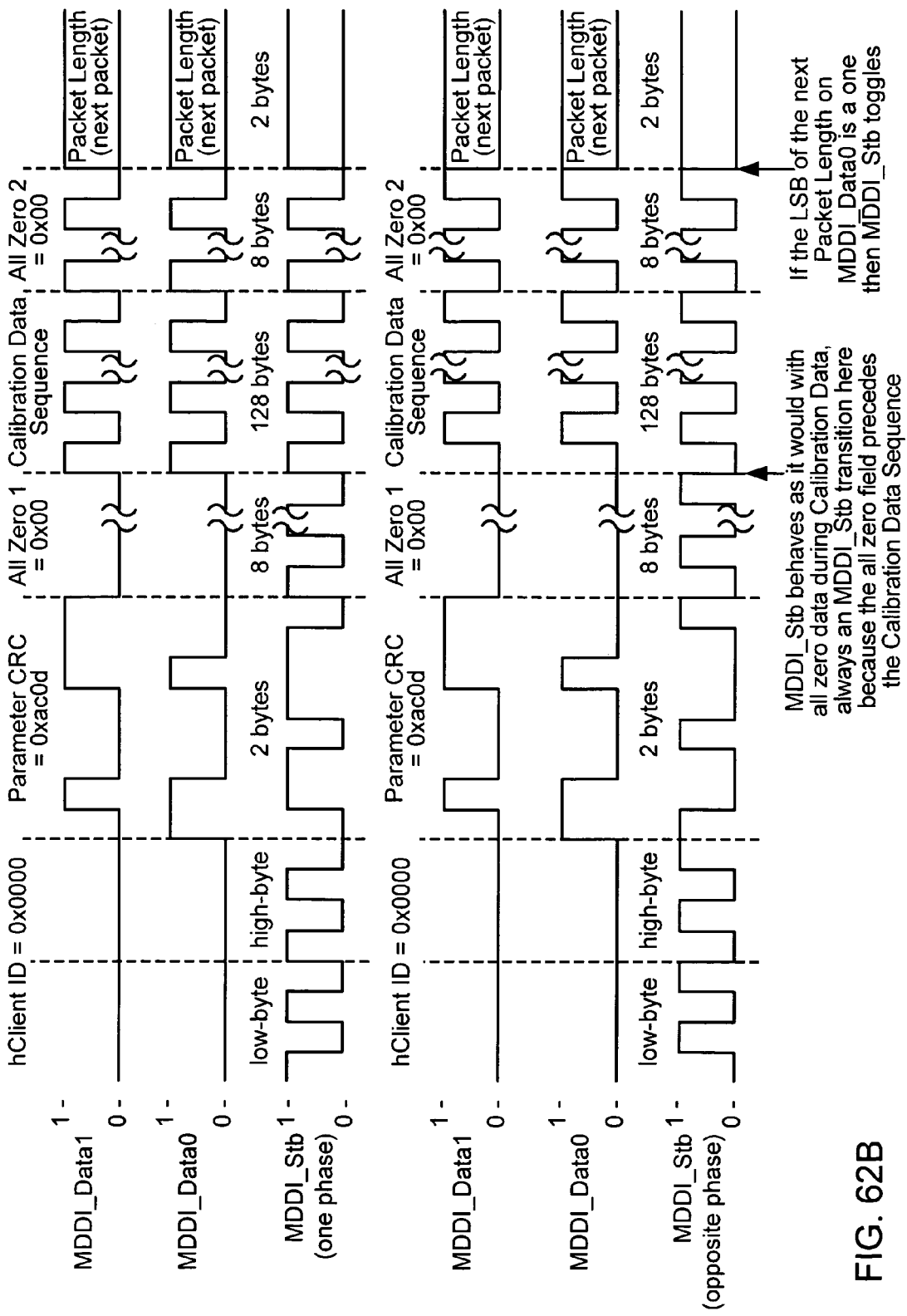

An example of the possible MDDI_Data and MDDI_Stb waveforms for both the Type 1 and Type 2 Interfaces are shown in FIGS. 62A and 62B, respectively.

XVII. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method stored on a computer hardware readable storage medium of starting up a digital data interface communication data link, the method comprising:
    driving a data signal to a logic one state for a first predetermined range of only strobe cycles, the first predetermined range of strobe cycles comprising counting a first predetermined number of strobe cycles independent of a time measuring system in a client;
    driving the data signal to a logic zero state for a second predetermined range of only strobe cycles to start up the digital data interface communication link, the second predetermined range of strobe cycles comprising counting a second predetermined number of strobe cycles independent of the time measuring system in the client; and
    transmitting a sub-frame header packet.

2. The method of claim 1 wherein the data signal consists of a differential pair.

3. The method of claim 1 wherein the first predetermined range of strobe cycles comprises between one hundred and forty (140) strobe cycles and one hundred and sixty (160) strobe cycles.

4. The method of claim 1 wherein the second predetermined range of strobe cycles comprises between forty (40) strobe cycles and sixty (60) strobe cycles.

5. A hardware system for starting up a digital data interface communication data link, the system comprising:
    means for driving a data signal to a logic one state for a first predetermined range of only strobe cycles, the first predetermined range of strobe cycles comprising counting a first predetermined number of strobe cycles independent of a time measuring system in a client;
    means for driving the data signal to a logic zero state for a second predetermined range of only strobe cycles to start up the digital data interface communication link, the second predetermined range of strobe cycles comprising counting a second predetermined number of strobe cycles independent of the time measuring system in the client; and
    means for transmitting a sub-frame header packet.

6. The hardware system of claim 5 wherein the data signal consists of a differential pair.

7. The hardware system of claim 5 wherein the first predetermined range of strobe cycles comprises between one hundred and forty (140) strobe cycles and one hundred and sixty (160) strobe cycles.

8. The hardware system of claim 5 wherein the second predetermined range of strobe cycles comprises between forty (40) strobe cycles and sixty (60) strobe cycles.

9. A computer program product embodied on a computer readable hardware storage medium, comprising:
    code for causing a digital data interface communication data link to start up, the computer code comprising:
    code for causing a data signal to be driven to a logic one state for a first predetermined range of only strobe cycles, the first predetermined range of strobe cycles comprising counting a first predetermined number of strobe cycles independent of a time measuring system in a client;
    code for causing the data signal to be driven to a logic zero state for a second predetermined range of only strobe cycles to start up the digital data interface communication link, the second predetermined range of strobe cycles comprising counting a second predetermined number of strobe cycles independent of the time measuring system in the client; and
    code for causing a sub-frame header packet to be transmitted.

10. The computer program product of claim 9 wherein the data signal consists of a differential pair.

11. The computer program product of claim 9 wherein the first predetermined range of strobe cycles comprises between one hundred and forty (140) strobe cycles and one hundred and sixty (160) strobe cycles.

12. The computer program product of claim 9 wherein the second predetermined range of strobe cycles comprises between forty (40) strobe cycles and sixty (60) strobe cycles.

13. An apparatus for starting up a digital data interface communication data link, comprising:
    a host configured to:
    drive a data signal to a logic one state for a first predetermined range of only strobe cycles, the first predetermined range of strobe cycles comprising counting a first predetermined number of strobe cycles independent of a time measuring system in a client;
    drive the data signal to a logic zero state for a second predetermined range of only strobe cycles to start up the digital data interface communication link, the second predetermined range of strobe cycles comprising counting a second predetermined number of strobe cycles independent of the time measuring system in the client; and
    transmit a sub-frame header packet.

14. The apparatus of claim 13 wherein the data signal consists of a differential pair.

15. The apparatus of claim 13 wherein the first predetermined range of strobe cycles comprises between one hundred and forty (140) strobe cycles and one hundred and sixty (160) strobe cycles.

16. The apparatus of claim 13 wherein the second predetermined range of strobe cycles comprises between forty (40) strobe cycles and sixty (60) strobe cycles.

* * * * *